US006311093B1

(12) United States Patent
Brown

(10) Patent No.: US 6,311,093 B1
(45) Date of Patent: Oct. 30, 2001

(54) SYSTEM AND METHOD FOR SIMULATION, MODELING AND SCHEDULING OF EQUIPMENT MAINTENANCE AND CALIBRATION IN BIOPHARMACEUTICAL BATCH PROCESS MANUFACTURING FACILITIES

(76) Inventor: Peter G. Brown, 63 Clearwater Rd., Newton, MA (US) 02162

( * ) Notice: Subject to any disclaimer, the term of this patent is extended or adjusted under 35 U.S.C. 154(b) by 0 days.

(21) Appl. No.: 09/100,028

(22) Filed: Jun. 19, 1998

Related U.S. Application Data

(60) Provisional application No. 60/050,290, filed on Jun. 20, 1997.

(51) Int. Cl.[7] .......... G06F 19/00

(52) U.S. Cl. .......... 700/95; 702/184

(58) Field of Search .......... 700/90, 95, 97; 702/182–184, 187

(56) References Cited

U.S. PATENT DOCUMENTS

| | | | |
|---|---|---|---|
| 4,796,194 | 1/1989 | Atherton | 364/468 |
| 4,975,865 | 12/1990 | Carrette et al. | 364/513 |

(List continued on next page.)

OTHER PUBLICATIONS

Daubas, P. et al., "Combined simulation of hybrid processes," *Systems, Man, and Cybernetics,* IEEE, 1994, vol. 1, pp. 320–325.

Dean, G., "Meeting the demands of batch control," *Control,* IEEE, 1991, vol. 2, pp. 881–886.

Hwang, Y. K. et al., "Motion planning for robotic spray cleaning with environmentally safe solvents," *Advanced Robotics,* IEEE, 1993, pp. 49–54.

Kasko, I. et al., "Integrated process control for cluster tools using an in–line anlytical," *Semiconductor Manufacturing Conference Proceedings,* IEEE, 1997, pp. 41–44.

Ober, O. N., "Automated pharmaceuticals manufacturing," *Innovations in Manufacturing Control Through Mechatronics,* IEEE, 1995, pp. 1/1–1/2.

Berstein et al., "A Simulation–based Decision Support System for a Specialty Chemicals Production Plant," *Proc. of the 1992 Winter Simulation Conference,* 1992, pp. 1262–1270.

Ehrlich et al., "Making Better Manufacturing Decisions with AIM," *Proc. of the 1996 Winter Simulation Conference,* 1996, pp. 485–491.

(List continued on next page.)

*Primary Examiner*—Thomas M. Heckler

(74) *Attorney, Agent, or Firm*—Sterne, Kessler, Goldstein & Fox PLLC

(57) ABSTRACT

A method and computer program product for simulating, modeling and scheduling equipment maintenance and calibration procedures in a biopharmaceutical production facility is described herein. The method and computer program product includes the steps of identifying maintenance, and maintenance and calibration data associated with biopharmaceutical production process equipment. After the maintenance and calibration data are identified, biopharmaceutical production process equipment is used to generate a table of equipment and maintenance and calibration data. After the table of equipment and data is generated, the table is compared with a procedure time line to determine the schedule of calibration and maintenance for the equipment in the biopharmaceutical production process.

9 Claims, 167 Drawing Sheets

U.S. PATENT DOCUMENTS

| | | | | |
|---|---|---|---|---|
| 5,006,992 | | 4/1991 | Skeirik | 364/513 |
| 5,058,043 | | 10/1991 | Skeirik | 364/550 |
| 5,148,370 | | 9/1992 | Litt et al. | 364/468.1 |
| 5,157,595 | | 10/1992 | Lovrenich | 364/136 |
| 5,164,905 | | 11/1992 | Iwasaki et al. | 364/468 |
| 5,237,508 | | 8/1993 | Furukawa et al. | 364/468 |
| 5,255,197 | | 10/1993 | Iida | 364/468.15 |
| 5,343,387 | * | 8/1994 | Honma et al. | 705/9 |
| 5,375,062 | | 12/1994 | Aoki | 364/468.05 |
| 5,402,367 | | 3/1995 | Sullivan et al. | 364/578 |
| 5,402,526 | | 3/1995 | Bauman et al. | 395/53 |
| 5,405,452 | | 4/1995 | Anderson et al. | 134/22.12 |
| 5,408,405 | | 4/1995 | Mozumder et al. | 364/151 |
| 5,427,126 | | 6/1995 | Carney et al. | 134/98.1 |
| 5,428,525 | | 6/1995 | Cappelaere et al. | 364/140 |
| 5,440,478 | | 8/1995 | Fisher et al. | 364/188 |
| 5,442,562 | | 8/1995 | Hopkins et al. | 364/468 |
| 5,450,346 | | 9/1995 | Krummen et al. | 364/140.01 |
| 5,463,555 | | 10/1995 | Ward et al. | 364/468 |
| 5,495,417 | | 2/1996 | Fuduka et al. | 364/468 |
| 5,594,639 | | 1/1997 | Atsumi | 364/468.14 |
| 5,666,297 | | 9/1997 | Britt et al. | 364/578 |
| 5,666,585 | * | 9/1997 | Nagira et al. | 399/10 |
| 5,680,877 | | 10/1997 | Edstrand et al. | 134/103.1 |
| 5,737,581 | | 4/1998 | Keane | 395/500 |
| 5,757,659 | | 5/1998 | Arai et al. | 364/497 |
| 5,774,875 | | 6/1998 | Medeiros et al. | 705/28 |
| 5,841,660 | | 11/1998 | Robinson et al. | 364/468.22 |
| 5,891,260 | | 4/1999 | Streets et al. | 134/8 |
| 5,969,973 | | 10/1999 | Bourne et al. | 364/474.07 |
| 5,980,078 | | 11/1999 | Krivoshein et al. | 364/131 |
| 6,004,025 | | 12/1999 | Kubiak wt al. | 366/173.1 |
| 6,038,486 | | 3/2000 | Saitoh et al. | 700/96 |
| 6,063,292 | | 5/2000 | Leung | 210/739 |
| 6,071,356 | | 6/2000 | Olsen | 134/26 |
| 6,143,092 | | 11/2000 | Straub et al. | 134/15 |

OTHER PUBLICATIONS

Faccenda et al., "A Combined Simulation/Optimization Approach to Process Plant Design," *Proc. of the 1992 Winter Simulation Conference,* 1992, pp. 1256–1261.

Ketcham et al., "A Generic Simulator for Continuous Flow Manufacturing," *Proc. of 1988 Winter Simulation Conference,* 1988, pp. 609–615.

Leitch et al., "A Real–Time Knowledge Based System for Product Quality Control," *International Conference on Control,* 1988, pp. 281–286.

Litt, J., "An Expert System to Perform On–Line Controller Tuning," *IEEE Control Systems Magazine,* vol. 11, Issue 3, Apr. 1991, pp. 18–23.

Sam G. Taylor et al., APICS, *Process Flow Scheduling: A Scheduling Systems Framework for Flow Manufacturing,* Copyright 1994 (168 Pages).

Sam G. Taylor et al., APICS, *Can Process Flow Scheduling Help You?,* pp. 44–46, Mar. 1996.

Copy of International Search Report from PCT Appl. No. PCT/US00/22104, 2 pages, mailed Jan. 25, 2001.

* cited by examiner

FIG. 3

UNIT OPERATIONS LIST

MICROBIAL FERMENTATION PROCESS

| UOP SEQ. NO. | CODE | UNIT OPERATION TYPE | CYCLES PER UnOp | | CYCLES PER BATCH | | | | CYCLES PER PROCESS | | | | RECOVERY PRODUCT | | RECOVERY TOTAL PROTEIN | |
|---|---|---|---|---|---|---|---|---|---|---|---|---|---|---|---|---|
| | | | | OFFSET (HRS) | | UnOp START | UnOp END | OFFSET (HRS) | | UnOp START | UnOp END | OFFSET (HRS) | SWR | OAR | SWR | OAR |
| 1 | 1 | INOCULUM PREP | 1 | | 3 | 1 | 6 | | 1 | | | | | | | |
| 2 | 2 | FLASK GROWTH | 1 | | 3 | 1 | 6 | | 1 | | | | | | | |
| 3 | 53 | SEED FERMENTATION | 1 | | 3 | 1 | 6 | | 1 | | | | | | | |
| 4 | 3 | PRODUCTION FERMENTATION | 1 | | 3 | 1 | 6 | | 1 | | | | 100% | 100% | 100% | 100% |
| 5 | 51 | HEAT EXCHANGE | 1 | | 3 | 1 | 6 | | 1 | | | | 100% | 100% | 100% | 100% |
| 6 | 28 | CONT. CENTRIFUGATION/WHOLE CELL HARVEST | 1 | | 3 | 1 | 6 | | 1 | | | | 95% | 95% | 95% | 95% |
| 7 | 48 | RESUSPEND CELL PASTE | 1 | | 1 | | | | 1 | | | | 100% | 95% | 100% | 95% |
| 8 | 51 | HEAT EXCHANGE | 1 | | 3 | 8 | 10 | | 1 | | | | 100% | 95% | 100% | 95% |
| 9 | 31 | CELL DISRUPTION/HIGH PRESSURE | 1 | | 3 | 8 | 10 | | 1 | | | | 80% | 76% | 90% | 86% |
| 10 | 51 | HEAT EXCHANGE | 1 | | 3 | 8 | 10 | | 1 | | | | 100% | 76% | 100% | 86% |
| 11 | 48 | RESUSPENSION/SURFACTANT | 1 | | 2 | 11 | 12 | | 1 | | | | 100% | 76% | 95% | 81% |
| 12 | 29 | CONT. CENTRIFUGATION/PRECIPITATE HARVEST | 1 | | 2 | 11 | 12 | | 1 | | | | 95% | 72% | 32% | 26% |
| 13 | 48 | RESUSPENSION/BUFFER | 1 | | 1 | | | | 1 | | | | 100% | 72% | 95% | 24% |
| 14 | 29 | ULTRAFILTRATION/CONCENTRATION/DILUTION | 1 | | 1 | | | | 1 | | | | 95% | 69% | 95% | 23% |
| 15 | 48 | MICROFILTRATION/TANGENTIAL FLOW | 1 | | 1 | | | | 1 | | | | 93% | 64% | 95% | 22% |
| 16 | 36 | PRODUCT ADSORPTION MPLC | 1 | | 1 | | | | 1 | | | | 85% | 54% | 33% | 7% |
| 17 | 34 | PRODUCT ADSORPTION MPLC | 1 | | 1 | | | | 1 | | | | 90% | 49% | 40% | 3% |
| 18 | 39 | ULTRAFILTRATION/FLOW DIALYSIS | 1 | | 1 | | | | 1 | | | | 95% | 46% | 95% | 3% |
| 19 | 39 | PRODUCT ADSORPTION MPLC | 1 | | 1 | | | | 1 | | | | 85% | 39% | 55% | 2% |
| 20 | 37 | ULTRAFILTRATION/FLOW DIALYSIS | 1 | | 1 | | | | 1 | | | | 90% | 35% | 95% | 1% |
| 21 | 39 | PRODUCT ADSORPTION MPLC | 1 | | 1 | | | | 1 | | | | 90% | 32% | 80% | 1% |
| 22 | 37 | MICROFILTRATION/DEAD END | 1 | | 1 | | | | 1 | | | | 95% | 30% | 95% | 1% |
| 23 | 99 | END | | | | | | | | | | | | | | |
| 302 | 304 | | 306 | 308 | 310 | 312 | 314 | 316 | 318 | 320 | 322 | 324 | 326 | 328 | 330 | 332 |

FIG. 4

UNIT OPERATIONS LIST

MAMMALIAN CELL CULTURE PROCESS

| UOP SEQ. NO. | CODE | UNIT OPERATION TYPE | CYCLES PER UnOp | | CYCLES PER BATCH | | | | CYCLES PER PROCESS | | | | RECOVERY PRODUCT | | RECOVERY TOTAL PROTEIN | |
|---|---|---|---|---|---|---|---|---|---|---|---|---|---|---|---|---|
| | | | | OFFSET (HRS) | | UnOp START | UnOp END | OFFSET (HRS) | | UnOp START | UnOp END | OFFSET (HRS) | SWR | OAR | SWR | OAR |
| 1 | 4 | INITIAL SEEDING | 1 | | 1 | | | | 1 | | | | | | | |
| 2 | 5 | CULTURE VESSEL SPLIT | 1 | | 1 | | | | 1 | | | | | | | |
| 3 | 5 | CULTURE VESSEL SPLIT | 1 | | 1 | | | | 1 | | | | | | | |
| 4 | 5 | CULTURE VESSEL SPLIT | 1 | | 1 | | | | 1 | | | | | | | |
| 5 | 6 | SPINNER FLASK SPLIT | 1 | | 1 | | | | 1 | | | | | | | |
| 6 | 54 | SPINNER FLASK SPLIT | 1 | | 1 | | | | 1 | | | | | | | |
| 7 | 13 | STIRRED TANK REACTOR | 1 | | 1 | | | | 1 | | | | | | | |
| 8 | 61 | HARVEST/FEED | 7 | 24 | 1 | | | | 8 | 8 | 18 | 168 | | | | |
| 9 | 62 | HARVEST POOL | 1 | | 1 | | | | 8 | 8 | 18 | 168 | | | | |
| 10 | 34 | MF/TANGENTIAL FLOW | 1 | | 1 | | | | 8 | 8 | 18 | 168 | | | | |
| 11 | 36 | UF/CONCENTRATION | 1 | | 1 | | | | 8 | 8 | 18 | 168 | | | | |
| 12 | 39 | PAC/MPLC | 1 | | 1 | | | | 8 | 8 | 18 | 168 | | | | |
| 13 | 39 | PAC/MPLC | 1 | | 1 | | | | 8 | 8 | 18 | 168 | | | | |
| 14 | 36 | UF/CONCENTRATION | 1 | | 1 | | | | 8 | 8 | 18 | 168 | | | | |
| 15 | 39 | PAC/MPLC | 1 | | 1 | | | | 8 | 8 | 18 | 168 | | | | |
| 16 | 37 | UF/FLOW DIALYSIS | 1 | | 1 | | | | 8 | 8 | 18 | 168 | | | | |
| 17 | 39 | PAC/MPLC | 1 | | 1 | | | | 8 | 8 | 18 | 168 | | | | |
| 18 | 35 | MF/DEAD END | 1 | | 1 | | | | 8 | 8 | 18 | 168 | | | | |
| 19 | 99 | END | 1 | | 1 | | | | 8 | 8 | 18 | 168 | | | | |
| 402 | 404 | | 406 | 408 | 410 | 412 | 414 | 416 | 418 | 420 | 422 | 424 | | | | |

FIG. 6A

| UNIT OPERATION ID CODE | UNIT OPERATION TYPE | PARAMETERS |
|---|---|---|
| 1 | INOCULUM PREP | # OF FLASKS, VOLUME OF FLASKS, TEMPERATURE, AGITATION, DURATION, FINAL OD |
| 2 | FLASK GROWTH | SCALE UP RATIO, MEDIA VOLUME, TEMPERATURE, AGITATION, DURATION, FINAL OD |
| 3 | FERMENTATION SEED | SCALE UP RATIO, FERMENTOR WORKING VOLUME, ANTIFOAM, BASE ACID, GROW TEMPERATURE, AGITATION, SPARGE RATE, BACK PRESSURE, TOTAL DURATION |
| 4 | FERMENTATION PRODUCTION | SCALE UP RATIO, GERMENTOR WORKING VOLUME, ANTIFOAM A, ANTIFOAM B, BASE, ACID, GROW TEMPERATURE, AGITATION, SPARGE RATE, BACK PRESSURE, TOTAL DURATION, FINAL OK, DRY CELL MASS, PRODUCT CONCENTRATION, CIP, SIP |
| 5 | HEAT EXCHANGE | PROCESS INITIAL & FINAL TEMP; UTILITY INITIAL & FINAL TEMP; PROCESS SPECIFIC HEAT; DESIGN TYPE, STEP RECOVERY OF PRODUCT, STEP RECOVERY OF T.P., TEMPERATURE REGULATION, CIP, SIP |
| 6 | BATCH CENTRIFUGATION | SYSTEM VOID VOLUME, RCF, TIME, VOLUME REDUCTION, WASH VOLUME, CLEAN, RINSE |
| 7 | RESOLUBLIZATION RESUSPENSION | REAGENT/PRODUCT RATIO, TITRATION SOLUTION, RESOLUBLIZATION, AGITATION, SOLUTION NAME, STEP RECOVERY OF THE PRODUCT, STEP RECOVERY OF T.P., TEMPERATURE REGULATION, CIP, SIP |
| 8 | CELL DISRUPTION HIGH PRESS. HOMMOGENIZATION | PRODUCT TERMPERATURE, UNILITY TEMPERATURE, VOID VOLUME, NUMBER OF PASSES, PRESSURE, FLOW RATE, TEMPERATURE INCREASE, WASH, RINSE, STEP RECOVERY OF PRODUCT, STEP RECOVERY OF T.P., TERMPERATURE REGULATION, CIP |
| 9 | DILUTE WITH SURFACTANT | REAGENT PRODUCT RATIO, TITRATION SOLUTION, DILUTION TIME, AGITATION, SOLUTION NAME, STEP RECOVERY OF PRODUCT, STEP RECOVERY OF T.P., TEMPERATURE REGULATION, CIP, SIP |
| 10 | BATCH CENTRIFUGATION PRECIPITATE HARVEST | SYSTEM VOID VOLUME, RCF, TIME, VOLUME REDUCTION, WASH VOLUME, CLEAN, RINSE, STEP RECOVERY OF PRODUCT, STEP RECOVERY OF T.P., TEMPERATURE REGULATION, CIP, SIP |
| 11 | RESUSPEND WITH CHAOTROPE | REAGENT/PRODUCT RATIO, TITRATION SOLUTION, RESOLUBLIZATION, AGITATION, SOLUTION NAME, STEP RECOVERY OF PRODUCT, STEP RECOVERY TO TP, TEMPERATURE REGULATION, CIP, SIP |
| • | • | • |

| SOLUTION TYPE | TASKS | TASK DURATION |
|---|---|---|
| S-101 | SETUP, PREINCUBATION, INCUBATION, CLEAN UP | 3, 3, 23, .3, HRS |
| S-101 | SETUP, PREINCUBATION, INCUBATION, CLEAN UP | 1, 1, 23, .3, HRS |
| S-101, 102, 103, 104, 105 | SETUP, PREINCUBATION, FERMENTATION, HARVEST, CIP, SIP, CLEAN UP | 1, 1, 21, .5, 1, 1, 3 HRS |
| S-101, 102 103, 104, 105 | SETUP, PREINCUBATION, FERMENTATION, CIP, SIP, CLEAN UP | • |
| | SETUP, TRANSFER, CIP, SIP, CLEAN UP | • |
| S-106 | SETUP, CENTRIFUGATION, WASH, CIP, SIP, CLEANUP | • |
| S-107 | SETUP, DILUTION, AGITATE, CIP, SIP, CLEAN UP | • |
| S-107 | SETUP, LYSIS, CIP, SIP, CLEAN UP | • |
| S-108 | SETUP, DILUTION, AGITATE, CIP, SIP, CLEAN UP | • |
| S-108 | SETUP, CENTRIFUGATION, WASH, CIP, SIP, CLEAN UP | • |
| S-109 | SETUP, FLUSH, PRIME, CONCENTRATION, DILUTION, WASH, FLUSH, STORE, CIP, SIP, CLEANUP | • |
| • | • | • |

SAMPLE APPLICATION OF PROCESS DESIGN CYCLES IN PROCESS SCHEDULING

MICROBIAL FERMENTATION PROCESS (SEE UNIT OPERATION LIST)

NOTE: NONE OF THE UNIT OPERATIONS IN THIS PROCESS HAVE MORE THAT 1 CYCLE PER UNIT OPERATION
(SEE UNIT OPERATION 8 IN THE MAMMALIAN CELL CULTURE PROCESS FOR AN EXAMPLE OF MULTIPLE CYCLES PER UNIT OPERATION)

UNIT OPERATIONS 1-6 UNDERGO THREE REPETATIVE CYCLES PER BATCH AS A SET BEFORE CONTINUING WITH UNIT OP 7
THIS TRANSLATES TO THREE RUNS ON A FERMENTOR WITH EACH HARVEST (UNIT OP 5 & 6) BEING STORED FOR POOLING AT UNIT OP 7
ASSOCIATED WITH EACH FERMENTOR RUN (UNIT OP 4) ARE THE PREVIOUS STEPS FOR INNOCULATION PREP (UNIT OPS 1-3)

| | | | FIRST PROCESS CYCLE | | SECOND PROCESS CYCLE | |
|---|---|---|---|---|---|---|
| | | DURATION | WEEK | DAY | WEEK | DAY |
| 1/3 FERMENTATION CYCLES PER BATCH | | | | | | |
| 1 | INOCULUM PREP | 24 HRS | 1 | FRI - SAT | 2 | FRI - SAT |
| 2 | FLASK GROWTH | 24 HRS | 2 | SAT - SUN | 3 | SAT - SUN |
| 3 | SEED FERMENTAION | 24 HRS | 2 | SUN - MON | 3 | SUN - MON |
| 4 | PRODUCTION FERMENTATION | 24 HRS | 2 | MON - TUE | 3 | MON - TUE |
| 5 | HEAT EXCHANGE | 1 HR | 2 | TUE | 3 | TUE |
| 6 | CENTRIFUGATION | 1 HR | 2 | TUE | 3 | TUE |
| 2/3 FERMENTATION CYCLES PER BATCH | | | | | | |
| 1 | INOCULUM PREP | 24 HRS | 2 | SUN - MON | 3 | SUN - MON |
| 2 | FLASK GROWTH | 24 HRS | 2 | MON - TUE | 3 | MON - TUE |
| 3 | SEED FERMENTAION | 24 HRS | 2 | TUE - WED | 3 | TUE - WED |
| 4 | PRODUCTION FERMENTATION | 24 HRS | 2 | WED - THU | 3 | WED - THU |
| 5 | HEAT EXCHANGE | 1 HR | 2 | THU | 3 | THU |
| 6 | CENTRIFUGATION | 1 HR | 2 | THU | 3 | THU |
| 3/3 FERMENTATION CYCLES PER BATCH | | | | | | |
| 1 | INOCULUM PREP | 24 HRS | 2 | TUE - WED | 3 | TUE - WED |
| 2 | FLASK GROWTH | 24 HRS | 2 | WED - THU | 3 | WED - THU |
| 3 | SEED FERMENTAION | 24 HRS | 2 | THU - FRI | 3 | THU - FRI |
| 4 | PRODUCTION FERMENTATION | 24 HRS | 2 | FRI - SAT | 3 | FRI - SAT |
| 5 | HEAT EXCHANGE | 1 HR | 2 | SAT | 3 | SAT |
| 6 | CENTRIFUGATION | 1 HR | 2 | SAT | 3 | SAT |
| UNIT OPERATION 7 POOLS THE HARVESTS FROM THE THREE FERMENTATION CYCLES ABOVE | | | | | | |
| 7 | POOL HARVESTS | 3 HR | 3 | MON | 4 | MON |
| UNIT OPERATIONS 8-9 UNDERGO THREE REPETATIVE CYCLES PER BATCH AS SET BEFORE CONTINUING WITH UNIT OPERATION 11 THIS TRANSLATES TO THREE CONSECUTIVE PASSES THROUGH CELL DISRUPTOR (UNIT OP 9) WITH ITS ASSOCIATED HEAT EXCHANGERS (UNIT OP 8 & 10) AT THE INLET AND THE OUTLET OF THE CELL DISRUPTOR | | | | | | |
| 1/3 DISRUPTION CYCLES PER BATCH | | | | | | |
| 8 | HEAT EXCHANGE | | | | | |
| 9 | CELL DISRUPTION | | | | | |
| 10 | HEAT EXCHANGE | 0.5 HR | 3 | MON | 4 | MON |
| 2/3 DISRUPTION CYCLES PER BATCH | | | | | | |
| 8 | HEAT EXCHANGE | | | | | |
| 9 | CELL DISRUPTION | | | | | |
| 10 | HEAT EXCHANGE | 0.5 HR | 3 | MON | 4 | MON |
| 3/3 DISRUPTION CYCLES PER BATCH | | | | | | |
| 8 | HEAT EXCHANGE | | | | | |
| 9 | CELL DISRUPTION | | | | | |
| 10 | HEAT EXCHANGE | 0.5 HR | 3 | MON | 4 | MON |

FIG. 11

SAMPLE APPLICATION OF PROCESS DESIGN CYCLES IN PROCESS SCHEDULING

MICROBIAL FERMENTATION PROCESS (SEE UNIT OPERATION LIST)

| | | | FIRST PROCESS CYCLE | | SECOND PROCESS CYCLE | |
|---|---|---|---|---|---|---|
| | | DURATION | WEEK | DAY | WEEK | DAY |
| UNIT OPS 11-12 UNDERGO TWO REPETATIVE CYCLES PER BATCH AS A SET BEFORE CONTINUING WITH UNIT OP 13 THIS TRANSLATES TO TWO CYCLES OF RESUSPENDING THE CELL TYSATE FROM THE CELL DISRUPTOR IN A MILD SURFACTANT AND RECONCENTRATING THE INSOLUBLE PRODUCT TO A PASTE BY CENTRIFUGATION | | | | | | |
| 1/2 PRODUCT WASHING CYCLES PER BATCH | | | | | | |
| 11 | RESUSPENSION | 0.5 HR | 3 | MON | 4 | MON |
| 12 | CENTRIFUGATION | 1 HR | 3 | MON | 4 | MON |
| 2/3 PRODUCT WASHING CYCLES PER BATCH | | | | | | |
| 11 | RESUSPENSION | 0.5 HR | 3 | MON | 4 | MON |
| 12 | CENTRIFUGATION | 1 HR | 3 | MON | 4 | MON |
| UNIT OPS 13-22 UNDERGO ONLY ONE CYCLE PER UNIT OPERATION EACH TO THE END OF THE PROCESS | | | | | | |
| 13 | RESUSPENSION | 0.5 HR | 3 | MON | 4 | MON |
| 14 | BUFFER EXCHANGE | 2 HR | 3 | MON | 4 | MON |
| 15 | FILTRATION | 2 HR | 3 | MON | 4 | MON |
| 16 | LIQUID CHROMATOGRAPHY | 16 HRS | 3 | MON - TUE | 4 | MON - TUE |
| 17 | LIQUID CHROMATOGRAPHY | 4 HRS | 3 | TUE | 4 | TUE |
| 18 | BUFFER EXCHANGE | 2 HRS | 3 | TUE | 4 | TUE |
| 19 | LIQUID CHROMATOGRAPHY | 2 HRS | 3 | WED | 4 | WED |
| 20 | BUFFER EXCHANGE | 2 HRS | 3 | WED | 4 | WED |
| 21 | LIQUID CHROMATOGRAPHY | 2 HRS | 3 | WED | 4 | WED |
| 22 | FILTRATION | 2 HRS | 3 | WED | 4 | WED |

FIG. 12A-1

| | OPERATION | PROCESS TIME LINE DURATION (HRS.) CALC. | A/D | ADJ. | REL. TIME SCALE (HRS) PREP | EXEC. | COMPL. | ABS. DAYS START | END | START DATE | START TIME | FINISH DATE | FINISH TIME | CALCULATIONS |
|---|---|---|---|---|---|---|---|---|---|---|---|---|---|---|
| | | | | | | 15.5 | | | | 06/03/96 | 08:00 AM | | | |
| 1 | 1 A INOCULUM PREP | | | | | | | | | | | | | |
| 2 | | | | | | | | | | | | | | |
| 3 | SET UP | 3.0 | 0.0 | 3.0 HRS | 12.5 | | | 0.40 | 0.52 | 06/03/96 | 09:30 AM | 06/03/96 | 12:30 PM | |
| 4 | PREINCUBATION | 3.0 | 0.0 | 3.0 HRS | 15.5 | | | 0.52 | 0.65 | 06/03/96 | 12:30 PM | 06/03/96 | 03:30 PM | |
| 5 | INCUBATION | 23.0 | 0.0 | 23.0 HRS | | 38.5 | | 0.65 | 1.60 | 06/03/96 | 03:30 PM | 06/04/96 | 02:30 PM | |
| 6 | CLEAN UP | 0.3 | 0.0 | 0.3 HRS | | | 38.8 | 1.60 | 1.61 | 06/04/96 | 02:30 PM | 06/04/96 | 02:45 PM | |
| 6 | SUBTOTAL | 29.0 | | 29.0 HRS | | 38.5 | | | | | | | | |
| 7 | | | | | | | | | | | | | | |
| 8 | 2 A FLASK GROWTH | | | | | | | | | | | | | |
| 9 | | | | | | | | | | | | | | |
| 10 | SET UP | 1.0 | 0.0 | 1.0 HRS | 37.5 | | | 1.52 | 1.56 | 06/04/96 | 12:30 PM | 06/04/96 | 01:30 PM | |
| 11 | PREINCUBATION | 1.0 | 0.0 | 1.0 HRS | 38.5 | | | 1.56 | 1.60 | 06/04/96 | 01:30 PM | 06/04/96 | 02:30 PM | |
| 12 | INCUBATION | 23.0 | 0.0 | 23.0 HRS | | 61.5 | | 1.60 | 2.56 | 06/04/96 | 02:30 PM | 06/05/96 | 01:30 PM | |
| 13 | CLEAN UP | 0.3 | 0.0 | 0.3 HRS | | | 61.8 | 2.56 | 2.57 | 06/05/96 | 01:30 PM | 06/05/96 | 01:45 PM | |
| 13 | SUBTOTAL | 25.0 | | 25.0 HRS | | 61.5 | | | | | | | | |
| 14 | | | | | | | | | | | | | | |
| 15 | 3 A SEED FERMENTATION | | | | | | | | | | | | | |
| 16 | | | | | | | | | | | | | | |
| 17 | SET UP | 1.0 | 0.0 | 1.0 HRS | 60.5 | | | 2.48 | 2.52 | 06/05/96 | 11:30 AM | 06/05/96 | 12:30 PM | |
| 18 | PREINCUBATION | 1.0 | 0.0 | 1.0 HRS | 61.5 | | | 2.52 | 2.56 | 06/05/96 | 12:30 PM | 06/05/96 | 01:30 PM | |
| 19 | FERMENTATION | 21.0 | 0.0 | 21.0 HRS | | 82.5 | | 2.56 | 3.44 | 06/05/96 | 01:30 PM | 06/06/96 | 10:30 AM | |
| 20 | HARVEST | 0.5 | 0.0 | 0.5 HRS | | 83.0 | | 3.44 | 3.46 | 06/06/96 | 10:30 AM | 06/06/96 | 11:00 AM | 50.0 L 1.7 LPM = 0.50 HRS |
| 21 | CIP | 1.0 | 0.0 | 1.0 HRS | | | 83.5 | 3.44 | 3.48 | 06/06/96 | 10:30 AM | 06/06/96 | 11:30 AM | |
| 22 | SIP | 1.0 | 0.0 | 1.0 HRS | | | 84.5 | 3.48 | 3.52 | 06/06/96 | 11:30 AM | 06/06/96 | 12:30 PM | |
| 23 | CLEAN UP | 3.0 | 0.0 | 3.0 HRS | | | 87.5 | 3.52 | 3.65 | 06/06/96 | 12:30 PM | 06/06/96 | 03:30 PM | |
| 24 | SUBTOTAL | 28.5 | | 28.5 HRS | | 83.0 | | | | | | | | |
| 25 | | | | | | | | | | | | | | |

FIG. 12A-2

| | | | | | | | | | | | | | | |
|---|---|---|---|---|---|---|---|---|---|---|---|---|---|---|
| 26 | 4 A PRODUCTION FERMENTATION | | | | | | | | | | | | | |
| 27 | | | | | | | | | | | | | | |
| 28 | SET UP | 1.0 | 0.0 | 1.0 HRS | 82.5 | | | 3.38 | 3.42 | 06/06/96 | 09:00 AM | 06/06/96 | 10:00 AM | |
| 29 | PREINCUBATION | 1.0 | 0.0 | 1.0 HRS | 83.0 | | | 3.42 | 3.46 | 06/06/96 | 10:00 AM | 06/06/96 | 11:00 AM | |
| 30 | FERMENTATION | 21.0 | 0.0 | 21.0 HRS | | 104.0 | | 3.46 | 4.33 | 06/06/96 | 11:00 AM | 06/07/96 | 08:00 AM | |
| 31 | CIP | 1.0 | 0.0 | 1.0 HRS | | | 105.0 | 4.33 | 4.38 | 06/07/96 | 08:00 AM | 06/07/96 | 09:00 AM | |
| 32 | SIP | 1.0 | 0.0 | 1.0 HRS | | | 106.0 | 4.38 | 4.42 | 06/07/96 | 09:00 AM | 06/07/96 | 10:00 AM | |
| 33 | CLEAN UP | 2.0 | 0.0 | 2.0 HRS | | | 108.0 | 4.42 | 4.50 | 06/07/96 | 10:00 AM | 06/07/96 | 12:00 PM | |
| 34 | SUBTOTAL | 27.0 | | 27.0 HRS | | 104.0 | | | | | | | | |
| 35 | | | | | | | | | | | | | | |
| 36 | 5 A HEAT EXCHANGE | | | | | | | | | | | | | |
| 37 | | | | | | | | | | | | | | |
| 38 | SET UP | 0.50 | 0.0 | 0.5 HRS | 104.5 | | | 4.33 | 4.35 | 06/07/96 | 08:00 AM | 06/07/96 | 08:30 AM | |
| 39 | TRANSFER | 1.00 | 0.0 | 1.0 HRS | | 105.0 | | 4.33 | 4.38 | 06/07/96 | 08:00 AM | 06/07/96 | 09:00 AM | 562.1 L0 9.4 LPM = 1.00 HRS |
| 40 | CIP | 1.0 | 0.0 | 1.0 HRS | | | 106.0 | 4.38 | 4.42 | 06/07/96 | 09:00 AM | 06/07/96 | 10:00 AM | |
| 41 | SIP | 1.0 | 0.0 | 1.0 HRS | | | 107.0 | 4.42 | 4.46 | 06/07/96 | 10:00 AM | 06/07/96 | 11:00 AM | |
| 42 | CLEAN UP | 2.0 | 0.0 | 2.0 HRS | | | 109.0 | 4.46 | 4.54 | 06/07/96 | 11:00 AM | 06/07/96 | 01:00 PM | |
| 43 | SUBTOTAL | 5.0 | | 5.0 HRS | | 105.0 | | | | | | | | |
| 44 | | | | | | | | | | | | | | |
| 45 | 6 A CONT. CENT./SOLIDS | | | | | | | | | | | | | |
| 46 | | | | | | | | | | | | | | |
| 47 | SET UP | 1.00 | 0.0 | 1.0 HRS | 105.0 | | | 4.33 | 4.38 | 06/07/96 | 08:00 AM | 06/07/96 | 09:00 AM | |
| 48 | CENTRIFUGATION | 1.00 | 0.0 | 1.0 HRS | | 106.0 | | 4.38 | 4.42 | 06/07/96 | 09:00 AM | 06/07/96 | 10:00 AM | 562.1 L0 9.4 LPM = 1.00 HRS |
| 49 | WASH | 0.10 | 0.0 | 0.1 HRS | | 106.1 | | 4.42 | 4.42 | 06/07/96 | 10:00 AM | 06/07/96 | 10:06 AM | 1.0 L0 0.2 LPM = 0.10 HRS |
| 50 | CIP | 0.25 | 0.0 | 0.3 HRS | | | 106.4 | 4.42 | 4.43 | 06/07/96 | 10:06 AM | 06/07/96 | 10:21 AM | 20.0 L0 1.3 LPM = 0.25 HRS |
| 51 | SIP | 1.00 | 0.0 | 1.0 HRS | | | 107.4 | 4.43 | 4.47 | 06/07/96 | 10:21 AM | 06/07/96 | 11:21 AM | |
| 52 | CLEAN UP | 0.50 | 0.0 | 0.5 HRS | | | 107.9 | 4.47 | 4.49 | 06/07/96 | 11:21 AM | 06/07/96 | 11:51 AM | |
| 53 | SUBTOTAL | 3.85 | | 3.85 HRS | | 106.1 | | | | | | | | |
| 54 | | | | | | | | | | | | | | |
| 55 | 1 B INOCULUM PREP | | | | | | | | | | | | | |
| 56 | | | | | | | | | | | | | | |
| 57 | SET UP | 1.0 | 0.0 | 1.0 HRS | 14.5 | | | 0.56 | 0.60 | 06/03/96 | 01:30 PM | 06/03/96 | 02:30 PM | |
| 58 | PREINCUBATION | 1.0 | 0.0 | 1.0 HRS | 15.5 | | | 0.60 | 0.65 | 06/03/96 | 02:30 PM | 06/03/96 | 03:30 PM | |
| 1 | 2 | 3 | 4 | 5 | 6 | 7 | 8 | 9 | 10 | 11 | 12 | 13 | 14 | 15 |

FIG. 12B-1

| | OPERATION | PROCESS TIME LINE | | | | | | | | | | | | CALCULATIONS |
|---|---|---|---|---|---|---|---|---|---|---|---|---|---|---|
| | | DURATION (HRS.) | | | REL. TIME SCALE (HRS) | | | ABS. DAYS | | START | | FINISH | | |
| | | CALC. | A/D | ADJ. | PREP | EXEC. | COMPL. | START | END | DATE | TIME | DATE | TIME | |
| | | | | | | 15.5 | | | | 06/03/96 | 08:00 AM | | | |
| 59 | INCUBATION | 23.0 | 0.0 | 23.0 HRS | | 38.5 | | 0.65 | 1.60 | 06/03/96 | 03:30 PM | 06/04/96 | 02:30 PM | |
| 60 | CLEAN UP | 0.3 | 0.0 | 0.3 HRS | | | 38.8 | 1.60 | 1.61 | 06/04/96 | 02:30 PM | 06/04/96 | 02:45 PM | |
| 60 | SUBTOTAL | 25.0 | | 25.0 HRS | | 38.5 | | | | | | | | |
| 61 | | | | | | | | | | | | | | |
| 62 | 2 B FLASK GROWTH | | | | | | | | | | | | | |
| 63 | | | | | | | | | | | | | | |
| 64 | SET UP | 1.0 | 0.0 | 1.0 HRS | 37.5 | | | 1.52 | 1.56 | 06/04/96 | 12:30 PM | 06/04/96 | 01:30 PM | |
| 65 | PREINCUBATION | 1.0 | 0.0 | 1.0 HRS | 38.5 | | | 1.56 | 1.60 | 06/04/96 | 01:30 PM | 06/04/96 | 02:30 PM | |
| 66 | INCUBATION | 23.0 | 0.0 | 23.0 HRS | | 61.5 | | 1.60 | 2.56 | 06/04/96 | 02:30 PM | 06/05/96 | 01:30 PM | |
| 67 | CLEAN UP | 0.3 | 0.0 | 0.3 HRS | | | 61.8 | 2.56 | 2.57 | 06/05/96 | 01:30 PM | 06/05/96 | 01:45 PM | |
| 67 | SUBTOTAL | 25.0 | | 25.0 HRS | | 61.5 | | | | | | | | |
| 68 | | | | | | | | | | | | | | |
| 69 | 3 B SEED FERMENTATION | | | | | | | | | | | | | |
| 70 | | | | | | | | | | | | | | |
| 71 | SET UP | 1.0 | 0.0 | 1.0 HRS | 60.5 | | | 2.48 | 2.52 | 06/05/96 | 11:30 AM | 06/05/96 | 12:30 PM | |
| 72 | PREINCUBATION | 1.0 | 0.0 | 1.0 HRS | 61.5 | | | 2.52 | 2.56 | 06/05/96 | 12:30 PM | 06/05/96 | 01:30 PM | |
| 73 | FERMENTATION | 21.0 | 0.0 | 21.0 HRS | | 82.5 | | 2.56 | 3.44 | 06/05/96 | 01:30 PM | 06/06/96 | 10:30 AM | |
| 74 | HARVEST | 0.5 | 0.0 | 0.5 HRS | | 83.0 | | 3.44 | 3.46 | 06/06/96 | 10:30 AM | 06/06/96 | 11:00 AM | 50.0 L 1.7 LPM = 0.50 HRS |
| 75 | CIP | 1.0 | 0.0 | 1.0 HRS | | | 83.5 | 3.44 | 3.48 | 06/06/96 | 10:30 AM | 06/06/96 | 11:30 AM | |
| 76 | SIP | 1.0 | 0.0 | 1.0 HRS | | | 84.5 | 3.48 | 3.52 | 06/06/96 | 11:30 AM | 06/06/96 | 12:30 PM | |
| 77 | CLEAN UP | 3.0 | 0.0 | 3.0 HRS | | | 87.5 | 3.52 | 3.65 | 06/06/96 | 12:30 PM | 06/06/96 | 03:30 PM | |
| 78 | SUBTOTAL | 28.5 | | 28.5 HRS | | 83.0 | | | | | | | | |
| 79 | | | | | | | | | | | | | | |
| 80 | 4 B PRODUCTION FERMENTATION | | | | | | | | | | | | | |
| 81 | | | | | | | | | | | | | | |
| 82 | SET UP | 1.0 | 0.0 | 1.0 HRS | 82.0 | | | 3.38 | 3.42 | 06/06/96 | 09:00 AM | 06/06/96 | 10:00 AM | |
| 83 | PREINCUBATION | 1.0 | 0.0 | 1.0 HRS | 83.0 | | | 3.42 | 3.46 | 06/06/96 | 10:00 AM | 06/06/96 | 11:00 AM | |
| 84 | FERMENTATION | 21.0 | 0.0 | 21.0 HRS | | 104.0 | | 3.46 | 4.33 | 06/06/96 | 11:00 AM | 06/07/96 | 08:00 AM | |

FIG. 12B-2

| | | | | | | | | | | | | | | |
|---|---|---|---|---|---|---|---|---|---|---|---|---|---|---|
| 85 | CIP | 1.0 | 0.0 | 1.0 HRS | | | 105.0 | 4.33 | 4.38 | 06/07/96 | 08:00 AM | 06/07/96 | 09:00 AM | |
| 86 | SIP | 1.0 | 0.0 | 1.0 HRS | | | 106.0 | 4.38 | 4.42 | 06/07/96 | 09:00 AM | 06/07/96 | 10:00 AM | |
| 87 | CLEAN UP | 2.0 | 0.0 | 2.0 HRS | | | 108.0 | 4.42 | 4.50 | 06/07/96 | 10:00 AM | 06/07/96 | 12:00 PM | |
| 88 | SUBTOTAL | 27.0 | | 27.0 HRS | | 104.0 | | | | | | | | |
| 89 | | | | | | | | | | | | | | |
| 90 | 5 B HEAT EXCHANGE | | | | | | | | | | | | | |
| 91 | | | | | | | | | | | | | | |
| 92 | SET UP | 0.50 | 0.0 | 0.5 HRS | 104.5 | | | 4.33 | 4.35 | 06/07/96 | 08:00 AM | 06/07/96 | 08:30 AM | |
| 93 | TRANSFER | 1.00 | 0.0 | 1.0 HRS | | 105.0 | | 4.33 | 4.38 | 06/07/96 | 08:00 AM | 06/07/96 | 09:00 AM | 562.1 L@ 9.4 LPM = 1.00 HRS |
| 94 | CIP | 1.0 | 0.0 | 1.0 HRS | | | 106.0 | 4.38 | 4.42 | 06/07/96 | 09:00 AM | 06/07/96 | 10:00 AM | |
| 95 | SIP | 1.0 | 0.0 | 1.0 HRS | | | 107.0 | 4.42 | 4.46 | 06/07/96 | 10:00 AM | 06/07/96 | 11:00 AM | |
| 96 | CLEAN UP | 2.0 | 0.0 | 2.0 HRS | | | 109.0 | 4.46 | 4.54 | 06/07/96 | 11:00 AM | 06/07/96 | 01:00 PM | |
| 97 | SUBTOTAL | 5.0 | | 5.0 HRS | | 105.0 | | | | | | | | |
| 98 | | | | | | | | | | | | | | |
| 99 | 6 B CONT. CENT./SOLIDS | | | | | | | | | | | | | |
| 100 | | | | | | | | | | | | | | |
| 101 | SET UP | 1.00 | 0.0 | 1.0 HRS | 105.0 | | | 4.33 | 4.38 | 06/07/96 | 08:00 AM | 06/07/96 | 09:00 AM | |
| 102 | CENTRIFUGATION | 1.00 | 0.0 | 1.0 HRS | | 106.0 | | 4.38 | 4.42 | 06/07/96 | 09:00 AM | 06/07/96 | 10:00 AM | 562.1 L@ 9.4 LPM = 1.00 HRS |
| 103 | WASH | 0.10 | 0.0 | 0.1 HRS | | 106.1 | | 4.42 | 4.42 | 06/07/96 | 10:00 AM | 06/07/96 | 10:06 AM | 1.0 L@ 0.2 LPM = 0.10 HRS |
| 104 | CIP | 0.25 | 0.0 | 0.3 HRS | | | 106.4 | 4.42 | 4.43 | 06/07/96 | 10:06 AM | 06/07/96 | 10:21 AM | 20.0 L@ 1.3 LPM = 0.25 HRS |
| 105 | SIP | 1.00 | 0.0 | 1.0 HRS | | | 107.4 | 4.43 | 4.47 | 06/07/96 | 10:21 AM | 06/07/96 | 11:21 AM | |
| 106 | CLEAN UP | 0.50 | 0.0 | 0.5 HRS | | | 107.9 | 4.47 | 4.49 | 06/07/96 | 11:21 AM | 06/07/96 | 11:51 AM | |
| 107 | SUBTOTAL | 3.85 | | 3.85 HRS | | 106.1 | | | | | | | | |
| 108 | | | | | | | | | | | | | | |
| 109 | 1 C INOCULUM PREP | | | | | | | | | | | | | |
| 110 | | | | | | | | | | | | | | |
| 111 | SET UP | 1.0 | 0.0 | 1.0 HRS | 14.5 | | | 0.56 | 0.50 | 06/03/96 | 01:30 PM | 06/03/96 | 02:30 PM | |
| 112 | PREINCUBATION | 1.0 | 0.0 | 1.0 HRS | 15.5 | | | 0.60 | 0.65 | 06/03/96 | 02:30 PM | 06/03/96 | 03:30 PM | |
| 113 | INCUBATION | 23.0 | 0.0 | 23.0 HRS | | 38.5 | | 0.65 | 1.60 | 06/03/96 | 03:30 PM | 06/04/96 | 02:30 PM | |
| 114 | CLEAN UP | 0.3 | 0.0 | 0.3 HRS | | | 38.8 | 1.60 | 1.61 | 06/04/96 | 02:30 PM | 06/04/96 | 02:45 PM | |
| 114 | SUBTOTAL | 25.0 | | 25.0 HRS | | 38.5 | | | | | | | | |
| 115 | | | | | | | | | | | | | | |

FIG. 12C-1

| | OPERATION | PROCESS TIME LINE DURATION (HRS.) CALC. | A/D | ADJ. | REL. TIME SCALE (HRS) PREP | EXEC. | COMPL. | ABS. DAYS START | END | START DATE | TIME | FINISH DATE | TIME | CALCULATIONS |
|---|---|---|---|---|---|---|---|---|---|---|---|---|---|---|
| | | | | | | 15.5 | | | | 06/03/96 | 08:00 AM | | | |
| 116 | 2 C FLASK GROWTH | | | | | | | | | | | | | |
| 117 | | | | | | | | | | | | | | |
| 118 | SET UP | 1.0 | 0.0 | 1.0 HRS | 37.5 | | | 1.52 | 1.56 | 06/04/96 | 12:30 PM | 06/04/96 | 01:30 PM | |
| 119 | PREINCUBATION | 1.0 | 0.0 | 1.0 HRS | 38.5 | | | 1.56 | 1.60 | 06/04/96 | 01:30 PM | 06/04/96 | 02:30 PM | |
| 120 | INCUBATION | 23.0 | 0.0 | 23.0 HRS | | 61.5 | | 1.60 | 2.56 | 06/04/96 | 02:30 PM | 06/05/96 | 01:30 PM | |
| 121 | CLEAN UP | 0.3 | 0.0 | 0.3 HRS | | | 61.8 | 2.56 | 2.57 | 06/05/96 | 01:30 PM | 06/05/96 | 01:45 PM | |
| 121 | SUBTOTAL | 25.0 | | 25.0 HRS | | 61.5 | | | | | | | | |
| 122 | | | | | | | | | | | | | | |
| 123 | 3 C SEED FERMENTATION | | | | | | | | | | | | | |
| 124 | | | | | | | | | | | | | | |
| 125 | SET UP | 1.0 | 0.0 | 1.0 HRS | 60.5 | | | 2.48 | 2.52 | 06/05/96 | 11:30 AM | 06/05/96 | 12:30 PM | |
| 126 | PREINCUBATION | 1.0 | 0.0 | 1.0 HRS | 61.5 | | | 2.52 | 2.56 | 06/05/96 | 12:30 PM | 06/05/96 | 01:30 PM | |
| 127 | FERMENTATION | 21.0 | 0.0 | 21.0 HRS | | 82.5 | | 2.56 | 3.44 | 06/05/96 | 01:30 PM | 06/06/96 | 10:30 AM | |
| 128 | HARVEST | 0.5 | 0.0 | 0.5 HRS | | 83.0 | | 3.44 | 3.46 | 06/06/96 | 10:30 AM | 06/06/96 | 11:00 AM | 50.0 L 1.7 LPM = 0.50 HRS |
| 129 | CIP | 1.0 | 0.0 | 1.0 HRS | | | 83.5 | 3.44 | 3.48 | 06/06/96 | 10:30 AM | 06/06/96 | 11:30 AM | |
| 130 | SIP | 1.0 | 0.0 | 1.0 HRS | | | 84.5 | 3.48 | 3.52 | 06/06/96 | 11:30 AM | 06/06/96 | 12:30 PM | |
| 131 | CLEAN UP | 3.0 | 0.0 | 3.0 HRS | | | 87.5 | 3.52 | 3.65 | 06/06/96 | 12:30 PM | 06/06/96 | 03:30 PM | |
| 132 | SUBTOTAL | 28.5 | | 28.5 HRS | | 83.0 | | | | | | | | |
| 133 | | | | | | | | | | | | | | |
| 134 | 4 C PRODUCTION FERMENTATION | | | | | | | | | | | | | |
| 135 | | | | | | | | | | | | | | |
| 136 | SET UP | 1.0 | 0.0 | 1.0 HRS | 82.0 | | | 3.38 | 3.42 | 06/06/96 | 09:00 AM | 06/06/96 | 10:00 AM | |
| 137 | PREINCUBATION | 1.0 | 0.0 | 1.0 HRS | 83.0 | | | 3.42 | 3.46 | 06/06/96 | 10:00 AM | 06/06/96 | 11:00 AM | |
| 138 | FERMENTATION | 21.0 | 0.0 | 21.0 HRS | | 104.0 | | 3.46 | 4.33 | 06/06/96 | 11:00 AM | 06/07/96 | 08:00 AM | |
| 139 | CIP | 1.0 | 0.0 | 1.0 HRS | | | 105.0 | 4.33 | 4.38 | 06/07/96 | 08:00 AM | 06/07/96 | 09:00 AM | |
| 140 | SIP | 1.0 | 0.0 | 1.0 HRS | | | 106.0 | 4.38 | 4.42 | 06/07/96 | 09:00 AM | 06/07/96 | 10:00 AM | |
| 141 | CLEAN UP | 2.0 | 0.0 | 2.0 HRS | | | 108.0 | 4.42 | 4.50 | 06/07/96 | 10:00 AM | 06/07/96 | 12:00 PM | |
| 142 | SUBTOTAL | 27.0 | | 27.0 HRS | | 104.0 | | | | | | | | |

FIG. 12C-2

| | | | | | | | | | | | | | | | | | |
|---|---|---|---|---|---|---|---|---|---|---|---|---|---|---|---|---|---|
| 143 | | | | | | | | | | | | | | | | | |
| 144 | 5 C HEAT EXCHANGE | | | | | | | | | | | | | | | | |
| 145 | | | | | | | | | | | | | | | | | |
| 146 | SET UP | 0.50 | 0.0 | 0.5 HRS | 104.5 | | | 4.33 | 4.35 | 06/07/96 | 08:00 AM | 06/07/96 | 08:30 AM | | | | |
| 147 | TRANSFER | 1.00 | 0.0 | 1.0 HRS | | 105.0 | | 4.33 | 4.38 | 06/07/96 | 08:00 AM | 06/07/96 | 09:00 AM | 562.1 LB | 9.4 LPM | = | 1.00 HRS |
| 148 | CIP | 1.0 | 0.0 | 1.0 HRS | | | 106.0 | 4.38 | 4.42 | 06/07/96 | 09:00 AM | 06/07/96 | 10:00 AM | | | | |
| 149 | SIP | 1.0 | 0.0 | 1.0 HRS | | | 107.0 | 4.42 | 4.46 | 06/07/96 | 10:00 AM | 06/07/96 | 11:00 AM | | | | |
| 150 | CLEAN UP | 2.0 | 0.0 | 2.0 HRS | | | 109.0 | 4.46 | 4.54 | 06/07/96 | 11:00 AM | 06/07/96 | 01:00 PM | | | | |
| 151 | SUBTOTAL | 5.0 | | 5.0 HRS | | 105.0 | | | | | | | | | | | |
| 152 | | | | | | | | | | | | | | | | | |
| 153 | 6 C CONT. CENT./SOLIDS | | | | | | | | | | | | | | | | |
| 154 | | | | | | | | | | | | | | | | | |
| 155 | SET UP | 1.00 | 0.0 | 1.0 HRS | 105.0 | | | 4.33 | 4.38 | 06/07/96 | 08:00 AM | 06/07/96 | 09:00 AM | | | | |
| 156 | CENTRIFUGATION | 1.00 | 0.0 | 1.0 HRS | | 106.0 | | 4.38 | 4.42 | 06/07/96 | 09:00 AM | 06/07/96 | 10:00 AM | 562.1 LB | 9.4 LPM | = | 1.00 HRS |
| 157 | WASH | 0.10 | 0.0 | 0.1 HRS | | 106.1 | | 4.42 | 4.42 | 06/07/96 | 10:00 AM | 06/07/96 | 10:06 AM | 1.0 LB | 0.2 LPM | = | 0.10 HRS |
| 158 | CIP | 0.25 | 0.0 | 0.3 HRS | | | 106.4 | 4.42 | 4.43 | 06/07/96 | 10:06 AM | 06/07/96 | 10:21 AM | 20.0 LB | 1.3 LPM | = | 0.25 HRS |
| 159 | SIP | 1.00 | 0.0 | 1.0 HRS | | | 107.4 | 4.43 | 4.47 | 06/07/96 | 10:21 AM | 06/07/96 | 11:21 AM | | | | |
| 160 | CLEAN UP | 0.50 | 0.0 | 0.5 HRS | | | 107.9 | 4.47 | 4.49 | 06/07/96 | 11:21 AM | 06/07/96 | 11:51 AM | | | | |
| 161 | SUBTOTAL | 3.85 | | 3.85 HRS | | 106.1 | | | | | | | | | | | |
| 162 | | | | | | | | | | | | | | | | | |
| 163 | 7 A RESOLUBLIZATION | | | | | | | | | | | | | | | | |
| 164 | | | | | | | | | | | | | | | | | |
| 165 | SET UP | 1.00 | 0.0 | 1.0 HRS | 106.1 | | | 4.38 | 4.42 | 06/07/96 | 09:06 AM | 06/07/96 | 10:06 AM | | | | |
| 166 | DILUTION | 0.50 | 0.0 | 0.5 HRS | | 106.6 | | 4.42 | 4.44 | 06/07/96 | 10:06 AM | 06/07/96 | 10:36 AM | 46.7 LB | 1.6 LPM | = | 0.50 HRS |
| 167 | AGITATE | 1.00 | 0.0 | 1.0 HRS | | 107.6 | | 4.44 | 4.48 | 06/07/96 | 10:36 AM | 06/07/96 | 11:36 AM | | | | 0.50 HRS |
| 168 | CIP | 1.00 | 0.0 | 1.0 HRS | | | 108.6 | 4.48 | 4.53 | 06/07/96 | 11:36 AM | 06/07/96 | 12:36 PM | | | | |
| 169 | SIP | 1.00 | 0.0 | 1.0 HRS | | | 109.6 | 4.53 | 4.57 | 06/07/96 | 12:36 PM | 06/07/96 | 01:36 PM | | | | |
| 170 | CLEAN UP | 1.00 | 0.0 | 1.0 HRS | | | 110.6 | 4.57 | 4.61 | 06/07/96 | 01:36 PM | 06/07/96 | 02:36 PM | | | | |
| 171 | SUBTOTAL | 5.50 | | 5.50 HRS | | 107.6 | | | | | | | | | | | |
| 172 | | | | | | | | | | | | | | | | | |
| 173 | 8 A HEAT EXCHANGE | | | | | | | | | | | | | | | | |
| 174 | | | | | | | | | | | | | | | | | |

FIG. 12D-1

| | OPERATION | PROCESS TIME LINE DURATION (HRS.) CALC. | A/D | ADJ. | REL. TIME SCALE (HRS) PREP | EXEC. | COMPL. | ABS. DAYS START | END | START DATE | START TIME | FINISH DATE | FINISH TIME | CALCULATIONS |
|---|---|---|---|---|---|---|---|---|---|---|---|---|---|---|
| | | | | | | 15.5 | | | | 06/03/96 | 08:00 AM | | | |
| 175 | SET UP | 0.50 | 0.0 | 0.5 HRS | 107.6 | | | 4.46 | 4.48 | 06/07/96 | 11:06 AM | 06/07/96 | 11:36 AM | |
| 176 | TRANSFER | 0.30 | 0.0 | 0.3 HRS | | 107.9 | | 4.48 | 4.50 | 06/07/96 | 11:36 AM | 06/07/96 | 11:54 AM | 66.5 L 3.7 LPM = 0.30 HRS |
| 177 | CIP | 0.0 | 0.0 | 0.0 HRS | | | 107.9 | 4.50 | 4.50 | 06/07/96 | 11:54 AM | 06/07/96 | 11:54 AM | |
| 178 | SIP | 0.0 | 0.0 | 0.0 HRS | | | 107.9 | 4.50 | 4.50 | 06/07/96 | 11:54 AM | 06/07/96 | 11:54 AM | |
| 179 | CLEAN UP | 0.0 | 0.0 | 0.0 HRS | | | 107.9 | 4.50 | 4.50 | 06/07/96 | 11:54 AM | 06/07/96 | 11:54 AM | |
| 180 | SUBTOTAL | 0.8 | | 0.8 HRS | | 107.9 | | | | | | | | |
| 181 | | | | | | | | | | | | | | |
| 182 | 9 A HOMMOGENIZATION | | | | | | | | | | | | | |
| 183 | | | | | | | | | | | | | | |
| 184 | SET UP | 0.25 | 0.0 | 0.3 HRS | 107.9 | | | 4.49 | 4.50 | 06/07/96 | 11:39 AM | 06/07/96 | 11:54 AM | |
| 185 | LYSIS | 0.68 | 0.0 | 0.7 HRS | | 108.6 | | 4.50 | 4.52 | 06/07/96 | 11:54 AM | 06/07/96 | 12:34 PM | 66.5 L 1.6 LPM = 0.68 HRS |
| 186 | CIP | 0.0 | 0.0 | 0.0 HRS | | | 108.6 | 4.52 | 4.52 | 06/07/96 | 12:34 PM | 06/07/96 | 12:34 PM | |
| 187 | SIP | 0.0 | 0.0 | 0.0 HRS | | | 108.6 | 4.52 | 4.52 | 06/07/96 | 12:34 PM | 06/07/96 | 12:34 PM | |
| 188 | CLEAN UP | 0.0 | 0.0 | 0.0 HRS | | | 108.6 | 4.52 | 4.52 | 06/07/96 | 12:34 PM | 06/07/96 | 12:34 PM | |
| 189 | SUBTOTAL | 0.9 | | 0.9 HRS | | 108.6 | | | | | | | | |
| 190 | | | | | | | | | | | | | | |
| 191 | 10 A HEAT EXCHANGE | | | | | | | | | | | | | |
| 192 | | | | | | | | | | | | | | |
| 193 | SET UP | 0.50 | 0.0 | 0.5 HRS | 108.6 | | | 4.50 | 4.52 | 06/07/96 | 12:04 PM | 06/07/96 | 12:34 PM | |
| 194 | TRANSFER | 0.30 | 0.0 | 0.3 HRS | | 108.9 | | 4.52 | 4.54 | 06/07/96 | 12:34 PM | 06/07/96 | 12:52 PM | 69.0 L 3.8 LPM = 0.30 HRS |
| 195 | CIP | 0.0 | 0.0 | 0.0 HRS | | | 108.9 | 4.54 | 4.54 | 06/07/96 | 12:52 PM | 06/07/96 | 12:52 PM | |
| 196 | SIP | 0.0 | 0.0 | 0.0 HRS | | | 108.9 | 4.54 | 4.54 | 06/07/96 | 12:52 PM | 06/07/96 | 12:52 PM | |
| 197 | CLEAN UP | 0.0 | 0.0 | 0.0 HRS | | | 108.9 | 4.54 | 4.54 | 06/07/96 | 12:52 PM | 06/07/96 | 12:52 PM | |
| 198 | SUBTOTAL | 0.8 | | 0.8 HRS | | 108.9 | | | | | | | | |
| 199 | | | | | | | | | | | | | | |
| 200 | 8 B HEAT EXCHANGE | | | | | | | | | | | | | |
| 201 | | | | | | | | | | | | | | |
| 202 | SET UP | 0.00 | 0.0 | 0.0 HRS | 108.9 | | | 4.54 | 4.54 | 06/07/96 | 12:52 PM | 06/07/96 | 12:52 PM | |

FIG. 12D-2

| | | | | | | | | | | | | | | | | | |
|---|---|---|---|---|---|---|---|---|---|---|---|---|---|---|---|---|---|
| 203 | TRANSFER | 0.30 | 0.0 | 0.3 HRS | | 109.2 | | 4.54 | 4.55 | 06/07/96 | 12:52 PM | 06/07/96 | 01:10 PM | 66.5 L@ | 3.7 LPM | = | 0.30 HRS |
| 204 | CIP | 0.0 | 0.0 | 0.0 HRS | | | 109.2 | 4.55 | 4.55 | 06/07/96 | 01:10 PM | 06/07/96 | 01:10 PM | | | | |
| 205 | SIP | 0.0 | 0.0 | 0.0 HRS | | | 109.2 | 4.55 | 4.55 | 06/07/96 | 01:10 PM | 06/07/96 | 01:10 PM | | | | |
| 206 | CLEAN UP | 0.0 | 0.0 | 0.0 HRS | | | 109.2 | 4.55 | 4.55 | 06/07/96 | 01:10 PM | 06/07/96 | 01:10 PM | | | | |
| 207 | SUBTOTAL | 0.3 | | 0.3 HRS | | 109.2 | | | | | | | | | | | |
| 208 | | | | | | | | | | | | | | | | | |
| 209 | 9 B HOMMOGENIZATION | | | | | | | | | | | | | | | | |
| 210 | | | | | | | | | | | | | | | | | |
| 211 | SET UP | 0.00 | 0.0 | 0.0 HRS | 109.2 | | | 4.55 | 4.55 | 06/07/96 | 01:10 PM | 06/07/96 | 01:10 PM | | | | |
| 212 | LYSIS | 0.68 | 0.0 | 0.7 HRS | | 109.9 | | 4.55 | 4.58 | 06/07/96 | 01:10 PM | 06/07/96 | 01:51 PM | 66.5 L@ | 1.6 LPM | = | 0.68 HRS |
| 213 | CIP | 0.0 | 0.0 | 0.0 HRS | | | 109.9 | 4.58 | 4.58 | 06/07/96 | 01:51 PM | 06/07/96 | 01:51 PM | | | | |
| 214 | SIP | 0.0 | 0.0 | 0.0 HRS | | | 109.9 | 4.58 | 4.58 | 06/07/96 | 01:51 PM | 06/07/96 | 01:51 PM | | | | |
| 215 | CLEAN UP | 0.0 | 0.0 | 0.0 HRS | | | 109.9 | 4.58 | 4.58 | 06/07/96 | 01:51 PM | 06/07/96 | 01:51 PM | | | | |
| 216 | SUBTOTAL | 0.7 | | 0.7 HRS | | 109.9 | | | | | | | | | | | |
| 217 | | | | | | | | | | | | | | | | | |
| 218 | 10 B HEAT EXCHANGE | | | | | | | | | | | | | | | | |
| 219 | | | | | | | | | | | | | | | | | |
| 220 | SET UP | 0.50 | 0.0 | 0.5 HRS | 109.9 | | | 4.56 | 4.58 | 06/07/96 | 01:21 PM | 06/07/96 | 01:51 PM | | | | |
| 221 | TRANSFER | 0.30 | 0.0 | 0.3 HRS | | 110.2 | | 4.58 | 4.59 | 06/07/96 | 01:51 PM | 06/07/96 | 02:09 PM | 69.0 L@ | 3.8 LPM | = | 0.30 HRS |
| 222 | CIP | 0.0 | 0.0 | 0.0 HRS | | | 110.2 | 4.59 | 4.59 | 06/07/96 | 02:09 PM | 06/07/96 | 02:09 PM | | | | |
| 223 | SIP | 0.0 | 0.0 | 0.0 HRS | | | 110.2 | 4.59 | 4.59 | 06/07/96 | 02:09 PM | 06/07/96 | 02:09 PM | | | | |
| 224 | CLEAN UP | 0.0 | 0.0 | 0.0 HRS | | | 110.2 | 4.59 | 4.59 | 06/07/96 | 02:09 PM | 06/07/96 | 02:09 PM | | | | |
| 225 | SUBTOTAL | 0.8 | | 0.8 HRS | | 110.2 | | | | | | | | | | | |
| 226 | | | | | | | | | | | | | | | | | |
| 227 | 8 C HEAT EXCHANGE | | | | | | | | | | | | | | | | |
| 228 | | | | | | | | | | | | | | | | | |
| 229 | SET UP | 0.00 | 0.0 | 0.0 HRS | 110.2 | | | 4.59 | 4.59 | 06/07/96 | 02:09 PM | 06/07/96 | 02:09 PM | | | | |
| 230 | TRANSFER | 0.30 | 0.0 | 0.3 HRS | | 110.5 | | 4.59 | 4.60 | 06/07/96 | 02:09 PM | 06/07/96 | 02:27 PM | 66.5 L@ | 3.7 LPM | = | 0.30 HRS |
| 231 | CIP | 1.0 | 0.0 | 1.0 HRS | | | 111.5 | 4.60 | 4.64 | 06/07/96 | 02:27 PM | 06/07/96 | 03:27 PM | | | | |
| 232 | SIP | 1.0 | 0.0 | 1.0 HRS | | | 112.5 | 4.64 | 4.69 | 06/07/96 | 03:27 PM | 06/07/96 | 04:27 PM | | | | |
| 233 | CLEAN UP | 1.0 | 0.0 | 1.0 HRS | | | 113.5 | 4.69 | 4.73 | 06/07/96 | 04:27 PM | 06/07/96 | 05:27 PM | | | | |
| 234 | SUBTOTAL | 3.3 | | 3.3 HRS | | 110.5 | | | | | | | | | | | |

FIG. 12E-1

| | OPERATION | PROCESS TIME LINE DURATION (HRS.) CALC. | A/D | ADJ. | REL. TIME SCALE (HRS) PREP | EXEC. | COMPL. | ABS. DAYS START | END | START DATE | TIME | FINISH DATE | TIME | CALCULATIONS |
|---|---|---|---|---|---|---|---|---|---|---|---|---|---|---|
| | | | | | | 15.5 | | | | 06/03/96 | 08:00 AM | | | |
| 235 | | | | | | | | | | | | | | |
| 236 | 9 C HOMMOGENIZATION | | | | | | | | | | | | | |
| 237 | | | | | | | | | | | | | | |
| 238 | SET UP | 0.00 | 0.0 | 0.0 HRS | 110.5 | | | 4.60 | 4.60 | 06/07/96 | 02:27 PM | 06/07/96 | 02:27 PM | |
| 239 | LYSIS | 0.68 | 0.0 | 0.7 HRS | | 111.1 | | 4.60 | 4.63 | 06/07/96 | 02:27 PM | 06/07/96 | 03:07 PM | 66.5 L⌀ 1.6 LPM = 0.68 HRS |
| 240 | CIP | 1.0 | 0.0 | 1.0 HRS | | | 112.1 | 4.63 | 4.67 | 06/07/96 | 03:07 PM | 06/07/96 | 04:07 PM | |
| 241 | SIP | 1.0 | 0.0 | 1.0 HRS | | | 113.1 | 4.67 | 4.71 | 06/07/96 | 04:07 PM | 06/07/96 | 05:07 PM | |
| 242 | CLEAN UP | 1.0 | 0.0 | 1.0 HRS | | | 114.1 | 4.71 | 4.76 | 06/07/96 | 05:07 PM | 06/07/96 | 06:07 PM | |
| 243 | SUBTOTAL | 3.7 | | 3.7 HRS | | 111.1 | | | | | | | | |
| 244 | | | | | | | | | | | | | | |
| 245 | 10 C HEAT EXCHANGE | | | | | | | | | | | | | |
| 246 | | | | | | | | | | | | | | |
| 247 | SET UP | 0.00 | 0.0 | 0.0 HRS | 111.1 | | | 4.63 | 4.63 | 06/07/96 | 03:07 PM | 06/07/96 | 03:07 PM | |
| 248 | TRANSFER | 0.30 | 0.0 | 0.3 HRS | | 111.4 | | 4.63 | 4.64 | 06/07/96 | 03:07 PM | 06/07/96 | 03:25 PM | 69.0 L⌀ 3.8 LPM = 0.30 HRS |
| 249 | CIP | 1.0 | 0.0 | 1.0 HRS | | | 112.4 | 4.64 | 4.68 | 06/07/96 | 03:25 PM | 06/07/96 | 04:25 PM | |
| 250 | SIP | 1.0 | 0.0 | 1.0 HRS | | | 113.4 | 4.68 | 4.73 | 06/07/96 | 04:25 PM | 06/07/96 | 05:25 PM | |
| 251 | CLEAN UP | 1.0 | 0.0 | 1.0 HRS | | | 114.4 | 4.73 | 4.77 | 06/07/96 | 05:25 PM | 06/07/96 | 06:25 PM | |
| 252 | SUBTOTAL | 3.3 | | 3.3 HRS | | 111.4 | | | | | | | | |
| 253 | | | | | | | | | | | | | | |
| 254 | 11 A RESOLUBLIZATION | | | | | | | | | | | | | |
| 255 | | | | | | | | | | | | | | |
| 256 | SET UP | 1.0 | 0.0 | 1.0 HRS | 108.9 | | | 4.49 | 4.54 | 06/07/96 | 11:52 AM | 06/07/96 | 12:52 PM | |
| 257 | DILUTION | 0.5 | 0.0 | 0.5 HRS | | 109.4 | | 4.54 | 4.56 | 06/07/96 | 12:52 PM | 06/07/96 | 01:22 PM | 206.9 L⌀ 6.9 LPM = 0.50 HRS |
| 258 | AGITATE | 0.5 | 0.0 | 0.5 HRS | | 109.9 | | 4.56 | 4.58 | 06/07/96 | 01:22 PM | 06/07/96 | 01:52 PM | 0.50 HRS |
| 259 | CIP | 0.0 | 0.0 | 0.0 HRS | | | 109.9 | 4.58 | 4.58 | 06/07/96 | 01:52 PM | 06/07/96 | 01:52 PM | |
| 260 | SIP | 0.0 | 0.0 | 0.0 HRS | | | 109.9 | 4.58 | 4.58 | 06/07/96 | 01:52 PM | 06/07/96 | 01:52 PM | |
| 261 | CLEAN UP | 0.0 | 0.0 | 0.0 HRS | | | 109.9 | 4.58 | 4.58 | 06/07/96 | 01:52 PM | 06/07/96 | 01:52 PM | |
| 262 | SUBTOTAL | 2.0 | | 2.0 HRS | | 109.9 | | | | | | | | |

FIG. 12E-2

| | | | | | | | | | | | | | | |
|---|---|---|---|---|---|---|---|---|---|---|---|---|---|---|
| 263 | | | | | | | | | | | | | | |
| 264 | 12 A CONT. CENT/SOLIDS | | | | | | | | | | | | | |
| 265 | | | | | | | | | | | | | | |
| 266 | SET UP | 1.0 | 0.0 | 1.0 HRS | 109.9 | | | 4.54 | 4.58 | 06/07/96 | 12:52 PM | 06/07/96 | 01:52 PM | |
| 267 | CENTRIFUGATION | 0.5 | 0.0 | 0.5 HRS | | 110.4 | | 4.58 | 4.60 | 06/07/96 | 01:52 PM | 06/07/96 | 02:22 PM | 275.9 L@ 9.2 LPM = 0.50 HRS |
| 268 | WASH | 0.1 | 0.0 | 0.1 HRS | | 110.5 | | 4.60 | 4.60 | 06/07/96 | 02:22 PM | 06/07/96 | 02:28 PM | 3.0 L@ 0.5 LPM = 0.10 HRS |
| 269 | CIP | 0.0 | 0.0 | 0.0 HRS | | | 110.5 | 4.60 | 4.60 | 06/07/96 | 02:28 PM | 06/07/96 | 02:28 PM | 8.0 L@ 0.5 LPM = 0.25 HRS |
| 270 | SIP | 0.0 | 0.0 | 0.0 HRS | | | 110.5 | 4.60 | 4.60 | 06/07/96 | 02:28 PM | 06/07/96 | 02:28 PM | |
| 271 | CLEAN UP | 0.0 | 0.0 | 0.0 HRS | | | 110.5 | 4.60 | 4.60 | 06/07/96 | 02:28 PM | 06/07/96 | 02:28 PM | |
| 272 | SUBTOTAL | 1.6 | | 1.6 HRS | | 110.5 | | | | | | | | |
| 273 | | | | | | | | | | | | | | |
| 274 | 11 B RESOLUBLIZATION | | | | | | | | | | | | | |
| 275 | | | | | | | | | | | | | | |
| 276 | SET UP | 0.0 | 0.0 | 0.0 HRS | 110.5 | | | 4.60 | 4.60 | 06/07/96 | 02:28 PM | 06/07/96 | 02:28 PM | |
| 277 | DILUTION | 0.5 | 0.0 | 0.5 HRS | | 111.0 | | 4.60 | 4.62 | 06/07/96 | 02:28 PM | 06/07/96 | 02:58 PM | 206.9 L@ 6.9 LPM = 0.50 HRS |
| 278 | AGITATE | 0.3 | 0.0 | 0.3 HRS | | 111.2 | | 4.62 | 4.63 | 06/07/96 | 02:58 PM | 06/07/96 | 03:13 PM | 0.50 HRS |
| 279 | CIP | 1.0 | 0.0 | 1.0 HRS | | | 112.2 | 4.63 | 4.68 | 06/07/96 | 03:13 PM | 06/07/96 | 04:13 PM | |
| 280 | SIP | 1.0 | 0.0 | 1.0 HRS | | | 113.2 | 4.68 | 4.72 | 06/07/96 | 04:13 PM | 06/07/96 | 05:13 PM | |
| 281 | CLEAN UP | 1.0 | 0.0 | 1.0 HRS | | | 114.2 | 4.72 | 4.76 | 06/07/96 | 05:13 PM | 06/07/96 | 06:13 PM | |
| 282 | SUBTOTAL | 3.8 | | 3.8 HRS | | 111.2 | | | | | | | | |
| 283 | | | | | | | | | | | | | | |
| 284 | 12 B CONT. CENT/SOLIDS | | | | | | | | | | | | | |
| 285 | | | | | | | | | | | | | | |
| 286 | SET UP | 1.0 | 0.0 | 1.0 HRS | 111.2 | | | 4.59 | 4.63 | 06/07/96 | 02:13 PM | 06/07/96 | 03:13 PM | |
| 287 | CENTRIFUGATION | 0.5 | 0.0 | 0.5 HRS | | 111.7 | | 4.63 | 4.66 | 06/07/96 | 03:13 PM | 06/07/96 | 03:43 PM | 275.9 L@ 9.2 LPM = 0.50 HRS |
| 288 | WASH | 0.1 | 0.0 | 0.1 HRS | | 111.8 | | 4.66 | 4.66 | 06/07/96 | 03:43 PM | 06/07/96 | 03:49 PM | 3.0 L@ 0.5 LPM = 0.10 HRS |
| 289 | CIP | 0.3 | 0.0 | 0.3 HRS | | | 112.1 | 4.66 | 4.67 | 06/07/96 | 03:49 PM | 06/07/96 | 04:04 PM | 8.0 L@ 0.5 LPM = 0.25 HRS |
| 290 | SIP | 1.0 | 0.0 | 1.0 HRS | | | 113.1 | 4.67 | 4.71 | 06/07/96 | 04:04 PM | 06/07/96 | 05:04 PM | |
| 291 | CLEAN UP | 0.5 | 0.0 | 0.5 HRS | | | 113.6 | 4.71 | 4.73 | 06/07/96 | 05:04 PM | 06/07/96 | 05:34 PM | |
| 292 | SUBTOTAL | 3.4 | | 3.4 HRS | | 111.8 | | | | | | | | |
| 293 | | | | | | | | | | | | | | |
| 294 | 13 A RESOLUBLIZATION | | | | | | | | | | | | | |

FIG. 12F-1

| | | PROCESS TIME LINE | | | | | | | | | | | | |
|---|---|---|---|---|---|---|---|---|---|---|---|---|---|---|
| | | DURATION (HRS.) | | | REL. TIME SCALE (HRS) | | | ABS. DAYS | | START | | FINISH | | |
| | OPERATION | CALC. | A/D | ADJ. | PREP | EXEC. | COMPL. | START | END | DATE | TIME | DATE | TIME | CALCULATIONS |
| | | | | | | 15.5 | | | | 06/03/96 | 08:00 AM | | | |
| 295 | | | | | | | | | | | | | | |
| 296 | SET UP | 1.0 | 0.0 | 1.0 HRS | 110.5 | | | 4.56 | 4.60 | 06/07/96 | 01:28 PM | 06/07/96 | 02:28 PM | |
| 297 | DILUTION | 0.5 | 0.0 | 0.5 HRS | | 111.0 | | 4.60 | 4.62 | 06/07/96 | 02:28 PM | 06/07/96 | 02:58 PM | 60.7 L@ 2.0 LPM = 0.50 HRS |
| 298 | AGITATE | 18.0 | 0.0 | 18.0 HRS | | 129.0 | | 4.62 | 5.37 | 06/07/96 | 02:58 PM | 06/08/96 | 08:58 AM | 23.50 HRS |
| 299 | CIP | 1.0 | 0.0 | 1.0 HRS | | | 130.0 | 5.37 | 5.42 | 06/08/96 | 08:58 AM | 06/08/96 | 09:58 AM | |
| 300 | SIP | 1.0 | 0.0 | 1.0 HRS | | | 131.0 | 5.42 | 5.46 | 06/08/96 | 09:58 AM | 06/08/96 | 10:58 AM | |
| 301 | CLEAN UP | 1.0 | 0.0 | 1.0 HRS | | | 132.0 | 5.46 | 5.50 | 06/08/96 | 10:58 AM | 06/08/96 | 11:58 AM | |
| 302 | SUBTOTAL | 22.5 | | 22.5 HRS | | 129.0 | | | | | | | | |
| 303 | | | | | | | | | | | | | | |
| 304 | 14 A CONCENTRATION | | | | | | | | | | | | | 26.99 SF |
| 305 | | | | | | | | | | | | | | |
| 306 | SET UP | 1.0 | 0.0 | 1.0 HRS | 127.6 | | | 5.28 | 5.32 | 06/08/96 | 06:38 AM | 06/08/96 | 07:38 AM | |
| 307 | FLUSH | 0.7 | 0.0 | 0.7 HRS | 128.3 | | | 5.32 | 5.35 | 06/08/96 | 07:38 AM | 06/08/96 | 08:18 AM | 54.0 L@ 3.0 L/SF/Hr or 1.35 LPM |
| 308 | PRIME | 0.7 | 0.0 | 0.7 HRS | 129.0 | | | 5.35 | 5.37 | 06/08/96 | 08:18 AM | 06/08/96 | 08:58 AM | 54.0 L@ 3.0 L/SF/Hr or 1.35 LPM |
| 309 | CONCENTRATION | 1.0 | 0.0 | 1.0 HRS | | 130.0 | | 5.37 | 5.42 | 06/08/96 | 08:58 AM | 06/08/96 | 09:58 AM | 81.0 L@ 3.0 L/SF/Hr or 1.35 LPM |
| 310 | DILUTION | 0.4 | 0.0 | 0.4 HRS | | 130.4 | | 5.42 | 5.43 | 06/08/96 | 09:58 AM | 06/08/96 | 10:25 AM | 13.5 L@ 0.5 LPM |
| 311 | WASH | 0.9 | 0.0 | 0.9 HRS | | 131.3 | | 5.43 | 5.47 | 06/08/96 | 10:25 AM | 06/08/96 | 11:19 AM | 72.9 L@ 3.0 L/SF/Hr or 1.35 LPM |
| 312 | FLUSH | 0.3 | 0.0 | 0.3 HRS | | | 131.7 | 5.47 | 5.49 | 06/08/96 | 11:19 AM | 06/08/96 | 11:39 AM | 27.0 L@ 3.0 L/SF/Hr or 1.35 LPM |
| 313 | STORE | 0.7 | 0.0 | 0.7 HRS | | | 132.3 | 5.49 | 5.51 | 06/08/96 | 11:39 AM | 06/08/96 | 12:19 PM | 54.0 L@ 3.0 L/SF/Hr or 1.35 LPM |
| 314 | CIP | 1.0 | 0.0 | 1.0 HRS | | | 133.3 | 5.51 | 5.56 | 06/08/96 | 12:19 PM | 06/08/96 | 01:19 PM | |
| 315 | SIP | 1.0 | 0.0 | 1.0 HRS | | | 134.3 | 5.56 | 5.60 | 06/08/96 | 01:19 PM | 06/08/96 | 02:19 PM | |
| 316 | CLEAN UP | 1.0 | 0.0 | 1.0 HRS | | | 135.3 | 5.60 | 5.64 | 06/08/96 | 02:19 PM | 06/08/96 | 03:19 PM | |
| 317 | SUBTOTAL | 8.7 | | 8.7 HRS | | 131.3 | | | | | | | | MAX FR 1.35 LPM |
| 318 | | | | | | | | | | | | | | |
| 319 | 15 A MICROFILTRATION | | | | | | | | | | | | | 12.60 SF |
| 320 | | | | | | | | | | | | | | |
| 321 | SET UP | 1.0 | 0.0 | 1.0 HRS | 131.1 | | | 5.42 | 5.46 | 06/08/96 | 10:03 AM | 06/08/96 | 11:03 AM | |
| 322 | FLUSH | 0.1 | 0.0 | 0.1 HRS | 131.2 | | | 5.46 | 5.47 | 06/08/96 | 11:03 AM | 06/08/96 | 11:11 AM | 25.2 L@ 15.0 L/SF/Hr or 3.15 LPM |
| 323 | PRIME | 0.1 | 0.0 | 0.1 HRS | 131.3 | | | 5.47 | 5.47 | 06/08/96 | 11:11 AM | 06/08/96 | 11:19 AM | 25.2 L@ 15.0 L/SF/Hr or 3.15 LPM |

FIG. 12F-2

| | | | | | | | | | | | | | | |
|---|---|---|---|---|---|---|---|---|---|---|---|---|---|---|
| 324 | FILTRATION | 0.5 | 0.0 | 0.5 HRS | | 131.8 | | 5.47 | 5.49 | 06/08/96 | 11:19 AM | 06/08/96 | 11:49 AM | 94.5 L@ 15.0 L/SF/Hr or 3.15 LPM |
| 325 | WASH | 0.0 | 0.0 | 0.0 HRS | | 131.8 | | 5.49 | 5.49 | 06/08/96 | 11:49 AM | 06/08/96 | 11:49 AM | 0.0 L@ 15.0 L/SF/Hr or 3.15 LPM |
| 326 | REGENERATE | 0.0 | 0.0 | 0.0 HRS | | | 131.9 | 5.49 | 5.49 | 06/08/96 | 11:49 AM | 06/08/96 | 11:51 AM | 6.3 L@ 15.0 L/SF/Hr or 3.15 LPM |
| 327 | STORE | 0.1 | 0.0 | 0.1 HRS | | | 131.9 | 5.49 | 5.50 | 06/08/96 | 11:51 AM | 06/08/96 | 11:55 AM | 12.6 L@ 15.0 L/SF/Hr or 3.15 LPM |
| 328 | CIP | 1.0 | 0.0 | 1.0 HRS | | | 132.9 | 5.50 | 5.54 | 06/08/96 | 11:55 AM | 06/08/96 | 12:55 PM | |
| 329 | SIP | 1.0 | 0.0 | 1.0 HRS | | | 133.9 | 5.54 | 5.58 | 06/08/96 | 12:55 PM | 06/08/96 | 01:55 PM | |
| 330 | CLEAN UP | 1.0 | 0.0 | 1.0 HRS | | | 134.9 | 5.58 | 5.62 | 06/08/96 | 01:55 PM | 06/08/96 | 02:55 PM | |
| 331 | SUBTOTAL | 4.9 | | 4.9 HRS | | 131.8 | | | | | | | | |
| 332 | | | | | | | | | | | | | | |
| 333 | 16 A P/A MPLC | | | | | | | | | | | | | 63.8 L.CV 0.4 H/D 60.32 CM DIA. |
| 334 | | | | | | | | | | | | | | |
| 335 | EQUILIBRATION | 1.1 | 0.0 | 1.1 HRS | 131.4 | | | 5.43 | 5.48 | 06/08/96 | 10:17 AM | 06/08/96 | 11:24 AM | 318.9 L@ 100.0 CM/HR or 4.76 LPM |
| 336 | LOAD | 0.7 | 0.0 | 0.7 HRS | | 132.5 | | 5.49 | 5.52 | 06/08/96 | 11:49 AM | 06/08/96 | 12:31 PM | 100.5 L@ 50.0 CM/HR or 2.38 LPM |
| 337 | WASH | 1.3 | 0.0 | 1.3 HRS | | 133.9 | | 5.52 | 5.58 | 06/08/96 | 12:31 PM | 06/08/96 | 01:52 PM | 191.4 L@ 50.0 CM/HR or 2.38 LPM |
| 338 | ELUTE A | 1.3 | 0.0 | 1.3 HRS | | 135.2 | | 5.58 | 5.63 | 06/08/96 | 01:52 PM | 06/08/96 | 03:12 PM | 191.4 L@ 50.0 CM/HR or 2.38 LPM |
| 339 | ELUTE B | 0.0 | 0.0 | 0.0 HRS | | 135.2 | | 5.63 | 5.63 | 06/08/96 | 03:12 PM | 06/08/96 | 03:12 PM | 0.0 L@ 30.0 CM/HR or 1.43 LPM |
| 340 | REGENERATE | 0.2 | 0.0 | 0.2 HRS | | | 135.4 | 5.63 | 5.64 | 06/08/96 | 03:12 PM | 06/08/96 | 03:25 PM | 63.8 L@ 100.0 CM/HR or 4.76 LPM |
| 341 | STORE | 0.4 | 0.0 | 0.4 HRS | | | 135.9 | 5.64 | 5.66 | 06/08/96 | 03:25 PM | 06/08/96 | 03:52 PM | 127.6 L@ 100.0 CM/HR or 4.76 LPM |
| 342 | CIP | 1.0 | 0.0 | 1.0 HRS | | | 136.9 | 5.66 | 5.70 | 06/08/96 | 03:52 PM | 06/08/96 | 04:52 PM | |
| 343 | SIP | 1.0 | 0.0 | 1.0 HRS | | | 137.9 | 5.70 | 5.74 | 06/08/96 | 04:52 PM | 06/08/96 | 05:52 PM | |
| 344 | CLEAN UP | 1.0 | 0.0 | 1.0 HRS | | | 138.9 | 5.74 | 5.79 | 06/08/96 | 05:52 PM | 06/08/96 | 06:52 PM | |
| 345 | SUBTOTAL | 5.2 | | 5.2 HRS | | 135.2 | | | | | | | | MAX FR 4.76 LPM |
| 346 | | | | | | | | | | | | | | |
| 347 | | | | | | | | | | | | | | |
| 348 | 17 A P/A MPLC | | | | | | | | | | | | | 12.2 L.CV 0.4 H/D 34.75 CM DIA. |
| 349 | | | | | | | | | | | | | | |
| 350 | EQUILIBRATION | 0.6 | 0.0 | 0.6 HRS | 135.6 | | | 5.62 | 5.65 | 06/08/96 | 02:59 PM | 06/08/96 | 03:38 PM | 61.0 L@ 100.0 CM/HR or 1.58 LPM |
| 351 | LOAD | 1.1 | 0.0 | 1.1 HRS | | 136.3 | | 5.63 | 5.68 | 06/08/96 | 03:12 PM | 06/08/96 | 04:17 PM | 51.0 L@ 50.0 CM/HR or 0.79 LPM |
| 352 | WASH | 0.8 | 0.0 | 0.8 HRS | | 137.1 | | 5.68 | 5.71 | 06/08/96 | 04:17 PM | 06/08/96 | 05:03 PM | 36.6 L@ 50.0 CM/HR or 0.79 LPM |
| 353 | ELUTE A | 0.8 | 0.0 | 0.8 HRS | | 137.8 | | 5.71 | 5.74 | 06/08/96 | 05:03 PM | 06/08/96 | 05:49 PM | 36.6 L@ 50.0 CM/HR or 0.79 LPM |
| 354 | ELUTE B | 0.0 | 0.0 | 0.0 HRS | | 137.8 | | 5.74 | 5.74 | 06/08/96 | 05:49 PM | 06/08/96 | 05:49 PM | 0.0 L@ 30.0 CM/HR or 0.47 LPM |

FIG. 12G-1

| | OPERATION | PROCESS TIME LINE DURATION (HRS.) CALC. | A/D | ADJ. | REL. TIME SCALE (HRS) PREP | EXEC. | COMPL. | ABS. DAYS START | END | START DATE | START TIME | FINISH DATE | FINISH TIME | CALCULATIONS |
|---|---|---|---|---|---|---|---|---|---|---|---|---|---|---|
| | | | | | | 15.5 | | | | 06/03/96 | 08:00 AM | | | |
| 355 | REGENERATE | 0.1 | 0.0 | 0.1 HRS | | | 138.0 | 5.74 | 5.75 | 06/08/96 | 05:49 PM | 06/08/96 | 05:57 PM | 12.2 L@ 100.0 CM/HR or 1.58 LPM |
| 356 | STORE | 0.3 | 0.0 | 0.3 HRS | | | 138.2 | 5.75 | 5.76 | 06/08/96 | 05:57 PM | 06/08/96 | 06:13 PM | 24.4 L@ 100.0 CM/HR or 1.58 LPM |
| 357 | CIP | 1.0 | 0.0 | 1.0 HRS | | | 139.2 | 5.76 | 5.80 | 06/08/96 | 06:13 PM | 06/08/96 | 07:13 PM | |
| 358 | SIP | 1.0 | 0.0 | 1.0 HRS | | | 140.2 | 5.80 | 5.84 | 06/08/96 | 07:13 PM | 06/08/96 | 08:13 PM | |
| 359 | CLEAN UP | 1.0 | 0.0 | 1.0 HRS | | | 141.2 | 5.84 | 5.88 | 06/08/96 | 08:13 PM | 06/08/96 | 09:13 PM | |
| 360 | SUBTOTAL | 6.7 | | 6.7 HRS | | 137.8 | | | | | | | | MAX FR 1.58 LPM |
| 361 | | | | | | | | | | | | | | |
| 362 | 18 A FLOW DIALYSIS | | | | | | | | | | | | | 12.20 SF |
| 363 | | | | | | | | | | | | | | |
| 364 | SET UP | 1.0 | 0.0 | 1.0 HRS | 136.5 | | | 5.65 | 5.69 | 06/08/96 | 03:29 PM | 06/08/96 | 04:29 PM | |
| 365 | FLUSH | 0.7 | 0.0 | 0.7 HRS | 137.2 | | | 5.69 | 5.72 | 06/08/96 | 04:29 PM | 06/08/96 | 05:09 PM | 24.4 L@ 3.0 L/SF/Hr or 0.61 LPM |
| 366 | PRIME | 0.7 | 0.0 | 0.7 HRS | 137.8 | | | 5.72 | 5.74 | 06/08/96 | 05:09 PM | 06/08/96 | 05:49 PM | 24.4 L@ 3.0 L/SF/Hr or 0.61 LPM |
| 367 | DIALYSIS | 1.0 | 0.0 | 1.0 HRS | | 138.8 | | 5.74 | 5.78 | 06/08/96 | 05:49 PM | 06/08/96 | 06:49 PM | 36.6 L@ 3.0 L/SF/Hr or 0.61 LPM |
| 368 | WASH | 0.0 | 0.0 | 0.0 HRS | | 138.8 | | 5.78 | 5.78 | 06/08/96 | 06:49 PM | 06/08/96 | 06:49 PM | 0.0 L@ 3.0 L/SF/Hr or 0.61 LPM |
| 369 | FLUSH | 0.3 | 0.0 | 0.3 HRS | | | 139.2 | 5.78 | 5.80 | 06/08/96 | 06:49 PM | 06/08/96 | 07:09 PM | 12.2 L@ 3.0 L/SF/Hr or 0.61 LPM |
| 370 | STORE | 0.7 | 0.0 | 0.7 HRS | | | 139.8 | 5.80 | 5.83 | 06/08/96 | 07:09 PM | 06/08/96 | 07:49 PM | 24.4 L@ 3.0 L/SF/Hr or 0.61 LPM |
| 371 | CIP | 1.0 | 0.0 | 1.0 HRS | | | 140.8 | 5.83 | 5.87 | 06/08/96 | 07:49 PM | 06/08/96 | 08:49 PM | |
| 372 | SIP | 1.0 | 0.0 | 1.0 HRS | | | 141.8 | 5.87 | 5.91 | 06/08/96 | 08:49 PM | 06/08/96 | 09:49 PM | |
| 373 | CLEAN UP | 1.0 | 0.0 | 1.0 HRS | | | 142.8 | 5.91 | 5.95 | 06/08/96 | 09:49 PM | 06/08/96 | 10:49 PM | |
| 374 | SUBTOTAL | 7.3 | | 7.3 HRS | | 138.8 | | | | | | | | MAX FR 0.61 LPM |
| 375 | | | | | | | | | | | | | | |
| 376 | 19 A P/A MPLC | | | | | | | | | | | | | 7.0 L.CV 0.4 H/D 28.81 CM DIA. |
| 377 | | | | | | | | | | | | | | |
| 378 | EQUILIBRATION | 0.5 | 0.0 | 0.5 HRS | 138.5 | | | 5.75 | 5.77 | 06/08/96 | 05:59 PM | 06/08/96 | 06:31 PM | 34.8 L@ 100.0 CM/HR or 1.09 LPM |
| 379 | LOAD | 0.2 | 0.0 | 0.2 HRS | | 139.1 | | 5.78 | 5.79 | 06/08/96 | 06:49 PM | 06/08/96 | 07:03 PM | 7.3 L@ 50.0 CM/HR or 0.54 LPM |
| 380 | WASH | 0.6 | 0.0 | 0.6 HRS | | 139.7 | | 5.79 | 5.82 | 06/08/96 | 07:03 PM | 06/08/96 | 07:41 PM | 20.9 L@ 50.0 CM/HR or 0.54 LPM |
| 381 | ELUTE A | 0.6 | 0.0 | 0.6 HRS | | 140.3 | | 5.82 | 5.85 | 06/08/96 | 07:41 PM | 06/08/96 | 08:20 PM | 20.9 L@ 50.0 CM/HR or 0.54 LPM |
| 382 | ELUTE B | 0.0 | 0.0 | 0.0 HRS | | 140.3 | | 5.85 | 5.85 | 06/08/96 | 08:20 PM | 06/08/96 | 08:20 PM | 0.0 L@ 30.0 CM/HR or 0.33 LPM |
| 383 | REGENERATE | 0.1 | 0.0 | 0.1 HRS | | | 140.4 | 5.85 | 5.85 | 06/08/96 | 08:20 PM | 06/08/96 | 08:26 PM | 7.0 L@ 100.0 CM/HR or 1.09 LPM |

FIG. 12G-2

| | | | | | | | | | | | | | | |
|---|---|---|---|---|---|---|---|---|---|---|---|---|---|---|
| 384 | STORE | 0.2 | 0.0 | 0.2 HRS | | | 140.7 | 5.85 | 5.86 | 06/08/96 | 08:26 PM | 06/08/96 | 08:39 PM | 13.9 L@ 100.0 CM/HR or 1.09 LPM |
| 385 | CIP | 1.0 | 0.0 | 1.0 HRS | | | 141.7 | 5.86 | 5.90 | 06/08/96 | 08:39 PM | 06/08/96 | 09:39 PM | |
| 386 | SIP | 1.0 | 0.0 | 1.0 HRS | | | 142.7 | 5.90 | 5.94 | 06/08/96 | 09:39 PM | 06/08/96 | 10:39 PM | |
| 387 | CLEAN UP | 1.0 | 0.0 | 1.0 HRS | | | 143.7 | 5.94 | 5.99 | 06/08/96 | 10:39 PM | 06/08/96 | 11:39 PM | |
| 388 | SUBTOTAL | 5.4 | | 5.4 HRS | | 140.3 | | | | | | | | MAX FR 1.09 LPM |
| 389 | | | | | | | | | | | | | | |
| 390 | 20 A FLOW DIALYSIS | | | | | | | | | | | | | 2.43 SF |
| 391 | | | | | | | | | | | | | | |
| 392 | SET UP | 0.0 | 0.0 | 0.0 HRS | 139.0 | | | 5.79 | 5.79 | 06/08/96 | 07:00 PM | 06/08/96 | 07:00 PM | |
| 393 | FLUSH | 0.7 | 0.0 | 0.7 HRS | 139.7 | | | 5.79 | 5.82 | 06/08/96 | 07:00 PM | 06/08/96 | 07:40 PM | 4.9 L@ 3.0 L/SF/HR or 0.12 LPM |
| 394 | PRIME | 0.7 | 0.0 | 0.7 HRS | 140.3 | | | 5.82 | 5.85 | 06/08/96 | 07:40 PM | 06/08/96 | 08:20 PM | 4.9 L@ 3.0 L/SF/HR or 0.12 LPM |
| 395 | DIALYSIS | 2.0 | 0.0 | 2.0 HRS | | 142.3 | | 5.85 | 5.93 | 06/08/96 | 08:20 PM | 06/08/96 | 10:20 PM | 14.6 L@ 3.0 L/SF/HR or 0.12 LPM |
| 396 | WASH | 0.0 | 0.0 | 0.0 HRS | | 142.3 | | 5.93 | 5.93 | 06/08/96 | 10:20 PM | 06/08/96 | 10:20 PM | 0.0 L@ 3.0 L/SF/HR or 0.12 LPM |
| 397 | FLUSH | 0.3 | 0.0 | 0.3 HRS | | | 142.7 | 5.93 | 5.94 | 06/08/96 | 10:20 PM | 06/08/96 | 10:40 PM | 2.4 L@ 3.0 L/SF/HR or 0.12 LPM |
| 398 | STORE | 0.7 | 0.0 | 0.7 HRS | | | 143.3 | 5.94 | 5.97 | 06/08/96 | 10:40 PM | 06/08/96 | 11:20 PM | 4.9 L@ 3.0 L/SF/HR or 0.12 LPM |
| 399 | CIP | 0.0 | 0.0 | 0.0 HRS | | | 143.3 | 5.97 | 5.97 | 06/08/96 | 11:20 PM | 06/08/96 | 11:20 PM | |
| 400 | SIP | 0.0 | 0.0 | 0.0 HRS | | | 143.3 | 5.97 | 5.97 | 06/08/96 | 11:20 PM | 06/08/96 | 11:20 PM | |
| 401 | CLEAN UP | 0.0 | 1.0 | 1.0 HRS | | | 144.3 | 5.97 | 6.01 | 06/08/96 | 11:20 PM | 06/08/96 | 12:20 AM | |
| 402 | SUBTOTAL | 4.3 | | 5.3 HRS | | 142.3 | | | | | | | | MAX FR 0.12 LPM |
| 403 | | | | | | | | | | | | | | |
| 404 | 17 A P/A MPLC | | | | | | | | | | | | | 5.3 L.CV 0.4 H/D 26.35 CM DIA. |
| 405 | | | | | | | | | | | | | | |
| 406 | EQUILIBRATION | 0.5 | 0.0 | 0.5 HRS | 142.0 | | | 5.89 | 5.91 | 06/08/96 | 09:28 PM | 06/08/96 | 09:57 PM | 26.6 L@ 100.0 CM/HR or 0.91 LPM |
| 407 | LOAD | 0.1 | 0.0 | 0.1 HRS | | 142.4 | | 5.93 | 5.94 | 06/08/96 | 10:20 PM | 06/08/96 | 10:26 PM | 2.9 L@ 50.0 CM/HR or 0.45 LPM |
| 408 | WASH | 0.6 | 0.0 | 0.6 HRS | | 143.0 | | 5.94 | 5.96 | 06/08/96 | 10:26 PM | 06/08/96 | 11:01 PM | 16.0 L@ 50.0 CM/HR or 0.45 LPM |
| 409 | ELUTE A | 0.6 | 0.0 | 0.6 HRS | | 143.6 | | 5.96 | 5.96 | 06/08/96 | 11:01 PM | 06/08/96 | 11:36 PM | 16.0 L@ 50.0 CM/HR or 0.45 LPM |
| 410 | ELUTE B | 0.0 | 0.0 | 0.0 HRS | | 143.6 | | 5.96 | 5.98 | 06/08/96 | 11:36 PM | 06/08/96 | 11:36 PM | 0.0 L@ 30.0 CM/HR or 0.27 LPM |
| 411 | REGENERATE | 0.1 | 0.0 | 0.1 HRS | | | 143.7 | 5.98 | 5.99 | 06/08/96 | 11:36 PM | 06/08/96 | 11:42 PM | 5.3 L@ 100.0 CM/HR or 0.91 LPM |
| 412 | STORE | 0.2 | 0.0 | 0.2 HRS | | | 143.9 | 5.99 | 6.00 | 06/08/96 | 11:42 PM | 06/08/96 | 11:54 PM | 10.6 L@ 100.0 CM/HR or 0.91 LPM |
| 413 | CIP | 0.0 | 0.0 | 0.0 HRS | | | 143.9 | 6.00 | 6.00 | 06/08/96 | 11:54 PM | 06/08/96 | 11:54 PM | |
| 414 | SIP | 0.0 | 0.0 | 0.0 HRS | | | 143.9 | 6.00 | 6.00 | 06/08/96 | 11:54 PM | 06/08/96 | 11:54 PM | |

FIG. 12H

| | OPERATION | PROCESS TIME LINE DURATION (HRS.) CALC. | A/D | ADJ. | REL. TIME SCALE (HRS) PREP | EXEC. | COMPL. | ABS. DAYS START | END | START DATE | TIME | FINISH DATE | TIME | CALCULATIONS |
|---|---|---|---|---|---|---|---|---|---|---|---|---|---|---|
| | | | | | | 15.5 | | | | 06/03/96 | 08:00 AM | | | |
| 415 | CLEAN UP | 1.0 | 0.0 | 1.0 HRS | | | 144.9 | 6.00 | 6.04 | 06/08/96 | 11:54 PM | 06/09/96 | 12:54 AM | |
| 416 | SUBTOTAL | 2.1 | | 2.1 HRS | | 143.6 | | | | | | | | MAX FR 0.91 LPM |
| 417 | | | | | | | | | | | | | | |
| 418 | 22 A STERILE FILTRATION | | | | | | | | | | | | | 0.09 SF |
| 419 | | | | | | | | | | | | | | |
| 420 | SET UP | 0.5 | 0.0 | 0.5 HRS | 152.6 | | | 6.34 | 6.36 | 06/09/96 | 08:06 AM | 06/09/96 | 06:36 AM | |
| 421 | FILTRATION | 0.5 | 0.0 | 0.5 HRS | | 144.1 | | 5.98 | 6.00 | 06/08/96 | 11:36 PM | 06/09/96 | 12:06 AM | 2.2 L@ 50.0 L/SF/Hr or 0.07 LPM |
| 422 | STORAGE | 0.5 | 0.0 | 0.5 HRS | | | 144.6 | 6.00 | 6.03 | 06/09/96 | 12:06 AM | 06/09/96 | 12:36 AM | |
| 423 | CIP | 0.0 | 0.0 | 0.0 HRS | | | 144.6 | 6.03 | 6.03 | 06/09/96 | 12:36 AM | 06/09/96 | 12:36 AM | |
| 424 | SIP | 0.0 | 0.0 | 0.0 HRS | | | 144.6 | 6.03 | 6.03 | 06/09/96 | 12:36 AM | 06/09/96 | 12:36 AM | |
| 425 | CLEAN UP | 1.0 | 0.0 | 1.0 HRS | | | 145.6 | 6.03 | 6.07 | 06/09/96 | 12:36 AM | 06/09/96 | 01:36 AM | |
| 426 | SUBTOTAL | 1.5 | | 1.5 HRS | | 144.1 | | | | | | | | MAX FR 0.07 LPM |

*FIG. 15*

SOLUTION PREP VESSEL LIST/PROCEDURE

| BATCH TANK | | BATCH TANK | | | | WATER COLLECT. | | | ULTRAFILTRATION/MICROFILTRATION | | | | | CIP | | | TOTAL | | |
|---|---|---|---|---|---|---|---|---|---|---|---|---|---|---|---|---|---|---|---|
| NO. | MIN. LWV | NO. | MIN. LWV | MAX. LWV | SET UP MIN. | LPM. | MIN. | WEIGH/ MIX MIN. | SF | L/SF/HR | MIN. | DELAY FACTOR | ADJ. MIN. | CYCLE | MIN. | SIP | MIN. | HRS. | PERC. UTIL. |
| 101 | 0.5 | 101 | 0.5 | 1 | 10 | | 1 | 15 | 0.5 | 25 | 4.8 | 1.2 | 5.76 | | | | 31.76 | 0.5 | |
| 102 | 1 | 102 | 1 | 2 | 10 | | 1 | 15 | 1 | 25 | 4.8 | 1.2 | 5.76 | | | | 31.76 | 0.5 | 2% |
| 103 | 2 | 103 | 2 | 4 | 20 | | 2 | 30 | 1 | 25 | 9.6 | 1.2 | 11.52 | | | | 63.52 | 1.1 | |
| 104 | 4 | 104 | 4 | 10 | 20 | 10 | 1 | 30 | 2 | 25 | 12 | 1.2 | 14.4 | | | | 65.4 | 1.1 | 4% |
| 105 | 10 | 105 | 10 | 20 | 20 | 10 | 2 | 30 | 2 | 25 | 24 | 1.2 | 28.8 | | | | 80.8 | 1.3 | |
| 106 | 20 | 106 | 20 | 50 | 20 | 10 | 5 | 30 | 10 | 25 | 12 | 1.2 | 14.4 | CIP-1 | 60 | 40 | 109.4 | 1.8 | 3% |
| 107 | 50 | 107 | 50 | 100 | 20 | 10 | 10 | 30 | 10 | 25 | 24 | 1.2 | 28.8 | CIP-1 | 60 | 40 | 128.8 | 2.1 | 8% |
| 108 | 100 | 108 | 100 | 250 | 0.5 | 50 | 5 | 30 | 30 | 25 | 20 | 1.2 | 24 | CIP-1 | 60 | 40 | 99.5 | 1.7 | 18% |
| 109 | 250 | 109 | 250 | 500 | 0.5 | 50 | 10 | 30 | 30 | 25 | 40 | 1.2 | 48 | CIP-1 | 60 | 40 | 128.5 | 2.1 | 11% |
| 110 | 500 | 110 | 500 | 1,500 | 1 | 50 | 30 | 30 | 60 | 25 | 60 | 1.2 | 72 | CIP-1 | 60 | 40 | 173 | 2.9 | 10% |
| 111 | 1500 | 111 | 1500 | 3,000 | 1 | 50 | 60 | 30 | 60 | 25 | 120 | 1.2 | 144 | CIP-1 | 60 | 40 | 275 | 4.6 | 16% |
| | | | 1402 | 1406 | 1410 | 1404 | 1502 | 1410 | 1412 | 1424 | 1506 | | | | 1422 | 1434 | 1428 | | |

FIG. 17

Solution Prep Campaign Format

1626

| | Soln. ID | Storage Cond. RT | Storage Cond. 4C | Storage Cond. XP | Soln.Prep Format MOD | Soln.Prep Format BOD | Soln.Prep Format BIA | Solution Prep Cycles Liters/ Batch | Preps/ Batch | Liters/ Prep | Days/ Bat.Cy. | Days/ Prep | Shelf Days | Shelf Check | 101 0.5 1 | 102 1 2 | 103 2 4 | 104 4 10 | 105 10 20 | 106 20 50 | 107 50 100 |
|---|---|---|---|---|---|---|---|---|---|---|---|---|---|---|---|---|---|---|---|---|---|
| 1 | S-0101 | X | | | 0 | X | 0 | 1,666.50 | 1 | 1,666.50 | 7 | 7 | 56 | OK | | | | | | | |
| 2 | S-0102 | X | | | 0 | X | 0 | 1.65 | 1 | 1.65 | 7 | 7 | 180 | OK | | 102 | | | | | |
| 3 | S-0103 | X | | | 0 | X | 0 | 1.65 | 1 | 1.65 | 7 | 7 | 180 | OK | | 102 | | | | | |
| 4 | S-0104 | X | | | 0 | X | 0 | 8.25 | 1 | 8.25 | 7 | 7 | 56 | OK | | | | 104 | | | |
| 5 | S-0105 | X | | | 0 | X | 0 | 8.25 | 1 | 8.25 | 7 | 7 | 56 | OK | | | | 104 | | | |
| 6 | S-0106 | X | | | 0 | X | 0 | 560.61 | 1 | 560.61 | 7 | 7 | 56 | OK | | | | | | | |
| 7 | S-0107 | X | | | 0 | X | 0 | 125.93 | 1 | 125.93 | 7 | 7 | 56 | OK | | | | | | | |
| 8 | S-0108 | X | | | 0 | X | 0 | 177.41 | 1 | 177.41 | 7 | 7 | 56 | OK | | | | | | | |
| 9 | S-0109 | X | | | 0 | X | 0 | 22.18 | 1 | 22.18 | 7 | 7 | 56 | OK | | | | | | 106 | |
| 10 | S-0111 | X | | | 0 | X | 0 | 56.52 | 1 | 56.52 | 7 | 7 | 56 | OK | | | | | | | 107 |
| 11 | S-0112 | X | | | 0 | X | 0 | 113.03 | 1 | 113.03 | 7 | 7 | 56 | OK | | | | | | | |
| 12 | S-0113 | X | | | 0 | X | 0 | 1,612.45 | 1 | 1,612.45 | 7 | 7 | 56 | OK | | | | | | | |
| 13 | S-0114 | X | | | 0 | X | 0 | 574.10 | 1 | 574.10 | 7 | 7 | 56 | OK | | | | | | | |
| 14 | S-0115 | X | | | 0 | X | 0 | 248.83 | 1 | 248.83 | 7 | 7 | 56 | OK | | | | | | | |
| 15 | S-0116 | X | | | 0 | X | 0 | 497.65 | 1 | 497.65 | 7 | 7 | 56 | OK | | | | | | | |
| 16 | S-0117 | X | | | 0 | X | 0 | 109.80 | 1 | 109.80 | 7 | 7 | 56 | OK | | | | | | | |
| 17 | S-0118 | X | | | 0 | X | 0 | 497.65 | 1 | 497.65 | 7 | 7 | 56 | OK | | | | | | | |
| 18 | S-0119 | X | | | 0 | X | 0 | 292.79 | 1 | 292.79 | 7 | 7 | 56 | OK | | | | | | | |
| 19 | S-0120 | X | | | 0 | X | 0 | 109.80 | 1 | 109.80 | 7 | 7 | 56 | OK | | | | | | | |
| 20 | S-0121 | X | | | 0 | X | 0 | 62.58 | 1 | 62.58 | 7 | 7 | 56 | OK | | | | | | | 107 |
| 21 | S-0122 | X | | | 0 | X | 0 | 0.00 | 1 | 0.00 | 7 | 7 | 56 | OK | | | | | | | |
| | 1704 | | | | | | | 1618 | 1608 | 1620 | 1604 | 1610 | 1614 | 1706 | 1708 | 1710 | 1712 | 1714 | 1716 | 1718 | 1720 |

FIG. 18

Solution Prep Campaign Format

1626

| | Soln. ID | 108 100 250 | 109 250 500 | 110 500 1500 | 111 1500 3000 | Tank Assignment Initial Assign. | Final Assign. | Solution Prep Schedule Required By | Back Days | Avail. By | Hold Days | Init. Start | Float Days | Final Start | Next Prep | Prep. Hrs. | Tank Fill 101 |
|---|---|---|---|---|---|---|---|---|---|---|---|---|---|---|---|---|---|
| 1 | S-0101 | | | | 111 | 111 | 111 | 06/03/96 | 1 | 05/31/96 | 2 | 05/29/96 | 0 | 05/29/96 | 06/05/96 | 4 | |
| 2 | S-0102 | | | | | 102 | 102 | 06/05/96 | 1 | 06/04/96 | 2 | 05/31/96 | 0 | 05/31/96 | 06/07/96 | 4 | |
| 3 | S-0103 | | | | | 102 | 102 | 06/05/96 | 1 | 06/04/96 | 2 | 05/31/96 | 0 | 05/31/96 | 06/07/96 | 4 | |
| 4 | S-0104 | | | | | 104 | 104 | 06/05/96 | 1 | 06/04/96 | 2 | 05/31/96 | 0 | 05/31/96 | 06/07/96 | 4 | |
| 5 | S-0105 | | | | | 104 | 104 | 06/05/96 | 1 | 06/04/96 | 2 | 05/31/96 | 0 | 05/31/96 | 06/07/96 | 4 | |
| 6 | S-0106 | | | 110 | | 110 | 110 | 06/07/96 | 1 | 06/06/96 | 2 | 06/04/96 | 0 | 06/04/96 | 06/11/96 | 4 | |
| 7 | S-0107 | 108 | | | | 108 | 108 | 06/11/96 | 1 | 06/10/96 | 2 | 06/07/96 | 0 | 06/07/96 | 06/14/96 | 4 | |
| 8 | S-0108 | 108 | | | | 108 | 108 | 06/11/96 | 1 | 06/10/96 | 2 | 06/07/96 | 0 | 06/07/96 | 06/14/96 | 4 | |
| 9 | S-0109 | | | | | 106 | 106 | 06/12/96 | 1 | 06/11/96 | 2 | 06/07/96 | 0 | 06/07/96 | 06/14/96 | 4 | |
| 10 | S-0111 | | | | | 107 | 107 | 06/12/96 | 1 | 06/11/96 | 2 | 06/07/96 | 0 | 06/07/96 | 06/14/96 | 4 | |
| 11 | S-0112 | 108 | | | | 108 | 108 | 06/12/96 | 1 | 06/11/96 | 2 | 06/07/96 | 0 | 06/07/96 | 06/14/96 | 4 | |
| 12 | S-0113 | | | | 111 | 111 | 111 | 06/12/96 | 1 | 06/11/96 | 2 | 06/07/96 | 0 | 06/07/96 | 06/14/96 | 4 | |
| 13 | S-0114 | | | 110 | | 110 | 110 | 06/12/96 | 1 | 06/11/96 | 2 | 06/07/96 | 0 | 06/07/96 | 06/14/96 | 4 | |
| 14 | S-0115 | 108 | | | | 108 | 108 | 06/12/96 | 1 | 06/11/96 | 2 | 06/07/96 | 0 | 06/07/96 | 06/14/96 | 4 | |
| 15 | S-0116 | | 109 | | | 109 | 109 | 06/12/96 | 1 | 06/11/96 | 2 | 06/07/96 | 0 | 06/07/96 | 06/14/96 | 4 | |
| 16 | S-0117 | 108 | | | | 108 | 108 | 06/12/96 | 1 | 06/11/96 | 2 | 06/07/96 | 0 | 06/07/96 | 06/14/96 | 4 | |
| 17 | S-0118 | | 109 | | | 109 | 109 | 06/12/96 | 1 | 06/11/96 | 2 | 06/07/96 | 0 | 06/07/96 | 06/14/96 | 4 | |
| 18 | S-0119 | | 109 | | | 109 | 109 | 06/12/96 | 1 | 06/11/96 | 2 | 06/07/96 | 0 | 06/07/96 | 06/14/96 | 4 | |
| 19 | S-0120 | 108 | | | | 108 | 108 | 06/12/96 | 1 | 06/11/96 | 2 | 06/07/96 | 0 | 06/07/96 | 06/14/96 | 4 | |
| 20 | S-0121 | | | | | 107 | 107 | 06/12/96 | 1 | 06/11/96 | 2 | 06/07/96 | 0 | 06/07/96 | 06/14/96 | 4 | |
| 21 | S-0122 | | | | | 0 | 0 | 06/12/96 | 1 | 06/11/96 | 2 | 06/07/96 | 0 | 06/07/96 | 06/14/96 | 4 | |

1722 1724 1726 1728

| | |
|---|---|
| Min | 06/03/96 |
| Max | 06/12/96 |
| Sat | 0 |
| Sun | 0 |

Min 05/29/96 06/14/96

Min

Figure 21A:
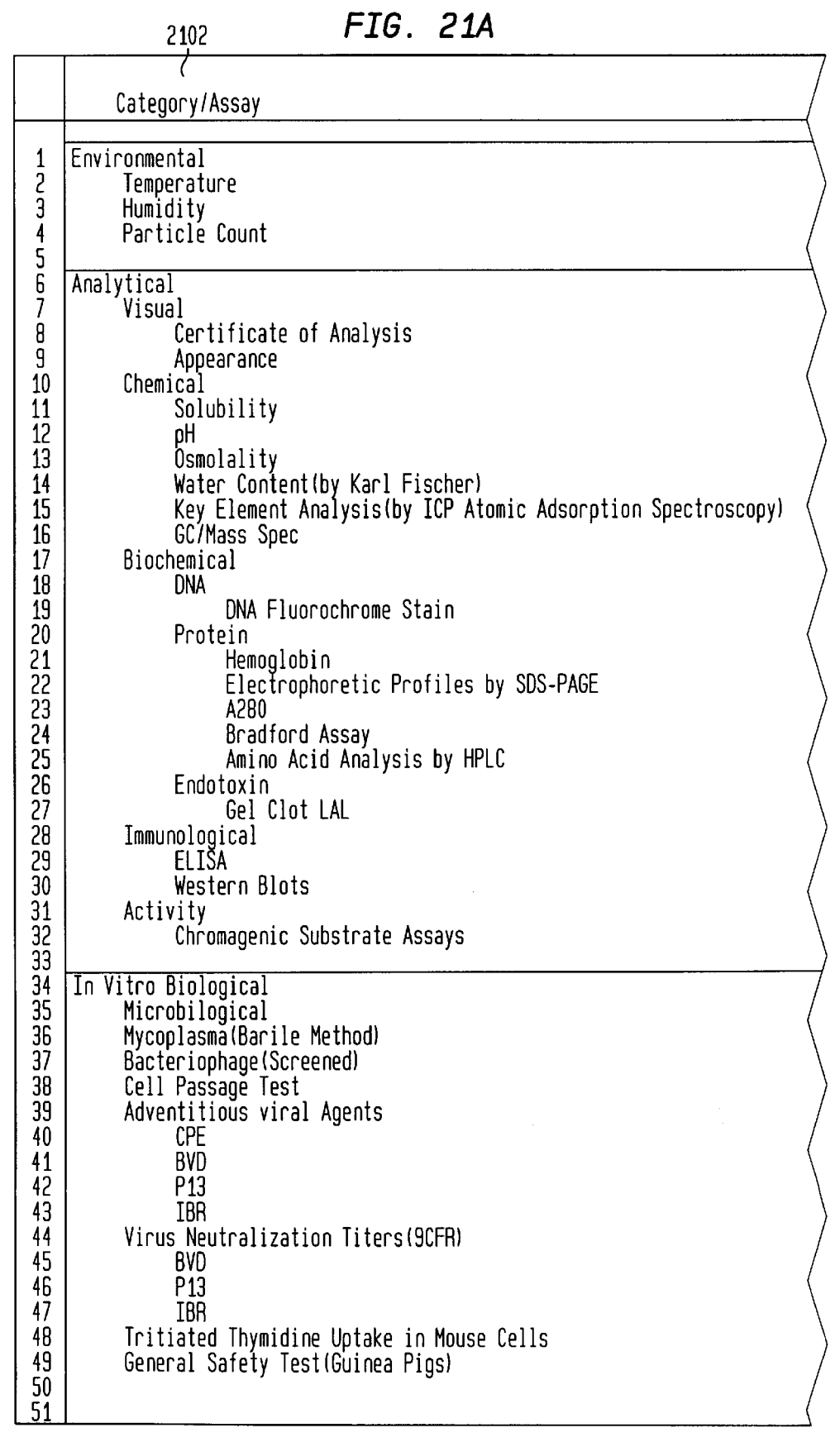

Category/Assay

- Environmental
  - Temperature
  - Humidity
  - Particle Count
- Analytical
  - Visual
    - Certificate of Analysis
    - Appearance
  - Chemical
    - Solubility
    - pH
    - Osmolality
    - Water Content(by Karl Fischer)
    - Key Element Analysis(by ICP Atomic Adsorption Spectroscopy)
    - GC/Mass Spec
  - Biochemical
    - DNA
      - DNA Fluorochrome Stain
    - Protein
      - Hemoglobin
      - Electrophoretic Profiles by SDS-PAGE
      - A280
      - Bradford Assay
      - Amino Acid Analysis by HPLC
    - Endotoxin
      - Gel Clot LAL
  - Immunological
    - ELISA
    - Western Blots
  - Activity
    - Chromagenic Substrate Assays
- In Vitro Biological
  - Microbilogical
  - Mycoplasma(Barile Method)
  - Bacteriophage(Screened)
  - Cell Passage Test
  - Adventitious viral Agents
    - CPE
    - BVD
    - P13
    - IBR
  - Virus Neutralization Titers(9CFR)
    - BVD
    - P13
    - IBR
  - Tritiated Thymidine Uptake in Mouse Cells
  - General Safety Test(Guinea Pigs)

FIG. 21B 2104 2106

| Code | Man Hour Set Up | Man Hour Per Sample | Man Hour Clean Up | Disp. Material |
|---|---|---|---|---|
| E-1 | 0.5 | 0.1 | 0.5 | |
| E-2 | 0.5 | 0.1 | 0.5 | |
| E-3 | 0.5 | 0.2 | 0.5 | |
| AV-1 | 0.25 | 0.2 | 0.5 | |
| AV-2 | 0.25 | 0.05 | 0.25 | |
| AC-1 | 0.5 | 0.1 | 0.5 | |
| AC-2 | 0.25 | 0.05 | 0.25 | |
| AC-3 | 0.25 | 0.1 | 0.25 | |
| AC-4 | 0.5 | 0.2 | 0.5 | |
| AC-5 | 1 | 0.25 | 1 | |
| AC-6 | 1 | 0.25 | 1 | |
| AB-1 | 0.5 | 0.1 | 0.5 | |
| AB-2 | 0.5 | 0.1 | 0.5 | |
| AB-3 | 1 | 0.2 | 1 | |
| AB-4 | 0.25 | 0.1 | 0.25 | |
| AB-5 | 0.5 | 0.1 | 0.5 | |
| AB-6 | 1 | 0.25 | 1 | |
| | 0.5 | 0.1 | 0.5 | |
| AB-7 | | | | |
| AI-1 | 1 | 0.1 | 1 | |
| AI-2 | 1.5 | 0.2 | 1.5 | |
| AA-1 | 1 | 0.1 | 1 | |
| VB-1 | 0.5 | 0.2 | 0.5 | |
| VB-2 | 0.5 | 0.2 | 0.5 | |
| VB-3 | 0.5 | 0.2 | 0.5 | |
| VB-4 | 1 | 0.2 | 1 | |
| | 2 | 0.2 | 1 | |
| VB-5 | 2 | 0.2 | 1 | |
| VB-6 | 2 | 0.2 | 1 | |
| VB-7 | 2 | 0.2 | 1 | |
| VB-8 | 2 | 0.2 | 1 | |
| VB-9 | 2 | 0.2 | 1 | |
| VB-10 | 2 | 0.2 | 1 | |
| VB-11 | 2 | 0.2 | 1 | |
| VB-12 | 2 | 0.2 | 1 | |
| VB-13 | 1 | 0.2 | 1 | |

| | | | 8 Hrs/Day | 59 | | 60 | | 61 | | 62 | |
|---|---|---|---|---|---|---|---|---|---|---|---|
| Tank 101 | Usage | 3.5 | 06/13/96<br>04/05/96 | 06/03/96 | | 06/04/96 | | 06/05/96 | | 06/06/96 | |
| Soin. | | Period | Start | Date | Hrs. | Date | Hrs. | Date | Hrs. | Date | Hrs. |
| S-0101 | | | | | | | | | | | |
| S-0102 | 13.2 | 56 | 02/14/96 | 04/10/96 | | 04/10/96 | | 06/05/96 | 3.5 | 06/05/96 | |
| S-0103 | 1.7 | 7 | 05/22/96 | 05/29/96 | | 05/29/96 | | 06/05/96 | 3.5 | 06/05/96 | |
| S-0104 | 8.3 | 7 | 05/22/96 | 05/29/96 | | 05/29/96 | | 06/05/96 | 3.5 | 06/05/96 | |
| S-0105 | 8.3 | 7 | 05/22/96 | 05/29/96 | | 05/29/96 | | 06/05/96 | 3.5 | 06/05/96 | |
| S-0106 | | | | | | | | | | | |
| S-0107 | | | | | | | | | | | |
| S-0108 | | | | | | | | | | | |
| S-0109 | 22.2 | 7 | 05/29/96 | 05/29/96 | | 05/29/96 | | 06/05/96 | 3.5 | 06/05/96 | |
| S-0111 | | | | | | | | | | | |
| S-0112 | | | | | | | | | | | |
| S-0113 | | | | | | | | | | | |
| S-0114 | | | | | | | | | | | |
| S-0115 | | | | | | | | | | | |
| S-0116 | | | | | | | | | | | |
| S-0117 | | | | | | | | | | | |
| S-0118 | | | | | | | | | | | |
| S-0119 | | | | | | | | | | | |
| S-0120 | | | | | | | | | | | |
| S-0121 | | | | | | | | | | | |
| S-0122 | 0.0 | 7 | 05/29/96 | 05/29/96 | | 05/29/96 | | 06/05/96 | 3.5 | 06/05/96 | |
| | | | | | 0 | | 0 | | 21 | | 0 |

| 63 | | 64 | | 65 | | 66 | | 67 | | 68 | |
|---|---|---|---|---|---|---|---|---|---|---|---|
| 06/07/96 | | 06/08/96 | | 06/09/96 | | 06/10/96 | | 06/11/96 | | 06/12/96 | |
| Date | Hrs. | Date | Hrs. | Date | Hrs. | Date | Hrs. | Date | Hrs. | Date | Hrs. |
| 06/05/96 | | 06/05/96 | | 06/05/96 | | 06/05/96 | | 06/05/96 | | 06/05/96 | |
| 06/05/96 | | 06/05/96 | | 06/05/96 | | 06/05/96 | | 06/05/96 | | 06/12/96 | 3.5 |
| 06/05/96 | | 06/05/96 | | 06/05/96 | | 06/05/96 | | 06/05/96 | | 06/12/96 | 3.5 |
| 06/05/96 | | 06/05/96 | | 06/05/96 | | 06/05/96 | | 06/05/96 | | 06/12/96 | 3.5 |
| 06/05/96 | | 06/05/96 | | 06/05/96 | | 06/05/96 | | 06/05/96 | | 06/12/96 | 3.5 |
| 06/05/96 | | 06/05/96 | | 06/05/96 | | 06/05/96 | | 06/05/96 | | 06/12/96 | 3.5 |
| | 0 | | 0 | | 0 | | 0 | | 0 | | 17.5 |

FIG. 36A

PREP EQUIPMENT PROTOCOL-BENCH SINK

3408

| | CYCLE CODE | MINUTES/CYCLE | | | | | | | | | | TOTAL |
|---|---|---|---|---|---|---|---|---|---|---|---|---|
| | | LOAD | PRE WASH RINSE | | DETERGENT WASH | | | POST WASH RINSE | | FINAL RINSE | HOLD/ DRY | |
| | | | NPHW | NPCW | MINUTES | REAGENT | Gm/CF | NPHW | NPCW | | | |
| 1 | BS-1 | 5 | 2 | 2 | 5 | Alconox | 0.5 | 2 | 2 | 2 | | 20 |
| 2 | BS-2 | 5 | 2 | 2 | 5 | Alconox | 0.5 | 2 | 2 | 2 | | 20 |
| 3 | BS-3 | 5 | 2 | 2 | 5 | Alconox | 0.5 | 2 | 2 | 2 | | 20 |
| 4 | BS-4 | 5 | 2 | 2 | 5 | Alconox | 0.5 | 2 | 2 | 2 | | 20 |
| 5 | BS-5 | 5 | 2 | 2 | 5 | Alconox | 0.5 | 2 | 2 | 2 | | 20 |

PREP EQUIPMENT PROTOCOL-WASH STATION

3408

| | PROTOCOL CODE | MINUTES/CYCLE | | | | | | | | | TOTAL |
|---|---|---|---|---|---|---|---|---|---|---|---|
| | | LOAD | PRE WASH RINSE | | DETERGENT WASH | | | POST WASH RINSE | | FINAL RINSE | |
| | | | NPHW | NPCW | MINUTES | REAGENT | Gm/CF | NPHW | NPCW | | |
| 1 | WS-1 | 5 | 2 | 2 | 5 | Alconox | 0.5 | 2 | 2 | 2 | 15 |
| 2 | WS-2 | 5 | 2 | 2 | 5 | Alconox | 0.5 | 2 | 2 | 2 | 15 |
| 3 | WS-3 | 5 | 2 | 2 | 5 | Alconox | 0.5 | 2 | 2 | 2 | 15 |
| 4 | WS-4 | 5 | 2 | 2 | 5 | Alconox | 0.5 | 2 | 2 | 2 | 15 |
| 5 | WS-5 | 5 | 2 | 2 | 5 | Alconox | 0.5 | 2 | 2 | 2 | 15 |

FIG. 36C

PREP EQUIPMENT PROTOCOL-GLASSWARE WASHER

3408

| | CYCLE CODE | MINUTES/CYCLE | | | | | | | | | | TOTAL |
|---|---|---|---|---|---|---|---|---|---|---|---|---|
| | | LOAD | PRE WASH RINSE | | DETERGENT WASH | | | POST WASH RINSE | | FINAL RINSE | UNLOAD | |
| | | | NPHW | NPCW | MINUTES | REAGENT | Gm/CF | NPHW | NPCW | | | |
| 1 | GW-1 | 15 | 2 | 2 | 5 | Alconox | 0.5 | 2 | 2 | 2 | 10 | 40 |
| 2 | GW-2 | 15 | 2 | 2 | 5 | Alconox | 0.5 | 2 | 2 | 2 | 10 | 40 |
| 3 | GW-3 | 15 | 2 | 2 | 5 | Alconox | 0.5 | 2 | 2 | 2 | 10 | 40 |
| 4 | GW-4 | 15 | 2 | 2 | 5 | Alconox | 0.5 | 2 | 2 | 2 | 10 | 40 |
| 5 | GW-5 | 15 | 2 | 2 | 5 | Alconox | 0.5 | 2 | 2 | 2 | 10 | 40 |

FIG. 36D

PREP EQUIPMENT PROTOCOL-GLASSWARE DRYER

3408

| | CYCLE CODE | LOAD | HEAT UP MINUTES | DRY | | COOL MINUTES | UNLOAD | TOTAL |
|---|---|---|---|---|---|---|---|---|
| | | | | TEMP (C) | MINUTES | | | |
| 1 | DO-1 | 10 | 30 | 250 | 40 | 30 | 10 | 120 |
| 2 | DO-2 | 10 | 30 | 250 | 25 | 30 | 10 | 105 |
| 3 | DO-3 | 10 | 30 | 250 | 25 | 30 | 10 | 105 |
| 4 | DO-4 | 10 | 30 | 250 | 25 | 30 | 10 | 105 |
| 5 | DO-5 | 10 | 30 | 250 | 25 | 30 | 10 | 105 |
| | | 3618 | 3620 | 3622 | 3624 | 3626 | 3628 | |

FIG. 36E

PREP EQUIPMENT PROTOCOL-CARBOY WASHER

3408

| | CYCLE CODE | MINUTES/CYCLE LOAD | PRE WASH RINSE NPHW | PRE WASH RINSE NPCW | DETERGENT MINUTES | DETERGENT REAGENT | DETERGENT Gm/CF | POST WASH RINSE NPHW | POST WASH RINSE NPCW | FINAL RINSE | UNLOAD | TOTAL |
|---|---|---|---|---|---|---|---|---|---|---|---|---|
| 1 | CW-1 | 15 | 2 | 2 | 5 | Alconox | 0.5 | 2 | 2 | 2 | 15 | 15 |
| 2 | CW-2 | 15 | 2 | 2 | 5 | Alconox | 0.5 | 2 | 2 | 2 | 15 | 15 |
| 3 | CW-3 | 15 | 2 | 2 | 5 | Alconox | 0.5 | 2 | 2 | 2 | 15 | 15 |
| 4 | CW-4 | 15 | 2 | 2 | 5 | Alconox | 0.5 | 2 | 2 | 2 | 15 | 15 |
| 5 | CW-5 | 15 | 2 | 2 | 5 | Alconox | 0.5 | 2 | 2 | 2 | 15 | 15 |

FIG. 36F

PREP EQUIPMENT PROTOCOL-CARBOY DRYER

3408

| | CYCLE CODE | LOAD | HEAT UP MINUTES | DRY TEMP(C) | DRY MINUTES | COOL MINUTES | UNLOAD | TOTAL |
|---|---|---|---|---|---|---|---|---|
| 1 | CD-1 | 10 | 30 | 250 | 40 | 30 | 10 | 100 |
| 2 | CD-2 | 10 | 30 | 250 | 25 | 30 | 10 | 85 |
| 3 | CD-3 | 10 | 30 | 250 | 25 | 30 | 10 | 85 |
| 4 | CD-4 | 10 | 30 | 250 | 25 | 30 | 10 | 85 |
| 5 | CD-5 | 10 | 30 | 250 | 25 | 30 | 10 | 85 |

FIG. 36G-1

Prep Equipment Protocol-Steam Sterilizer 3606 3608 3610 3612 3614 3616

| | | Cycles | | | | | |
|---|---|---|---|---|---|---|---|
| | | SS-1 | | | | | |
| | | Press (Bar) | Minutes To Ach. | Minutes To Hold | No. of Cycles | Subt. | |
| 1 | Load | | | | | 20 | |
| 2 | | | | | | | |
| 3 | Pre Sterilization | | | | | | |
| 4 | Deep Vacuum | | 15 | 1 | 1 | 16 | |
| 5 | Vacuum/Steam Pulse | | | | | | |
| 6 | Vacuum | | | | | | |
| 7 | Steam | | | | | | |
| 8 | Subtotal | | | | | 16 | |
| 9 | | | | | | | |
| 10 | Sterilization | | | | | | |
| 11 | Steam | 1 | 20 | 40 | 1 | 60 | |
| 12 | Steam/Air | | | | | | |
| 13 | Subtotal | | | | | 60 | |
| 14 | | | | | | | |
| 15 | Cooling | | | | | | |
| 16 | Direct Air Cooling | | | | | | |
| 17 | Indirect Jacket Cooling | 0 | 40 | 0 | 1 | 40 | |
| 18 | Overpressure | | | | | | |
| 19 | Subtotal | | | | | 40 | |
| 20 | | | | | | | |
| 21 | Drying | | | | | | |
| 22 | Fast Exhaust | 0 | 20 | 5 | 1 | 25 | |
| 23 | Slow Exhaust | | | | | | |
| 24 | Deep Vacuum | | | | | | |
| 25 | Vacuum Pulse | | | | | | |
| 26 | Heat | | | | | | |
| 27 | Heated Pressure | | | | | | |
| 28 | Subtotal | | | | | 25 | |
| 29 | | | | | | | |
| 30 | Unload | | | | | 20 | |
| 31 | | | | | | | |
| 32 | Total Minutes | | | | | 161 | |
| 33 | Total Hours | | | | | 2.7 | |

FIG. 36G-2

| | SS-2 | | | | | SS-3 | | | | |
|---|---|---|---|---|---|---|---|---|---|---|
| | Press (Bar) | Minutes To Ach. | Minutes To Hold | No. of Cycles | Subt. | Press (Bar) | Minutes To Ach. | Minutes To Hold | No. of Cycles | Subt. |
| | | | | | | | | | | |
| | | | | | 20 | | | | | 20 |
| | 1 | 3<br>2 | 0<br>0 | 9<br>9 | 27<br>18<br>45 | 1 | 3<br>2 | 0<br>0 | 9<br>9 | 27<br>18<br>45 |
| | 1 | 20 | 40 | 1 | 60<br>60 | 1 | 20 | 40 | 1 | 60<br>60 |
| | 0 | 40 | 0 | 1 | 40<br>40 | 0<br>1 | 40<br>40 | 0<br>0 | 1<br>1 | 40<br>40<br>80 |
| | | 3 | 0 | 10 | 30<br>30 | 0 | 20 | 5 | 1 | 25<br>25 |
| | | | | | 20 | | | | | 20 |
| | | | | | 195 | | | | | 230 |
| | | | | | 3.3 | | | | | 3.8 |

FIG. 36H

PREP EQUIPMENT PROTOCOL-DRY HEAT STERILIZER

3408

| | CYCLE CODE | LOAD | HEAT UP MINUTES | STERILIZATION | | COOL MINUTES | UNLOAD | TOTAL |
|---|---|---|---|---|---|---|---|---|
| | | | | TEMP(C) | MINUTES | | | |
| 1 | SO-1 | 15 | 30 | 250 | 40 | 30 | 15 | 130 |
| 2 | SO-2 | 15 | 30 | 250 | 25 | 30 | 15 | 115 |
| 3 | SO-3 | 15 | 30 | 250 | 25 | 30 | 15 | 115 |
| 4 | SO-4 | 15 | 30 | 250 | 25 | 30 | 15 | 115 |
| 5 | SO-5 | 15 | 30 | 250 | 25 | 30 | 15 | 115 |

FIG. 37A

Equipment Prep Procedures 3706 3702 3704

| | | | EPC1 | EPC2 | EPC3 | EPC4 | EPC5 | EPC6 | EPC7 |
|---|---|---|---|---|---|---|---|---|---|
| 1 | Initial Rinse | | | | | | | | |
| 2 | | | | | | | | | |
| 3 | Bench Sink-1 | | | | | | | | |
| 4 | Protocol | | BS-1 | BS-1 | BS-2 | BS-1 | | | |
| 5 | Duration | PHrs. | 0.33 | 0.33 | 0.33 | 0.33 | | | |
| 6 | Hold/Dry | PHrs. | 0 | 0 | 0 | | | | |
| 7 | Subtotal | PHrs. | 0.33 | 0.33 | 0.33 | 0.33 | 0.00 | 0.00 | 0.00 |
| 8 | Cummulative | PHrs. | 0.33 | 0.33 | 0.33 | 0.33 | 0.00 | 0.00 | 0.00 |
| 9 | | | | | | | | | |
| 10 | Wash Station-1 | | | | | | | | |
| 11 | Protocol | | | | | | WS-1 | WS-1 | |
| 12 | Duration | PHrs. | | | | | 0.25 | 0.25 | |
| 13 | Hold/Dry | PHrs. | | | | | | | |
| 14 | Subtotal | PHrs. | 0.00 | 0.00 | 0.00 | 0.00 | 0.25 | 0.25 | 0.00 |
| 15 | Cummulative | PHrs. | 0.33333 | 0.33333 | 0.33333 | 0.33333 | 0 | 0 | 0 |
| 16 | | | | | | | | | |
| 17 | Cleaning | | | | | | | | |
| 18 | | | | | | | | | |
| 19 | Bench Sink-1 | | | | | | | | |
| 20 | Protocol | | BS-3 | BS-3 | BS-4 | | | | |
| 21 | Duration | PHrs. | 0.33 | 0.33 | 0.33 | | | | |
| 22 | Hold/Dry | PHrs. | | | | | | | |
| 23 | Subtotal | PHrs. | 0.33 | 0.33 | 0.33 | 0.00 | 0.00 | 0.00 | 0.00 |
| 24 | Cummulative | PHrs. | 0.66667 | 0.66667 | 0.66667 | 0.33333 | 0 | 0 | 0 |
| 25 | | | | | | | | | |
| 26 | Glassware Washer-1 | | | | | | | | |
| 27 | Protocol | | | | | GW-1 | | | |
| 28 | Duration | PHrs. | | | | 0.67 | | | |
| 29 | Hold/Dry | PHrs. | | | | | | | |
| 30 | Subtotal | PHrs. | 0.00 | 0.00 | 0.00 | 0.67 | 0.00 | 0.00 | 0.00 |
| 31 | Cummulative | PHrs. | 0.66667 | 0.66667 | 0.66667 | 1 | 0 | 0 | 0 |
| 32 | | | | | | | | | |
| 33 | Glassware Dryer-1 | | | | | | | | |
| 34 | Protocol | | GD-1 | GD-1 | GD-2 | GD-3 | | | |
| 35 | Duration | PHrs. | 2.00 | 2.00 | 1.75 | 1.75 | | | |
| 36 | Hold/Dry | PHrs. | | | | | | | |
| 37 | Subtotal | PHrs. | 2.00 | 2.00 | 1.75 | 1.75 | 0.00 | 0.00 | 0.00 |
| 38 | Cummulative | PHrs. | 2.66667 | 2.66667 | 2.41667 | 2.75 | 0 | 0 | 0 |
| 39 | | | | | | | | | |
| 40 | Carboy Washer-1 | | | | | | | | |
| 41 | Protocol | | | | | | CW-1 | CW-1 | |
| 42 | Duration | PHrs. | | | | | 0.25 | 0.25 | |
| 43 | Hold/Dry | PHrs. | | | | | | | |
| 44 | Subtotal | PHrs. | 0.00 | 0.00 | 0.00 | 0.00 | 0.25 | 0.25 | 0.00 |

*FIG. 37B*

Equipment Prep Procedures

| | | | EPC1 | EPC2 | EPC3 | EPC4 | EPC5 | EPC6 | EPC7 |
|---|---|---|---|---|---|---|---|---|---|
| 45 | Cummulative | PHrs. | 2.66667 | 2.66667 | 2.41667 | 2.75 | 0.25 | 0.25 | 0 |
| 46 | | | | | | | | | |
| 47 | Carboy Dryer-1 | | | | | | | | |
| 48 | Protocol | | | | | | CD-1 | CD-1 | |
| 49 | Duration | PHrs. | | | | | 1.67 | 1.67 | |
| 50 | Hold/Dry | PHrs. | | | | | | | |
| 51 | Subtotal | PHrs. | 0.00 | 0.00 | 0.00 | 0.00 | 1.67 | 1.67 | 0.00 |
| 52 | Cummulative | PHrs. | 2.66667 | 2.66667 | 2.41667 | 2.75 | 1.91667 | 1.91667 | 0 |
| 53 | | | | | | | | | |
| 54 | Prep | | | | | | | | |
| 55 | | | | | | | | | |
| 56 | Staffing | | 2 | 2 | 2 | 2 | 2 | 2 | 2 |
| 57 | | | | | | | | | |
| 58 | Preassembly | | | | | | | | |
| 59 | Man Hours | MHrs. | | 1 | | | | | |
| 60 | Procedure Hours | | | 0.5 | | | | | |
| 61 | Cummulative | PHrs. | 2.66667 | 3.16667 | 2.41667 | 2.75 | 1.91667 | 1.91667 | 0 |
| 62 | | | | | | | | | |
| 63 | Wrap | | | | | | | | |
| 64 | Man Hours | MHrs. | 1.5 | 1.5 | 1.5 | 1.5 | 1.5 | 1.5 | 1.5 |
| 65 | Procedure Hours | | 0.75 | 0.75 | 0.75 | 0.75 | 0.75 | 0.75 | 0.75 |
| 66 | Cummulative | PHrs. | 3.41667 | 3.91667 | 3.16667 | 3.5 | 2.66667 | 2.66667 | 0.75 |
| 67 | | | | | | | | | |
| 68 | Sterilization | | | | | | | | |
| 69 | | | | | | | | | |
| 70 | Autoclave-1 | | | | | | | | |
| 71 | Procedure | | SS-1 | SS-1 | SS-1 | SS-1 | SS-2 | | SS-3 |
| 72 | Duration | PHrs. | 2.68 | 2.68 | 2.68 | 2.68 | 3.25 | | 3.83 |
| 73 | Hold/Dry | PHrs. | | | | | | | |
| 74 | Subtotal | PHrs. | 2.68 | 2.68 | 2.68 | 2.68 | 3.25 | 0.00 | 3.83 |
| 75 | Cummulative | PHrs. | 6.10 | 6.60 | 5.85 | 6.18 | 5.92 | 2.67 | 4.58 |
| 76 | | | | | | | | | |
| 77 | Dry Heat-1 | | | | | | | | |
| 78 | Procedure | | | | | | | SO-1 | |
| 79 | Hours/Load | PHrs. | | | | | | 2.17 | |
| 80 | Hold/Dry | PHrs. | | | | | | | |
| 81 | Subtotal | PHrs. | 0.00 | 0.00 | 0.00 | 0.00 | 0.00 | 2.17 | 0.00 |
| 82 | Cummulative | PHrs. | 6.10 | 6.60 | 5.85 | 6.18 | 5.92 | 4.83 | 4.58 |
| 83 | | | | | | | | | |
| 84 | Total | | 6.10 | 6.60 | 5.85 | 6.18 | 6.17 | 5.08 | 4.58 |
| 85 | | | | | | | | | |
| 86 | Max | | 2.68 | 2.68 | 2.68 | 2.68 | 3.25 | 2.17 | 3.83 |

Load Configuration Table-General

| | | EPC-1 | | EPC-2 | | | | | | | | |
|---|---|---|---|---|---|---|---|---|---|---|---|---|
| | | Specialty Glass | | Instruments | | | Fitting | | | | | |
| | | Siphon Tubes | | PI | DO Probe | pH Probe | Tees | Elbows | Crosses | Reducers | Hose Barbs | Clamps |
| 1 | R/L Inches | 4 | | 4 | 4 | 4 | 6 | 4 | 6 | 6 | 3 | 6 |
| 2 | FIB Inches | 2 | | 2 | 2 | 2 | 2 | 2 | 2 | 2 | 2 | 1.5 |
| 3 | TIB Inches | 12 | | 6 | 12 | 12 | 4 | 4 | 6 | 2 | 2 | 1.5 |
| 4 | | | | | | | | | | | | |
| 5 | CI | 96 | 0 | 48 | 96 | 96 | 48 | 32 | 95 | 24 | 12 | 18 |
| 6 | CF | 0.06 | 0.00 | 0.03 | 0.06 | 0.06 | 0.03 | 0.02 | 0.06 | 0.01 | 0.01 | 0.01 |

3904 3906 3908 3910

| EPC-3 | | | | | | EPC-4 | | EPC-5 | | | EPC-6 | | |
|---|---|---|---|---|---|---|---|---|---|---|---|---|---|
| Plasticware | | Rubber Stoppers | | Flexible Tubing | | Small Glassware | | PP Carboys | | | BSG Carboys | | |
| Small | Medium | Sloome | Bulyl | Small | Large | Small | Medium | 1mL | 20L | 45L | 10L | 20L | 45L |
| 3 | 6 | 2 | 4 | 12 | 24 | 3 | 6 | 12 | 10 | 24 | 12 | 16 | 24 |
| 3 | 6 | 2 | 4 | 12 | 24 | 3 | 6 | 12 | 10 | 24 | 12 | 16 | 24 |
| 6 | 12 | 2 | 3 | 4 | 10 | 6 | 12 | 16 | 20 | 32 | 16 | 26 | 32 |
| 14 | 432 | 3 | 46 | 576 | 3760 | 64 | 432 | 2304 | 6424 | 18432 | 2304 | 8424 | 18432 |
| 0.03 | 0.25 | 0.00 | 0.00 | 0.33 | 0.33 | 0.00 | 0.25 | 1.33 | 4.65 | 10.67 | 1.33 | 4.88 | 10.67 |

Equipment Prep Load Table 4202 4204 4206 4208

| Task | Unit Oper End Time | | EPC-1 | | | EPC-2 | |
|---|---|---|---|---|---|---|---|
| | | | Speciality Glass | | | Instruments | |
| | Date | Time | Siphon Tubes | | Total | PI 0.03 | DO Probe 0.06 |
| | | | | | | | |
| 1 Inoculum Prep | 06/04/96 | 02:30 PM | | | 0 | | |
| 2 Flask Growth | 06/05/96 | 01:30 PM | | | 0 | | |
| 3 Seed Fermentation | 06/06/96 | 03:30 PM | | | 0 | | |
| 4 Fermentation | 06/07/96 | 12:00 PM | | | 0 | 4 0.111 | |
| 5 Heat Exchange | 06/07/96 | 01:00 PM | | | 0 | 3 | |
| 6 Cont. Cent/Solids | 06/07/96 | 11:51 AM | | | 0 | 3 0.083 | |
| 1 Inoculum Prep | 06/06/96 | 02:30 PM | | | 0 | | |
| 2 Flask Growth | 06/07/96 | 01:30 PM | | | 0 | | |
| 3 Seed Fermentation | 06/08/96 | 03:30 PM | | | 0 | | |
| 4 Fermentation | 06/09/96 | 09:00 AM | | | 0 | 4 0.111 | |
| 5 Heat Exchange | 06/09/96 | 10:00 AM | | | 0 | 3 0.083 | |
| 6 Cont. Cent/Solids | 06/09/96 | 08:51 AM | | | 0 | 3 0.083 | |
| 1 Inoculum Prep | 06/08/96 | 02:30 PM | | | 0 | | |
| 2 Flask Growth | 06/09/96 | 01:30 PM | | | 0 | | |
| 3 Seed Fermentation | 06/10/96 | 03:30 PM | | | 0 | | |
| 4 Fermentation | 06/03/96 | 10:00 AM | | | 0 | 4 0.111 | |
| 5 Heat Exchange | 06/11/96 | 09:00 AM | | | 0 | 3 0.083 | |
| 6 Cont. Cent/Solids | 06/11/96 | 08:51 AM | | | 0 | 3 0.083 | |
| 7 Cell Resuspension | 06/11/96 | 12:15 PM | | | 0 | | |
| 8 Heat Exchange | 06/11/96 | 09:33 AM | | | 0 | | |
| 9 Cell Disruption | 06/11/96 | 09:51 AM | | | 0 | | |
| 10 Heat Exchange | 06/11/96 | 10:09 AM | | | 0 | | |

*FIG. 42A-2*

Equipment Prep Load Table

| | Fittings | | | | | | | EPC-3 Plasticware |
|---|---|---|---|---|---|---|---|---|
| pH Probe 0.06 | Tees 0.03 | Elbows 0.02 | Crosses 0.06 | Reducers 0.01 | Hose Barbs 0.01 | Clamps 0.01 | Total CF | Beakers 0.03 |
| | | | | | | | 0.00 | |
| | | | | | | | 0.00 | |
| | | | | | | | 0.00 | |
| | 6<br>0.17 | | | 2<br>0.03 | 4<br>0.03 | 16<br>0.17 | 0.50 | |
| | 4<br>0.11 | | | | 4<br>0.03 | 8<br>0.08 | 0.22 | |
| | 4<br>0.11 | | | | 4<br>0.03 | 8<br>0.08 | 0.31 | |
| | | | | | | | 0.00 | |
| | | | | | | | 0.00 | |
| | | | | | | | 0.00 | |
| | 6<br>0.17 | | | 2<br>0.03 | 4<br>0.03 | 16<br>0.17 | 0.50 | |
| | 4<br>0.11 | | | | 4<br>0.03 | 8<br>0.08 | 0.31 | |
| | 4<br>0.11 | | | | 4<br>0.03 | 8<br>0.08 | 0.31 | |
| | | | | | | | 0.00 | |
| | | | | | | | 0.00 | |
| | | | | | | | 0.00 | |
| | 6<br>0.17 | | | 2<br>0.03 | 4<br>0.03 | 16<br>0.17 | 0.50 | |
| | 4<br>0.11 | | | | 4<br>0.03 | 8<br>0.08 | 0.31 | |
| | 4<br>0.11 | | | | 4<br>0.03 | 8<br>0.08 | 0.31 | |
| | | | | | | | 0.00 | |
| | | | | | | | 0.00 | |
| | | | | | | | 0.00 | |
| | | | | | | | 0.00 | |

| Equipment Items | Unit Oper End Time Date | Unit Oper End Time Time | Flasks 0.25 | Rubber Stoppers Silicone 0.00 | Rubber Stoppers Butyl 0.03 | Flexible Tubing Silicone 0.33 | Flexible Tubing Neoprene 3.33 |
|---|---|---|---|---|---|---|---|
| | | | | | | | |
| 1 Inoculum Prep | 06/04/96 | 02:30 PM | | | | | |
| 2 Flask Growth | 06/05/96 | 01:30 PM | | | | | |
| 3 Seed Fermentation | 06/06/96 | 03:30 PM | | 4<br>0.02 | | 4<br>1.33 | |
| 4 Fermentation | 06/07/96 | 12:00 PM | | 4<br>0.02 | | 4<br>1.33 | |
| 5 Heat Exchange | 06/07/96 | 01:00 PM | | | | | |
| 6 Cont. Cent/Solids | 06/07/96 | 11:51 AM | | | | | |
| 1 Inoculum Prep | 06/06/96 | 02:30 PM | | | | | |
| 2 Flask Growth | 06/07/96 | 01:30 PM | | | | | |
| 3 Seed Fermentation | 06/08/96 | 03:30 PM | | | | | |
| 4 Fermentation | 06/09/96 | 09:00 AM | | | | | |
| 5 Heat Exchange | 06/09/96 | 10:00 AM | | | | | |
| 6 Cont. Cent/Solids | 06/09/96 | 08:51 AM | | | | | |
| 1 Inoculum Prep | 06/08/96 | 02:30 PM | | | | | |
| 2 Flask Growth | 06/09/96 | 01:30 PM | | | | | |
| 3 Seed Fermentation | 06/10/96 | 03:30 PM | | | | | |
| 4 Fermentation | 06/03/96 | 10:00 AM | | | | | |
| 5 Heat Exchange | 06/11/96 | 09:00 AM | | | | | |
| 6 Cont. Cent/Solids | 06/11/96 | 08:51 AM | | | | | |
| 7 Cell Resuspension | 06/11/96 | 12:15 PM | | | | | |
| 8 Heat Exchange | 06/11/96 | 09:33 AM | | | | | |
| 9 Cell Disruption | 06/11/96 | 09:51 AM | | | | | |
| 10 Heat Exchange | 06/11/96 | 10:09 AM | | | | | |

| | | EPC-4 | | | EPC-5 | | | | EPC-6 | | | |
|---|---|---|---|---|---|---|---|---|---|---|---|---|
| | Total CF | Small Glassware | | Total CF | PP Carboys | | | Total CF | BSG Carboys | | | Total CF |
| | | Beakers 0.03125 | Flasks 0.25 | | 10L 1.3333 | 20L 4.88 | 45L 10.7 | | 10L 1.3333 | 20L 4.88 | 45L 10.7 | |
| | | | | | | | | | | | | |
| | 0.00 | | 5<br>1.25 | 1.25 | | | | 0.00 | | | | 0.00 |
| | 0.00 | | 5<br>1.25 | 1.25 | | | | 0.00 | | | | 0.00 |
| | 1.35 | | 4<br>1.00 | 1 | | | | 0.00 | | | | 0.00 |
| | 1.35 | | | 0 | 4<br>5.33 | | | 5.33 | | | | 0.00 |
| | 0.00 | | | 0 | | | | 0.00 | | | | 0.00 |
| | 0.00 | | | 0 | | | | 0.00 | | | | 0.00 |
| | 0.00 | | 5<br>1.25 | 1.25 | | | | 0.00 | | | | 0.00 |
| | 0.00 | | 5<br>1.25 | 1.25 | | | | 0.00 | | | | 0.00 |
| | 0.00 | | | 0 | | | | 0.00 | | | | 0.00 |
| | 0.00 | | | 0 | | | | 0.00 | | | | 0.00 |
| | 0.00 | | | 0 | | | | 0.00 | | | | 0.00 |
| | 0.00 | | | 0 | | | | 0.00 | | | | 0.00 |
| | 0.00 | | 5<br>1.25 | 1.25 | | | | 0.00 | | | | 0.00 |
| | 0.00 | | 5<br>1.25 | 1.25 | | | | 0.00 | | | | 0.00 |
| | 0.00 | | | 0 | | | | 0.00 | | | | 0.00 |
| | 0.00 | | | 0 | | | | 0.00 | | | | 0.00 |
| | 0.00 | | | 0 | | | | 0.00 | | | | 0.00 |
| | 0.00 | | | 0 | | | | 0.00 | | | | 0.00 |
| | 0.00 | | | 0 | | | | 0.00 | | | | 0.00 |
| | 0.00 | | | 0 | | | | 0.00 | | | | 0.00 |
| | 0.00 | | | 0 | | | | 0.00 | | | | 0.00 |
| | 0.00 | | 5<br>1.25 | 1.25 | | | | 0.00 | | | | 0.00 |

FIG. 42C-1

Equipment Prep Load Table 4218 4220

| Equipment Items | Unit Oper End Time | | EPC-1 | | | EPC-2 | |
|---|---|---|---|---|---|---|---|
| | | | Speciality Glass | | | Instruments | |
| | Date | Time | Siphon Tubes | | Total | PI 0.03 | DO Probe 0.06 |
| | | | | | | | |
| 8 Heat Exchange | 06/11/96 | 10:27 AM | | | 0 | | |
| 9 Cell Disruption | 06/11/96 | 10:45 AM | | | 0 | | |
| 10 Heat Exchange | 06/11/96 | 12:00 AM | | | 0 | | |
| 8 Heat Exchange | 06/11/96 | 02:21 PM | | | 0 | | |
| 9 Cell Disruption | 06/11/96 | 02:39 PM | | | 0 | | |
| 10 Heat Exchange | 06/11/96 | 02:57 PM | | | 0 | | |
| 11 IB Resuspension | 06/11/96 | 10:57 AM | | | 0 | | |
| 12 Centrifugation | 06/11/96 | 11:33 AM | | | 0 | | |
| 11 IB Resuspension | 06/11/96 | 03:06 PM | | | 0 | | |
| 12 Centrifugation | 06/11/96 | 03:12 PM | | | 0 | | |
| 13 Renaturation | 06/12/96 | 08:43 AM | | | 0 | | |
| 14 Buffer Exchange | 06/12/96 | 11:47 AM | | | 0 | | |
| 15 Clarification | 06/12/96 | 11:03 AM | | | 0 | | |
| 16 Chromatography 1 | 06/12/96 | 03:59 PM | | | 0 | | |
| 17 Chromatography 2 | 06/12/96 | 06:59 PM | | | 0 | | |
| 18 Buffer Exchange | 06/12/96 | 08:27 PM | | | 0 | | |
| 19 Chromatography 3 | 06/12/96 | 10:07 PM | | | 0 | | |
| 20 Buffer Exchange | 06/12/96 | 10:38 PM | | | 0 | | |
| 21 Chromatography 4 | 06/13/96 | 12:14 AM | | | 0 | | |
| 22 Sterile Filtration | 06/13/96 | 12:48 AM | | | 0 | | |
| Totals | | | | | | | |

FIG. 42C-2

Equipment Prep Load Table

4220

| | | | | | | | | EPC-3 |
|---|---|---|---|---|---|---|---|---|
| | Fittings | | | | | | Total CF | Plasticware |
| pH Probe 0.06 | Tees 0.03 | Elbows 0.02 | Crosses 0.06 | Reducers 0.01 | Hose Barbs 0.01 | Clamps 0.01 | | Beakers 0.03 |
| | | | | | | | | |
| | | | | | | | 0.00 | |
| | | | | | | | 0.00 | |
| | | | | | | | 0.00 | |
| | | | | | | | 0.00 | |
| | | | | | | | 0.00 | |
| | | | | | | | 0.00 | |
| | | | | | | | 0.00 | |
| | | | | | | | 0.00 | |
| | | | | | | | 0.00 | |
| | | | | | | | 0.00 | |
| | | | | | | | 0.00 | |
| | | | | | | | 0.00 | |
| | | | | | | | 0.00 | |
| | | | | | | | 0.00 | |
| | | | | | | | 0.00 | |
| | | | | | | | 0.00 | |
| | | | | | | | 0.00 | |
| | | | | | | | 0.00 | |
| | | | | | | | 0.00 | |
| | | | | | | | 0.00 | |
| | | | | | | | 3.25 | |

FIG. 42D-1

Equipment Top Load Table

4222

| Equipment Items | Unit Oper End Time | | | Rubber Stoppers | | Flexible Tubing | |
|---|---|---|---|---|---|---|---|
| | Date | Time | Flasks 0.25 | Silicone 0.00 | Butyl 0.03 | Silicone 0.33 | Neoprene 3.33 |
| | | | | | | | |
| 8 Heat Exchange | 06/11/96 | 10:27 AM | | | | | |
| 9 Cell Disruption | 06/11/96 | 10:45 AM | | | | | |
| 10 Heat Exchange | 06/11/96 | 12:00 AM | | | | | |
| 8 Heat Exchange | 06/11/96 | 02:21 PM | | | | | |
| 9 Cell Disruption | 06/11/96 | 02:39 PM | | | | | |
| 10 Heat Exchange | 06/11/96 | 02:57 PM | | | | | |
| 11 IB Resuspension | 06/11/96 | 10:57 AM | | | | | |
| 12 Centrifugation | 06/11/96 | 11:33 AM | | | | | |
| 11 IB Resuspension | 06/11/96 | 03:06 PM | | | | | |
| 12 Centrifugation | 06/11/96 | 03:12 PM | | | | | |
| 13 Renaturation | 06/12/96 | 08:43 AM | | | | | |
| 14 Buffer Exchange | 06/12/96 | 11:47 AM | | | | | |
| 15 Clarification | 06/12/96 | 11:03 AM | | | | | |
| 16 Chromatography 1 | 06/12/96 | 03:59 PM | | | | | |
| 17 Chromatography 2 | 06/12/96 | 06:59 PM | | | | | |
| 18 Buffer Exchange | 06/12/96 | 08:27 PM | | | | | |
| 19 Chromatography 3 | 06/12/96 | 10:07 PM | | | | | |
| 20 Buffer Exchange | 06/12/96 | 10:38 PM | | | | | |
| 21 Chromatography 4 | 06/13/96 | 12:14 AM | | | | | |
| 22 Sterile Filtration | 06/13/96 | 12:48 AM | | | | | |
| Totals | | | | | | | |

FIG. 42D-2

Equipment Top Load Table 4224 4226 4228

EPC-4 — Small Glassware; EPC-5 — PP Carboys; EPC-6 — BSG Carboys

| Total CF | Beakers 0.03125 | Flasks 0.25 | Total CF | PP Carboys 10L 1.3333 | PP Carboys 20L 4.88 | PP Carboys 45L 10.7 | Total CF | BSG Carboys 10L 1.3333 | BSG Carboys 20L 4.88 | BSG Carboys 45L 10.7 | Total CF |
|---|---|---|---|---|---|---|---|---|---|---|---|
| | | | | | | | | | | | |
| 0.00 | | | 0 | | | | 0.00 | | | | 0.00 |
| 0.00 | | | 0 | | | | 0.00 | | | | 0.00 |
| 0.00 | | 5 / 1.25 | 1.25 | | | | 0.00 | | | | 0.00 |
| 0.00 | | | 0 | | | | 0.00 | | | | 0.00 |
| 0.00 | | | 0 | | | | 0.00 | | | | 0.00 |
| 0.00 | | 5 / 1.25 | 1.25 | | | | 0.00 | | | | 0.00 |
| 0.00 | | | 0 | | | | 0.00 | | | | 0.00 |
| 0.00 | | | 0 | | | | 0.00 | | | | 0.00 |
| 0.00 | | | 0 | | | | 0.00 | | | | 0.00 |
| 0.00 | | | 0 | | | | 0.00 | | | | 0.00 |
| 0.00 | | | 0 | | | | 0.00 | | | | 0.00 |
| 0.00 | | | 0 | | | | 0.00 | | | | 0.00 |
| 0.00 | | | 0 | | | | 0.00 | | | | 0.00 |
| 0.00 | | | 0 | | | | 0.00 | | | | 0.00 |
| 0.00 | | | 0 | | | | 0.00 | | | | 0.00 |
| 0.00 | | | 0 | | | | 0.00 | | | | 0.00 |
| 0.00 | | | 0 | | | | 0.00 | | | | 0.00 |
| 0.00 | | | 0 | | | | 0.00 | | | | 0.00 |
| 0.00 | | | 0 | | | | 0.00 | | | | 0.00 |
| 0.00 | | | 0 | | | | 0.00 | | | | 0.00 |
| 0.00 | | | 0 | | | | 0.00 | | | | 0.00 |

FIG. 45A-1

QC Load Table-PE Module 4502 4504

| | Operation | Start | | Finish | | QA/QC Samples Visual | |
|---|---|---|---|---|---|---|---|
| | | Date | Time | Date | Time | AV-1 | AV-2 |
| | | 06/03/96 | 08:00 AM | | | | |
| 1 | 1 A Inoculum Prep | | | | | | |
| 2 | | | | | | | |
| 3 | Set Up | 06/03/96 | 09:30 AM | 06/03/96 | 12:30 PM | | |
| 4 | Preincubation | 06/03/96 | 12:30 PM | 06/03/96 | 03:30 PM | | |
| 5 | Incubation | 06/03/96 | 03:30 PM | 06/04/96 | 02:30 PM | | |
| 6 | Clean Up | 06/04/96 | 02:30 PM | 06/04/96 | 02:45 PM | | |
| 6 | Subtotal | | | | | | |
| 7 | | | | | | | |
| 8 | 2 A Flask Growth | | | | | | |
| 9 | | | | | | | |
| 10 | Set Up | 06/04/96 | 12:30 PM | 06/04/96 | 01:30 PM | | |
| 11 | Preincubation | 06/04/96 | 01:30 PM | 06/04/96 | 02:30 PM | | |
| 12 | Incubation | 06/04/96 | 02:30 PM | 06/05/96 | 01:30 PM | | |
| 13 | Clean Up | 06/05/96 | 01:30 PM | 06/05/96 | 01:45 PM | | |
| 13 | Subtotal | | | | | | |
| 14 | | | | | | | |
| 15 | 3 A Seed Fermentation | | | | | | |
| 16 | | | | | | | |
| 17 | Set Up | 06/05/96 | 11:30 AM | 06/05/96 | 12:30 PM | | |
| 18 | Preincubation | 06/05/96 | 12:30 PM | 06/05/96 | 01:30 PM | | |
| 19 | Fermentation | 06/05/96 | 01:30 PM | 06/06/96 | 10:30 AM | | 2 |
| 20 | Harvest | 06/06/96 | 10:30 AM | 06/06/96 | 11:00 AM | | |
| 21 | CIP | 06/06/96 | 10:30 AM | 06/06/96 | 11:30 AM | | |
| 22 | SIP | 06/06/96 | 11:30 AM | 06/06/96 | 12:30 PM | | |
| 23 | Clean Up | 06/06/96 | 12:30 PM | 06/06/96 | 03:30 PM | | |
| 24 | Subtotal | | | | | | |
| 25 | | | | | | | |
| 26 | 4 A Product Fermentation | | | | | | |
| 27 | | | | | | | |
| 28 | Set Up | 06/06/96 | 09:00 AM | 06/06/96 | 10:00 AM | | |
| 29 | Preincubation | 06/06/96 | 10:00 AM | 06/06/96 | 11:00 AM | | |
| 30 | Fermentation | 06/06/96 | 11:00 AM | 06/07/96 | 08:00 AM | | 2 |
| 31 | CIP | 06/07/96 | 08:00 AM | 06/07/96 | 09:00 AM | | |
| 32 | SIP | 06/07/96 | 09:00 AM | 06/07/96 | 10:00 AM | | |
| 33 | Clean Up | 06/07/96 | 10:00 AM | 06/07/96 | 12:00 PM | | |
| 34 | Subtotal | | | | | | |
| 35 | | | | | | | |
| 36 | 5 A Heat Exchange | | | | | | |
| 37 | | | | | | | |
| 38 | Set Up | 06/07/96 | 08:00 AM | 06/07/96 | 08:30 AM | | |
| 39 | Transfer | 06/07/96 | 08:00 AM | 06/07/96 | 09:00 AM | | |
| 40 | CIP | 06/07/96 | 09:00 AM | 06/07/96 | 10:00 AM | | |
| 41 | SIP | 06/07/96 | 10:00 AM | 06/07/96 | 11:00 AM | | |
| 42 | Clean Up | 06/07/96 | 11:00 AM | 06/07/96 | 01:00 PM | | |
| 43 | Subtotal | | | | | | |
| 44 | | | | | | | |
| 45 | 6 A Cont. Cent./Solids | | | | | | |
| 46 | | | | | | | |
| 47 | Set Up | 06/07/96 | 08:00 AM | 06/07/96 | 09:00 AM | | |

*FIG. 45A-2*

QC Load Table-PE Module

4506

| Chemical | | | | | | Biochemical | | | | | | | Immulogical | | Act. |
|---|---|---|---|---|---|---|---|---|---|---|---|---|---|---|---|
| AC-1 | AC-2 | AC-3 | AC-4 | AC-5 | AC-6 | AB-1 | AB-2 | AB-3 | AB-4 | AB-5 | AB-6 | AB-7 | AI-1 | AI-2 | AA-1 |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | 3 | | | | | 3 | | |
| | | | | | | | | | | | | | | | |
| | | | | | | | | | | | | | | | |
| | | | | | | | | | | | | | | | |
| | | | | | | | | | | | | | | | |

FIG. 45B-1

QC Load Table-PE Module

| | Operation | Start Date | Start Time | Finish Date | Finish Time | QA/QC Samples Visual AV-1 | AV-2 | |
|---|---|---|---|---|---|---|---|---|
| | | 06/03/96 | 08:00 AM | | | | | |
| 48 | Centrifugation | 06/07/96 | 09:00 AM | 06/07/96 | 10:00 AM | | | |
| 49 | Wash | 06/07/96 | 10:00 AM | 06/07/96 | 10:06 AM | | | |
| 50 | CIP | 06/07/96 | 10:06 AM | 06/07/96 | 10:21 AM | | | |
| 51 | SIP | 06/07/96 | 10:21 AM | 06/07/96 | 11:21 AM | | | |
| 52 | Clean Up | 06/07/96 | 11:21 AM | 06/07/96 | 11:51 AM | | | |
| 53 | Subtotal | | | | | | | |
| 54 | | | | | | | | |
| 55 | 1 B Inoculum Prep | | | | | | | |
| 56 | | | | | | | | |
| 57 | Set Up | 06/03/96 | 01:30 PM | 06/03/96 | 02:30 PM | | | |
| 58 | Preincubation | 06/03/96 | 02:30 PM | 06/03/96 | 03:30 PM | | | |
| 59 | Incubation | 06/03/96 | 03:30 PM | 06/04/96 | 02:30 PM | | | |
| 60 | Clean Up | 06/04/96 | 02:30 PM | 06/04/96 | 02:45 PM | | | |
| 60 | Subtotal | | | | | | | |
| 61 | | | | | | | | |
| 62 | 2 B Flask Growth | | | | | | | |
| 63 | | | | | | | | |
| 64 | Set Up | 06/04/96 | 12:30 PM | 06/04/96 | 01:30 PM | | | |
| 65 | Preincubation | 06/04/96 | 01:30 PM | 06/04/96 | 02:30 PM | | | |
| 66 | Incubation | 06/04/96 | 02:30 PM | 06/05/96 | 01:30 PM | | | |
| 67 | Clean Up | 06/05/96 | 01:30 PM | 06/05/96 | 01:45 PM | | | |
| 67 | Subtotal | | | | | | | |
| 68 | | | | | | | | |
| 69 | 3 B Seed Fermentation | | | | | | | |
| 70 | | | | | | | | |
| 71 | Set Up | 06/05/96 | 11:30 AM | 06/05/96 | 12:30 PM | | | |
| 72 | Preincubation | 06/05/96 | 12:30 PM | 06/05/96 | 01:30 PM | | | |
| 73 | Fermentation | 06/05/96 | 01:30 PM | 06/06/96 | 10:30 AM | | 2 | |
| 74 | Harvest | 06/06/96 | 10:30 AM | 06/06/96 | 11:00 AM | | | |
| 75 | CIP | 06/06/96 | 10:30 AM | 06/06/96 | 11:30 AM | | | |
| 76 | SIP | 06/06/96 | 11:30 AM | 06/06/96 | 12:30 PM | | | |
| 77 | Clean Up | 06/06/96 | 12:30 PM | 06/06/96 | 03:30 PM | | | |
| 78 | Subtotal | | | | | | | |
| 79 | | | | | | | | |
| 80 | 4 B Product Fermentation | | | | | | | |
| 81 | | | | | | | | |
| 82 | Set Up | 06/06/96 | 09:00 AM | 06/06/96 | 10:00 AM | | | |
| 83 | Preincubation | 06/06/96 | 10:00 AM | 06/06/96 | 11:00 AM | | | |
| 84 | Fermentation | 06/06/96 | 11:00 AM | 06/07/96 | 08:00 AM | | 2 | |
| 85 | CIP | 06/07/96 | 08:00 AM | 06/07/96 | 09:00 AM | | | |
| 86 | SIP | 06/07/96 | 09:00 AM | 06/07/96 | 10:00 AM | | | |
| 87 | Clean Up | 06/07/96 | 10:00 AM | 06/07/96 | 12:00 AM | | | |
| 88 | Subtotal | | | | | | | |
| 89 | | | | | | | | |
| 90 | 5 B Heat Exchange | | | | | | | |
| 91 | | | | | | | | |
| 92 | Set Up | 06/07/96 | 08:00 AM | 06/07/96 | 08:30 AM | | | |
| 93 | Transfer | 06/07/96 | 08:00 AM | 06/07/96 | 09:00 AM | | | |
| 94 | CIP | 06/07/96 | 09:00 AM | 06/07/96 | 10:00 AM | | | |

FIG. 45B-2

QC Load Table-PE Module

4506

| Chemical | | | | | | Biochemical | | | | | | | Immulogical | | Act. |
|---|---|---|---|---|---|---|---|---|---|---|---|---|---|---|---|
| AC-1 | AC-2 | AC-3 | AC-4 | AC-5 | AC-6 | AB-1 | AB-2 | AB-3 | AB-4 | AB-5 | AB-6 | AB-7 | AI-1 | AI-2 | AA-1 |
| | | | | | | | | | | | | | | | |
| | | | | | | | | 3 | | 3 | | | 3 | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | 3 | | | | | 3 | | |
| | | | | | | | | | | | | | | | |
| | | | | | | | | | | | | | | | |

FIG. 45C-1

QC Load Table-PE Module

| | Operation | Start | | Finish | | QA/QC Samples | | |
|---|---|---|---|---|---|---|---|---|
| | | | | | | Visual | | |
| | | Date | Time | Date | Time | AV-1 | AV-2 | |
| | | 06/03/96 | 08:00 AM | | | | | |
| 95 | SIP | 06/07/96 | 10:00 AM | 06/07/96 | 11:00 AM | | | |
| 96 | Clean Up | 06/07/96 | 11:00 AM | 06/07/96 | 01:00 AM | | | |
| 97 | Subtotal | | | | | | | |
| 98 | | | | | | | | |
| 99 | 6 B Cont. Cent/Solilds | | | | | | | |
| 100 | | | | | | | | |
| 101 | Set Up | 06/07/96 | 08:00 AM | 06/07/96 | 09:00 AM | | | |
| 102 | Centrifugation | 06/07/96 | 09:00 AM | 06/07/96 | 10:00 AM | | | |
| 103 | Wash | 06/07/96 | 10:00 AM | 06/07/96 | 10:06 AM | | | |
| 104 | CIP | 06/07/96 | 10:06 AM | 06/07/96 | 10:21 AM | | | |
| 105 | SIP | 06/07/96 | 10:21 AM | 06/07/96 | 11:21 AM | | | |
| 106 | Clean Up | 06/07/96 | 11:21 AM | 06/07/96 | 11:51 AM | | | |
| 107 | Subtotal | | | | | | | |
| 108 | | | | | | | | |
| 109 | 1 C Inoculum Prep | | | | | | | |
| 110 | | | | | | | | |
| 111 | Set Up | 06/03/96 | 01:30 PM | 06/03/96 | 02:30 PM | | | |
| 112 | Preincubation | 06/03/96 | 02:30 PM | 06/03/96 | 03:30 PM | | | |
| 113 | Incubation | 06/03/96 | 03:30 PM | 06/04/96 | 02:30 PM | | | |
| 114 | Clean Up | 06/04/96 | 02:30 PM | 06/04/96 | 02:45 PM | | | |
| 114 | Subtotal | | | | | | | |
| 115 | | | | | | | | |
| 116 | 2 C Flask Growth | | | | | | | |
| 117 | | | | | | | | |
| 118 | Set Up | 06/04/96 | 12:30 PM | 06/04/96 | 01:30 PM | | | |
| 119 | Preincubation | 06/04/96 | 01:30 PM | 06/04/96 | 02:30 PM | | | |
| 120 | Incubation | 06/04/96 | 02:30 PM | 06/05/96 | 01:30 PM | | | |
| 121 | Clean Up | 06/05/96 | 01:30 PM | 06/05/96 | 01:45 PM | | | |
| 121 | Subtotal | | | | | | | |
| 122 | | | | | | | | |
| 123 | 3 C Seed Fermentation | | | | | | | |
| 124 | | | | | | | | |
| 125 | Set Up | 06/05/96 | 11:30 AM | 06/05/96 | 12:30 PM | | | |
| 126 | Preincubation | 06/05/96 | 12:30 PM | 06/05/96 | 01:30 PM | | | |
| 127 | Fermentation | 06/05/96 | 01:30 PM | 06/06/96 | 10:30 AM | | 2 | |
| 128 | Harvest | 06/06/96 | 10:30 AM | 06/06/96 | 11:00 AM | | | |
| 129 | CIP | 06/06/96 | 10:30 AM | 06/06/96 | 11:30 AM | | | |
| 130 | SIP | 06/06/96 | 11:30 AM | 06/06/96 | 12:30 PM | | | |
| 131 | Clean Up | 06/06/96 | 12:30 PM | 06/06/96 | 03:30 PM | | | |
| 132 | Subtotal | | | | | | | |
| 133 | | | | | | | | |
| 134 | 4 C Product Fermentation | | | | | | | |
| 135 | | | | | | | | |
| 136 | Set Up | 06/06/96 | 09:00 AM | 06/06/96 | 10:00 AM | | | |
| 137 | Preincubation | 06/06/96 | 10:00 AM | 06/06/96 | 11:00 AM | | | |
| 138 | Fermentation | 06/06/96 | 11:00 AM | 06/07/96 | 08:00 AM | | | |
| 139 | CIP | 06/07/96 | 08:00 AM | 06/07/96 | 09:00 AM | | 2 | |
| 140 | SIP | 06/07/96 | 09:00 AM | 06/07/96 | 10:00 AM | | | |
| 141 | Clean Up | 06/07/96 | 10:00 AM | 06/07/96 | 12:00 PM | | | |

*FIG. 45C-2*

QC Load Table-PE Module

| Chemical | | | | | | Biochemical | | | | | | | Immulogical | | Act. |
|---|---|---|---|---|---|---|---|---|---|---|---|---|---|---|---|
| AC-1 | AC-2 | AC-3 | AC-4 | AC-5 | AC-6 | AB-1 | AB-2 | AB-3 | AB-4 | AB-5 | AB-6 | AB-7 | AI-1 | AI-2 | AA-1 |
| | | | | | | | | | | | | | | | |
| | | | | | | | | | | | | | | | |
| | | | | | | | | | | | | | | | |
| | | | | | | | | 3 | | 3 | | | 3 | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | 3 | | | | | 3 | | |

FIG. 45D-1

QC LOAD TABLE-PE MODULE

| | Operation | Start | | Finish | | QA/QC Samples | | |
|---|---|---|---|---|---|---|---|---|
| | | | | | | Visual | | |
| | | Date | Time | Date | Time | AV-1 | AV-2 | |
| | | 06/03/96 | 08:00 AM | | | | | |
| 142 | Subtotal | | | | | | | |
| 143 | | | | | | | | |
| 144 | 5 C Heat Exchange | | | | | | | |
| 145 | | | | | | | | |
| 146 | Set Up | 06/07/96 | 08:00 AM | 06/07/96 | 08:30 AM | | | |
| 147 | Transfer | 06/07/96 | 08:00 AM | 06/07/96 | 09:00 AM | | | |
| 148 | CIP | 06/07/96 | 09:00 AM | 06/07/96 | 10:00 AM | | | |
| 149 | SIP | 06/07/96 | 10:00 AM | 06/07/96 | 11:00 AM | | | |
| 150 | Clean Up | 06/07/96 | 11:00 AM | 06/07/96 | 01:00 PM | | | |
| 151 | Subtotal | | | | | | | |
| 152 | | | | | | | | |
| 153 | 6 C Cont. Cent./Solids | | | | | | | |
| 154 | | | | | | | | |
| 155 | Set Up | 06/07/96 | 08:00 AM | 06/07/96 | 09:00 AM | | | |
| 156 | Centrifugation | 06/07/96 | 09:00 AM | 06/07/96 | 10:00 AM | | | |
| 157 | Wash | 06/07/96 | 10:00 AM | 06/07/96 | 10:06 AM | | | |
| 158 | CIP | 06/07/96 | 10:06 AM | 06/07/96 | 10:21 AM | | | |
| 159 | SIP | 06/07/96 | 10:21 AM | 06/07/96 | 11:21 AM | | | |
| 160 | Clean Up | 06/07/96 | 11:21 AM | 06/07/96 | 11:51 AM | | | |
| 161 | Subtotal | | | | | | | |
| 162 | | | | | | | | |
| 163 | 7 A Resolubilization | | | | | | | |
| 164 | | | | | | | | |
| 165 | Set Up | 06/07/96 | 09:06 AM | 06/07/96 | 10:06 AM | | | |
| 166 | Dilution | 06/07/96 | 10:06 AM | 06/07/96 | 10:36 AM | | | |
| 167 | Agitate | 06/07/96 | 10:36 AM | 06/07/96 | 11:36 AM | | | |
| 168 | CIP | 06/07/96 | 11:36 AM | 06/07/96 | 12:36 PM | | | |
| 169 | SIP | 06/07/96 | 12:36 PM | 06/07/96 | 01:36 PM | | | |
| 170 | Clean Up | 06/07/96 | 01:36 PM | 06/07/96 | 02:36 PM | | | |
| 171 | Subtotal | | | | | | | |
| 172 | | | | | | | | |
| 173 | 8 A Heat Exchange | | | | | | | |
| 174 | | | | | | | | |
| 175 | Set Up | 06/07/96 | 11:06 AM | 06/07/96 | 11:36 AM | | | |
| 176 | Transfer | 06/07/96 | 11:36 AM | 06/07/96 | 11:54 AM | | | |
| 177 | CIP | 06/07/96 | 11:54 AM | 06/07/96 | 11:54 AM | | | |
| 178 | SIP | 06/07/96 | 11:54 AM | 06/07/96 | 11:54 AM | | | |
| 179 | Clean Up | 06/07/96 | 11:54 AM | 06/07/96 | 11:54 AM | | | |
| 180 | Subtotal | | | | | | | |
| 181 | | | | | | | | |
| 182 | 9 A Hommogenization | | | | | | | |
| 183 | | | | | | | | |
| 184 | Set Up | 06/07/96 | 11:39 AM | 06/07/96 | 11:54 AM | | | |
| 185 | Lysis | 06/07/96 | 11:54 AM | 06/07/96 | 12:34 PM | | | |
| 186 | CIP | 06/07/96 | 12:34 PM | 06/07/96 | 12:34 PM | | | |
| 187 | SIP | 06/07/96 | 12:34 PM | 06/07/96 | 12:34 PM | | | |
| 188 | Clean Up | 06/07/96 | 12:34 PM | 06/07/96 | 12:34 PM | | | |
| 189 | Subtotal | | | | | | | |
| 190 | | | | | | | | |

FIG. 45D-2

QC LOAD TABLE-PE MODULE

| | | | | | | | | | | | | | | | |
|---|---|---|---|---|---|---|---|---|---|---|---|---|---|---|---|
| Chemical | | | | | | Biochemical | | | | | | | Immulogical | | Act. |
| AC-1 | AC-2 | AC-3 | AC-4 | AC-5 | AC-6 | AB-1 | AB-2 | AB-3 | AB-4 | AB-5 | AB-6 | AB-7 | AI-1 | AI-2 | AA-1 |
| | | | | | | | | | | | | | | | |
| | | | | | | | | | | | | | | | |
| | | | | | | | | | | | | | | | |
| | | | | | | | | | | | | | | | |
| | | | | | | | | 3 | | 3 | | | 3 | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |

FIG. 45E-1

QC LOAD TABLE-PE MODULE

| | Operation | Start | | Finish | | QA/QC Samples | | |
|---|---|---|---|---|---|---|---|---|
| | | | | | | Visual | | |
| | | Date | Time | Date | Time | AV-1 | AV-2 | |
| | | 06/03/96 | 08:00 AM | | | | | |
| 191 | 10 A Heat Exchange | | | | | | | |
| 192 | | | | | | | | |
| 193 | Set Up | 06/07/96 | 12:04 PM | 06/07/96 | 12:34 PM | | | |
| 194 | Transfer | 06/07/96 | 12:34 PM | 06/07/96 | 12:52 PM | | | |
| 195 | CIP | 06/07/96 | 12:52 PM | 06/07/96 | 12:52 PM | | | |
| 196 | SIP | 06/07/96 | 12:52 PM | 06/07/96 | 12:52 PM | | | |
| 197 | Clean Up | 06/07/96 | 12:52 PM | 06/07/96 | 12:52 PM | | | |
| 198 | Subtotal | | | | | | | |
| 199 | | | | | | | | |
| 200 | 8 B Heat Exchange | | | | | | | |
| 201 | | | | | | | | |
| 202 | Set Up | 06/07/96 | 12:52 PM | 06/07/96 | 12:52 PM | | | |
| 203 | Transfer | 06/07/96 | 12:52 PM | 06/07/96 | 01:10 PM | | | |
| 204 | CIP | 06/07/96 | 01:10 PM | 06/07/96 | 01:10 PM | | | |
| 205 | SIP | 06/07/96 | 01:10 PM | 06/07/96 | 01:10 PM | | | |
| 206 | Clean Up | 06/07/96 | 01:10 PM | 06/07/96 | 01:10 PM | | | |
| 207 | Subtotal | | | | | | | |
| 208 | | | | | | | | |
| 209 | 9 B Hommogenization | | | | | | | |
| 210 | | | | | | | | |
| 211 | Set Up | 06/07/96 | 01:10 PM | 06/07/96 | 01:10 PM | | | |
| 212 | Lysis | 06/07/96 | 01:10 PM | 06/07/96 | 01:51 PM | | | |
| 213 | CIP | 06/07/96 | 01:51 PM | 06/07/96 | 01:51 PM | | | |
| 214 | SIP | 06/07/96 | 01:51 PM | 06/07/96 | 01:51 PM | | | |
| 215 | Clean Up | 06/07/96 | 01:51 PM | 06/07/96 | 01:51 PM | | | |
| 216 | Subtotal | | | | | | | |
| 217 | | | | | | | | |
| 218 | 10 B Heat Exchange | | | | | | | |
| 219 | | | | | | | | |
| 220 | Set Up | 06/07/96 | 01:21 PM | 06/07/96 | 01:51 PM | | | |
| 221 | Transfer | 06/07/96 | 01:51 PM | 06/07/96 | 02:09 PM | | | |
| 222 | CIP | 06/07/96 | 02:09 PM | 06/07/96 | 02:09 PM | | | |
| 223 | SIP | 06/07/96 | 02:09 PM | 06/07/96 | 02:09 PM | | | |
| 224 | Clean Up | 06/07/96 | 02:09 PM | 06/07/96 | 02:09 PM | | | |
| 225 | Subtotal | | | | | | | |
| 226 | | | | | | | | |
| 227 | 8 C Heat Exchange | | | | | | | |
| 228 | | | | | | | | |
| 229 | Set Up | 06/07/96 | 02:09 PM | 06/07/96 | 02:09 PM | | | |
| 230 | Transfer | 06/07/96 | 02:09 PM | 06/07/96 | 02:27 PM | | | |
| 231 | CIP | 06/07/96 | 02:27 PM | 06/07/96 | 03:27 PM | | | |
| 232 | SIP | 06/07/96 | 03:27 PM | 06/07/96 | 04:27 PM | | | |
| 233 | Clean Up | 06/07/96 | 04:27 PM | 06/07/96 | 05:27 PM | | | |
| 234 | Subtotal | | | | | | | |
| 235 | | | | | | | | |
| 236 | 9 C Hommogenization | | | | | | | |
| 237 | | | | | | | | |
| 238 | Set Up | 06/07/96 | 02:27 PM | 06/07/96 | 02:27 PM | | | |
| 239 | Lysis | 06/07/96 | 02:27 PM | 06/07/96 | 03:07 PM | | | |

FIG. 45E-2

QC LOAD TABLE-PE MODULE

| Chemical | | | | | | Biochemical | | | | | | | Immulogical | | Act. |
|---|---|---|---|---|---|---|---|---|---|---|---|---|---|---|---|
| AC-1 | AC-2 | AC-3 | AC-4 | AC-5 | AC-6 | AB-1 | AB-2 | AB-3 | AB-4 | AB-5 | AB-6 | AB-7 | AI-1 | AI-2 | AA-1 |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |

FIG. 45F-1

QC LOAD TABLE-PE MODULE

| | Operation | Start Date | Start Time | Finish Date | Finish Time | QA/QC Samples Visual AV-1 | AV-2 | |
|---|---|---|---|---|---|---|---|---|
| | | 06/03/96 | 08:00 AM | | | | | |
| 240 | CIP | 06/07/96 | 03:07 PM | 06/07/96 | 04:07 PM | | | |
| 241 | SIP | 06/07/96 | 04:07 PM | 06/07/96 | 05:07 PM | | | |
| 242 | Clean Up | 06/07/96 | 05:07 PM | 06/07/96 | 06:07 PM | | | |
| 243 | Subtotal | | | | | | | |
| 244 | | | | | | | | |
| 245 | 10 C Heat Exchange | | | | | | | |
| 246 | | | | | | | | |
| 247 | Set Up | 06/07/96 | 03:07 PM | 06/07/96 | 03:07 PM | | | |
| 248 | Transfer | 06/07/96 | 03:07 PM | 06/07/96 | 03:25 PM | | | |
| 249 | CIP | 06/07/96 | 03:25 PM | 06/07/96 | 04:25 PM | | | |
| 250 | SIP | 06/07/96 | 04:25 PM | 06/07/96 | 05:25 PM | | | |
| 251 | Clean Up | 06/07/96 | 05:25 PM | 06/07/96 | 06:25 PM | | | |
| 252 | Subtotal | | | | | | | |
| 253 | | | | | | | | |
| 254 | 11 A Resolubilization | | | | | | | |
| 255 | | | | | | | | |
| 256 | Set Up | 06/07/96 | 11:52 AM | 06/07/96 | 12:52 PM | | | |
| 257 | Dilution | 06/07/96 | 12:52 PM | 06/07/96 | 01:22 PM | | | |
| 258 | Agitate | 06/07/96 | 01:22 PM | 06/07/96 | 01:52 PM | | | |
| 259 | CIP | 06/07/96 | 01:52 PM | 06/07/96 | 01:52 PM | | | |
| 260 | SIP | 06/07/96 | 01:52 PM | 06/07/96 | 01:52 PM | | | |
| 261 | Clean Up | 06/07/96 | 01:52 PM | 06/07/96 | 01:52 PM | | | |
| 262 | Subtotal | | | | | | | |
| 263 | | | | | | | | |
| 264 | 12 A Cont.Cent/Solids | | | | | | | |
| 265 | | | | | | | | |
| 266 | Set Up | 06/07/96 | 12:52 PM | 06/07/96 | 01:52 PM | | | |
| 267 | Centrifugation | 06/07/96 | 01:52 PM | 06/07/96 | 02:22 PM | | | |
| 268 | Wash | 06/07/96 | 02:22 PM | 06/07/96 | 02:28 PM | | | |
| 269 | CIP | 06/07/96 | 02:28 PM | 06/07/96 | 02:28 PM | | | |
| 270 | SIP | 06/07/96 | 02:28 PM | 06/07/96 | 02:28 PM | | | |
| 271 | Clean Up | 06/07/96 | 02:28 PM | 06/07/96 | 02:28 PM | | | |
| 272 | Subtotal | | | | | | | |
| 273 | | | | | | | | |
| 274 | 11 B Resolubilization | | | | | | | |
| 275 | | | | | | | | |
| 276 | Set Up | 06/07/96 | 02:28 PM | 06/07/96 | 02:28 PM | | | |
| 277 | Dilution | 06/07/96 | 02:28 PM | 06/07/96 | 02:58 PM | | | |
| 278 | Agitate | 06/07/96 | 02:58 PM | 06/07/96 | 03:13 PM | | | |
| 279 | CIP | 06/07/96 | 03:13 PM | 06/07/96 | 04:13 PM | | | |
| 280 | SIP | 06/07/96 | 04:13 PM | 06/07/96 | 05:13 PM | | | |
| 281 | Clean Up | 06/07/96 | 05:13 PM | 06/07/96 | 06:13 PM | | | |
| 282 | Subtotal | | | | | | | |
| 283 | | | | | | | | |
| 284 | 12 B Cont.Cent/Solids | | | | | | | |
| 285 | | | | | | | | |
| 286 | Set Up | 06/07/96 | 02:13 PM | 06/07/96 | 03:13 PM | | | |
| 287 | Centrifugation | 06/07/96 | 03:13 PM | 06/07/96 | 03:43 PM | | | |
| 288 | Wash | 06/07/96 | 03:43 PM | 06/07/96 | 03:49 PM | | | |

FIG. 45F-2

QC LOAD TABLE-PE MODULE

| | | | | | | | | | | | | | | | |
|---|---|---|---|---|---|---|---|---|---|---|---|---|---|---|---|
| Chemical | | | | | | | | | | | | | Immulogical | | Act. |
| AC-1 | AC-2 | AC-3 | AC-4 | AC-5 | AC-6 | AB-1 | AB-2 | AB-3 | AB-4 | AB-5 | AB-6 | AB-7 | AI-1 | AI-2 | AA-1 |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |

FIG. 45G-1

QC LOAD TABLE-PE MODULE

| | Operation | | | Finish | | QA/QC Samples Visual | | |
|---|---|---|---|---|---|---|---|---|
| | | Date | Time | Date | Time | AV-1 | AV-2 | |
| | | 06/03/96 | 08:00 AM | | | | | |
| 289 | CIP | 06/07/96 | 03:49 PM | 06/07/96 | 04:04 PM | | | |
| 290 | SIP | 06/07/96 | 04:04 PM | 06/07/96 | 05:04 PM | | | |
| 291 | Clean Up | 06/07/96 | 05:04 PM | 06/07/96 | 05:34 PM | | | |
| 292 | Subtotal | | | | | | | |
| 293 | | | | | | | | |
| 294 | 13 A Resolubilization | | | | | | | |
| 295 | | | | | | | | |
| 296 | Set Up | 06/07/96 | 01:28 PM | 06/07/96 | 02:28 PM | | | |
| 297 | Dilution | 06/07/96 | 02:28 PM | 06/07/96 | 02:58 PM | | | |
| 298 | Agitate | 06/07/96 | 02:58 PM | 06/08/96 | 08:58 AM | | | |
| 299 | CIP | 06/08/96 | 08:58 AM | 06/08/96 | 09:58 AM | | | |
| 300 | SIP | 06/08/96 | 09:58 AM | 06/08/96 | 10:58 AM | | | |
| 301 | Clean Up | 06/08/96 | 10:58 AM | 06/08/96 | 11:58 AM | | | |
| 302 | Subtotal | | | | | | | |
| 303 | | | | | | | | |
| 304 | 14 A Concentration | | | | | | | |
| 305 | | | | | | | | |
| 306 | Set Up | 06/08/96 | 06:38 AM | 06/08/96 | 07:38 AM | | | |
| 307 | Flush | 06/08/96 | 07:38 AM | 06/08/96 | 08:18 AM | | | |
| 308 | Prime | 06/08/96 | 08:18 AM | 06/08/96 | 08:58 AM | | | |
| 309 | Concentration | 06/08/96 | 08:58 AM | 06/08/96 | 09:58 AM | | | |
| 310 | Dilution | 06/08/96 | 09:58 AM | 06/08/96 | 10:25 AM | | | |
| 311 | Wash | 06/08/96 | 10:25 AM | 06/08/96 | 11:19 AM | | | |
| 312 | Flush | 06/08/96 | 11:19 AM | 06/08/96 | 11:39 AM | | | |
| 313 | Store | 06/08/96 | 11:39 AM | 06/08/96 | 12:19 PM | | | |
| 314 | CIP | 06/08/96 | 12:19 PM | 06/08/96 | 01:19 PM | | | |
| 315 | SIP | 06/08/96 | 01:19 PM | 06/08/96 | 02:19 PM | | | |
| 316 | Clean Up | 06/08/96 | 02:19 PM | 06/08/96 | 03:19 PM | | | |
| 317 | Subtotal | | | | | | | |
| 318 | | | | | | | | |
| 319 | 15 A Microfiltration | | | | | | | |
| 320 | | | | | | | | |
| 321 | Set Up | 06/08/96 | 10:03 AM | 06/08/96 | 11:03 AM | | | |
| 322 | Flush | 06/08/96 | 11:03 AM | 06/08/96 | 11:11 AM | | | |
| 323 | Prime | 06/08/96 | 11:11 AM | 06/08/96 | 11:19 AM | | | |
| 324 | Filtration | 06/08/96 | 11:19 AM | 06/08/96 | 11:49 AM | | | |
| 325 | Wash | 06/08/96 | 11:49 AM | 06/08/96 | 11:49 AM | | | |
| 326 | Regenerate | 06/08/96 | 11:49 AM | 06/08/96 | 11:51 AM | | | |
| 327 | Store | 06/08/96 | 11:51 AM | 06/08/96 | 11:55 AM | | | |
| 328 | CIP | 06/08/96 | 11:55 AM | 06/08/96 | 12:55 PM | | | |
| 329 | SIP | 06/08/96 | 12:55 PM | 06/08/96 | 01:55 PM | | | |
| 330 | Clean Up | 06/08/96 | 01:55 PM | 06/08/96 | 02:55 PM | | | |
| 331 | Subtotal | | | | | | | |
| 332 | | | | | | | | |
| 333 | 16 A P/A MPLC | | | | | | | |
| 334 | | | | | | | | |
| 335 | Equilibration | 06/08/96 | 10:17 AM | 06/08/96 | 11:24 AM | | | |
| 336 | Load | 06/08/96 | 11:49 AM | 06/08/96 | 12:31 PM | | | |
| 337 | Wash | 06/08/96 | 12:31 PM | 06/08/96 | 01:52 PM | | | |

FIG. 45G-2

QC LOAD TABLE-PE MODULE

| | | | | | | | | | | | | | | | |
|---|---|---|---|---|---|---|---|---|---|---|---|---|---|---|---|
| Chemical | | | | | | | | | | | | | Immulogical | | Act. |
| AC-1 | AC-2 | AC-3 | AC-4 | AC-5 | AC-6 | AB-1 | AB-2 | AB-3 | AB-4 | AB-5 | AB-6 | AB-7 | AI-1 | AI-2 | AA-1 |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |

*FIG. 45H-1*

QC LOAD TABLE-PE MODULE

| | | | | | | QA/QC Samples | | |
|---|---|---|---|---|---|---|---|---|
| | | | | Finish | | Visual | | |
| | Operation | Date | Time | Date | Time | AV-1 | AV-2 | |
| | | 06/03/96 | 08:00 AM | | | | | |
| 338 | Elute A | 06/08/96 | 01:52 PM | 06/08/96 | 03:12 PM | | | |
| 339 | Elute B | 06/08/96 | 03:12 PM | 06/08/96 | 03:12 PM | | | |
| 340 | Regenerate | 06/08/96 | 03:12 PM | 06/08/96 | 03:25 PM | | | |
| 341 | Store | 06/08/96 | 03:25 PM | 06/08/96 | 03:52 PM | | | |
| 342 | CIP | 06/08/96 | 03:52 PM | 06/08/96 | 04:52 PM | | | |
| 343 | SIP | 06/08/96 | 04:52 PM | 06/08/96 | 05:52 PM | | | |
| 344 | Clean Up | 06/08/96 | 05:52 PM | 06/08/96 | 06:52 PM | | | |
| 345 | Subtotal | | | | | | | |
| 346 | | | | | | | | |
| 347 | | | | | | | | |
| 348 | 17 A P/A MPLC | | | | | | | |
| 349 | | | | | | | | |
| 350 | Equilibration | 06/08/96 | 02:59 PM | 06/08/96 | 03:38 PM | | | |
| 351 | Load | 06/08/96 | 03:12 PM | 06/08/96 | 04:17 PM | | | |
| 352 | Wash | 06/08/96 | 04:17 PM | 06/08/96 | 05:03 PM | | | |
| 353 | Elute A | 06/08/96 | 05:03 PM | 06/08/96 | 05:49 PM | | | |
| 354 | Elute B | 06/08/96 | 05:49 PM | 06/08/96 | 05:49 PM | | | |
| 355 | Regenerate | 06/08/96 | 05:49 PM | 06/08/96 | 05:57 PM | | | |
| 356 | Store | 06/08/96 | 05:57 PM | 06/08/96 | 06:13 PM | | | |
| 357 | CIP | 06/08/96 | 06:13 PM | 06/08/96 | 07:13 PM | | | |
| 358 | SIP | 06/08/96 | 07:13 PM | 06/08/96 | 08:13 PM | | | |
| 359 | Clean Up | 06/08/96 | 08:13 PM | 06/08/96 | 09:13 PM | | | |
| 360 | Subtotal | | | | | | | |
| 361 | | | | | | | | |
| 362 | 18 A Flow Dialysis | | | | | | | |
| 363 | | | | | | | | |
| 364 | Set Up | 06/08/96 | 03:29 PM | 06/08/96 | 04:29 PM | | | |
| 365 | Flush | 06/08/96 | 04:29 PM | 06/08/96 | 05:09 PM | | | |
| 366 | Prime | 06/08/96 | 05:09 PM | 06/08/96 | 05:49 PM | | | |
| 367 | Dialysis | 06/08/96 | 05:49 PM | 06/08/96 | 06:49 PM | | | |
| 368 | Wash | 06/08/96 | 06:49 PM | 06/08/96 | 06:49 PM | | | |
| 369 | Flush | 06/08/96 | 06:49 PM | 06/08/96 | 07:09 PM | | | |
| 370 | Store | 06/08/96 | 07:09 PM | 06/08/96 | 07:49 PM | | | |
| 371 | CIP | 06/08/96 | 07:49 PM | 06/08/96 | 08:49 PM | | | |
| 372 | SIP | 06/08/96 | 08:49 PM | 06/08/96 | 09:49 PM | | | |
| 373 | Clean Up | 06/08/96 | 09:49 PM | 06/08/96 | 10:49 PM | | | |
| 374 | Subtotal | | | | | | | |
| 375 | | | | | | | | |
| 376 | 19 A P/A MPLC | | | | | | | |
| 377 | | | | | | | | |
| 378 | Equilibration | 06/08/96 | 05:59 PM | 06/08/96 | 06:31 PM | | | |
| 379 | Load | 06/08/96 | 06:49 PM | 06/08/96 | 07:03 PM | | | |
| 380 | Wash | 06/08/96 | 07:03 PM | 06/08/96 | 07:41 PM | | | |
| 381 | Elute A | 06/08/96 | 07:41 PM | 06/08/96 | 08:20 PM | | | |
| 382 | Elute B | 06/08/96 | 08:20 PM | 06/08/96 | 08:20 PM | | | |
| 383 | Regenerate | 06/08/96 | 08:20 PM | 06/08/96 | 08:26 PM | | | |
| 384 | Store | 06/08/96 | 08:26 PM | 06/08/96 | 08:39 PM | | | |
| 385 | CIP | 06/08/96 | 08:39 PM | 06/08/96 | 09:39 PM | | | |
| 386 | SIP | 06/08/96 | 09:39 PM | 06/08/96 | 10:39 PM | | | |

FIG. 45H-2

QC LOAD TABLE-PE MODULE

| | | | | | | | | | | | | | | | |
|---|---|---|---|---|---|---|---|---|---|---|---|---|---|---|---|
| Chemical | | | | | | Biochemical | | | | | | | Immulogical | | Act. |
| AC-1 | AC-2 | AC-3 | AC-4 | AC-5 | AC-6 | AB-1 | AB-2 | AB-3 | AB-4 | AB-5 | AB-6 | AB-7 | AI-1 | AI-2 | AA-1 |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |

FIG. 45I-1

QC LOAD TABLE-PE MODULE

| | | | | | | QA/QC Samples | | |
|---|---|---|---|---|---|---|---|---|
| | | | | Finish | | Visual | | |
| | Operation | Date | Time | Date | Time | AV-1 | AV-2 | |
| | | 06/03/96 | 08:00 AM | | | | | |
| 387 | Clean Up | 06/08/96 | 10:39 PM | 06/08/96 | 11:39 PM | | | |
| 388 | Subtotal | | | | | | | |
| 389 | | | | | | | | |
| 390 | 20 A Flow Dialysis | | | | | | | |
| 391 | | | | | | | | |
| 392 | Set Up | 06/08/96 | 07:00 PM | 06/08/96 | 07:00 PM | | | |
| 393 | Flush | 06/08/96 | 07:00 PM | 06/08/96 | 07:40 PM | | | |
| 394 | Prime | 06/08/96 | 07:40 PM | 06/08/96 | 08:20 PM | | | |
| 395 | Dialysis | 06/08/96 | 08:20 PM | 06/08/96 | 10:20 PM | | | |
| 396 | Wash | 06/08/96 | 10:20 PM | 06/08/96 | 10:20 PM | | | |
| 397 | Flush | 06/08/96 | 10:20 PM | 06/08/96 | 10:40 PM | | | |
| 398 | Store | 06/08/96 | 10:40 PM | 06/08/96 | 11:20 PM | | | |
| 399 | CIP | 06/08/96 | 11:20 PM | 06/08/96 | 11:20 PM | | | |
| 400 | SIP | 06/08/96 | 11:20 PM | 06/08/96 | 11:20 PM | | | |
| 401 | Clean Up | 06/08/96 | 11:20 PM | 06/09/96 | 12:20 AM | | | |
| 402 | Subtotal | | | | | | | |
| 403 | | | | | | | | |
| 404 | 21 A P/A MPLC | | | | | | | |
| 405 | | | | | | | | |
| 406 | Equilibration | 06/08/96 | 09:28 PM | 06/08/96 | 09:57 PM | | | |
| 407 | Load | 06/08/96 | 10:20 PM | 06/08/96 | 10:26 PM | | | |
| 408 | Wash | 06/08/96 | 10:26 PM | 06/08/96 | 11:01 PM | | | |
| 409 | Elute A | 06/08/96 | 11:01 PM | 06/08/96 | 11:36 PM | | | |
| 410 | Elute B | 06/08/96 | 11:36 PM | 06/08/96 | 11:36 PM | | | |
| 411 | Regenerate | 06/08/96 | 11:36 PM | 06/08/96 | 11:42 PM | | | |
| 412 | Store | 06/08/96 | 11:42 PM | 06/08/96 | 11:54 PM | | | |
| 413 | CIP | 06/08/96 | 11:54 PM | 06/08/96 | 11:54 PM | | | |
| 414 | SIP | 06/08/96 | 11:54 PM | 06/08/96 | 11:54 PM | | | |
| 415 | Clean Up | 06/08/96 | 11:54 PM | 06/09/96 | 12:54 AM | | | |
| 416 | Subtotal | | | | | | | |
| 417 | | | | | | | | |
| 418 | 22 A Sterile Filtration | | | | | | | |
| 419 | | | | | | | | |
| 420 | Set Up | 06/09/96 | 08:06 AM | 06/09/96 | 08:36 AM | | | |
| 421 | Filtration | 06/08/96 | 11:36 PM | 06/09/96 | 12:06 AM | | | |
| 422 | Storage | 06/09/96 | 12:06 AM | 06/09/96 | 12:36 AM | | | |
| 423 | CIP | 06/09/96 | 12:36 AM | 06/09/96 | 12:36 AM | | | |
| 424 | SIP | 06/09/96 | 12:36 AM | 06/09/96 | 12:36 AM | | | |
| 425 | Clean Up | 06/09/96 | 12:36 AM | 06/09/96 | 01:36 AM | | | |
| 426 | Subtotal | | | | | | | |

FIG. 45I-2

QC LOAD TABLE-PE MODULE

| | | | | | | | | | | | | | | | |
|---|---|---|---|---|---|---|---|---|---|---|---|---|---|---|---|
| Chemical | | | | | | Biochemical | | | | | | | Immulogical | | Act. |
| AC-1 | AC-2 | AC-3 | AC-4 | AC-5 | AC-6 | AB-1 | AB-2 | AB-3 | AB-4 | AB-5 | AB-6 | AB-7 | AI-1 | AI-2 | AA-1 |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |
| | | | | | | | | | | | | | | | |

FIG. 64A-1

EQUIPMENT MAINTENANCE TABLE-MICROBIAL FERMENTATION 6402 6404

| Equipment Items | Filters | | | | | |
|---|---|---|---|---|---|---|
| | Materials | | | | | Labor |
| | Item No. | Qty | Cycle Life | Unit Cost | $/Cycle | Hours |
| | | | | | | |
| 1 Inoculum Prep | | | | | | |
| -80 C Stock Freezer | | | | | | |
| Shaking Water Bath | | | | | | |
| 2 Flask Growth | | | | | | |
| Floor Incubator-Shaker | | | | | | |
| Microscope | | | | | | |
| 3 Seed Fermentation | | | | | | |
| Seed Bioreactor | | | | | | |
| 4 Fermentation | | | | | | |
| Production Bioreactor | 75868 | 1 | 100 | 55 | .55 | .5 |
| 5 Whole Cell Harvest | | | | | | |
| Harvest Heat Exchanger | | | | | | |
| Harvest Vessel | | | | | | |
| Agitator | | | | | | |
| 6 Cell Concentration | | | | | | |
| Pump | | | | | | |
| Filter Holder | | | | | | |
| Manifolding | | | | | | |
| Instrumentation | | | | | | |
| MF Flush Vessel | | | | | | |
| MF Prime Vessel | | | | | | |
| MF Filtrate Vessel | | | | | | |
| Agitator | | | | | | |
| MF Wash Vessel | | | | | | |
| MF Regeneration Vessel | | | | | | |
| MF Storage Vessel | | | | | | |

FIG. 64A-2

EQUIPMENT MAINTENANCE TABLE-MICROBIAL FERMENTATION 6406 6408

| | Gaskets | | | | | | | Bearings |
|---|---|---|---|---|---|---|---|---|
| | Materials | | | | | Labor | | Materials |
| $/Cycle | Item No. | Qty | Cycle Life | Unit Cost | $/Cycle | Hours | $/Cycle | Item No. |
| | | | | | | | | |
| | | | | | | | | |
| | | | | | | | | |
| | | | | | | | | |
| .0875 | 48994 | 1 | 500 | 55 | .11 | 1 | .035 | |
| | 62589 | 1 | 350 | 85 | .2429 | 1 | .05 | |
| | | | | | | | | |

FIG. 64B-1

EQUIPMENT MAINTENANCE TABLE-MICROBIAL FERMENTATION

6408

| Equipment Items | Qty | Cycle Life | Unit Cost | $/Cycle | Labor Hours |
|---|---|---|---|---|---|
| | | | | | |
| 1 Inoculum Prep | | | | | |
| -80 C Stock Freezer | | | | | |
| Shaking Water Bath | | | | | |
| 2 Flask Growth | | | | | |
| Floor Incubator-Shaker | | | | | |
| Microscope | | | | | |
| 3 Seed Fermentation | | | | | |
| Seed Bioreactor | | | | | |
| 4 Fermentation | | | | | |
| Production Bioreactor | | | | | |
| 5 Whole Cell Harvest | | | | | |
| Harvest Heat Exchanger | | | | | |
| Harvest Vessel | | | | | |
| Agitator | | | | | |
| 6 Cell Concentration | | | | | |
| Pump | | | | | |
| Filter Holder | | | | | |
| Manifolding | | | | | |
| Instrumentation | | | | | |
| MF Flush Vessel | | | | | |
| MF Prime Vessel | | | | | |
| MF Filtrate Vessel | | | | | |
| Agitator | | | | | |
| MF Wash Vessel | | | | | |
| MF Regeneration Vessel | | | | | |
| MF Storage Vessel | | | | | |

FIG. 64B-2

EQUIPMENT MAINTENANCE TABLE-MICROBIAL FERMENTATION 6410 6412

| | | Seals | | | | | | | Belts | |
|---|---|---|---|---|---|---|---|---|---|---|
| | | Materials | | | | | Labor | | Materials | |
| | $/Cycle | Item No. | Qty | Cycle Life | Unit Cost | $/Cycle | Hours | $/Cycle | Item No. | Qty |
| | | | | | | | | | | |
| | | | | | | | | | | |
| | | | | | | | | | | |
| | | 54812<br>48695 | 2<br>1 | 250<br>250 | 12<br>18.9 | .048<br>.0756 | 1<br>1 | .07<br>.07 | | |
| | | | | | | | | | 85258 | 1 |
| | | | | | | | | | | |
| | | | | | | | | | | |

FIG. 64C-1

EQUIPMENT MAINTENANCE TABLE-MICROBIAL FERMENTATION

6414

| Equipment Items | Cycle Life | Unit Cost | $/Cycle | Labor Hours |
|---|---|---|---|---|
| | | | | |
| 1 Inoculum Prep | | | | |
| -80 C Stock Freezer | | | | |
| Shaking Water Bath | | | | |
| 2 Flask Growth | | | | |
| Floor Incubator-Shaker | | | | |
| Microscope | | | | |
| 3 Seed Fermentation | | | | |
| Seed Bioreactor | | | | |
| 4 Fermentation | | | | |
| Production Bioreactor | 500 | 25 | .05 | 1 |
| 5 Whole Cell Harvest | | | | |
| Harvest Heat Exchanger | | | | |
| Harvest Vessel | | | | |
| Agitator | | | | |
| 6 Cell Concentration | | | | |
| Pump | | | | |
| Filter Holder | | | | |
| Manifolding | | | | |
| Instrumentation | | | | |
| MF Flush Vessel | | | | |
| MF Prime Vessel | | | | |
| MF Filtrate Vessel | | | | |
| Agitator | | | | |
| MF Wash Vessel | | | | |
| MF Regeneration Vessel | | | | |
| MF Storage Vessel | | | | |

FIG. 64C-2

EQUIPMENT MAINTENANCE TABLE-MICROBIAL FERMENTATION 6416 6418

| | Shafts | | | | | | | Lubricant | | |
|---|---|---|---|---|---|---|---|---|---|---|
| | Materials | | | | | Labor | | Materials | | |
| $/Cycle | Item No. | Qty | Cycle Life | Unit Cost | $/Cycle | Hours | $/Cycle | Item No. | Qty | Cycle Life |
| | | | | | | | | | | |
| | | | | | | | | | | |
| | | | | | | | | | | |
| | | | | | | | | 78954 | .5 | |
| .035 | | | | | | | | | | |
| | | | | | | | | | | |
| | | | | | | | | | | |

FIG. 64D-1

EQUIPMENT MAINTENANCE TABLE-MICROBIAL FERMENTATION

6418

| Equipment Items | Unit Cost | $/Cycle | Labor Hours |
|---|---|---|---|
| | | | |
| 1 Inoculum Prep | | | |
| -80 C Stock Freezer | | | |
| Shaking Water Bath | | | |
| 2 Flask Growth | | | |
| Floor Incubator-Shaker | | | |
| Microscope | | | |
| 3 Seed Fermentation | | | |
| Seed Bioreactor | 1.5 | .03 | .5 |
| 4 Fermentation | | | |
| Production Bioreactor | | | |
| 5 Whole Cell Harvest | | | |
| Harvest Heat Exchanger | | | |
| Harvest Vessel | | | |
| Agitator | | | |
| 6 Cell Concentration | | | |
| Pump | | | |
| Filter Holder | | | |
| Manifolding | | | |
| Instrumentation | | | |
| MF Flush Vessel | | | |
| MF Prime Vessel | | | |
| MF Filtrate Vessel | | | |
| Agitator | | | |
| MF Wash Vessel | | | |
| MF Regeneration Vessel | | | |
| MF Storage Vessel | | | |

FIG. 64D-2

EQUIPMENT MAINTENANCE TABLE-MICROBIAL FERMENTATION

6420

| | Thermal Media | | | | | | |
|---|---|---|---|---|---|---|---|
| | Materials | | | | | Labor | |
| $/Cycle | Item No. | Qty | Cycle Life | Unit Cost | $/Cycle | Hours | $/Cycle |
| | | | | | | | |
| | | | | | | | |
| | | | | | | | |
| .175 | | | | | | | |
| | 56258 | 5 | 500 | .85 | 425 | 1 | 17.5 |
| | | | | | | | |
| | | | | | | | |

FIG. 64E-1

EQUIPMENT MAINTENANCE TABLE-MICROBIAL FERMENTATION

| Equipment Items | Filters | | | | | |
|---|---|---|---|---|---|---|
| | Materials | | | | | Labor |
| | Item No. | Qty | Cycle Life | Unit Cost | $/Cycle | Hours |
| | | | | | | |
| | | | | | | |
| 7 Cell Concentration 2 | | | | | | |
| MF Wash Vessel | | | | | | |
| Pump | | | | | | |
| Filter Holder | | | | | | |
| Manifolding | | | | | | |
| Instrumentation | | | | | | |
| MF Flush Vessel | | | | | | |
| MF Prime Vessel | | | | | | |
| MF Filtrate Vessel | | | | | | |
| MF Wash Vessel | | | | | | |
| MF Regeneration Vessel | | | | | | |
| MF Storage Vessel | | | | | | |
| 8 Cell Resuspension | | | | | | |
| Resuspension Vessel | | | | | | |
| Stir Plate | | | | | | |
| 9 Cell Disruption | | | | | | |
| Cell Disruptor | | | | | | |
| Lysate Vessel | | | | | | |
| 10 IB Resuspension 1&2 | | | | | | |
| Resuspension Vessel | | | | | | |
| Stir Plate | | | | | | |
| 11 IB Concentration 1&2 | | | | | | |
| MF Wash Vessel | | | | | | |
| Pump | | | | | | |
| Filter Holder | | | | | | |

FIG. 64E-2

EQUIPMENT MAINTENANCE TABLE-MICROBIAL FERMENTATION

| | Gaskets | | | | | | | | Bearings |
|---|---|---|---|---|---|---|---|---|---|
| | Materials | | | | | | Labor | | Materials |
| $/Cycle | Item No. | Qty | Cycle Life | Unit Cost | $/Cycle | | Hours | $/Cycle | Item No. |
| | | | | | | | | | |
| | | | | | | | | | |

FIG. 64F-1

EQUIPMENT MAINTENANCE TABLE-MICROBIAL FERMENTATION

| Equipment Items | Qty | Cycle Life | Unit Cost | $/Cycle | Labor Hours |
|---|---|---|---|---|---|
| | | | | | |
| | | | | | |
| 7 Cell Concentration 2 | | | | | |
| MF Wash Vessel | | | | | |
| Pump | | | | | |
| Filter Holder | | | | | |
| Manifolding | | | | | |
| Instrumentation | | | | | |
| MF Flush Vessel | | | | | |
| MF Prime Vessel | | | | | |
| MF Filtrate Vessel | | | | | |
| MF Wash Vessel | | | | | |
| MF Regeneration Vessel | | | | | |
| MF Storage Vessel | | | | | |
| 8 Cell Resuspension | | | | | |
| Resuspension Vessel | | | | | |
| Stir Plate | | | | | |
| 9 Cell Disruption | | | | | |
| Cell Disruptor | | | | | |
| Lysate Vessel | | | | | |
| 10 IB Resuspension 1&2 | | | | | |
| Resuspension Vessel | | | | | |
| Stir Plate | | | | | |
| 11 IB Concentration 1&2 | | | | | |
| MF Wash Vessel | | | | | |
| Pump | | | | | |
| Filter Holder | | | | | |

FIG. 64F-2

EQUIPMENT MAINTENANCE TABLE-MICROBIAL FERMENTATION

| | Seals | | | | | | | Belts | |
|---|---|---|---|---|---|---|---|---|---|
| | Materials | | | | | Labor | | Materials | |
| $/Cycle | Item No. | Qty | Cycle Life | Unit Cost | $/Cycle | Hours | $/Cycle | Item No. | Qty |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |
| | | | | | | | | | |

FIG. 64G-1

EQUIPMENT MAINTENANCE TABLE-MICROBIAL FERMENTATION

| Equipment Items | Cycle Life | Unit Cost | $/Cycle | Labor Hours |
|---|---|---|---|---|
| | | | | |
| | | | | |
| 7 Cell Concentration 2 | | | | |
| MF Wash Vessel | | | | |
| Pump | | | | |
| Filter Holder | | | | |
| Manifolding | | | | |
| Instrumentation | | | | |
| MF Flush Vessel | | | | |
| MF Prime Vessel | | | | |
| MF Filtrate Vessel | | | | |
| MF Wash Vessel | | | | |
| MF Regeneration Vessel | | | | |
| MF Storage Vessel | | | | |
| 8 Cell Resuspension | | | | |
| Resuspension Vessel | | | | |
| Stir Plate | | | | |
| 9 Cell Disruption | | | | |
| Cell Disruptor | | | | |
| Lysate Vessel | | | | |
| 10 IB Resuspension 1&2 | | | | |
| Resuspension Vessel | | | | |
| Stir Plate | | | | |
| 11 IB Concentration 1&2 | | | | |
| MF Wash Vessel | | | | |
| Pump | | | | |
| Filter Holder | | | | |

FIG. 64G-2

EQUIPMENT MAINTENANCE TABLE-MICROBIAL FERMENTATION

| | Shafts | | | | | | | Lubricant | | |
|---|---|---|---|---|---|---|---|---|---|---|
| | Materials | | | | | Labor | | Materials | | |
| $/Cycle | Item No. | Qty | Cycle Life | Unit Cost | $/Cycle | Hours | $/Cycle | Item No. | Qty | Cycle Life |
| | | | | | | | | | | |
| | | | | | | | | | | |

FIG. 64H-1

EQUIPMENT MAINTENANCE TABLE-MICROBIAL FERMENTATION

| Equipment Items | Unit Cost | $/Cycle | Labor Hours |
|---|---|---|---|
| | | | |
| | | | |
| 7 Cell Concentration 2 | | | |
| MF Wash Vessel | | | |
| Pump | | | |
| Filter Holder | | | |
| Manifolding | | | |
| Instrumentation | | | |
| MF Flush Vessel | | | |
| MF Prime Vessel | | | |
| MF Filtrate Vessel | | | |
| MF Wash Vessel | | | |
| MF Regeneration Vessel | | | |
| MF Storage Vessel | | | |
| 8 Cell Resuspension | | | |
| Resuspension Vessel | | | |
| Stir Plate | | | |
| 9 Cell Disruption | | | |
| Cell Disruptor | | | |
| Lysate Vessel | | | |
| 10 IB Resuspension 1&2 | | | |
| Resuspension Vessel | | | |
| Stir Plate | | | |
| 11 IB Concentration 1&2 | | | |
| MF Wash Vessel | | | |
| Pump | | | |
| Filter Holder | | | |

FIG. 64H-2

EQUIPMENT MAINTENANCE TABLE-MICROBIAL FERMENTATION

| | | Thermal Media | | | | | | |
|---|---|---|---|---|---|---|---|---|
| | | Materials | | | | | Labor | |
| | $/Cycle | Item No. | Qty | Cycle Life | Unit Cost | $/Cycle | Hours | $/Cycle |

*FIG. 64I-1*

EQUIPMENT MAINTENANCE TABLE-MICROBIAL FERMENTATION

| Equipment Items | Filters | | | | | |
|---|---|---|---|---|---|---|
| | Materials | | | | | Labor |
| | Item No. | Qty | Cycle Life | Unit Cost | $/Cycle | Hours |
| | | | | | | |
| Manifolding | | | | | | |
| Instrumentation | | | | | | |
| MF Flush Vessel | | | | | | |
| MF Prime Vessel | | | | | | |
| MF Filtrate Vessel | | | | | | |
| MF Dilute Vessel | | | | | | |
| MF Wash Vessel | | | | | | |
| MF Regeneration Vessel | | | | | | |
| MF Storage Vessel | | | | | | |
| 14 Renaturation | | | | | | |
| Renaturant Vessel | | | | | | |
| Stir Plate | | | | | | |
| 15 Buffer Exchange | | | | | | |
| Pump | | | | | | |
| Filter Holder | | | | | | |
| Manifolding | | | | | | |
| Instrumentation | | | | | | |
| UF Flush Vessel | | | | | | |
| UF Prime Vessel | | | | | | |
| UF Filtrate Vessel | | | | | | |
| UF Wash Vessel | | | | | | |
| UF Diluent Vessel | | | | | | |
| UF Regeneration Vessel | | | | | | |
| UF Storage Vessel | | | | | | |

FIG. 64I-2

EQUIPMENT MAINTENANCE TABLE-MICROBIAL FERMENTATION

| | Gaskets | | | | | | | Bearings |
|---|---|---|---|---|---|---|---|---|
| | Materials | | | | | Labor | | Materials |
| $/Cycle | Item No. | Qty | Cycle Life | Unit Cost | $/Cycle | Hours | $/Cycle | Item No. |
| | | | | | | | | |

FIG. 64J-1

EQUIPMENT MAINTENANCE TABLE-MICROBIAL FERMENTATION

| Equipment Items | Qty | Cycle Life | Unit Cost | $/Cycle | Labor Hours |
|---|---|---|---|---|---|
| | | | | | |
| Manifolding | | | | | |
| Instrumentation | | | | | |
| MF Flush Vessel | | | | | |
| MF Prime Vessel | | | | | |
| MF Filtrate Vessel | | | | | |
| MF Dilute Vessel | | | | | |
| MF Wash Vessel | | | | | |
| MF Regeneration Vessel | | | | | |
| MF Storage Vessel | | | | | |
| 14 Renaturation | | | | | |
| Renaturant Vessel | | | | | |
| Stir Plate | | | | | |
| 15 Buffer Exchange | | | | | |
| Pump | | | | | |
| Filter Holder | | | | | |
| Manifolding | | | | | |
| Instrumentation | | | | | |
| UF Flush Vessel | | | | | |
| UF Prime Vessel | | | | | |
| UF Filtrate Vessel | | | | | |
| UF Wash Vessel | | | | | |
| UF Diluent Vessel | | | | | |
| UF Regeneration Vessel | | | | | |
| UF Storage Vessel | | | | | |

FIG. 64J-2

EQUIPMENT MAINTENANCE TABLE-MICROBIAL FERMENTATION

| | Seals | | | | | | | Belts | |
|---|---|---|---|---|---|---|---|---|---|
| | Materials | | | | | Labor | | Materials | |
| $/Cycle | Item No. | Qty | Cycle Life | Unit Cost | $/Cycle | Hours | $/Cycle | Item No. | Qty |
| | | | | | | | | | |
| | | | | | | | | | |
| | | | | | | | | | |
| | | | | | | | | | |

FIG. 64K-1

EQUIPMENT MAINTENANCE TABLE-MICROBIAL FERMENTATION

| Equipment Items | Cycle Life | Unit Cost | $/Cycle | Labor Hours |
|---|---|---|---|---|
| | | | | |
| Manifolding | | | | |
| Instrumentation | | | | |
| MF Flush Vessel | | | | |
| MF Prime Vessel | | | | |
| MF Filtrate Vessel | | | | |
| MF Dilute Vessel | | | | |
| MF Wash Vessel | | | | |
| MF Regeneration Vessel | | | | |
| MF Storage Vessel | | | | |
| 14 Renaturation | | | | |
| Renaturant Vessel | | | | |
| Stir Plate | | | | |
| 15 Buffer Exchange | | | | |
| Pump | | | | |
| Filter Holder | | | | |
| Manifolding | | | | |
| Instrumentation | | | | |
| UF Flush Vessel | | | | |
| UF Prime Vessel | | | | |
| UF Filtrate Vessel | | | | |
| UF Wash Vessel | | | | |
| UF Diluent Vessel | | | | |
| UF Regeneration Vessel | | | | |
| UF Storage Vessel | | | | |

FIG. 64K-2

EQUIPMENT MAINTENANCE TABLE-MICROBIAL FERMENTATION

| | Shafts | | | | | | | Lubricant | | |
|---|---|---|---|---|---|---|---|---|---|---|
| | Materials | | | | | Labor | | Materials | | |
| $/Cycle | Item No. | Qty | Cycle Life | Unit Cost | $/Cycle | Hours | $/Cycle | Item No. | Qty | Cycle Life |
| | | | | | | | | | | |

FIG. 64L-1

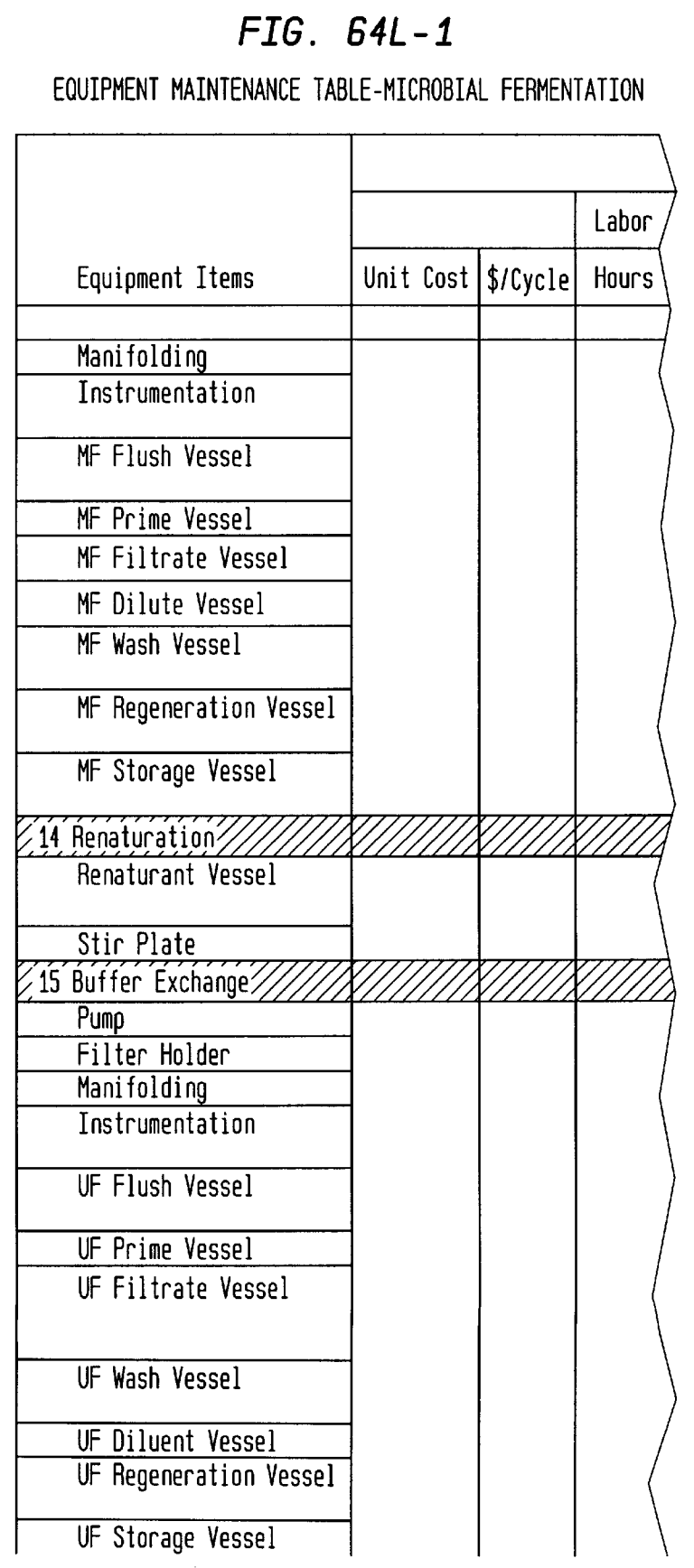

EQUIPMENT MAINTENANCE TABLE-MICROBIAL FERMENTATION

| Equipment Items | Unit Cost | $/Cycle | Labor Hours |
|---|---|---|---|
| | | | |
| Manifolding | | | |
| Instrumentation | | | |
| MF Flush Vessel | | | |
| MF Prime Vessel | | | |
| MF Filtrate Vessel | | | |
| MF Dilute Vessel | | | |
| MF Wash Vessel | | | |
| MF Regeneration Vessel | | | |
| MF Storage Vessel | | | |
| 14 Renaturation | | | |
| Renaturant Vessel | | | |
| Stir Plate | | | |
| 15 Buffer Exchange | | | |
| Pump | | | |
| Filter Holder | | | |
| Manifolding | | | |
| Instrumentation | | | |
| UF Flush Vessel | | | |
| UF Prime Vessel | | | |
| UF Filtrate Vessel | | | |
| UF Wash Vessel | | | |
| UF Diluent Vessel | | | |
| UF Regeneration Vessel | | | |
| UF Storage Vessel | | | |

FIG. 64L-2

EQUIPMENT MAINTENANCE TABLE-MICROBIAL FERMENTATION

| | Thermal Media | | | | | | | |
|---|---|---|---|---|---|---|---|---|
| | Materials | | | | | Labor | | |
| $/Cycle | Item No. | Qty | Cycle Life | Unit Cost | $/Cycle | Hours | $/Cycle | |
| | | | | | | | | |

FIG. 64M-1

EQUIPMENT MAINTENANCE TABLE-MICROBIAL FERMENTATION

| Equipment Items | Filters | | | | | |
|---|---|---|---|---|---|---|
| | Materials | | | | | Labor |
| | Item No. | Qty | Cycle Life | Unit Cost | $/Cycle | Hours |
| | | | | | | |
| UF Waste Vessel | | | | | | |
| 16 Chromatography 1 | | | | | | |
| Chromatography Column | | | | | | |
| Pump | | | | | | |
| Inst.& Control System | | | | | | |
| Manifolding | | | | | | |
| Equilibration Vessel | | | | | | |
| Wash Vessel | | | | | | |
| Eluent Vessel | | | | | | |
| Regenerate Vessel | | | | | | |
| Storage Vessel | | | | | | |
| Waste Vessel(1) | | | | | | |
| Product Vessel | | | | | | |
| Waste Vessel(2) | | | | | | |
| 17 Chromatography 2 | | | | | | |
| Chromatography Column | | | | | | |
| Pump | | | | | | |
| Inst.& Control System | | | | | | |
| Manifolding | | | | | | |
| Equilibration Vessel | | | | | | |
| Wash Vessel | | | | | | |
| Eluent Vessel | | | | | | |
| Regenerate Vessel | | | | | | |

FIG. 64M-2

EQUIPMENT MAINTENANCE TABLE-MICROBIAL FERMENTATION

| | Gaskets | | | | | | | Bearings |
|---|---|---|---|---|---|---|---|---|
| | Materials | | | | | Labor | | Materials |
| $/Cycle | Item No. | Qty | Cycle Life | Unit Cost | $/Cycle | Hours | $/Cycle | Item No. |
| | | | | | | | | |

FIG. 64N-1

EQUIPMENT MAINTENANCE TABLE-MICROBIAL FERMENTATION

| Equipment Items | Qty | Cycle Life | Unit Cost | $/Cycle | Labor Hours |
|---|---|---|---|---|---|
| | | | | | |
| UF Waste Vessel | | | | | |
| 16 Chromatography 1 | | | | | |
| Chromatography Column | | | | | |
| Pump | | | | | |
| Inst.& Control System | | | | | |
| Manifolding | | | | | |
| Equilibration Vessel | | | | | |
| Wash Vessel | | | | | |
| Eluent Vessel | | | | | |
| Regenerate Vessel | | | | | |
| Storage Vessel | | | | | |
| Waste Vessel(1) | | | | | |
| Product Vessel | | | | | |
| Waste Vessel(2) | | | | | |
| 17 Chromatography 2 | | | | | |
| Chromatography Column | | | | | |
| Pump | | | | | |
| Inst.& Control System | | | | | |
| Manifolding | | | | | |
| Equilibration Vessel | | | | | |
| Wash Vessel | | | | | |
| Eluent Vessel | | | | | |
| Regenerate Vessel | | | | | |

FIG. 64N-2

EQUIPMENT MAINTENANCE TABLE-MICROBIAL FERMENTATION

| | | Seals | | | | | | | Belts | |
|---|---|---|---|---|---|---|---|---|---|---|
| | | Materials | | | | | Labor | | Materials | |
| | $/Cycle | Item No. | Qty | Cycle Life | Unit Cost | $/Cycle | Hours | $/Cycle | Item No. | Qty |
| | | | | | | | | | | |

FIG. 640-1

EQUIPMENT MAINTENANCE TABLE-MICROBIAL FERMENTATION

| Equipment Items | Cycle Life | Unit Cost | $/Cycle | Labor Hours |
|---|---|---|---|---|
| | | | | |
| UF Waste Vessel | | | | |
| 16 Chromatography 1 | | | | |
| Chromatography Column | | | | |
| Pump | | | | |
| Inst.& Control System | | | | |
| Manifolding | | | | |
| Equilibration Vessel | | | | |
| Wash Vessel | | | | |
| Eluent Vessel | | | | |
| Regenerate Vessel | | | | |
| Storage Vessel | | | | |
| Waste Vessel(1) | | | | |
| Product Vessel | | | | |
| Waste Vessel(2) | | | | |
| 17 Chromatography 2 | | | | |
| Chromatography Column | | | | |
| Pump | | | | |
| Inst.& Control System | | | | |
| Manifolding | | | | |
| Equilibration Vessel | | | | |
| Wash Vessel | | | | |
| Eluent Vessel | | | | |
| Regenerate Vessel | | | | |

*FIG. 640-2*

EQUIPMENT MAINTENANCE TABLE-MICROBIAL FERMENTATION

| | | Shafts | | | | | | | Lubricant | | |
|---|---|---|---|---|---|---|---|---|---|---|---|
| | | Materials | | | | | Labor | | Materials | | |
| | $/Cycle | Item No. | Qty | Cycle Life | Unit Cost | $/Cycle | Hours | $/Cycle | Item No. | Qty | Cycle Life |
| | | | | | | | | | | | |
| | | | | | | | | | | | |
| | | | | | | | | | | | |
| | | | | | | | | | | | |

FIG. 64P-1

EQUIPMENT MAINTENANCE TABLE-MICROBIAL FERMENTATION

| Equipment Items | Unit Cost | $/Cycle | Labor Hours |
|---|---|---|---|
| | | | |
| UF Waste Vessel | | | |
| 16 Chromatography 1 | | | |
| Chromatography Column | | | |
| Pump | | | |
| Inst.& Control System | | | |
| Manifolding | | | |
| Equilibration Vessel | | | |
| Wash Vessel | | | |
| Eluent Vessel | | | |
| Regenerate Vessel | | | |
| Storage Vessel | | | |
| Waste Vessel(1) | | | |
| Product Vessel | | | |
| Waste Vessel(2) | | | |
| 17 Chromatography 2 | | | |
| Chromatography Column | | | |
| Pump | | | |
| Inst.& Control System | | | |
| Manifolding | | | |
| Equilibration Vessel | | | |
| Wash Vessel | | | |
| Eluent Vessel | | | |
| Regenerate Vessel | | | |

FIG. 64P-2

EQUIPMENT MAINTENANCE TABLE-MICROBIAL FERMENTATION

| | Thermal Media | | | | | | |
|---|---|---|---|---|---|---|---|
| | Materials | | | | | Labor | |
| $/Cycle | Item No. | Qty | Cycle Life | Unit Cost | $/Cycle | Hours | $/Cycle |
| | | | | | | | |
| | | | | | | | |

FIG. 64Q-1

EQUIPMENT MAINTENANCE TABLE-MICROBIAL FERMENTATION

| Equipment Items | Filters | | | | | |
|---|---|---|---|---|---|---|
| | Materials | | | | | Labor |
| | Item No. | Qty | Cycle Life | Unit Cost | $/Cycle | Hours |
| | | | | | | |
| | | | | | | |
| Storage Vessel | | | | | | |
| Waste Vessel(1) | | | | | | |
| Product Vessel | | | | | | |
| Waste Vessel(2) | | | | | | |
| 18 Buffer Exchange | | | | | | |
| Pump | | | | | | |
| Filter Holder | | | | | | |
| Manifolding | | | | | | |
| Instrumentation | | | | | | |
| UF Flush Vessel | | | | | | |
| UF Prime Vessel | | | | | | |
| UF Filtrate Vessel | | | | | | |
| UF Wash Vessel | | | | | | |
| UF Diluent Vessel | | | | | | |
| UF Regeneration Vessel | | | | | | |
| UF Storage Vessel | | | | | | |
| UF Waste Vessel | | | | | | |
| 19 Chromatography 3 | | | | | | |
| Chromatography Column | | | | | | |
| Pump | | | | | | |
| Inst.& Control System | | | | | | |
| Manifolding | | | | | | |
| Equilibration Vessel | | | | | | |

FIG. 64Q-2

EQUIPMENT MAINTENANCE TABLE-MICROBIAL FERMENTATION

| | Gaskets | | | | | | | Bearings |
|---|---|---|---|---|---|---|---|---|
| | Materials | | | | | Labor | | Materials |
| $/Cycle | Item No. | Qty | Cycle Life | Unit Cost | $/Cycle | Hours | $/Cycle | Item No. |
| | | | | | | | | |
| | | | | | | | | |
| | | | | | | | | |
| | | | | | | | | |

FIG. 64R-1

EQUIPMENT MAINTENANCE TABLE-MICROBIAL FERMENTATION

| Equipment Items | Qty | Cycle Life | Unit Cost | $/Cycle | Labor Hours |
|---|---|---|---|---|---|
| | | | | | |
| | | | | | |
| Storage Vessel | | | | | |
| Waste Vessel(1) | | | | | |
| Product Vessel | | | | | |
| Waste Vessel(2) | | | | | |
| 18 Buffer Exchange | | | | | |
| Pump | | | | | |
| Filter Holder | | | | | |
| Manifolding | | | | | |
| Instrumentation | | | | | |
| UF Flush Vessel | | | | | |
| UF Prime Vessel | | | | | |
| UF Filtrate Vessel | | | | | |
| UF Wash Vessel | | | | | |
| UF Diluent Vessel | | | | | |
| UF Regeneration Vessel | | | | | |
| UF Storage Vessel | | | | | |
| UF Waste Vessel | | | | | |
| 19 Chromatography 3 | | | | | |
| Chromatography Column | | | | | |
| Pump | | | | | |
| Inst.& Control System | | | | | |
| Manifolding | | | | | |
| Equilibration Vessel | | | | | |

*FIG. 64R-2*

EQUIPMENT MAINTENANCE TABLE-MICROBIAL FERMENTATION

| | | Seals | | | | | | | | Belts | |
|---|---|---|---|---|---|---|---|---|---|---|---|
| | | Materials | | | | | Labor | | | Materials | |
| | $/Cycle | Item No. | Qty | Cycle Life | Unit Cost | $/Cycle | Hours | $/Cycle | | Item No. | Qty |
| | | | | | | | | | | | |

FIG. 64S-1

EQUIPMENT MAINTENANCE TABLE-MICROBIAL FERMENTATION

| Equipment Items | Cycle Life | Unit Cost | $/Cycle | Labor Hours |
|---|---|---|---|---|
| | | | | |
| | | | | |
| Storage Vessel | | | | |
| Waste Vessel(1) | | | | |
| Product Vessel | | | | |
| Waste Vessel(2) | | | | |
| 18 Buffer Exchange | | | | |
| Pump | | | | |
| Filter Holder | | | | |
| Manifolding | | | | |
| Instrumentation | | | | |
| UF Flush Vessel | | | | |
| UF Prime Vessel | | | | |
| UF Filtrate Vessel | | | | |
| UF Wash Vessel | | | | |
| UF Diluent Vessel | | | | |
| UF Regeneration Vessel | | | | |
| UF Storage Vessel | | | | |
| UF Waste Vessel | | | | |
| 19 Chromatography 3 | | | | |
| Chromatography Column | | | | |
| Pump | | | | |
| Inst.& Control System | | | | |
| Manifolding | | | | |
| Equilibration Vessel | | | | |

FIG. 64S-2

EQUIPMENT MAINTENANCE TABLE-MICROBIAL FERMENTATION

| | Shafts | | | | | | | Lubricant | | |
|---|---|---|---|---|---|---|---|---|---|---|
| | Materials | | | | | Labor | | Materials | | |
| $/Cycle | Item No. | Qty | Cycle Life | Unit Cost | $/Cycle | Hours | $/Cycle | Item No. | Qty | Cycle Life |
| | | | | | | | | | | |

FIG. 64T-1

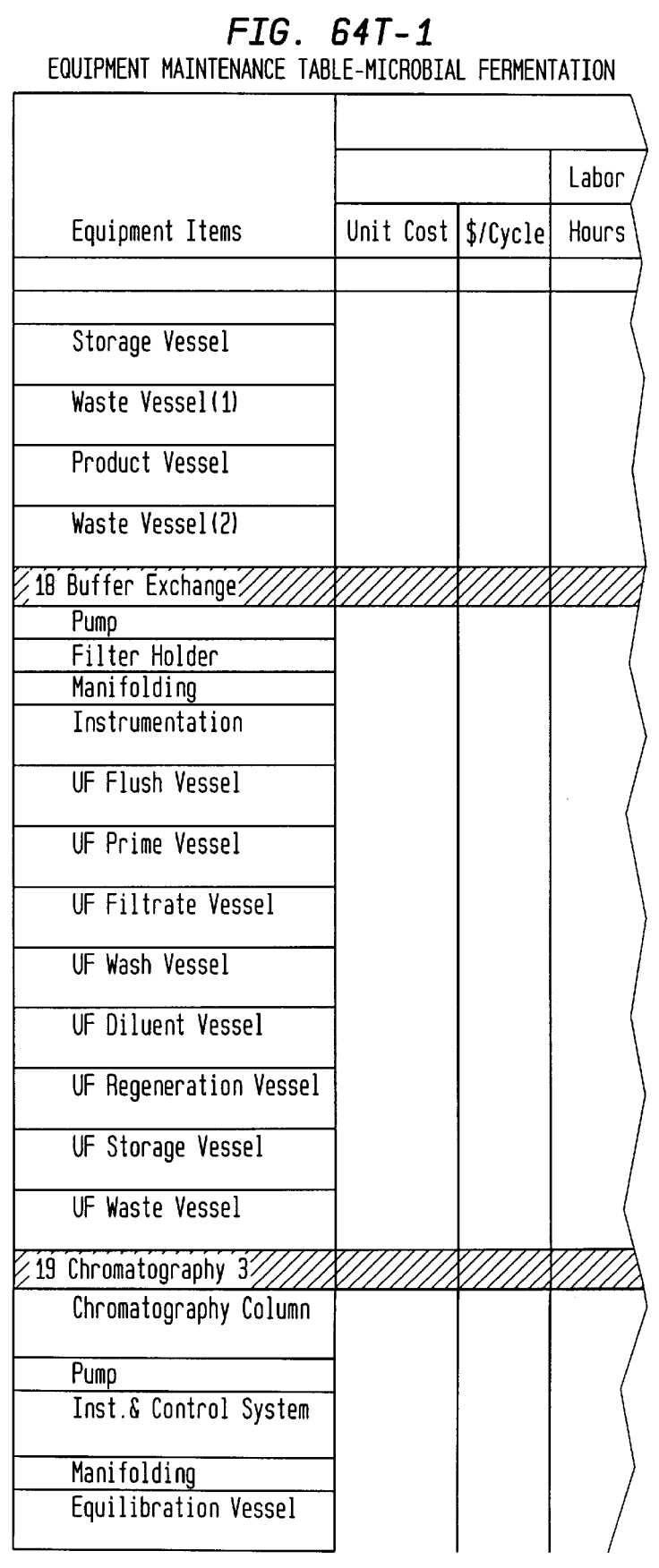

EQUIPMENT MAINTENANCE TABLE-MICROBIAL FERMENTATION

| Equipment Items | Unit Cost | $/Cycle | Labor Hours |
|---|---|---|---|
| | | | |
| | | | |
| Storage Vessel | | | |
| Waste Vessel(1) | | | |
| Product Vessel | | | |
| Waste Vessel(2) | | | |
| 18 Buffer Exchange | | | |
| Pump | | | |
| Filter Holder | | | |
| Manifolding | | | |
| Instrumentation | | | |
| UF Flush Vessel | | | |
| UF Prime Vessel | | | |
| UF Filtrate Vessel | | | |
| UF Wash Vessel | | | |
| UF Diluent Vessel | | | |
| UF Regeneration Vessel | | | |
| UF Storage Vessel | | | |
| UF Waste Vessel | | | |
| 19 Chromatography 3 | | | |
| Chromatography Column | | | |
| Pump | | | |
| Inst.& Control System | | | |
| Manifolding | | | |
| Equilibration Vessel | | | |

FIG. 64T-2

EQUIPMENT MAINTENANCE TABLE-MICROBIAL FERMENTATION

| | | | | | | | | |
|---|---|---|---|---|---|---|---|---|
| | | Thermal Media | | | | | | |
| | | Materials | | | | | Labor | |
| | $/Cycle | Item No. | Qty | Cycle Life | Unit Cost | $/Cycle | Hours | $/Cycle |
| | | | | | | | | |
| | | | | | | | | |
| | | | | | | | | |
| | | | | | | | | |

FIG. 64U-1

EQUIPMENT MAINTENANCE TABLE-MICROBIAL FERMENTATION

| Equipment Items | Filters | | | | | |
|---|---|---|---|---|---|---|
| | Materials | | | | | Labor |
| | Item No. | Qty | Cycle Life | Unit Cost | $/Cycle | Hours |
| | | | | | | |
| Wash Vessel | | | | | | |
| Eluent Vessel | | | | | | |
| Regenerate Vessel | | | | | | |
| Storage Vessel | | | | | | |
| Waste Vessel(1) | | | | | | |
| Product Vessel | | | | | | |
| Waste Vessel(2) | | | | | | |
| 20 Buffer Exchange | | | | | | |
| Pump | | | | | | |
| Filter Holder | | | | | | |
| Manifolding | | | | | | |
| Instrumentation | | | | | | |
| UF Flush Vessel | | | | | | |
| UF Prime Vessel | | | | | | |
| UF Filtrate Vessel | | | | | | |
| UF Wash Vessel | | | | | | |
| UF Diluent Vessel | | | | | | |
| UF Regeneration Vessel | | | | | | |
| UF Storage Vessel | | | | | | |
| UF Waste Vessel | | | | | | |
| 21 Chromatography 4 | | | | | | |
| Chromatography Column | | | | | | |
| Pump | | | | | | |

FIG. 64U-2

EQUIPMENT MAINTENANCE TABLE-MICROBIAL FERMENTATION

| | | Gaskets | | | | | | | Bearings |
|---|---|---|---|---|---|---|---|---|---|
| | | Materials | | | | | Labor | | Materials |
| | $/Cycle | Item No. | Qty | Cycle Life | Unit Cost | $/Cycle | Hours | $/Cycle | Item No. |
| | | | | | | | | | |
| | | | | | | | | | |
| | | | | | | | | | |
| | | | | | | | | | |
| | | | | | | | | | |
| | | | | | | | | | |

FIG. 64V-1

EQUIPMENT MAINTENANCE TABLE-MICROBIAL FERMENTATION

| Equipment Items | Qty | Cycle Life | Unit Cost | $/Cycle | Labor Hours |
|---|---|---|---|---|---|
| | | | | | |
| Wash Vessel | | | | | |
| Eluent Vessel | | | | | |
| Regenerate Vessel | | | | | |
| Storage Vessel | | | | | |
| Waste Vessel(1) | | | | | |
| Product Vessel | | | | | |
| Waste Vessel(2) | | | | | |
| 20 Buffer Exchange | | | | | |
| Pump | | | | | |
| Filter Holder | | | | | |
| Manifolding | | | | | |
| Instrumentation | | | | | |
| UF Flush Vessel | | | | | |
| UF Prime Vessel | | | | | |
| UF Filtrate Vessel | | | | | |
| UF Wash Vessel | | | | | |
| UF Diluent Vessel | | | | | |
| UF Regeneration Vessel | | | | | |
| UF Storage Vessel | | | | | |
| UF Waste Vessel | | | | | |
| 21 Chromatography 4 | | | | | |
| Chromatography Column | | | | | |
| Pump | | | | | |

FIG. 64V-2

EQUIPMENT MAINTENANCE TABLE-MICROBIAL FERMENTATION

| | | | | | | | | | | |
|---|---|---|---|---|---|---|---|---|---|---|
| | | Seals | | | | | | | Belts | |
| | | Materials | | | | | Labor | | Materials | |
| | $/Cycle | Item No. | Qty | Cycle Life | Unit Cost | $/Cycle | Hours | $/Cycle | Item No. | Qty |
| | | | | | | | | | | |
| | | | | | | | | | | |
| | | | | | | | | | | |
| | | | | | | | | | | |

FIG. 64W-1

EQUIPMENT MAINTENANCE TABLE-MICROBIAL FERMENTATION

| Equipment Items | Cycle Life | Unit Cost | $/Cycle | Labor Hours |
|---|---|---|---|---|
| | | | | |
| Wash Vessel | | | | |
| Eluent Vessel | | | | |
| Regenerate Vessel | | | | |
| Storage Vessel | | | | |
| Waste Vessel (1) | | | | |
| Product Vessel | | | | |
| Waste Vessel (2) | | | | |
| 20 Buffer Exchange | | | | |
| Pump | | | | |
| Filter Holder | | | | |
| Manifolding | | | | |
| Instrumentation | | | | |
| UF Flush Vessel | | | | |
| UF Prime Vessel | | | | |
| UF Filtrate Vessel | | | | |
| UF Wash Vessel | | | | |
| UF Diluent Vessel | | | | |
| UF Regeneration Vessel | | | | |
| UF Storage Vessel | | | | |
| UF Waste Vessel | | | | |
| 21 Chromatography 4 | | | | |
| Chromatography Column | | | | |
| Pump | | | | |

*FIG. 64W-2*

EQUIPMENT MAINTENANCE TABLE-MICROBIAL FERMENTATION

| | Shafts | | | | | | | Lubricant | | |
|---|---|---|---|---|---|---|---|---|---|---|
| | Materials | | | | | Labor | | Materials | | |
| $/Cycle | Item No. | Qty | Cycle Life | Unit Cost | $/Cycle | Hours | $/Cycle | Item No. | Qty | Cycle Life |
| | | | | | | | | | | |

FIG. 64X-1

EQUIPMENT MAINTENANCE TABLE-MICROBIAL FERMENTATION

| Equipment Items | Unit Cost | $/Cycle | Labor Hours |
|---|---|---|---|
| | | | |
| Wash Vessel | | | |
| Eluent Vessel | | | |
| Regenerate Vessel | | | |
| Storage Vessel | | | |
| Waste Vessel (1) | | | |
| Product Vessel | | | |
| Waste Vessel (2) | | | |
| 20 Buffer Exchange | | | |
| Pump | | | |
| Filter Holder | | | |
| Manifolding | | | |
| Instrumentation | | | |
| UF Flush Vessel | | | |
| UF Prime Vessel | | | |
| UF Filtrate Vessel | | | |
| UF Wash Vessel | | | |
| UF Diluent Vessel | | | |
| UF Regeneration Vessel | | | |
| UF Storage Vessel | | | |
| UF Waste Vessel | | | |
| 21 Chromatography 4 | | | |
| Chromatography Column | | | |
| Pump | | | |

FIG. 64X-2

EQUIPMENT MAINTENANCE TABLE-MICROBIAL FERMENTATION

| | Thermal Media | | | | | | |
|---|---|---|---|---|---|---|---|
| | Materials | | | | | Labor | |
| $/Cycle | Item No. | Qty | Cycle Life | Unit Cost | $/Cycle | Hours | $/Cycle |
| | | | | | | | |
| | | | | | | | |
| | | | | | | | |
| | | | | | | | |

FIG. 64Y-1

EQUIPMENT MAINTENANCE TABLE-MICROBIAL FERMENTATION

| | Filters | | | | | |
|---|---|---|---|---|---|---|
| | Materials | | | | | Labor |
| Equipment Items | Item No. | Qty | Cycle Life | Unit Cost | $/Cycle | Hours |
| | | | | | | |
| Inst.& Control System | | | | | | |
| Manifolding | | | | | | |
| Equilibration Vessel | | | | | | |
| Wash Vessel | | | | | | |
| Eluent Vessel | | | | | | |
| Regenerate Vessel | | | | | | |
| Storage Vessel | | | | | | |
| Waste Vessel(1) | | | | | | |
| Product Vessel | | | | | | |
| Waste Vessel(2) | | | | | | |
| 22 Sterile Filtration | | | | | | |
| MF Wash Vessel | | | | | | |
| Pump | | | | | | |
| Filter Holder | | | | | | |
| Manifolding | | | | | | |
| Instrumentation | | | | | | |
| MF Flush Vessel | | | | | | |
| MF Prime Vessel | | | | | | |
| MF Filtrate Vessel | | | | | | |
| MF Wash Vessel | | | | | | |

FIG. 64Y-2

EQUIPMENT MAINTENANCE TABLE-MICROBIAL FERMENTATION

| | Gaskets | | | | | | | Bearings |
|---|---|---|---|---|---|---|---|---|
| | Materials | | | | | Labor | | Materials |
| $/Cycle | Item No. | Qty | Cycle Life | Unit Cost | $/Cycle | Hours | $/Cycle | Item No. |
| | | | | | | | | |
| | | | | | | | | |
| | | | | | | | | |
| | | | | | | | | |

FIG. 64Z-1

EQUIPMENT MAINTENANCE TABLE-MICROBIAL FERMENTATION

| Equipment Items | Qty | Cycle Life | Unit Cost | $/Cycle | Labor Hours |
|---|---|---|---|---|---|
| | | | | | |
| Inst.& Control System | | | | | |
| Manifolding | | | | | |
| Equilibration Vessel | | | | | |
| Wash Vessel | | | | | |
| Eluent Vessel | | | | | |
| Regenerate Vessel | | | | | |
| Storage Vessel | | | | | |
| Waste Vessel(1) | | | | | |
| Product Vessel | | | | | |
| Waste Vessel(2) | | | | | |
| 22 Sterile Filtration | | | | | |
| MF Wash Vessel | | | | | |
| Pump | | | | | |
| Filter Holder | | | | | |
| Manifolding | | | | | |
| Instrumentation | | | | | |
| MF Flush Vessel | | | | | |
| MF Prime Vessel | | | | | |
| MF Filtrate Vessel | | | | | |
| MF Wash Vessel | | | | | |

FIG. 64Z-2

EQUIPMENT MAINTENANCE TABLE-MICROBIAL FERMENTATION

| | Seals | | | | | | | Belts | |
|---|---|---|---|---|---|---|---|---|---|
| | Materials | | | | | Labor | | Materials | |
| $/Cycle | Item No. | Qty | Cycle Life | Unit Cost | $/Cycle | Hours | $/Cycle | Item No. | Qty |
| | | | | | | | | | |

FIG. 64AA-1

EQUIPMENT MAINTENANCE TABLE-MICROBIAL FERMENTATION

| Equipment Items | Cycle Life | Unit Cost | $/Cycle | Labor Hours |
|---|---|---|---|---|
| | | | | |
| Inst.& Control System | | | | |
| Manifolding | | | | |
| Equilibration Vessel | | | | |
| Wash Vessel | | | | |
| Eluent Vessel | | | | |
| Regenerate Vessel | | | | |
| Storage Vessel | | | | |
| Waste Vessel(1) | | | | |
| Product Vessel | | | | |
| Waste Vessel(2) | | | | |
| 22 Sterile Filtration | | | | |
| MF Wash Vessel | | | | |
| Pump | | | | |
| Filter Holder | | | | |
| Manifolding | | | | |
| Instrumentation | | | | |
| MF Flush Vessel | | | | |
| MF Prime Vessel | | | | |
| MF Filtrate Vessel | | | | |
| MF Wash Vessel | | | | |

FIG. 64AA-2

EQUIPMENT MAINTENANCE TABLE-MICROBIAL FERMENTATION

| | Shafts | | | | | | | Lubricant | | |
|---|---|---|---|---|---|---|---|---|---|---|
| | Materials | | | | | Labor | | Materials | | |
| $/Cycle | Item No. | Qty | Cycle Life | Unit Cost | $/Cycle | Hours | $/Cycle | Item No. | Qty | Cycle Life |
| | | | | | | | | | | |
| | | | | | | | | | | |
| | | | | | | | | | | |

FIG. 64AB-1

EQUIPMENT MAINTENANCE TABLE-MICROBIAL FERMENTATION

| Equipment Items | Unit Cost | $/Cycle | Labor Hours |
|---|---|---|---|
| | | | |
| Inst.& Control System | | | |
| Manifolding | | | |
| Equilibration Vessel | | | |
| Wash Vessel | | | |
| Eluent Vessel | | | |
| Regenerate Vessel | | | |
| Storage Vessel | | | |
| Waste Vessel(1) | | | |
| Product Vessel | | | |
| Waste Vessel(2) | | | |
| 22 Sterile Filtration | | | |
| MF Wash Vessel | | | |
| Pump | | | |
| Filter Holder | | | |
| Manifolding | | | |
| Instrumentation | | | |
| MF Flush Vessel | | | |
| MF Prime Vessel | | | |
| MF Filtrate Vessel | | | |
| MF Wash Vessel | | | |

FIG. 64AB-2

EQUIPMENT MAINTENANCE TABLE-MICROBIAL FERMENTATION

| | Thermal Media | | | | | | |
|---|---|---|---|---|---|---|---|
| | Materials | | | | | Labor | |
| $/Cycle | Item No. | Qty | Cycle Life | Unit Cost | $/Cycle | Hours | $/Cycle |
| | | | | | | | |

*FIG. 65A-1*

MASTER PROCESS PARAMETERS TABLE-BLOPHARMACEUTICAL

| | Unit Operation Type | Group 1 Parameter | Soln. | | Parameter |
|---|---|---|---|---|---|
| T1 | Inoculum Prep | Number of Flasks<br>Media Volume/Flask | | 2<br>0.25 Liters | Temperature<br>Agitation<br>Duration |
| T2 | Flask Growth | Scale Up Ratio<br>Media Volume/Flask | | 10 Fold<br>1.25 L | Temperature<br>Agitation<br>Duration |
| T3 | Fermentation Production | Scale Up Ratio<br>Fermentor Working Volume<br>Antifoam A<br>Antifoam B<br>Base<br>Acid | <br>S-101<br>S-102<br>S-103<br>S-104<br>S-105 | 10 Fold<br>500 Liters<br>1 Ml/L<br>1 Ml/L<br>5 Ml/L<br>5 Ml/L | Growth Temperature<br>Agitation<br>Sparge Rate<br>Back Pressure<br>Total Duration |
| T4 | Initial Seeding | Number of Ampules<br>Volume Per Ampule<br>Starting Cell Density<br>Ampule Split Ratio<br>Culture Vessel Type<br>Feed Volume | | 2<br>2 Ml<br>300,000 Cells/Ml<br>1 Vessels/Ampule<br>Roll. Bot.<br>100 Ml | Serum Content<br>Feed Rate<br><br>Days to Confluence |
| T5 | Culture Vessel Split | Vessel Split Ratio<br>New Vessel Type<br>Feed Volume<br>Serum Content | | 2<br>RB<br>100 Ml<br>2.0% Fetal Bovine Serum | Feed Rate<br><br>Days to Confluence |
| T6 | Spinner Flask Seeding | Flask Feed Volume<br>Vessel/Flask Ratio<br>uCarrier Density<br>Number of PBS Washes<br>Number of Media Washes<br>No.of Media/Serum Washes | | 4 Liters<br>0.1 L Cells/L Flask<br>5 Gm/Liter<br>2<br>1<br>2 FBS | Serum Content<br>Feed Rate<br><br>Days to Confluence |
| T7 | Biosynthesis Bioreactor Preparation (Stirred Tank Reactor) | Reactor Feed Volume<br>Spinner/Reactor Ratio<br>uCarrier Density<br>Number of PBS Washes<br>Number of Media Washes<br>No.of Media/Serum Washes | | 500 Liters<br>8.3<br>5 Gm/Liter<br>2<br>1<br>2 | Serum Content<br>Feed Rate<br><br>Days to Confluence<br>Serum Free Media Washes |
| T8 | Biosynthesis Bioreactor Preparation (Hollow Fiber Reactor) | Reactor Feed Volume<br>Number of PBS Washes<br>Number of Media Washes<br>No.of Media/Serum Washes<br>Serum Content | | 100 Liters<br>2<br>2<br>2<br>2.0% Fetal Bovine Serum | Number of Reactors<br>Feed Rate<br><br>Days to Confluence |
| T9 | Biosynthesis Bioreactor Preparation (Fluidized Bed Reactor) | Reactor Feed Volume<br>uCarrier Density<br>Number of PBS Washes<br>Number of Media Washes<br>No.of Media/Serum Washes<br>Serum Content | | Liters<br>Gms/L | Number of Reactors<br>Feed Rate<br><br>Days to Confluence |
| T10 | Initial seeding | Number of Ampules<br>Volume Per Ampule<br>Starting Cell Density<br>Ampule Split Ratio | | 2<br>2 Ml<br>300,000 Cells/Ml<br>1 Vessels/Ampule | Serum Content<br>Feed Rate<br><br>Days to Confluence |

FIG. 65A-2

MASTER PROCESS PARAMETERS TABLE-BLOPHARMACEUTICAL

| Group 2 | | | Group 3 | | |
|---|---|---|---|---|---|
| | Soln. | | Parameter | Soln. | |
| | | | | | |
| | | 37 C<br>200 RPM<br>18 Hours | Final OD | | 12 |
| | | 37 C<br>200 Hours<br>18 RPM | Final OD | | 12 |
| | | 37 Hours<br>1 HP/100L<br>1.5 VVM<br>5 PSIG<br>21 Hrs | Final OD<br>Dry Cell Mass<br>Product Concentration<br>CIP | | 12<br>9.96 Gms TDCM/L<br>0.3 Gms Product/L<br>Y |
| | | 2.0% Fetal Bovine Serum<br>1 Feed per vessel per<br>2 Days<br>2 Days | Amplification Factor | | 100% |
| | | 1 Feed per vessel per<br>2 Days<br>2 Days | Amplification Factor | | 100% |
| | | 2.0% Fetal Bovine Serum<br>1 Feed per vessel per<br>2 Days<br>2 Days | Amplification Factor | | 100% |
| | | 2.0% Fetal Bovine Serum<br>1 Feed per vessel per<br>2 Days<br>10 Days<br>2 | Product Concentration<br>Total Protein Concen. | | 2500% Mg Prod/L<br>0.125 Mg TP/Ml |
| | | 1<br>1 Feed per vessel per<br>1 Days<br>10 Days | Harvest Volume<br>Product Concentration<br>Total Protein Concen. | | 500% Liters<br>25 Mg Prod/L<br>0.125 Mg TP/Ml |
| | | 1<br>1 Feed per vessel per<br>1 Days<br>10 Days | Product Concentration<br>Total Protein Concen. | | 2500% Mg Prod/L<br>0.125 Mg TP/Ml |
| | | 2.0% Fetal Bovine Serum<br>1 Feed per vessel per<br>2 Days<br>2 Days | Amplification Factor | | 100% |

*FIG. 65B-1*

MASTER PROCESS PARAMETERS TABLE-BLOPHARMACEUTICAL

| | Unit Operation Type | Group 1 | | | |
|---|---|---|---|---|---|
| | | Parameter | Soln. | | Parameter |
| | | | | | |
| | | Culture Vessel Type<br>Feed Volume | | Roll. Bot.<br>100 Ml | PBS Washes<br>Trypsin Wash |
| T11 | Culture Vessel Split | Vessel Split Ratio<br>New Vessel Type<br>Feed Volume<br>Serum Content | | 2<br>RB<br>100 Ml<br>2.0% Fetal Bovine Serum | Feed Rate<br><br>Days to Confluence<br>PBS Washes<br>Trypsin Wash |
| T12 | Spinner Flask Split | Flask Feed Volume<br>Vessel/Flask Ratio<br>uCarrier Density<br>Number of PBS Washes<br>Number of Media Washes<br>No. of Media/Serum Washes | | 4 Liters<br>0.1 L Cells/L Flask<br>5 Gm/Liter<br>2<br>1<br>2 | Serum Content<br>Feed Rate<br><br>Days to Confluence |
| T13 | Biosynthesis Bioreactor Preparation (Stirred Tank Reactor) | Reactor Feed Volume<br>Spinner/Reactor Ratio<br>uCarrier Density<br>Number of PBS Washes<br>Number of Media Washes<br>No. of Media/Serum Washes | | 500 Liters<br>8.3<br>5 Gm/Liter<br>2<br>1<br>2 | Serum Content<br>Feed Rate<br><br>Days to Confluence<br>Serum Free Media Washes |
| T14 | Biosynthesis Bioreactor Preparation (Fluidized Bed Reactor) | Reactor Feed Volume<br>uCarrier Density<br>Number of PBS Washes<br>Number of Media Washes<br>No. of Media/Serum Washes<br>Serum Content | | Liters<br>Gms/L | Number of Reactors<br>Feed Rate<br><br>Days to Confluence |
| T15 | Intial Coupling | Flask Feed Volume<br>Vessel/Flask Ratio<br>uCarrier Density<br>Number of PBS Washes<br>Number of Media Washes<br>No.of Media/Serum Washes | | 4 Liters<br>0.1 L Cells/L Flask<br>5 Gm/Liter<br>2<br>1<br>2 FBS | Serum Content<br>Feed Rate<br><br>Days to Confluence |
| T16 | Additional Coupling | Reactor Feed Volume<br>Spinner/Reactor Ratio<br>uCarrier Density<br>Number of PBS Washes<br>Number of Media Washes<br>No.of Media/Serum Washes | | 500 Liters<br>8.3<br>5 Gm/Liter<br>2<br>1<br>2 | Serum Content<br>Feed Rate<br><br>Days to Confluence<br>Serum Free Media Washes |
| T17 | Peptide Cleavage | Reactor Feed Volume<br>Number of PBS Washes<br>Number of Media Washes<br>No.of Media/Serum Washes<br>Serum Content | | 100 Liters<br>2<br>2<br>2<br>2.0% Fetal Bovine Serum | Number of Reactors<br>Feed Rate<br><br>Days to Confluence |
| T18 | Tissue Thawing | Crude Product Yield<br>Environmental Temperature<br>Thaw Duration | | 25 Gm Crude Prod./Kg Tissue<br>25 C<br>16 Hours | Contaminant Protein Conc. |
| T19 | Homogenization | Crude Product Yield<br>Liquid/Solid Ratio<br>Hommogenization Temp.<br>Hommogenizer Type<br>Energy Input<br>Duration | | 25 Gm Crude Prod./Kg Tissue<br>10 L Solution/Kg Tissue<br>4 C<br>RS<br>200 HP/100L/Hr<br>4 Hours | Contaminant Protein Conc. |
| T20 | Liquid Thawing | | | | |

FIG. 65B-2

MASTER PROCESS PARAMETERS TABLE-BLOPHARMACEUTICAL

| Group 2 | | | Group 3 | | |
|---|---|---|---|---|---|
| | Soln. | | Parameter | Soln. | |
| | | | | | |
| | | 200 Ml<br>100 Ml | | | |
| | | 1 Feed per vessel per<br>2 Days<br>2 Days<br>200 Ml<br>100 Ml | Amplification Factor | | 100% |
| | | 2.0% Fetal Bovine Serum<br>1 Feed per vessel per<br>2 Days<br>2 Days | Amplification Factor | | 100% |
| | | 2.0% Fetal Bovine Serum<br>1 Feed per vessel per<br>2 Days<br>10 Days<br>2 Days | Product Concentration<br>Total Protein Concen. | | 2500% Mg Prod/L<br>0.125 Mg TP/Ml |
| | | 1<br>1 Feed per vessel per<br>1 Days<br>10 Days | Product Concentration<br>Total Protein Concen. | | 2500% Mg Prod/L<br>0.125 Mg TP/Ml |
| | | 2.0% Fetal Bovine Serum<br>1 Feed per vessel per<br>2 Days<br>2 Days | Amplification Factor | | 100% |
| | | 2.0% Fetal Bovine Serum<br>1 Feed per vessel per<br>2 Days<br>10 Days<br>2 | Product Concentration<br>Total Protein Concen. | | 2500% Mg Prod/L<br>0.125 Mg TP/Ml |
| | | 1<br>1 Feed per vessel per<br>1 Days<br>10 Days | Harvest Volume<br>Product Concentration<br>Total Protein Concen. | | 500% Liters<br>25 Mg Prod/L<br>0.125 Mg TP/Ml |
| | | 100 Gm/L | Temperature Regulation<br>CIP<br>SIP | | Y<br>Y<br>Y |
| | | 100 Gm/L | Temperature Regulation<br>CIP<br>SIP | | Y<br>Y<br>Y |
| | | | Amplification Factor | | 100% |

FIG. 65C-1

MASTER PROCESS PARAMETERS TABLE-BLOPHARMACEUTICAL

| | Unit Operation Type | Group 1 | | | |
|---|---|---|---|---|---|
| | | Parameter | Soln. | | Parameter |
| T21 | Product Ppt by Solids | Reagent<br>Concentration | | 1 M | Kgms of Reagent/Liters Product<br>Temperature<br>Addition Time<br>Additional Mix Time |
| T22 | Product Ppt by Liquids | Reagent<br>Concentration | | 1 M | Liters Reagent/Liters Product<br>Temperature<br>Addition Time<br>Additional Mix Time |
| T23 | Contaminant Ppt by Solids | Reagent<br>Concentration | | 1 M | Kgms of Reagent/Liters Product<br>Temperature<br>Addition Time<br>Additional Mix Time |
| T24 | Contaminant Ppt by Liquids | Reagent<br>Concentration | | 1 M | Liters Reagent/Liters Product<br>Temperature<br>Addition Time<br>Additional Mix Time |
| T25 | Solids Harvest<br>Tangential Flow MF | Porosity<br>Average Flux Rate<br><br><br>Total Throughput<br>Filtration Time | | 0.2 Micron<br>11 L/SF/HR at<br>40 Psig at<br>4 C<br>400 Liters/SF<br>1 HR | Flush<br>Prime<br>Concentration Factor<br>Wash<br>Regenerate<br>Store |
| T26 | Continuous Centrifugation<br>Solids Harvest | System Void Volume | | 5 Liters | RCF<br>Time<br>Volume Reduction<br>Wash Volume |
| T27 | Continuous Centrifugation<br>Supematant Harvest | System Void Volume | | 6 Liters | RCF<br>Time<br>Volume Reduction<br>Wash Volume |
| T28 | Dilution | System Void Volume | | 6 Liters | RCF<br>Time<br>Volume Reduction<br>Wash Volume |
| T29 | Batch Centrifugation<br>Solids Harvest | System Void Volume | | 6 Liters | RCF<br>Time<br>Volume Reduction<br>Wash Volume |

FIG. 65C-2

MASTER PROCESS PARAMETERS TABLE-BLOPHARMACEUTICAL

| Group 2 | | | Group 3 | | |
|---|---|---|---|---|---|
| | Soln. | | Parameter | Soln. | |
| | | | | | |
| | | | | | |
| | | 0.25 Kg/L<br>4 C<br>0.5 Hours<br>2 Hours | Step Recovery of Product<br>Step Recovery of T.P.<br>Temperature Regulation<br>CIP<br>SIP | | 95%<br>95%<br>Y<br>Y<br>Y |
| | | 0.25 L/L<br>4 C<br>0.5 Hours<br>2 Hours | Step Recovery of Product<br>Step Recovery of T.P.<br>Temperature Regulation<br>CIP<br>SIP | | 95%<br>95%<br>Y<br>Y<br>Y |
| | | 0.25 Kg/L<br>4 C<br>0.5 Hours<br>2 Hours | Step Recovery of Product<br>Step Recovery of T.P.<br>Temperature Regulation<br>CIP<br>SIP | | 95%<br>95%<br>Y<br>Y<br>Y |
| | | 0.25 L/L<br>4 C<br>0.5 Hours<br>2 Hours | Step Recovery of Product<br>Step Recovery of T.P.<br>Temperature Regulation<br>CIP<br>SIP | | 95%<br>95%<br>Y<br>Y<br>Y |
| | | 2 L/SF<br>2 L/SF<br>10 Fold<br>0.5 L/SF<br>1 L/SF<br>2 L/SF | Step Recovery of Product<br>Step Recovery of T.P.<br>Temperature Regulation<br>CIP<br>SIP | | 95%<br>95%<br>Y<br>Y<br>Y |
| | | 10,000 X G<br>60 Minutes<br>30 X Vol. Reduction<br>0.2 X System Void Volume | Step Recovery of Product<br>Step Recovery of T.P.<br>Temperature Regulation<br>CIP<br>SIP | | 95%<br>95%<br>Y<br>Y<br>Y |
| | | 10,000 X G<br>30 Minutes<br>0.062 X Vol. Reduction<br>1.5 X System Void Volume | Step Recovery of Product<br>Step Recovery of T.P.<br>Temperature Regulation<br>CIP<br>SIP | | 85%<br>0.3<br>Y<br>Y<br>Y |
| | | 10,000 X G<br>30 Minutes<br>16 X Vol. Reduction<br>1.5 X System Void Volume | Step Recovery of Product<br>Step Recovery of T.P.<br>Temperature Regulation<br>CIP<br>SIP | | 95%<br>0.95<br>Y<br>Y<br>Y |
| | | 10,000 X G<br>30 Minutes<br>16 X Vol. Reduction<br>1.5 X System Void Volume | Step Recovery of Product<br>Step Recovery of T.P.<br>Temperature Regulation<br>CIP | | 95%<br>0.95<br>Y<br>Y |

FIG. 65D-1

MASTER PROCESS PARAMETERS TABLE-BLOPHARMACEUTICAL

| | Unit Operation Type | Group 1 | | | |
|---|---|---|---|---|---|
| | | Parameter | Soln. | | Parameter |
| | | | | | |
| | | | | | |
| T30 | Batch Centrifugation<br>Supematent Harvest | System Void Volume | | 6 Liters | RCF<br>Time<br>Volume Reduction<br>Wash Volume |
| T31 | Cell Disruption<br>High Press. Homogen. | Product Temperature<br>Utility Temperature<br>Void Volume | | 8 C<br>2 C<br>5 Liter | Number of Passes<br>Pressure<br>Flow Rate<br>Temperature Increase |
| T32 | Cell Disruption<br>Bead Mill | Number of Passes<br>Bead Size<br>Void Volume<br>Flow Rate | | 2<br><br><br>0.5 LPM | |
| T33 | Cell Disruption<br>Chemical Lysis | Reagent<br>Temperature<br>Exposure Time | | 0.5 M NaOH<br>4 C<br>2 Hours | Liters Reagent/Gm Product<br>Titration |
| T34 | Microfiltration<br>Tangential Flow | Porosity<br>Average Flux Rate<br><br><br>Total Throughput<br>Filtration Time | | 0.2 Micron<br>50 L/SF/HR at<br>40 Psig at<br>4 C<br>400 Liters/SF<br>2 HR | Flush<br>Prime<br>Wash<br>Solids<br>Regenerate<br>Store |
| T35 | Microfiltration<br>Dead End | Porosity<br>Average Flux Rate<br><br><br>Total Throughput<br>Filtration Time | | 0.2 Micron<br>50 L/SF/HR at<br>40 Psig at<br>4 C<br>400 Liters/SF<br>0.5 HR | Flush<br>Prime<br>Wash<br>Solids<br>Regenerate<br>Store |
| T36 | Ultrafiltration<br>Concentration/Dilution | Porosity<br>Average Flux Rate<br><br><br>Concentration Time | | 60 K NMWL<br>3 L/SF/HR at<br>40 Psig at<br>4 C<br>2 HR | Flush<br>Prime<br>Wash<br>Dilute Concentrate<br>Solids<br>Regenerate |
| T37 | Ultrafiltration<br>Flow Dialysis | Porosity<br>Average Flux Rate<br><br><br>Dialysis Time | | 60 K NMWL<br>3 L/SF/HR at<br>40 Psig at<br>4 C<br>2 HR | Flush<br>Prime<br>Dialysis Buffer<br>Wash<br>Solids<br>Regenerate |
| T38 | Prod.Ads.Chromatography<br>HPLC | Column Capacity<br>Column Oversize Factor<br>Column Aspect Ratio<br>Max. Linear Velocity | | 10 MG Prod./MI Of Packing<br>1.5 Fold<br>0.37 H/D<br>100 Cm/Hr at<br>45 Psig and<br>4 C | Column Equilibration<br>Column Wash<br>Column Elute A<br>Column Elute B<br>Column Regenerate<br>Column Store |
| T39 | Prod.Ads.Chromatography<br>MPLC | Column Capacity<br>Column Oversize Factor | | 10 MG Prod./MI Of Packing<br>1.5 Fold | Column Equilibration<br>Column Wash |

FIG. 65D-2

MASTER PROCESS PARAMETERS TABLE-BLOPHARMACEUTICAL

| Group 2 | | | Group 3 | | |
|---|---|---|---|---|---|
| | Soln. | | Parameter | Soln. | |
| | | | | | |
| | | | SIP | | Y |
| | | 10,000 XG<br>30 Minutes<br>16 X Vol.Reduction<br>1.5 X System Void Volume | Step Recovery of Product<br>Step Recovery of T.P.<br>Temperature Regulation<br>CIP<br>SIP | | 95%<br>0.95<br>Y<br>Y<br>Y |
| | | 6 Times<br>12,000 PSI<br>5 LPM<br>1.8 Degrees C/1,000 PSI | Rinse<br>Step Recovery of Product<br>Step Recovery of T.P.<br>Temperature Regulation<br>CIP<br>SIP | | 500% Void Volumes<br>95%<br>95%<br>Y<br>Y<br>Y |
| | | | Step Recovery of Product<br>Step Recovery of T.P.<br>Temperature Regulation<br>CIP<br>SIP | | 95%<br>Y<br>Y<br>Y |
| | | 0.4 L/Gm<br>0 MI/Liter | Step Recovery of Product<br>Step Recovery of T.P.<br>Temperature Regulation<br>CIP<br>SIP | | 95%<br>Y<br>Y<br>Y |
| | | 2.00 L/SF<br>2.00 L/SF<br>0.50 L/SF<br>0.30% Of Product Solution<br>1.00 L/SF<br>2.00 L/SF | Step Recovery of Product<br>Step Recovery of T.P.<br>Temperature Regulation<br>CIP<br>SIP | | 95%<br>95%<br>Y<br>Y<br>Y |
| | | 0 L/SF<br>0 L/SF<br>0.50 L/SF<br>0.003 Of Product Solution<br>1 L/SF<br>2 L/SF | Step Recovery of Product<br>Step Recovery of T.P.<br>Temperature Regulation<br>CIP<br>SIP | | 95%<br>0.95%<br>N<br>N<br>N |
| | | 2.00 L/SF<br>2.00 L/SF<br>0.50 L/SF<br>10.0 Fold<br>0.30% Of Product Solution<br>1.00 L/SF | Store<br>Step Recovery of Product<br>Step Recovery of T.P.<br>Temperature Regulation<br>CIP<br>SIP | | 2.00 L/SF<br>95%<br>95%<br>Y<br>Y<br>Y |
| | | 2 L/SF<br>2.00 L/SF<br>5.0 X Feed Stream Volume<br>0.50 L/SF<br>0.30% Of Product Solution<br>1.00 L/SF | Store<br>Step Recovery of Product<br>Step Recovery of T.P.<br>Temperature Regulation<br>CIP<br>SIP | | 200% L/SF<br>95%<br>95%<br>Y<br>Y<br>Y |
| | | 5 Column Volumes<br>3 Column Volumes<br>3 Column Volumes<br>0 Column Volumes<br>1 Column Volumes<br>2 Column Volumes | Prod.Elution Volume<br>Step Recovery of Product<br>Step Recovery of T.P.<br>Temperature Regulation<br>CIP<br>SIP | | 80%<br>95%<br>95%<br>N<br>Y<br>Y |
| | | 5 Column Volumes<br>3 Column Volumes | Prod.Elution Volume<br>Step Recovery of Product | | 80%<br>95% |

*FIG. 65E-1*

MASTER PROCESS PARAMETERS TABLE-BLOPHARMACEUTICAL

| | Unit Operation Type | Parameter | Soln. | | Parameter |
|---|---|---|---|---|---|
| | | Column Aspect Ratio<br>Max. Linear Velocity | | 0.37 H/D<br>100 Cm/Hr at<br>45 Psig and<br>4 C | Column Elute A<br>Column Elute B<br>Column Regenerate<br>Column Store |
| T40 | Prod.Ads.Chromatography LPLC | Column Capacity<br>Column Oversize Factor<br>Column Aspect Ratio<br>Max. Linear Velocity | | 10 MG Prod./Ml Of Packing<br>1.5 Fold<br>0.37 H/D<br>100 Cm/Hr at<br>45 Psig and<br>4 C | Column Equilibration<br>Column Wash<br>Column Elute A<br>Column Elute B<br>Column Regenerate<br>Column Store |
| T41 | Cont.Ads.Chromatography HPLC | Column Capacity<br>Column Oversize Factor<br>Column Aspect Ratio<br>Max. Linear Velocity | | 30 MG Cont./Ml Of Packing<br>1.5 Fold<br>0.37 H/D<br>100 Cm/Hr at<br>45 Psig and<br>4 C | Column Equilibration<br>Column Wash<br>Column Elute A<br>Column Elute B<br>Column Regenerate<br>Column Store |
| T42 | Cont.Ads.Chromatography MPLC | Column Capacity<br>Column Oversize Factor<br>Column Aspect Ratio<br>Max. Linear Velocity | | 10 MG Cont./Ml Of Packing<br>1.5 Fold<br>0.37 H/D<br>100 Cm/Hr at<br>45 Psig and<br>400% C | Column Equilibration<br>Column Wash<br>Column Elute A<br>Column Elute B<br>Column Regenerate<br>Column Store |
| T43 | Cont.Ads.Chromatography LPLC | Column Capacity<br>Column Oversize Factor<br>Column Aspect Ratio<br>Max. Linear Velocity | | 10 MG Cont./Ml Of Packing<br>1.5 Fold<br>0.37 H/D<br>100 Cm/Hr at<br>45 Psig and<br>4 C | Column Equilibration<br>Column Wash<br>Column Elute A<br>Column Elute B<br>Column Regenerate<br>Column Store |
| T44 | Size Excl.Chromatography HPLC | Load Capacity<br>Length<br>Max. Linear Velocity<br><br><br>Void Volume | | 5% of Total Column Volume<br>100 Cm<br>100 Cm/Hr at<br>45 Psig and<br>4 C<br>25% Column Volume | Column Equilibration<br>Column Wash<br>Column Regenerate<br>Column Store |
| T45 | Size Excl.Chromatography MPLC | Load Capacity<br>Length<br>Max. Linear Velocity<br><br><br>Void Volume | | 5% of Total Column Volume<br>100 Cm<br>100 Cm/Hr at<br>45 Psig and<br>4 C<br>25% Column Volume | Column Equilibration<br>Column Wash<br>Column Regenerate<br>Column Store |
| T46 | Size Excl.Chromatography LPLC | Load Capacity<br>Length<br>Max. Linear Velocity<br><br><br>Void Volume | | 5% of Total Column Volume<br>100 Cm<br>100 Cm/Hr at<br>45 Psig and<br>4 C<br>25% Column Volume | Column Equilibration<br>Column Wash<br>Column Regenerate<br>Column Store |
| T47 | Dilution | Dilution Factor | | 3 Liters/Liter | Dilution Time<br>Additional Mix Time |
| T48 | Resolubilization | Reagent/Product Ratio<br><br><br>Dissolution Time<br>Additional Mix Time | | 0 L/Kg Product<br><br><br>0.50 Hours<br>0.50 Hours | Reagent 1<br>Concentration |

FIG. 65E-2

MASTER PROCESS PARAMETERS TABLE-BLOPHARMACEUTICAL

| Group 2 | | | Group 3 | | |
|---|---|---|---|---|---|
| | Soln. | | Parameter | Soln. | |
| | | | | | |
| | | 3 Column Volumes<br>0 Column Volumes<br>1 Column Volumes<br>2 Column Volumes | Step Recovery of T.P.<br>Temperature Regulation<br>CIP<br>SIP | | 95%<br>N<br>Y<br>Y |
| | | 5 Column Volumes<br>3 Column Volumes<br>3 Column Volumes<br>2 Column Volumes<br>1 Column Volumes<br>2 Column Volumes | Prod. Elution Volume<br>Step Recovery of Product<br>Step Recovery of T.P.<br>Temperature Regulation<br>CIP<br>SIP | | 42%<br>95%<br>95%<br>N<br>Y<br>Y |
| | | 5 Column Volumes<br>3 Column Volumes<br>3 Column Volumes<br>2 Column Volumes<br>1 Column Volumes<br>2 Column Volumes | Prod. Elution Volume<br>Step Recovery of Product<br>Step Recovery of T.P.<br>Temperature Regulation<br>CIP<br>SIP | | 42%<br>95%<br>95%<br>N<br>Y<br>Y |
| | | 5 Column Volumes<br>3 Column Volumes<br>3 Column Volumes<br>2 Column Volumes<br>1 Column Volumes<br>2 Column Volumes | Prod. Elution Volume<br>Step Recovery of Product<br>Step Recovery of T.P.<br>Temperature Regulation<br>CIP<br>SIP | | 42%<br>95%<br>95%<br>N<br>Y<br>Y |
| | | 5 Column Volumes<br>3 Column Volumes<br>3 Column Volumes<br>2 Column Volumes<br>1 Column Volumes<br>2 Column Volumes | Prod. Elution Volume<br>Step Recovery of Product<br>Step Recovery of T.P.<br>Temperature Regulation<br>CIP<br>SIP | | 42% Columns Volumes<br>95%<br>95%<br>N<br>Y<br>Y |
| | | 4 Column Volumes<br>1 Column Volumes<br>1 Column Volumes<br>2 Column Volumes | Prod. Elution Volume<br>Step Recovery of Product<br>Step Recovery of T.P.<br>Temperature Regulation<br>CIP<br>SIP | | 42% Columns Volumes<br>95%<br>95%<br>N<br>Y<br>Y |
| | | 4 Column Volumes<br>1 Column Volumes<br>1 Column Volumes<br>2 Column Volumes | Prod. Elution Volume<br>Step Recovery of Product<br>Step Recovery of T.P.<br>Temperature Regulation<br>CIP<br>SIP | | 42% Columns Volumes<br>95%<br>95%<br>N<br>Y<br>Y |
| | | 4 Column Volumes<br>1 Column Volumes<br>1 Column Volumes<br>2 Column Volumes | Prod. Elution Volume<br>Step Recovery of Product<br>Step Recovery of T.P.<br>Temperature Regulation<br>CIP<br>SIP | | 42% Columns Volumes<br>95%<br>95%<br>N<br>Y<br>Y |
| | | 0.5 Hours<br>1 Hours | Step Recovery of Product<br>Step Recovery of T.P.<br>Temperature Regulation<br>CIP<br>SIP | | 95%<br>95%<br>Y<br>Y<br>Y |
| | | Water<br>Dist. | Step Recovery of Product<br>Step Recovery of T.P.<br>Temperature Regulation<br>CIP<br>SIP | | 95%<br>95%<br>Y<br>Y<br>Y |

FIG. 65F-1

MASTER PROCESS PARAMETERS TABLE-BLOPHARMACEUTICAL

| | Unit Operation Type | Group 1 | | | |
|---|---|---|---|---|---|
| | | Parameter | Soln. | | Parameter |
| | | | | | |
| T49 | Enzymatic Modification | Enzyme to Product Ratio<br><br>Enzyme Concentration<br>Reaction Temp.<br>Reaction Duration | | 0.084 Liters of Enzyme Stock Per Liter of Start Proc. Vol.<br>2 Mg/MI<br>37 Degrees C<br>30 Minutes<br>100% | Titration Solution-1<br>Titration Solution-2<br>Neutralization |
| T50 | Lyophilization | Product Capacity/Load<br>Product Unit Size | | 8 Units<br>100 Grams/Unit | Lyophilization Time<br>Product Weight Reduction |
| T51 | Heat Exchange | Process Initial Temp.<br>Process Final Temp<br>Utility Initial Temp.<br>Utility Final Temp.<br>Process Specific Heat<br>Design Type(P.T.C) | | 98.6 Degrees C<br>39.2 Degrees C<br>34 Degree C<br>5 Degrees C<br>38.6 K BTU/Hr<br>P | Exposure Time |
| T52 | Storage | | | | |
| T53 | Fermentation Seed | Scale Up Ratio<br>Fermentor Working Volume<br>Antifoam A<br>Antifoam B<br>Base<br>Acid | | 10 Fold<br>50 Liters<br>1 MI/L<br>1 MI/L<br>5 MI/L<br>5 MI/L | Growth Temperature<br>Agitation<br>Sparge Rate<br>Back Pressure<br>Total Duration |
| 54 | Initial Seeding | Flask Feed Volume<br>Spinner Split Ratio<br>uCarrier Density<br>Number of PBS Washes<br>Number of Media Washes<br>No. of Media/Serum Washes | | 12 Liters<br>4<br>5 Gm/Liter<br>2<br>1<br>2 FBS | Serum Content<br>Feed Rate<br><br>Days to Confluence |
| 55 | Culture Vessel Split | Flask Feed Volume<br><br>Spinner Split Ratio<br>uCarrier Density<br>Number of PBS Washes<br>Number of Media Washes<br>No. of Media/Serum Washes | | 12 Liters<br><br>4<br>5 Gm/Liter<br>2<br>1<br>2 FBS | Serum Content<br><br>Feed Rate<br><br>Days to Confluence |
| 56 | Culture Flask Split | | | | |
| 57 | Stirred Tank Reactor | | | | |
| 58 | Fluidized Bed Reactor | Process Initial Temp.<br>Process Final Temp<br>Utility Initial Temp | | 37 Degree C<br>4 Degree C<br>2 Degree C | Exposure Time |

FIG. 65F-2

MASTER PROCESS PARAMETERS TABLE-BLOPHARMACEUTICAL

| Group 2 | | | Group 3 | | |
|---|---|---|---|---|---|
| | Soln. | | Parameter | Soln. | |
| | | | | | |
| | | 0.067 L/L Process<br>0.02 L/L Process<br>0.57 L/L Process | Step Recovery of Product<br>Step Recovery of T.P.<br><br>Temperature Regulation<br>CIP<br>SIP | | 95%<br>95%<br><br>Y<br>Y<br>Y |
| | | 18 Hours<br>0.95 | Step Recovery of Product<br>Step Recovery of T.P.<br><br><br>CIP<br>SIP | | 95%<br>95%<br><br>Y<br>Y<br>Y |
| | | 1 Hours | Step Recovery of Product<br>Step Recovery of T.P.<br><br>Temperature Regulation<br>CIP<br>SIP | | 100%<br>100%<br><br>Y<br>Y<br>Y |
| | | | Step Recovery of Product<br>Step Recovery of T.P.<br><br>Temperature Regulation<br>CIP<br>SIP | | 95%<br>95%<br><br>Y<br>Y<br>Y |
| | | 37 Hours<br>1 HP/100L<br>1.5 VVM<br>5 PSIG<br>21 Hrs | Final OD<br>CIP | | 12<br><br><br><br>Y |
| | | 2% FBS<br>1 Feed per vessel per<br>2 Days<br>2 Days | Amplification Factor | | 1 |
| | | 2% FBS<br><br>1 Feed per vessel per<br>2 Days<br>2 Days | Amplification Factor | | 1 |
| | | | | | |
| | | | Step Recovery of Product<br>Step Recovery of T.P.<br><br>CIP<br>SIP | | 0.95<br>95%<br>Y<br>Y<br>Y |
| | | 50% Hours | Step Recovery of Product<br>Step Recovery of T.P. | | 0.95<br>100% |

FIG. 65G-1

MASTER PROCESS PARAMETERS TABLE-BLOPHARMACEUTICAL

| | Unit Operation Type | Group 1 | | | |
|---|---|---|---|---|---|
| | | Parameter | Soln. | | Parameter |
| | | | | | |
| | | Utility Final Temp.<br>Process Specific Heat<br>Design Type(P.T.C) | | 5 Degrees C<br>12 K BTU/Hr<br>P | |
| 59 | Liquid/Liquid Extraction | Liquid/Liquid Ratio<br>Extraction Temperature<br>Addition Duration<br>Additional Mix Duration<br>Mix Energy | | 1 L Extraction/L Product<br>4 C<br>0.5 Hours<br>4 Hours<br>0.3 HP/100 L | Phase Separation Time<br>Product Phase(Top/Bottom)<br>Harvest Time |
| 60 | Solid/Liquid Extraction | Liquid/Liquid Ratio<br>Extraction Temperature<br>Duration<br>Mix Energy | | 1 L Extraction/L Product<br>4 C<br>4 Hours<br>0.3 HP/100 L | Phase Separation Time<br>Product Phase(Top/Bottom)<br>Harvest Time |

FIG. 65G-2

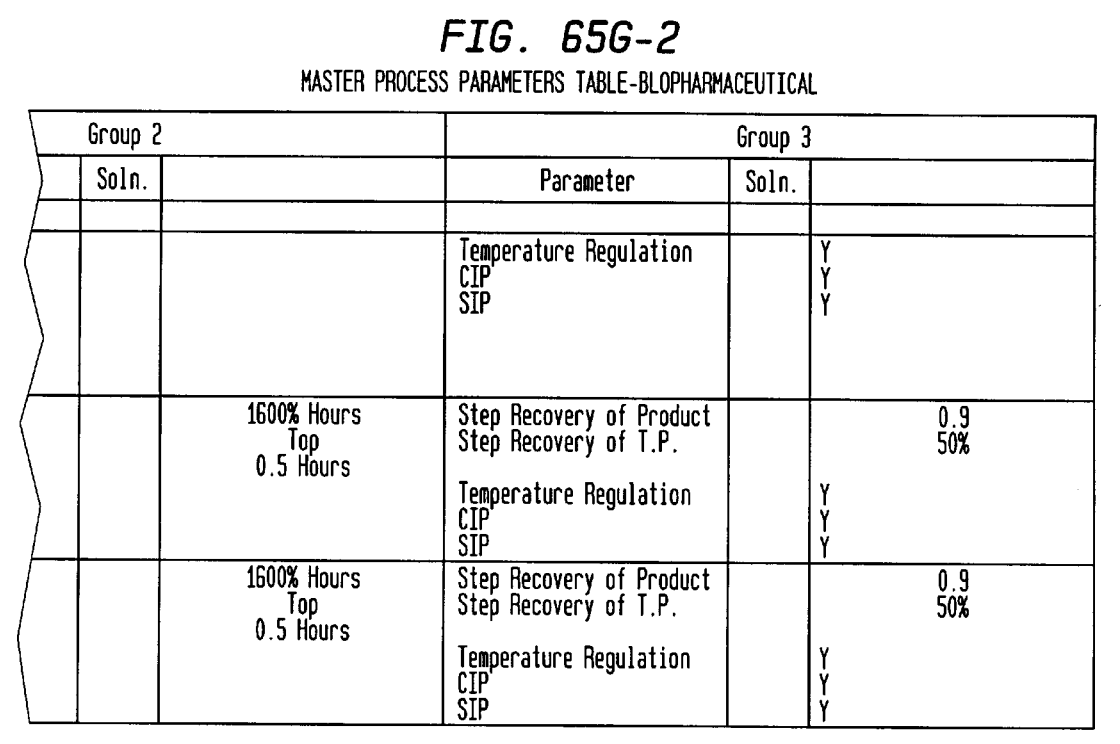

MASTER PROCESS PARAMETERS TABLE-BLOPHARMACEUTICAL

| Group 2 | | | Group 3 | | |
|---|---|---|---|---|---|
| | Soln. | | Parameter | Soln. | |
| | | | | | |
| | | | Temperature Regulation<br>CIP<br>SIP | | Y<br>Y<br>Y |
| | | 1600% Hours<br>Top<br>0.5 Hours | Step Recovery of Product<br>Step Recovery of T.P.<br><br>Temperature Regulation<br>CIP<br>SIP | | 0.9<br>50%<br><br>Y<br>Y<br>Y |
| | | 1600% Hours<br>Top<br>0.5 Hours | Step Recovery of Product<br>Step Recovery of T.P.<br><br>Temperature Regulation<br>CIP<br>SIP | | 0.9<br>50%<br><br>Y<br>Y<br>Y |

SYSTEM AND METHOD FOR SIMULATION, MODELING AND SCHEDULING OF EQUIPMENT MAINTENANCE AND CALIBRATION IN BIOPHARMACEUTICAL BATCH PROCESS MANUFACTURING FACILITIES

CROSS-REFERENCE TO RELATED APPLICATIONS

This application claims priority to U.S. Provisional Patent Application No. 60/050,290, filed Jun. 20, 1997.

This application is related to the following commonly-owned, co-pending applications:

"System and Method for Simulation and Modeling of Biopharmaceutical Batch Process Manufacturing Facilities", by Brown, having application Ser. No. 09/019,777, filed Feb. 6, 1998;

"System and Method for Simulation, Modeling and Scheduling of Solution Preparation in Biopharmaceutical Batch Process Manufacturing Facilities", by Brown, having application Ser. No. 09/100,088, filed concurrently herewith;

"System and Method for Simulation, Modeling and Scheduling of Equipment Preparation in Biopharmaceutical Batch Process Manufacturing Facilities", by Brown, having application Ser. No. 09/100,024, filed concurrently herewith; and "System and Method for Simulation, Modeling and Scheduling of Quality Control Sampling in Biopharmaceutical Batch Process Manufacturing Facilities", by Brown, having application Ser. No. 09/100,232, filed concurrently herewith.

Each of the above applications are incorporated herein by reference in their entirety.

BACKGROUND OF THE INVENTION

1. Field of the Invention

The present invention relates generally to the design of large scale batch manufacturing facilities, and specifically to the design of biopharmaceutical drug manufacturing processes.

2. Related Art

Biopharmaceutical plants produce biopharmaceutical products through biological methods. Typical biopharmaceutical synthesis methods are mammalian cell culture, microbial fermentation and insect cell culture. Occasionally biopharmaceutical products are produced from natural animal or plant sources or by a synthetic technique called solid phase synthesis. Mammalian cell culture, microbial fermentation and insect cell culture involve the growth of living cells and the extraction of biopharmaceutical products from the cells or the medium surrounding the cells. Solid phase synthesis and crude tissue extraction are processes by which biopharmaceutical are synthesized from chemicals or extracted from natural plant or animal tissues, respectively.

The process for producing biopharmaceutical is complex. In addition to basic synthesis, additional processing steps of separation, purification, conditioning and formulation are required to produce the end product biopharmaceutical. Each of these processing steps includes additional unit operations. For example, the step of purification may include the step of Product Adsorption Chromatography, which may further include the unit operations of High Pressure Liquid Chromatography (HPLC), Medium Pressure Liquid Chromatography (MPLC), Low Pressure Liquid Chromatography (LPLC), etc. The production of biopharmaceutical is complex because of the number, complexity and combinations of synthesis methods and processing steps possible. Consequently, the design of a biopharmaceutical plant is expensive.

Tens of millions of dollars can be misspent during the design and construction phases of biopharmaceutical plants due to inadequacies in the design process. Errors and inefficiencies are introduced in the initial design of the biopharmaceutical production process because no effective tools for modeling and simulating a biopharmaceutical production process exists. The inadequacies in the initial process design carry through to all phases of the biopharmaceutical plant design and construction. Errors in the basic production process design propagate through all of the design and construction phases, resulting in increased cost due to change orders late in the facility development project. For example, detailed piping and instrumentation diagrams (P&IDs) normally cost thousands of dollars per diagram. Problems in the biopharmaceutical production process design frequently necessitate the re-working of these detailed P&IDs. This adds substantially to the overall cost of design and construction of a biopharmaceutical plant.

There are generally three phases of biopharmaceutical plants which coincide with the different levels of drug approval by the FDA. A Clinical Phase I/II biopharmaceutical plant produces enough biopharmaceutical product to support both phase I and phase II clinical testing of the product which may involve up to a few hundred patients. A Clinical Phase III biopharmaceutical plant produces enough biopharmaceutical product to support two to three-thousand patients during phase III clinical testing. A Clinical Phase III plant will also produce enough of the biopharmaceutical drug to support an initial commercial offering upon the licensing of the drug by the FDA for commercial sale. The successive phases represent successively larger biopharmaceutical facilities to support full scale commercial production after product licensing. Often the production process design is repeated for each phase, resulting in increased costs to each phase of plant development.

The design, architecture and engineering of biopharmaceutical plants is a several hundred million dollars a year industry because of the complex nature of biopharmaceutical production. Design of biopharmaceutical plants occurs in discrete phases. The first phase is the conceptual design phase. The first step in the conceptual design phase is identifying the high-level steps of the process that will produce the desired biopharmaceutical. Examples of high-level steps are synthesis, separation, purification and conditioning. After the high-level process steps have been identified, the unit operations associated with each of the high-level steps are identified. Unit operations are discrete process steps that make up the high-level process steps. In a microbial fermentation process, for example, the high-level step of synthesis may include the unit operations of inoculum preparation, flask growth, seed fermentation and production fermentation.

The unit operation level production process is typically designed by hand and is prone to errors and inefficiencies. Often, in the conceptual design phase, the specifications for the final production process are not complete. Therefore some of the equipment design parameters, unit operation yields and actual production rates for the various unit operations must be estimated. These factors introduce errors into the initial design base of the production process. Additionally, since the production process is designed by hand, attempting to optimize the process for efficiency and production of biopharmaceutical products is impractically time consuming.

Scale calculations for each of the unit operations are performed to determine the size and capacity of the equipment necessary to produce the desired amount of product per batch. Included in the scale calculations is the number of batches per year needed to produce the required amount of biopharmaceutical product. A batch is a single run of the biopharmaceutical process that produces the product. Increasing the size and capacity of the equipment increases the amount of product produced per batch. The batch cycle time is the amount of time required to produce one batch of product. The amount of product produced in a given amount of time, therefore, is dependent upon the amount produced per batch, and the batch cycle time. The scale calculations are usually executed by hand to determine the size and capacity of the equipment that will be required in each of the unit operations. Since the scale calculations are developed from the original conceptual design parameters, they are also subject to the same errors inherent in the initial conceptual design base.

Typically a process flow diagram is generated after the scale calculations for the unit operations have been performed. The process flow diagram graphically illustrates the process equipment such as tanks and pumps necessary to accommodate the process for a given batch scale. The process flow diagram illustrates the different streams of product and materials through the different unit operations. Generally associated with the process flow diagram is a material balance table which shows the quantities of materials consumed and produced in each step of the biopharmaceutical production process. The material balance table typically includes rate information of consumption of raw materials and production of product. The process flow diagram and material balance table provides much of the information necessary to develop a preliminary equipment list. The preliminary equipment list shows the equipment necessary to carry out all of the unit operations in the manufacturing procedure. Since the process flow diagram, material balance table and preliminary equipment list are determined from the original conceptual design parameters, they are subject to the same errors inherent in the initial conceptual design base.

A preliminary facility layout for the plant is developed from the process flow diagram, material balance table and preliminary equipment list. The preliminary facility layout usually begins with a bubble or block diagram of the plant that illustrates the adjacencies of rooms housing different high-level steps, as well as a space program which dimensions out the space and square footage of the building. From this information a preliminary equipment layout for the plant is prepared. The preliminary equipment layout attempts to show all the rooms in the plant, including corridors, staircases, etc. Mechanical, electrical and plumbing engineers estimate the mechanical, electrical and plumbing needs of the facility based on the facility design layout and the utility requirements of the manufacturing equipment. Since the preliminary facility layout is developed from the original conceptual design parameters, they are subject to the same errors inherent in the initial conceptual design base.

Typically the next phase of biopharmaceutical plant design is preliminary piping and instrumentation diagram (P&ID) design. Preliminary P&IDs are based on the process flow diagram from the conceptual design phase. Often the calculations on the process design are re-run and incorporated into the preliminary P&ID. The preliminary P&IDs incorporate the information from the material balance table with the preliminary equipment list to show the basic piping and instrumentation required to run the manufacturing process.

Detailed design is the next phase of biopharmaceutical plant design. Plans and specifications which allow vendors and contractors to bid on portions of the biopharmaceutical plant are developed during the detailed design. Detailed P&IDs are developed which schematically represent every detail of the process systems for the biopharmaceutical plant. The detailed P&IDs include for example, the size and components of process piping, mechanical, electrical and plumbing systems; all tanks, instrumentation, controls and hardware. A bill of materials and detailed specification sheets on all of the equipment and systems are developed from the P&IDs. Detailed facility architecture diagrams are developed that coincide with the detailed P&IDs and equipment specifications. The detailed P&IDs and facility construction diagrams allow builders and engineering companies to bid on the biopharmaceutical plant project. Since the preliminary and detailed P&IDs are developed from the original conceptual design parameters, they are subject to the same errors inherent in the initial conceptual design base. Reworking the preliminary and detailed P&IDs due to errors in the conceptual design phase can cost thousands of dollars per diagram.

The inability to accurately model and simulate the biopharmaceutical production process drives inaccurate initial design. Often, these inaccuracies result in changes to the design and construction diagrams at the plant construction site, or repair and reconstruction of the plant during the construction phase resulting in millions of dollars in additional cost.

Once the biopharmaceutical facility has been built, and is operational, the production equipment requires periodic service. Equipment maintenance and instrument calibration is necessary to sustain the biopharmaceutical production process. The types and frequency of maintenance and calibration required are a function of the particular equipment used in the facility, as well as the frequency and nature of use. The equipment involved in the production process, solution preparation process, and equipment preparation all require regular maintenance during sustained operation. Often, maintenance frequency and cost are not considered in the design of a biopharmaceutical production facility. Maintenance costs, however, are a significant fraction of the cost of operating the biopharmaceutical facility and producing the biopharmaceutical product. Equipment maintenance is typically scheduled, planned and managed manually which results in inefficiency and extra costs.

The manual scheduling systems typically employed for planning equipment calibration and maintenance are generally inefficient and tedious. There may be several thousand maintenance and calibration points in a manufacturing plant all requiring different types and frequencies of maintenance and calibration as a function of their service in manufacturing operations. A maintenance or calibration error in an instrument can cause a critical step in a manufacturing operation to fail and result in loss of product.

What is needed, therefore, is an advanced scheduling capability to accurately predict when various instruments and equipment require maintenance and calibration based on their cumulative service hours in order to more adequately insure integrity of the manufacturing processes.

SUMMARY OF THE INVENTION

The present invention satisfies the above-stated needs by providing a method and computer program product for simulating, modeling and scheduling equipment maintenance and calibration in the biopharmaceutical production process. The method and computer program product directly and more accurately links maintenance and calibration scheduling to cumulative equipment service hours than previously possible. The result will be more efficient planning and scheduling of equipment maintenance and calibration activities and enhanced integrity of manufacturing operations. The method and computer program product includes the steps of identifying maintenance and calibration data associated with biopharmaceutical production process equipment. After the maintenance and calibration data is identified, biopharmaceutical production process equipment data is used to generate a table of equipment and maintenance and calibration data. After the table of equipment maintenance and calibration data is generated, the table is compared with a procedure time line to determine the schedule of calibration and maintenance for the equipment in the biopharmaceutical production process.

BRIEF DESCRIPTION OF THE FIGURES

FIG. 3 illustrates a unit operation list for a microbial fermentation process.

FIG. 4 illustrates a unit operation list for a mammalian cell culture process.

FIG. 6 illustrates an exemplary process parameters table.

FIGS. 10–11 illustrate a high-level process time line according to the present invention.

FIGS. 12A–12H illustrate a detailed process time line according to the present invention.

FIG. 15 illustrates an exemplary list of solution preparation parameters.

FIG. 17 illustrates an exemplary list of solution preparation procedure parameters.

FIG. 18 illustrates an exemplary preparation vessel to solution assignment list.

FIG. 21 illustrates an exemplary master quality control protocol table.

FIG. 31 illustrates an exemplary initial solution preparation shift schedule.

FIGS. 36A–36H illustrate exemplary preparation equipment protocol tables.

FIGS. 37A–37B illustrate an exemplary equipment preparation procedure table.

FIG. 39 illustrates an exemplary equipment dimension table.

FIGS. 42A–42D illustrate an exemplary equipment preparation load table.

FIGS. 45A–45I illustrate an exemplary process equipment quality control assay sample time line.

FIGS. 64A–64AB illustrate an exemplary process equipment maintenance time line.

FIGS. 65A–65G are a detailed example of a process parameters table showing a list of unit operations and their associated parameters.

DETAILED DESCRIPTION OF THE PREFERRED EMBODIMENTS

1.0 Biopharmaceutical Batch Process Simulator

Figure 1:
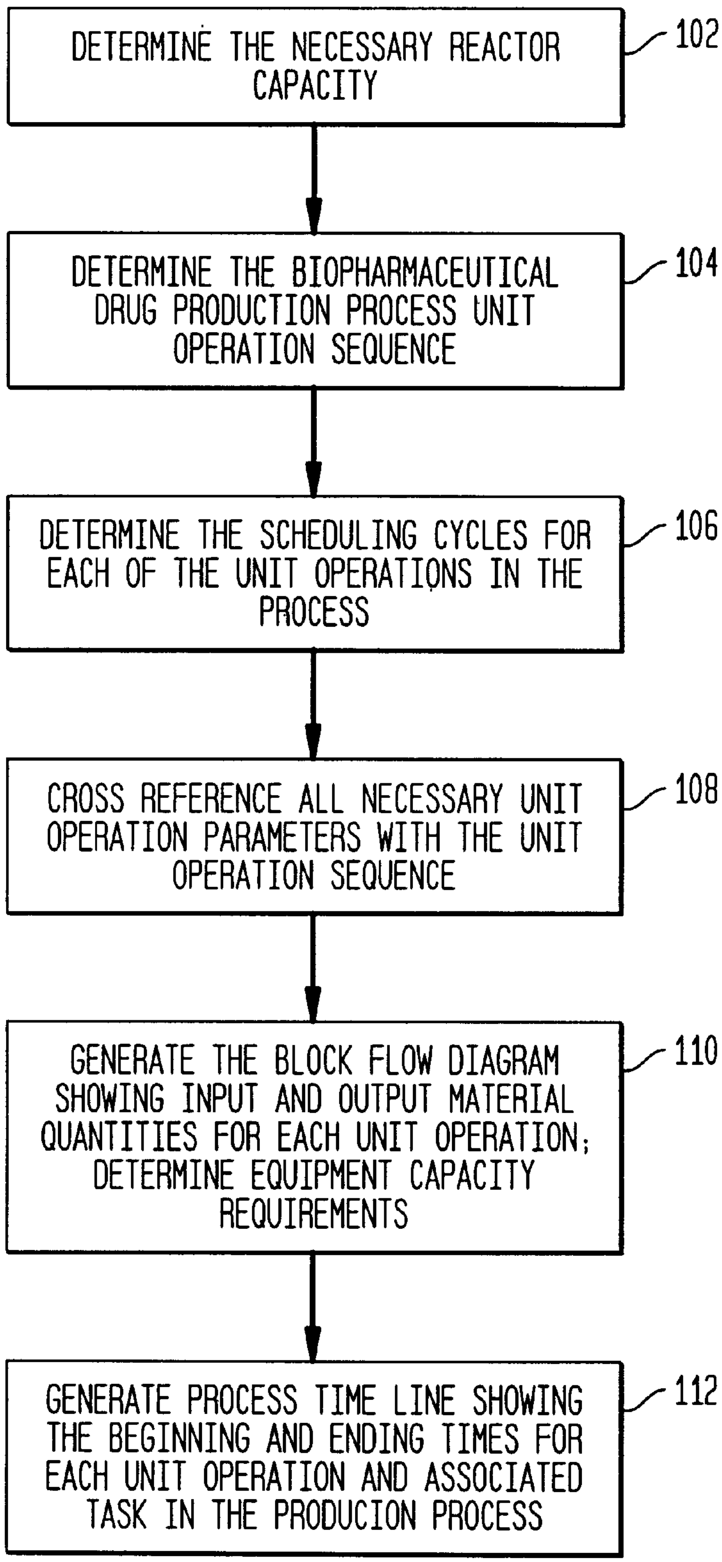
FIG. 1 illustrates a flow diagram of the process to generate a block flow diagram and a process time line according to the present invention.

FIG. 1 illustrates a high-level flow diagram of the preferred embodiment. The process begins by determining the necessary reactor vessel capacity at step 102. The reactor vessel is the container in which the crude product is first synthesized. For example, in mammalian cell culture processes, the reactor vessel houses the mammalian cells suspended in growth media. Next, the unit operation sequence for production of the biopharmaceutical product is determined at step 104. The unit operation sequence is the series of unit operations that are required to produce the biopharmaceutical product. Each unit operation is an individual step in the biopharmaceutical manufacturing process with an associated set of manufacturing equipment. The unit operation list is the list of unit operations that make up the unit operation sequence and their associated sequence information. The unit operation sequence information is the information that defines the scheduling cycles for each of the unit operations in the unit operation list. Scheduling cycles are iterations ((the default being one (1)) of unit operations in the unit operation sequence. Together, the unit operation list and the unit operation sequence information define the unit operation sequence. The desired biopharmaceutical product dictates the particular unit operations and their order in the biopharmaceutical production process. Some examples of unit operations are: inoculum preparation, initial seeding of the reactor vessel, solids harvest by centrifugation, high-pressure homogenization, dilution, etc.

Scheduling cycles and cycle offset duration for each of the unit operations in the biopharmaceutical production process are determined at step 106. Scheduling cycles are iterations of unit operations in the unit operation sequence, and occur in three levels. Additionally, each level of scheduling cycle has an associated offset duration that dictates the time period between the beginnings of successive scheduling cycles. “Cycles per unit operation” is the first level of scheduling cycles. Cycles per unit operation are defined as the number of iterations a unit operation is repeated in a process by itself before proceeding to the next unit operation. For example, the harvest and feed unit operation in a mammalian cell culture process has multiple cycles per unit operation. Product-rich media is drawn from the reactor vessel and nutrient-rich media is fed into the reactor vessel multiple times during one harvest and feed unit operation. The multiple draws of product-rich reactor media are pooled for processing in the next unit operation.

The second level of scheduling cycles is “cycles per batch.” Cycles per batch are defined as the number of iterations a set of consecutive unit operations are repeated as a group before proceeding to the next unit operation after the set of consecutive unit operations. The set of consecutive unit operations repeated as a group are also referred to as a subprocess. For example, the set of unit operations including inoculum preparation, flask growth, seed fermentation, production fermentation, heat exchange, and continuous centrifugation/whole-cell harvest in a microbial fermentation process are often cycled together. Running through each of the six steps results in a single harvest from the microbial fermentation reactor vessel. Multiple harvests from a reactor vessel may be needed to achieve a batch of sufficient quantity. Each additional harvest is pooled with the previous harvest, resulting in a single batch of cell culture for the process.

The third level of scheduling cycles is “cycles per process.” Cycles per process are defined as the number of iterations a batch cycle is repeated for a process that employs continuous or semi-continuous product synthesis. In such a case, a single biopharmaceutical production process may result in multiple batches of product. For example, in a mammalian cell-culture process a single cell culture is typically in continuous production for 60–90 days. During this period multiple harvests of crude product are collected and pooled on a batch basis to be processed into the end product biopharmaceutical. The pooling of multiple harvests into a batch of material will occur several times during the cell culture period resulting in multiple batch cycles per process.

In step 108, a process parameters table master list is referenced to obtain all operational parameters for each unit operation in the unit operation list. The process parameters table contains a list of all unit operations and operational parameters necessary to simulate a particular unit operation. Examples of operational parameters are the solutions involved in a particular unit operation, temperature, pressure, duration, agitation, scaling volume, etc. Additionally, the process parameters table supplies all of the individual tasks and task durations involved in a particular unit operation. For example, the unit operation of inoculum preparation includes the individual tasks of setup, pre-incubation, incubation, and cleanup. Examples of unit operations for biopharmaceutical manufacturing and their associated operational parameters are included in this application as FIGS. 65A–65G.

A block flow diagram is generated at step 110 after unit operation list has obtained the operational parameters from the process parameters table at step 108. The block flow diagram illustrates each unit operation in the manufacturing process as a block with inputs for both incoming product and new material, as well as outputs for both processed product and waste. The block flow diagram is a simple yet convenient tool for quantifying material flows through the process in a way that allows the sizing of many key pieces of equipment relative to a given process scale.

The information in each block of the block flow diagram is generated from the parameters and sizing ratios from the process parameters table in the unit operation list, and block flow diagram calculation sets. A calculation set is a set of algebraic equations. The parameters and calculation sets are used to calculate the quantities of material inputs, product and waste outputs required for that unit operation based on the quantity of product material being received from the previous unit operation. Likewise, a given block flow diagram block calculates the quantity of product to be transferred to the next unit operation block in the manufacturing procedure. These calculations take into account the unit operation scheduling cycles identified at step 106, as further explained below.

A process time line is generated at step 112 after the block flow diagram is generated at step 110. The process time line is a very useful feature of the present invention. The process time line is generated from the unit operation list, the tasks associated with each of the unit operations, the scheduling cycles for each of the unit operations in the process, the process parameters from the master process parameters table and the volume of the material as calculated from the block flow diagram. The process time line is a relative time line in hours and minutes from the start date of the production process. The relative time is converted into days and hours to provide a time line for the beginning and ending times of each unit operation and its associated tasks for the entire biopharmaceutical drug production process.

The process time line is a very powerful tool for process design. The process time line can be used to accurately size pumps, filters and heat exchangers used in unit operations, by calculating the flow rate from the known transfer time and the volume of the material to be transferred, filtered or cooled. The process time line accurately predicts loads for labor, solution preparation, equipment cleaning, reagent, process utilities, preventative maintenance, quality control testing, etc.

Figure 2:
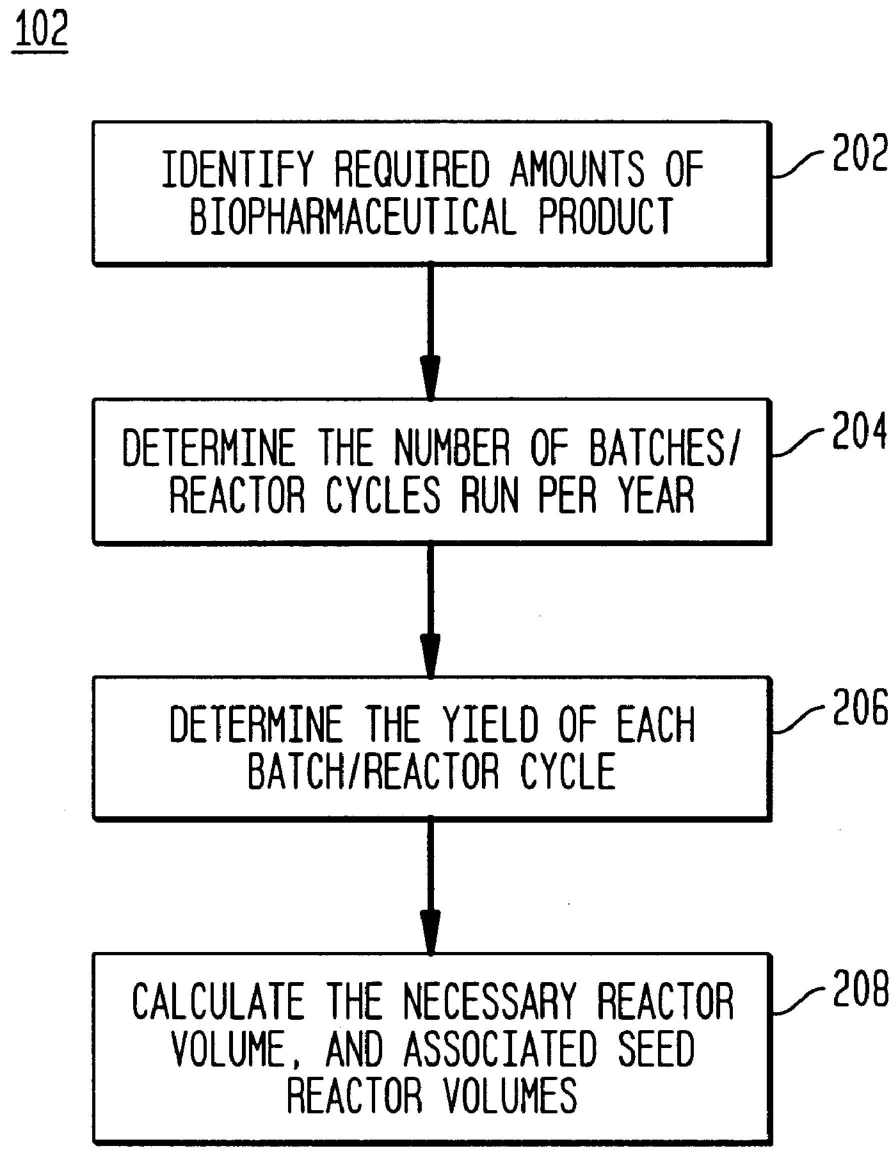
FIG. 2 illustrates a flow diagram of the process for determining the necessary reactor volume according to the present invention.

FIG. 2 further illustrates step 102 of determining the necessary reactor vessel capacity. The amount of biopharmaceutical product to be produced in a given amount of time is determined in step 202. Normally, the amount of biopharmaceutical product required is expressed in terms of mass produced per year. The number of reactor vessel runs for a particular biopharmaceutical product per year is determined at step 204. Factors considered when determining the number of reactor vessel cycles for a particular biopharmaceutical product are, for example, the number of biopharmaceutical products produced in the reactor vessel (i.e., the reactor vessel is shared to produce different products), the reaction time for each cycle of the reactor vessel and the percentage of up-time for the reactor vessel over the year.

The yield of each batch or reactor cycle is calculated at step 206. The yield from each batch or a reactor cycle is process-dependent and is usually expressed in grams of crude product per liter of broth. Given the required amount of biopharmaceutical product per year from step 202, the number of reactor cycles available to produce the required biopharmaceutical product from step 204, and the yield of each reactor cycle from step 206, the necessary reactor volume to produce the required amount of biopharmaceutical product is calculated at step 208.

FIG. 3 illustrates a unit operation list for an exemplary microbial fermentation biopharmaceutical production process. The far left-hand column, column 302, lists the unit operation sequence numbers for each of the unit operations in the process. The exemplary microbial fermentation unit operation list includes 23 unit operations. The unit operation sequence number defines the order in which the unit operations occur. For example, unit operation sequence number 1, inoculum preparation, occurs first, before unit operation sequence number 2, flask growth. Column 304 shows the unit operation identifier codes associated with each of the unit operations in the unit operation list (see step 108). The unit operation identifier codes are used to bring operational parameters from the process parameters table into the unit operation list. For example, heat exchange, unit operation list numbers 5, 8 and 10, has a unit operation identifier code 51.

As described above with reference to FIG. 1, after the unit operation sequence for a particular biopharmaceutical production process has been determined at step 104, the scheduling cycles associated with each unit operation is determined at step 106. Columns 306, 310 and 318 list the number of scheduling cycles for the microbial fermentation process of FIG. 3. Scheduling cycles are iterations of unit operations in the unit operation sequence, and occur in three levels. Additionally, each level of scheduling cycle has an associated offset duration that dictates the time period between the beginnings of successive scheduling cycles, shown in columns 308, 316 and 324.

Column 306 lists the number of cycles per unit operation for each of the unit operations in the microbial fermentation unit operation sequence. In the exemplary microbial fermentation unit operation sequence, each of the unit operations has only one cycle per unit operation. Again, cycles per unit operation define the number of iterations a unit operation is repeated in a process by itself before proceeding to the next unit operation.

Column 308 lists the cycle offset duration in hours for the cycles per unit operation. Since each of the unit operations in the microbial fermentation example of FIG. 3 has only one cycle per unit operation, there is no cycle offset duration for any of the unit operations. Cycle offset duration defines the time period between the beginnings of successive scheduling cycles.

Column 310 lists the cycles per batch for each of the unit operations in the microbial fermentation unit operation sequence. Unit operation sequence numbers 1–6 are defined as having three cycles per batch. Cycles per batch defines the number of iterations a set of consecutive unit operations are repeated as a group before proceeding to the next unit operation. In FIG. 3, for example, the set of unit operations 1–6, as defined in unit operation start column 312 and unit operation end column 314, cycle together as a group (e.g., the sequence of unit operations for the exemplary microbial fermentation process is 1, 2, 3, 4, 5, 6, 1, 2, 3, 4 ,5, 6, 1, 2, 3, 4, 5, 6 and 7). Unit operations 1–6 cycle together as a group three times before the process continues to unit operation 7, as defined in column 310.

After unit operation sequence numbers 1–6 have cycled consecutively three times, the microbial fermentation production process continues at unit operation sequence number 7, resuspension of cell paste. After unit operation sequence number 7, the process continues with three cycles per batch of unit operation sequence numbers 8–10. The unit operations of heat exchange, cell disruption and heat exchange are cycled consecutively three times, as defined in columns 310, 312 and 314. After unit operation sequence numbers 8–10 have cycled three times, the microbial fermentation production process continues at resuspension/surfactant, unit operation sequence number 11.

Unit operation sequence numbers 11 and 12 cycle together two times, as defined by columns 310, 312 and 314. After unit operation sequence numbers 11 and 12 have been cycled two times, the microbial fermentation production process continues without cycling from unit operation sequence number 13 through unit operation sequence number 23 to conclude the microbial fermentation production process.

Columns 326–332 of FIG. 3 represent the step wise recover (SWR) and overall recovery (OAR) percentages of the product and total proteins. SWR is the recovery of protein for the individual unit operation for which it is listed. OAR is the recovery of protein for the overall process up to and including the unit operation for which it is listed. The product recovery columns represent the recovery of the desired product protein from the solution in the process. The protein recovery columns represent the recovery of contaminant proteins from the solution which result in higher purity of the product solution.

FIG. 4 illustrates a unit operation list for an exemplary mammalian cell culture production process. Column 402 lists unit operation sequence numbers 1–19. Unit operation sequence numbers 1–19 define the order in which the unit operations of the mammalian cell culture production process occur. The most notable differences between the microbial fermentation process of FIG. 3 and the mammalian cell culture process of FIG. 4 are the multiple cycles per unit operation of unit operation sequence number 8 and the multiple cycles per process of unit operation sequence numbers 8–18.

Unit operation sequence number 8 of FIG. 4 illustrates the concept of multiple cycles per unit operation. Unit operation sequence number 8 is the unit operation of harvesting product rich growth media from and feeding fresh growth media into the mammalian cell reactor vessel. In most mammalian cell culture processes, the product is secreted by the cells into the surrounding growth media in the reactor vessel. To harvest the product, some of the product rich growth media is harvested from the reactor vessel to be processed to remove the product, and an equal amount of fresh growth media is fed into the reactor vessel to sustain production in the reactor vessel. The process of harvesting and feeding the reactor vessel can continue for many weeks for a single biopharmaceutical production process. Unit operation sequence number 8 is repeated seven times, or 7 cycles per unit operation (e.g., the unit operation sequence is 7, 8, 8, 8, 8, 8, 8, 8, 9). Note that the offset duration for unit operation sequence number 8 is 24 hours. The offset duration defines the time period between the cycles per unit operation. In the example of FIG. 4, unit operation sequence number 8 is repeated 7 times (7 cycles per unit operation) and each cycle is separated from the next by 24 hours, or one day. This corresponds to unit operation sequence number 8 having a duration of one week, with a harvest/feed step occurring each day.

FIG. 4 also illustrates the feature of multiple cycles per process. Cycles per process is defined as the number of iterations a batch cycle is repeated in a given process that employs continuous or semi-continuous product synthesis. Each batch cycle results in a batch of product. A single biopharmaceutical production process, therefore, may result in multiple batches of product. In the mammalian cell culture process example of FIG. 4, unit operation sequence numbers 8–18 are repeated together as a group eight times (column 418). Each of these cycles of unit operation sequence numbers 8–18 produce one batch of product (columns 420–422). The offset between each cycle of unit operation sequence numbers 8–18 is 168 hours, or one week (column 424).

In the example of FIG. 4, unit operation sequence numbers 8–18 proceed as follows: the reactor vessel is harvested and fed once each day for seven days; the results of the harvest/feed operation are pooled in unit operation sequence number 9 at the end of the seven days; unit operations 9–18 are then executed to process the pooled harvested growth media from unit operation sequence number 8. Unit operation sequence numbers 8–18 are cycled sequentially once each week to process an additional seven day batch of harvested growth media from unit operation sequence number 8. At the end of eight weeks, the mammalian cell culture process is completed.

Figure 5:
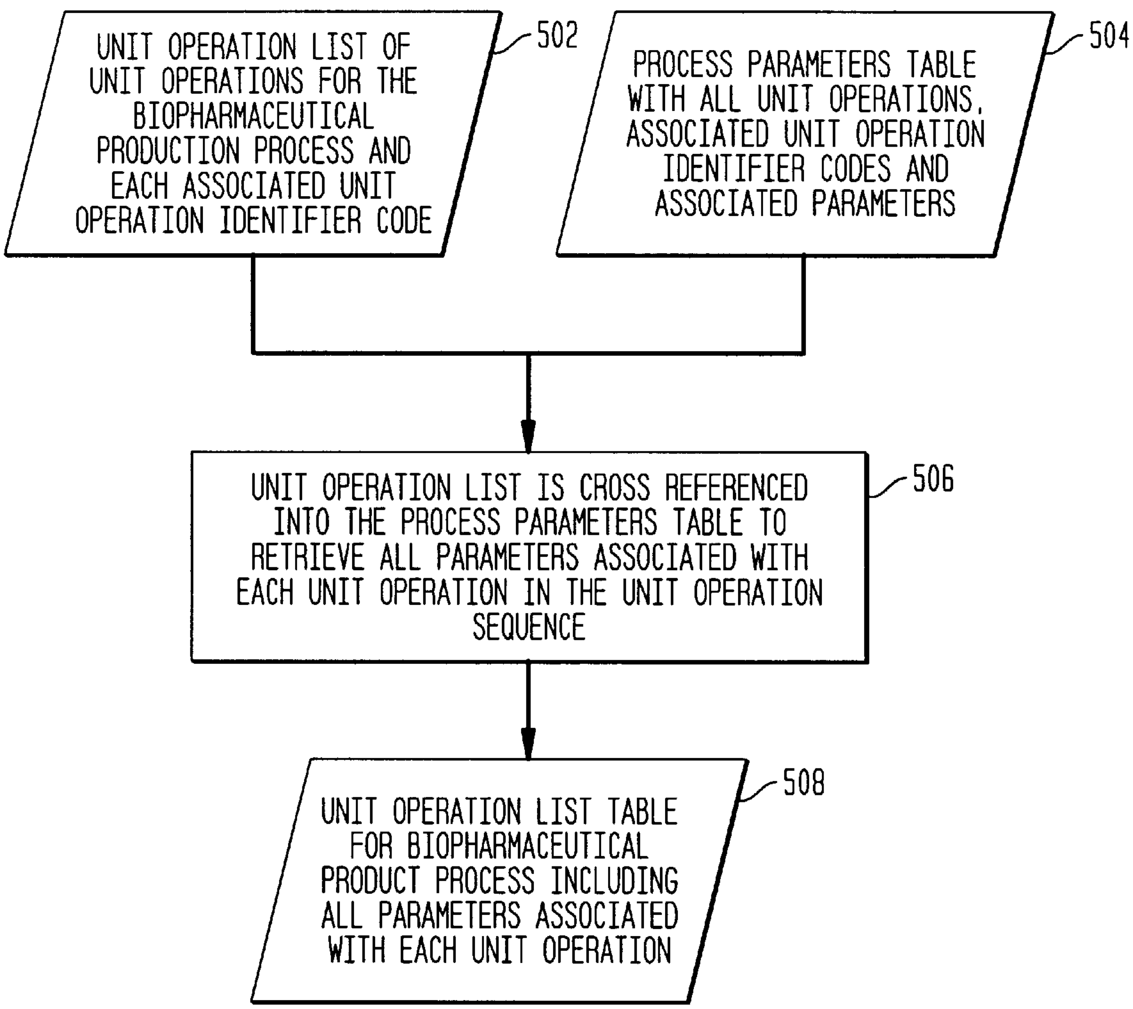
FIG. 5 illustrates a flow diagram for cross-referencing a unit operation list with a process parameters table according to the present invention.

FIG. 5 further illustrates step 108, cross referencing the unit operation sequence with the master process parameters table. The operational parameters in the process parameters table are those parameters necessary to simulate a particular unit operation. The parameters from the process parameters table define the key operational parameters and equipment sizing ratios for each unit operation in the unit operation sequence. The values for these parameters and ratios are variables which can be easily manipulated and ordered to model and evaluate alternative design scenarios for a given process scale. Examples of the process parameters associated with each unit operation are listed in FIGS. 65A–65G. It should be noted, however, that the list of unit operations, parameters, values, and scaling ratios is not exhaustive. One of ordinary skill in the art could expand the process parameters table to encompass additional unit operations and production processes for other batch process industries such as chemical pharmaceutical, specialty chemical, food, beverage and cosmetics. Such expansion would allow the present invention to simulate and schedule additional batch production processes for other such batch processes.

FIG. 5 illustrates the files necessary to cross-reference the unit operation list with the process parameters table in step 108. Exemplary unit operation list 502 for the biopharmaceutical production process and process parameters table 504 are input into processing step 506. Step 506 cross-references the unit operation list and process parameters table based on unit operation identification code (see FIG. 3). The parameters are copied from the process parameters table 504 into the unit operation list 502 to generate unit operation list 508.

FIG. 6 further illustrates exemplary process parameters table, 504. The operational parameters in the process parameters table are those parameters necessary to simulate a particular unit operation. The unit operation identification codes of process parameters table 504 are used in the cross-reference step 506 to assign the parameters from the process parameters table 504 to the unit operation list 502. Examples of operational parameters are the solutions involved in a particular unit operation, temperature, pressure, duration, agitation, scaling volume, etc.

Additionally, the process parameters table defines all of the individual tasks and task durations involved in each unit operation. It should be noted, however, one of ordinary skill in the art could expand the process parameters table to encompass additional unit operations and production processes for other batch process industries such as chemical pharmaceutical, specialty chemical, food, beverage and cosmetics. Such expansion would allow the present invention to simulate and schedule additional batch production processes for other such batch processes.

Figure 7:
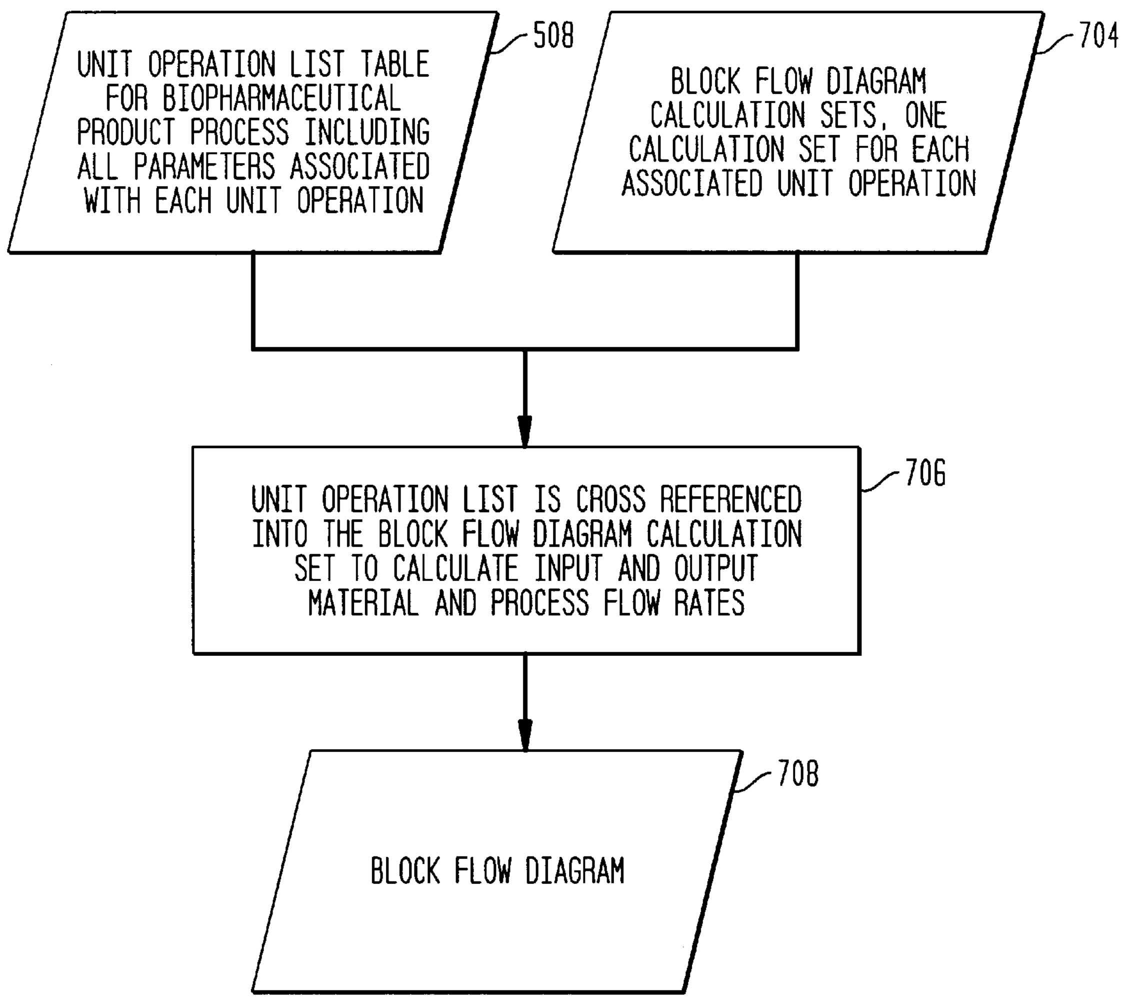
FIG. 7 illustrates the process for generating a block flow diagram according to the present invention.

FIG. 7 further illustrates step 110, generating a block flow diagram. A block flow diagram depicts each unit operation in the biopharmaceutical production process as a block with inputs for both incoming product and new material, as well as outputs for both processed product and waste. The material that flows through each of the unit operation blocks is quantified by calculation sets in each of the block flow diagram blocks. A unit operation block in a block flow diagram is a graphical representation of a unit operation. A calculation set is a set of algebraic equations describing a unit operation. Some examples of outputs of the calculation sets are: required process materials for that unit operation, equipment performance specifications and process data outputs to be used for the next unit operation. Some examples of inputs to the calculation sets are: product quantity (mass) or volume (liters) from a previous unit operation, other parameters and/or multipliers derived from the process parameters table, as well as the design cycles defined in the unit operation list.

Block flow diagram 708 is generated from unit operation list 508 and block flow diagram calculation set 704. Block flow diagram calculation set 704 is an exhaustive list of unit operation identifier codes and the calculation sets associated with each unit operation identifier. Unit operation list 508 and block flow diagram calculation set 704 are linked together based on unit operation identifier code.

Step 706 calculates the block flow diagram material flow requirements and basic equipment sizing requirements from unit operation list 508 which includes all of the associated operational parameters from the process parameters table, and the block flow diagram calculation set 704. Block flow diagram 708 allows the sizing of many key pieces of equipment relative to a given process scale. Since the material flow quantities into and out of each unit operation is determined at step 706, the capacity of many equipment items involved in each unit operation can be determined. The block flow diagram also manages important information in the unit operation list 502 such as the percent recovery, percent purity and purification factor of the product in each unit operation. This information helps identify the steps in the process that may need optimization.

The following is an example calculation set for a tangential flow micro-filtration (TFMF) system unit operation. Tangential flow micro-filtration is an important process technology in biopharmaceutical manufacturing. This technology significantly extends the life of the filtration media and reduces the replacement cost of expensive filters.

TFMF generically requires the same steps to prepare the membrane for each use as well as for storage after use. The design parameters for each unit operation such as TFMF have been developed around these generic design requirements.

Generic Parameters (Variables) from the Process Parameters Table

| Equipment Design Type | Plate & Frame |
|---|---|
| Membrane Porosity | 0.2 micron |
| Membrane Flux rate | 125 Liters/square meter/hour |
| Process Time | 2 Hours |
| Redounded/Filtrate Rate | 20 to 1 |
| Flush volume | 21.5 Liters/square meter |
| Prime volume | 21.5 Liters/square meter |
| Wash Volume | 0.5% of Process Volume |
| Regenerate Volume | 10.8 Liters/square meter |
| Storage Volume | 215 Liters/square meter |
| % Recovery of Product | 95% |
| % Recovery of Total Protein | 80% |
| Clean In Place (CIP) | Yes |
| Steam In Place (CIP) | Yes |

Input Values from Previous Unit Operation

| | |
|---|---|
| Product Volume | 1,000 Liters |
| Product Quantity | 5 Kg |
| Total Protein Quantity | 3.0 Kg |

The calculation set for this unit operation first takes the incoming process volume and uses it as a basis of sizing the filtration membrane for the filtration system based on the above flux rate and required processing time.

1,000 Liters /125 L/SM/Hr / 2 Hours=4.0 SM of 0.2 micron membrane

After calculating the square meter (SM) of membrane required by this unit operation, the volumes of each of the support solutions can be calculated based on the above volume ratios.

| | |
|---|---|
| Flush volume | 21.5 Liters/SM × 4.0 SM = 86 Liters |
| Prime volume | 21.5 Liters/SM × 4.0 SM = 86 Liters |
| Wash Volume | 5% of 1,000 Liters = 50 Liters |
| Regenerate | 21.5 Liters/SM × 4.0 SM = 86 Liters |
| Storage | 10.8 Liters/SM × 4.0 SM = 42 Liters |

The flow rate of the filtrate is calculated from the volume to be filtered and the required process time.

1,000 Liters / 2 Hours=8.3 Liters/minute

The flow rate of the retentate is calculated based on the above retentate/filtrate ratio.

8.3 Liters per minute×20 =167 Liters/minute

Based on the input of the process volume to this unit operation and the above parameters, the equipment size, the filtration apparatus, the retentate pump, the support linkage and associated systems can be designed.

In addition, the input values for the quantity of product and contaminant protein received from the previous unit operation together with the recovery factors listed in the parameters allow the calculation of the cumulative recovery of product through this step, as well the percent purity of the product and the product purification factor for this step. This information is helpful for identifying steps in the manufacturing process which require optimization.

Figure 8:
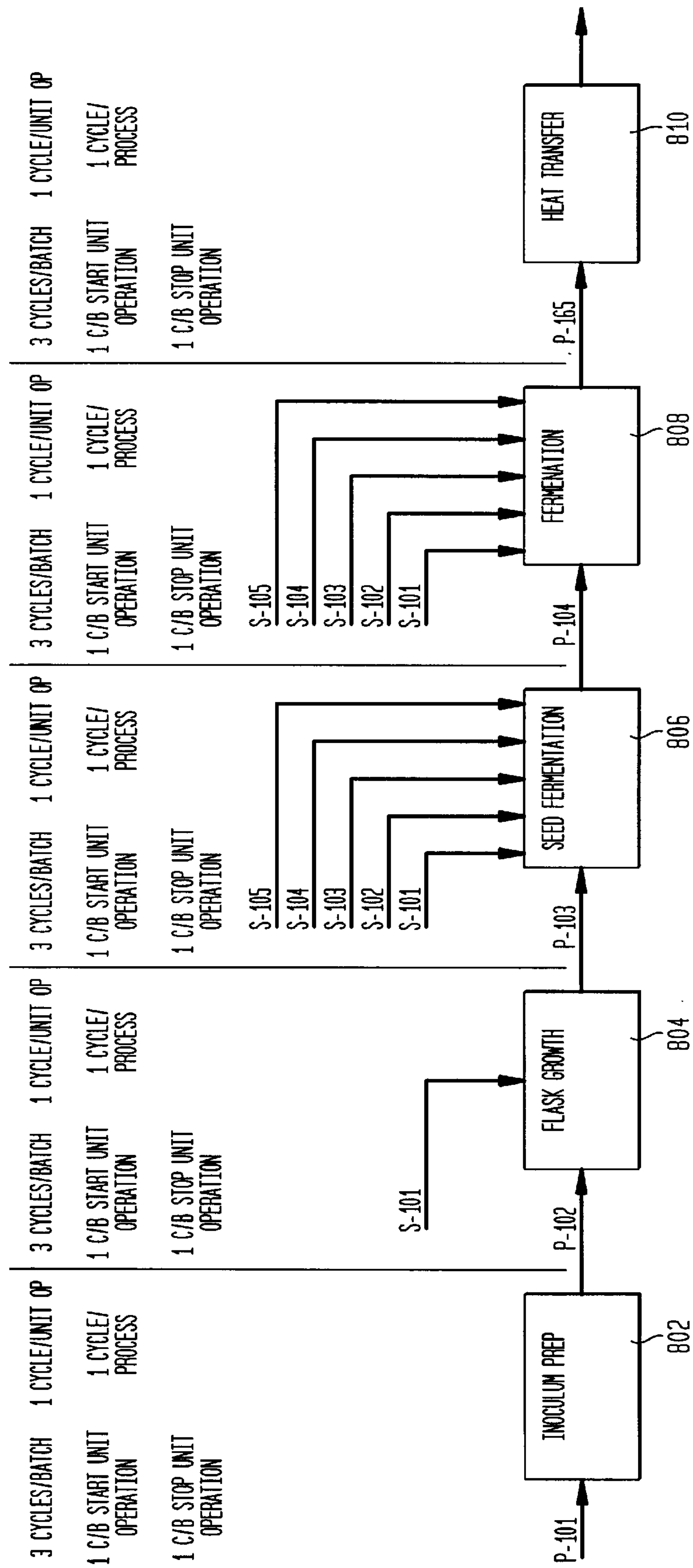
FIG. 8 illustrates an exemplary block flow diagram according to the present invention.

FIG. 8 illustrates an exemplary block flow diagram for the first five unit operations of the microbial fermentation process unit operation list of FIG. 3. Unit operations 1 through 5 are shown as blocks 802, 804, 806, 808 and 810. The input solutions to each of the steps are shown as arrows tagged with solution identifier information from the unit operation list 508. The process streams to which these solutions are added at each unit operation are also shown as arrows tagged with process stream identifier information. Working from the initial process stream characteristics (P-101) in unit operation 1, inoculum prep, the volumes of input materials (solutions) and subsequent process streams in each of the unit operations is determined using scale-up ratios which are included in the information from the unit operation list 508 for each respective unit operation. For example, the volume of solutions and process streams flowing into and out of each of unit operation blocks 802–810 in FIG. 8 is determined by the initial starting characteristics of the process stream P-101 and the volume of its associated input material S-101 in the first unit operation, block 802 and the scale up ratio in each of the successive unit operations, blocks 804–810. The solutions involved in each of unit operation blocks 802–810 are likewise part of the information for each respective unit operation in the unit operation list 508.

Figure 9:
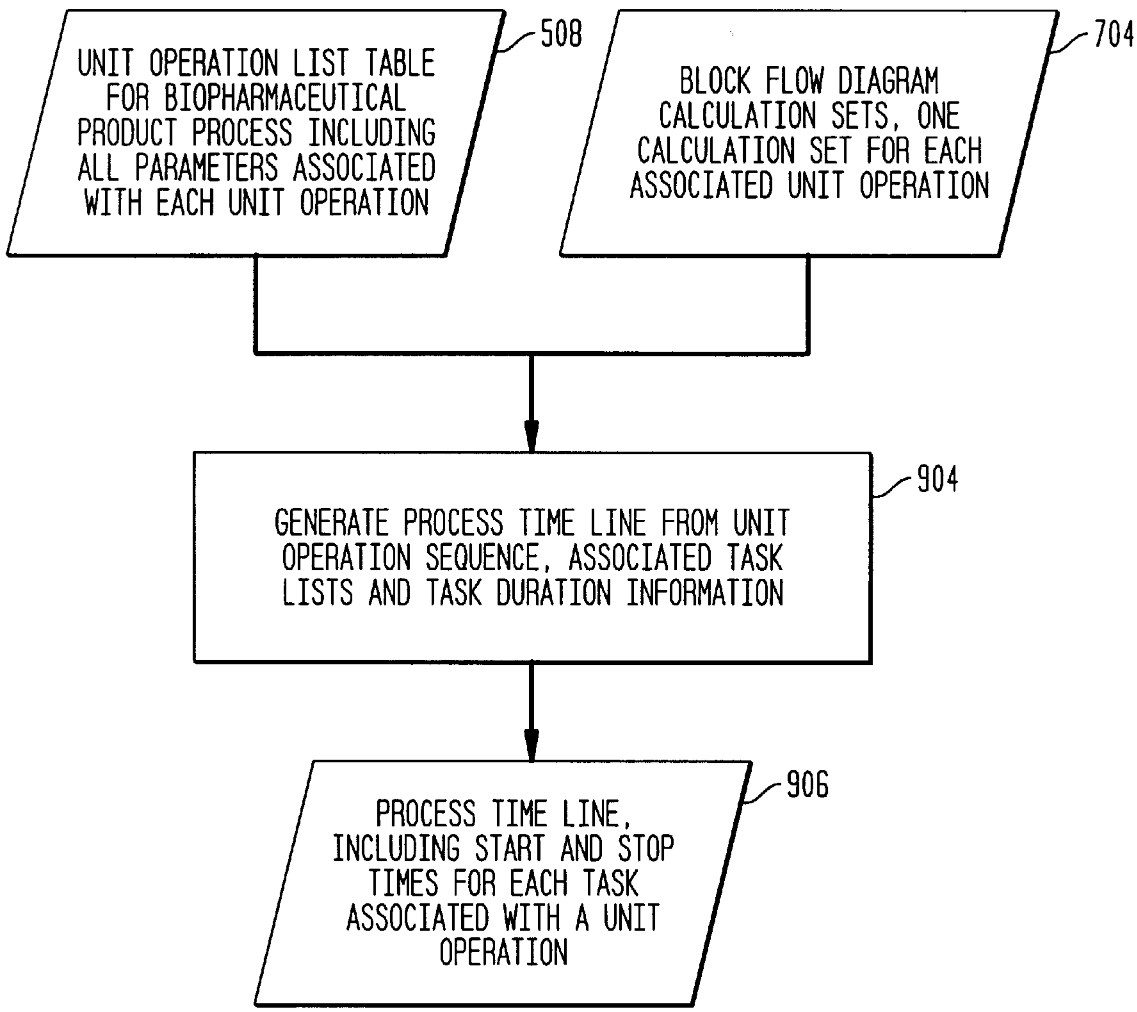
FIG. 9 illustrates a block flow diagram for the process of generating a process time line according to the present invention.

FIG. 9 further illustrates step 112, generating the process time line. The process time line is generated (steps 904–906) from unit operation list 508 and block flow diagram calculation set 704. Unit operation list 508 contains enough input information to generate a detailed process time line which includes the start and stop times for most of the tasks associated with each unit operation. The durations of some unit operation tasks are not scale dependent. The durations of other unit operation tasks are, however, scale dependent. In the latter case, as a process is scaled up, the amount of time required to complete a unit operation task increases. In such cases, where duration of a unit operation task is scale dependent, block flow diagram calculation set 704 is required to calculate the quantity of material handled by the unit operation task. After the quantity of material handled by a unit operation task is determined, its duration can be determined. Examples of scale dependent task durations are the time required to pump solutions from one storage tank to another, the amount of time required to heat or cool solutions in a heat exchanger, the amount of time required to filter product or contaminants from solution.

FIG. 10 is an example of a high-level process time line for a microbial fermentation process. The unit operation sequence of the process time line of FIG. 10 corresponds to the unit operation list of FIG. 3. The high-level process time line shown in FIG. 10 illustrates two process cycles of the microbial fermentation unit operation sequence, labeled "First Process Cycle" and "Second Process Cycle." A process cycle is a complete run of the biopharmaceutical production process, as defined by the unit operation sequence for the process.

The first two columns of the process time line of FIG. 10 identify the unit operation sequence number and unit operation description of the unit operation being performed, respectively. The first three sets of unit operations correspond to the three cycles per batch of unit operation sequence numbers 1–6 of FIG. 3. Three cycles of unit operations 1–6 are performed and the results are pooled into unit operation 7, pool harvests. The two columns to the right of the duration column identify the week and day that the particular unit operation is occurring in the first process cycle.

The day and the week each unit operation is performed is calculated from the start time of the process, as well as the cumulative duration of each of the previous unit operations. In the example of FIG. 10, Sunday is defined as the first day of the week. In the example of FIG. 10, the process sequence begins at unit operation 1, inoculum prep, on Friday of the first week. After unit operation 1 has completed (24 hours later, since unit operation 1 has a 24 hour duration) unit operation 2 is performed on Saturday. The begin and end times for each successive unit operation are calculated from the duration of the unit operation and end time of the previous unit operation. Note that FIG. 10 is calculated to the day and week only for the purposes of explanation. Usually the process time line is determined for each of the tasks associated with a unit operation to the minute.

As illustrated in FIG. 10, unit operation 7 occurs on Monday of the third week in the first process cycle. The third column from the left is the duration of each of the unit operations. After the three cycles of unit operations 1 through 6 have been pooled in unit operation 7, the process continues at unit operations 8 through 10, heat exchange, cell disruption and heat exchange. Each of unit operations 8 through 10 are cycled three times and the associated scheduling information is contained in column to the right of the unit operation duration. Since each cycle of unit operations 8 through 10 have a duration of 0.5 hours, as shown in column 3, each cycle occurs on Monday of the third week in the process.

FIG. 11 illustrates the final unit operations of the process time line for the microbial fermentation process. After 3 cycles of unit operations 8 through 10 have been completed, unit operation sequence numbers 11 and 12 cycle together two times on Monday, week 3 of the first process cycle. After unit operation sequence numbers 11 and 12 have been cycled twice, the microbial fermentation production process continues without cycling from unit operation sequence number 13 through unit operation sequence number 22 to conclude the microbial fermentation production process. The durations and associated start times are listed for each of the unit operations 13–22.

FIGS. 12A–12H illustrate the preferred embodiment of a detailed process time line. The unit operation sequence of the process time line of FIGS. 12A–12H correspond to the unit operation list of FIG. 3. The process time line of FIGS. 12A–12H illustrates a single process cycle of the microbial fermentation unit operation sequence. The individual tasks associated with each unit operation are included after the unit operation. For example, in FIG. 12A, unit operation 1A, inoculum prep, consists of the individual tasks of set up, pre-incubation, incubation, and clean up. Columns 11–14 show the start date and time and finish date and time for each of the tasks in each unit operation. Since setup and clean up are not part of the critical path of the process, they do not directly affect the start and end times of following unit operations. The start and finish date and times for the set up and clean up operations of each of the unit operations are valuable because they ensure that the equipment will be available for each unit operation if the process time line is followed.

The process time line of FIGS. 12A–12H includes examples of unit operation task duration calculations. Row 20, column 15 of FIG. 12A, which corresponds to the harvest task of unit operation 3A, seed fermentation, is an example of a duration calculation. As stated above, the duration of some unit operations is process scale dependent (i.e., the duration is dependent upon the volume processed). The harvest task in the seed fermentation unit operation is an example of a task whose duration is process scale dependent. In column 15, the calculations column, information listed for the harvest task is 50 liters, 1.7 liters/minute (LPM), and 0.5 hours. Fifty liters represents the volume of material that is harvested during a harvest task. 1.7 liters/minute represents the rate at which the solution is harvested. Given the volume to be harvested and the flow rate of the harvest, the duration of the harvest task is calculated to be 0.5 hours. Each task in a unit operation that is volume dependent has its duration calculated in order to generate the process time line of FIGS. 12A–12H.

The process time line of FIGS. 12A–12H can be resolved to minutes and seconds, if necessary. The accuracy of the process time line allows the precise planning and scheduling of many aspects of the batch manufacturing process. The process time line scheduling information can be used to schedule manufacturing resources such as labor, reagents, reusables, disposables, etc., required directly by the manufacturing process. Pre-process support activities such as solution preparation, and equipment prep and sterilization, required to support the core process, including the labor, reagents, etc. can be scheduled, cost forecasted and provided for. Post-process support activities such as product formulation, aseptic fill, freeze drying, vial capping, vial labeling and packaging required to ship the purified product in a form ready for use may be added to the process time line and managed. Based on the process time line, labor, reagents, etc., required to support these post-process support functions can be acquired and managed. One of the most important aspects of the present invention is the determination of process utility loads such as USP Purified Water, Water For Injection, Pure Steam, etc., for all of the manufacturing equipment. The process time line can be used to determine the peak utility loading, and utility requirements for the facility. Building utility loads such as building steam, heating, ventilation, air conditioning, plumbing, etc., for all manufacturing equipment, process areas and facility equipment can be determined based on the process time line and the equipment associated with each of the unit operations. The process time line can be used to measure the time that the equipment has been in service to schedule preventative maintenance of all plant equipment, Quality Assurance activities including instrument calibration, automated batch documentation, etc. and Quality Control activities including process system maintenance, raw material testing, in process testing and final product testing, etc.

2.0 Solution Preparation Scheduling Module

The preferred embodiment of the present invention is a computer based system and method for the simulation, modeling and scheduling of batch process solution preparation. The preferred embodiment is based on a method for generating scheduling information which accurately defines the complex manufacturing operations of solution preparation in batch manufacturing processes. This scheduling capability system allows the definition of manufacturing costs and systems in a more detailed and accurate manner than previously possible. As a result, this invention allows the rapid and accurate evaluation of numerous batch manufacturing alternatives in order to arrive at an optimal process design early in a facility development project. In so doing the invention minimizes project cost over runs which result from inaccuracies that can carry forward from the early stages of design into construction. The invention also allows the accurate scheduling of solution preparation activities in an operating manufacturing plant, including the scheduling of resources required by solution preparation such as labor, reagents, disposables, reuseables, utilities, equipment maintenance & calibration, etc.

The object of the solution preparation scheduling module is to assign each solution to a solution preparation vessel and to generate a solution preparation schedule for each solution preparation vessel. Scheduling solution preparation in each solution preparation vessel allows the biopharmaceutical production process designer to manage, predict and optimize solution preparation vessel inventory, equipment cost, utility requirements, clean and preparation and other solution preparation associated activities.

Figure 13:
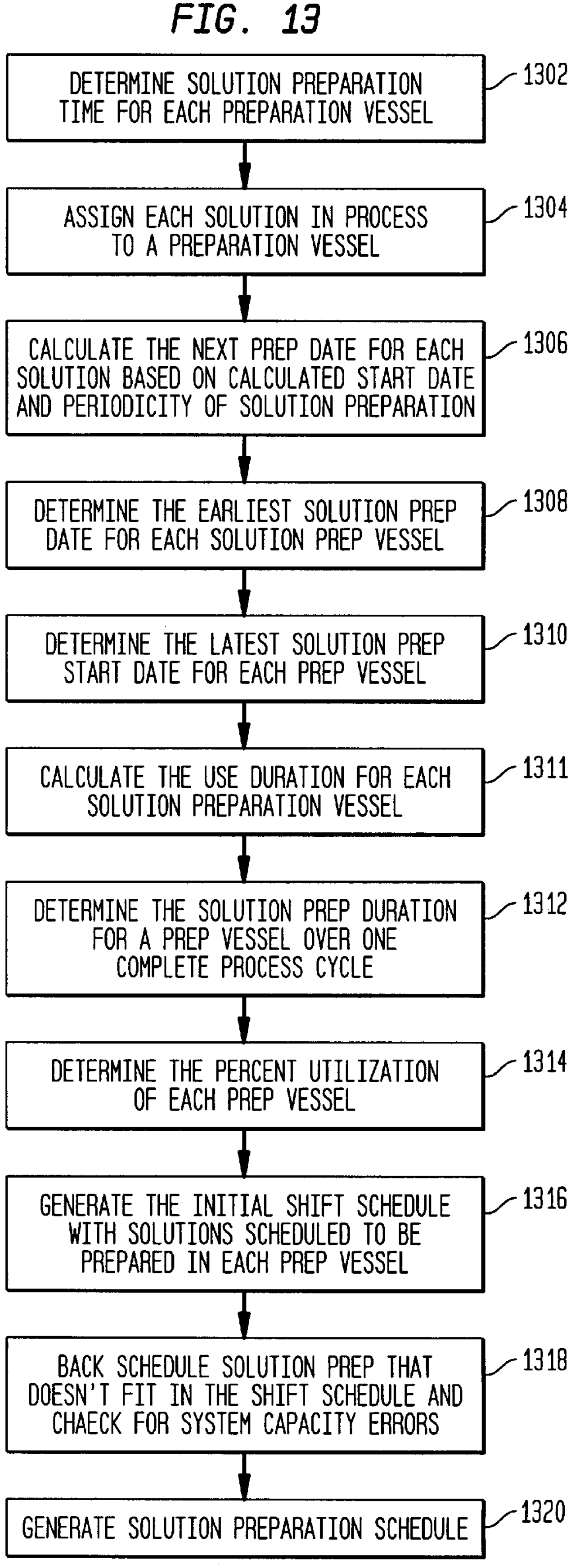
FIG. 13 is a block flow diagram illustrating an overview of the process for scheduling and simulating solution preparation in a biopharmaceutical production process.

FIG. 13 is a flow chart providing an overview of the process for scheduling and simulating solution preparation in a biopharmaceutical production process. Step 1302 determines the solution preparation time for each solution preparation vessel. A solution preparation vessel is a vessel used for the preparation of solution used in the biopharmaceutical production process. In the preferred embodiment, each type of solution preparation vessel used in the biopharmaceutical production process has an associated solution preparation time. The solution preparation time is the amount of time it takes to prepare solution in the solution preparation vessel. Preparation of one solution preparation vessel's volume of solution is called a solution preparation cycle. Each solution preparation vessel has associated solution preparation parameters. Solution preparation parameters describe the amount of time necessary to complete various steps in the solution preparation process.

Step 1304 assigns the solutions in the biopharmaceutical production process to particular solution preparation vessels. Solutions are assigned to particular vessels in order to schedule and determine the load on the solution preparation vessels. Step 1304 includes the procedure of determining the total volume of each solution needed for the biopharmaceutical production process and assigning it to a preparation vessel of the appropriate size. Large volume solutions can be prepared in smaller multiple solution preparation cycles and pooled to yield a higher volume batch of solution. Conversely, smaller volume solutions can be batch prepared in larger preparation volumes to accommodate multiple process cycles provided the shelf life of these solutions allow longer storage times.

Step 1306 determines the calculated start date and the next preparation date of each solution. The calculated start date for the preparation of a solution is the date which solution preparation should begin in order to have the solution ready for use in the biopharmaceutical process. The calculated start date takes into account the amount of time necessary to prepare the solution, and other lead time factors necessary for preparation of solution. The next preparation date is the earliest date that a solution will be prepared after its calculated start date. The next preparation date is determined by adding the periodicity of solution preparation to the calculated start date. The periodicity of solution preparation is how often each solution must be prepared in order to sustain the biopharmaceutical production process.

Step 1308 determines the earliest solution preparation date for each solution preparation vessel for a given process cycle. Since each solution has been assigned to a solution preparation vessel, and the calculated start dates for each solution have been determined, step 1308 determines the earliest calculated start date for each solution preparation vessel. The earliest calculated start date associated with a solution preparation vessel is the date which the first solution is prepared in the vessel for a given process cycle. The earliest calculated start date associated with a solution preparation vessel identifies the point in the process cycle by which the preparation vessel must be available.

Step 1310 determines the latest next preparation date for each solution preparation vessel. The latest next preparation date for each solution preparation vessel is the date that a solution preparation vessel is last used for solution preparation to support a given process cycle. Based on the solution to solution preparation vessel assignments determined in step 1304, the earliest calculated start date for each solution and the next preparation dates for each of the solutions determined in step 1306, step 1310 determines the latest next preparation date for each solution preparation vessel. The earliest calculated start date and the latest next preparation date associated with a solution preparation vessel define the usage boundaries of the solution preparation vessel in the process cycle. The loading of a solution prep vessel can be evaluated during the time between the earliest calculated start date and the latest next preparation date. In the case where the usage boundary is set by a solution which is batch prepared to accommodate multiple process cycles, the usage boundary of a tank includes these multiple process cycles. Therefore the loading on a solution preparation vessel in this instance will also account for solutions from multiple process cycles.

The duration of time between the first biopharmaceutical production process activity related to a given process and the last biopharmaceutical production process activity related to that process may be called a manufacturing cycle (i.e., multiple process cycles define a manufacturing cycle). In the case where an activity, such as the preparation of a solution, accommodates multiple process cycles, a manufacturing cycle consists of multiple process cycles. In the case where all the activities associated with a process only accommodate one process cycle a manufacturing cycle consists of only one process cycle. Therefore manufacturing cycles may consist of one or more process cycles with their related support activities.

Step 1311 calculates the use duration for each solution preparation vessel. The use duration for each solution preparation vessel is the time that a solution preparation vessel is occupied with the preparation of solution for a manufacturing cycle. For example, when multiple solutions are assigned to a single solution preparation vessel, the use duration for the solution preparation vessel is determined based on the earliest calculated start date and the latest next preparation date for all of the solutions assigned to the solution preparation vessel. The total number of hours the solution preparation vessel is occupied can be calculated from the use duration (days) and the number of shift hours per day for the particular manufacturing cycle (e.g., single shift operation would normally be 8 hours per day).

Step 1312 calculates the cumulative solution preparation time for each solution preparation vessel. The cumulative solution preparation time is the amount of time a solution preparation vessel is occupied with the preparation of solutions in a biopharmaceutical manufacturing cycle. Step 1312 calculates the cumulative solution preparation time for each solution preparation vessel based on:

1) the solutions assigned to a particular vessel;

2) the prep vessel use duration;

3) the duration of a process cycle;

4) the number of preps of a solution per process cycle; and 5) solution preparation times.

For example, if five solutions are to be prepared in a particular solution preparation vessel each requiring two preparations per process cycle, process cycle durations of seven days, solution preparation times of three hours, during a use duration of fourteen days, the cumulative solution preparation time for the solution preparation vessel would be sixty hours over a two week period.

Step 1314 determines the percent utilization of each solution preparation vessel. The percent utilization of each solution preparation vessel is the fraction of the use duration that the solution preparation vessel is actually engaged in the preparation of solution, or the cumulative solution preparation time. The percent utilization is determined based on the use duration, cumulative solution preparation time and the number of hours per solution prep shift for the process cycle. For example, if the use duration for a solution preparation vessel is fourteen days, and there are eight shift hours per day, then the solution preparation vessel has a total availability of one hundred twelve hours. If, as calculated above, the cumulative solution preparation time for the solution preparation vessel is sixty hours, then the percent utilization of the solution preparation vessel is approximately fifty-four percent. The percent utilization of each solution preparation vessel is determined in step 1314 so that the biopharmaceutical production process planner is able to gauge the level of utilization of the solution preparation equipment and make any adjustments in the solution preparation equipment pool or production cycles.

Step 1316 generates the initial shift schedule for each solution preparation vessel. The initial shift schedule is a daily schedule of solutions to be prepared in a particular solution preparation vessel. Step 1316 generates the initial shift schedule based on the calculated start date for each solution, the periodicity of solution preparation for each solution and the solution to solution preparation vessel assignment.

Step 1318 back schedules solution preparation procedures that do not fit in the shift schedule and checks for system capacity problems. Back scheduling is the process of rescheduling solution preparation cycles for previous days or time slots. The initial shift schedule is generated regardless of the number of hours a solution preparation vessel is occupied for a particular day. For example, the initial shift schedule may have a particular solution preparation vessel scheduled for fourteen hours of solution preparation. In a biopharmaceutical production process that operates sixteen hours a day, all of the solutions scheduled for the solution preparation vessel can be accommodated. If, however, the biopharmaceutical production process operates only eight hours a day, not all of the required solutions may be prepared on the scheduled date. Step 1318 back schedules to earlier days those solution preparation cycles that cannot be completed on the initially scheduled day. The scheduling of a back scheduled solution preparation cycle into an available shift is performed according to the priority of the oldest back scheduled date for all available back scheduled solutions. The end result of step 1318 is to generate a final shift schedule for each prep vessel which assigns the appropriate solutions to that vessel and schedules out the preparation of each solution according to shift capacity, the duration of each prep assigned to that shift.

Step 1320 generates a time line for the operation of each solution prep vessel and its associated equipment according to the shift assignments in the final shift schedule and the durations associated with each solution prep step in the solution prep procedure table. Based on this time line resources requirements for labor, reagents, disposables, reusables, utilities, maintenance, etc., can be accurately scheduled.

Figure 14:
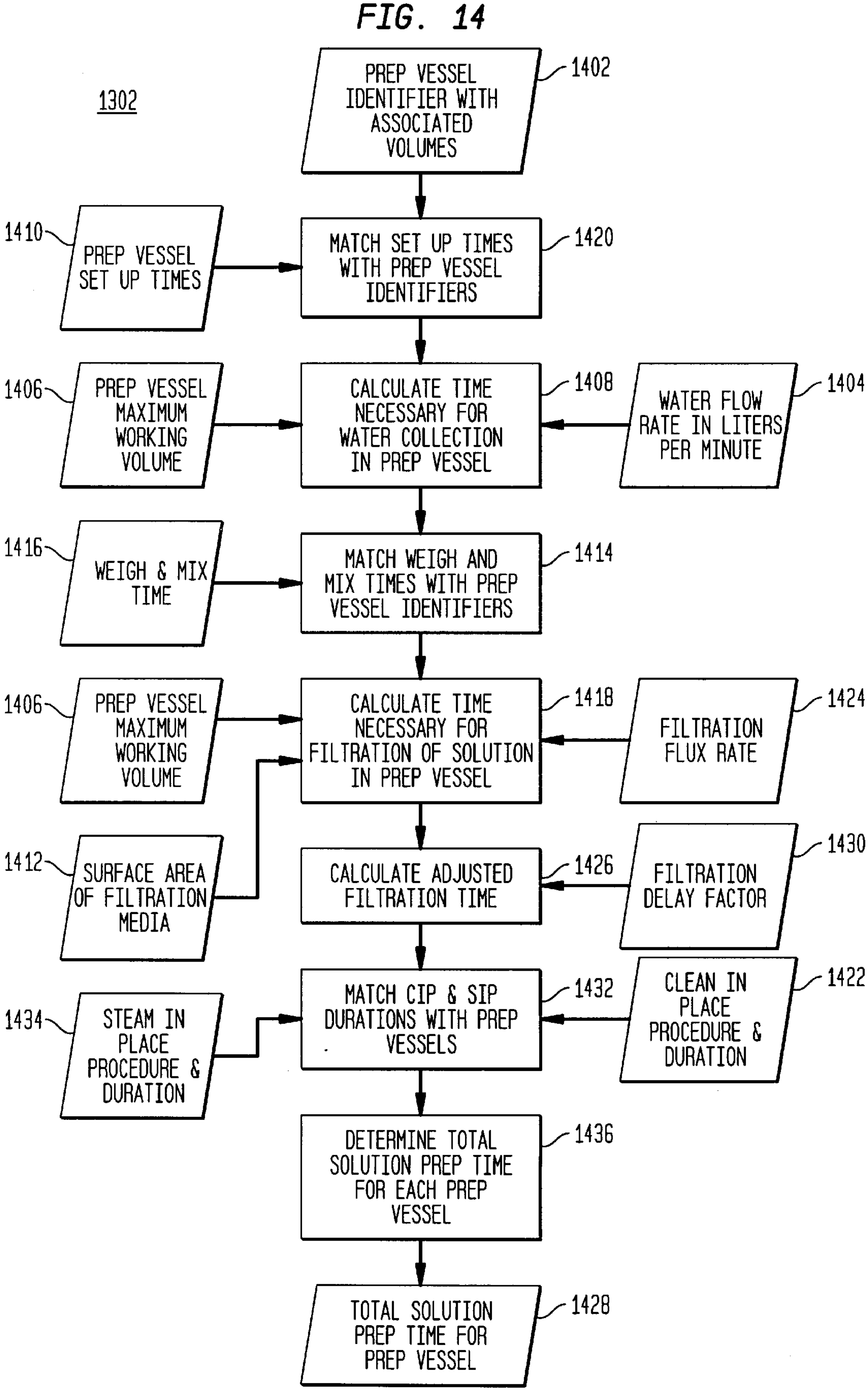
FIG. 14 is a block flow diagram illustrating the step of determining the solution preparation time associated with each solution preparation vessel.

FIG. 14 further illustrates step 1302, determining the solution preparation time for each solution preparation vessel. Step 1302 begins at step 1420 determining the setup time for a solution preparation vessel. Step 1420 compares a list of solution preparation vessels 1402 that are available for use in the biopharmaceutical production process and their associated solution preparation vessel identifiers with a master list of solution preparation vessel identifiers and their associated set up times 1410. Solution identifiers and solution preparation vessel identifiers are keys or tags that identify individual solution preparation vessel and solution types. Examples of solution preparation vessel set up times are illustrated in FIG. 15, column 1410. List of solution preparation vessels 1402 includes the minimum/maximum working volumes for each vessel, as well as the particular tasks associated with the solution preparation vessel and any process equipment necessary to complete solution preparation. The solution preparation tasks and equipment may be included in the total solution preparation time 1428 for use in equipment preparation and scheduling.

Next, step 1408 determines the water collection time for each preparation vessel. The water collection time is the amount of time necessary to fill the maximum working volume 1406 of the solution preparation vessel at the water collection rate 1404. Water collection rate 1404 is the rate at which the solution preparation vessel can be filled. Different solution preparation vessels have different water collection rates, depending on their specific water collection hardware. Step 1408 estimates the water collection time for each solution preparation vessel based on its maximum working volume 1410 and the water collection rate 1404. In the preferred embodiment, the volume of water to be collected is assumed to be the preparation vessel maximum working volume 1406. In alternative embodiments, the volume of water to be collected can be the actual volume of solution prepared in the solution preparation cycle. Examples of water collection rate 1404, maximum working volume 1406 and water collection time 1502 are illustrated in FIG. 15, columns 1404, 1406 and 1502, respectively.

Step 1414 defines the weigh and mix times associated with each solution preparation vessel. Weigh and mix time 1416 is the time required to weigh, mix and adjust the components of a solution. Preparation vessel identifiers 1402 are matched with the associated preparation vessel weigh and mix time 1416. The weigh and mix time 1416 associated with each solution preparation vessel in the biopharmaceutical process is thereby assigned to the associated solution preparation vessel identifier 1402. The default weigh and mix time variables can be manipulated by the process designer. Examples of weigh and mix time 1416 are illustrated in FIG. 15, column 1416.

Next, step 1418 determines the time required to filter the solution in a preparation vessel. The time required to filter the solution in a preparation vessel is the amount of time post-preparation filtering and transfer of the prepared solution out of the solution preparation vessel requires. Step 1418 calculates the time required to filter the solution in a preparation vessel based on preparation vessel identifier 1402, preparation vessel maximum working volume 1406, filtration flux rate 1424 and surface area of filtration media 1412. In the preferred embodiment, the volume of solution to be filtered is assumed to be the preparation vessel maximum working volume 1406. In alternative embodiments, the volume of solution to be filtered can be the actual volume of solution prepared in the solution preparation cycle. The surface area of the filtration media 1412 is the area of the filtration media used to filter the solution as it is transferred out of the solution preparation vessel. Filtration flux rate 1424 is the rate per unit area that the solution is can be filtered through the filtration media. Examples of filtration flux rate 1424 and surface area of filtration media 1412 are illustrated in FIG. 15, columns 1424 and 1412, respectively.

Step 1426 calculates the adjusted filtration time. The adjusted filtration time is the filtration time as determined in step 1418 multiplied by the filtration delay factor 1430. Filtration delay factor 1430 is based on the additional filtration time typically required to manipulate solution storage vessels on a fill line. Step 1426 calculates the adjusted filtration time by multiplying the filtration time calculated in step 1418 by the filtration delay factor 1430. FIG. 15, column 1430 shows exemplary values for filtration delay factor 1430.

Step 1432 determines clean in place and steam in place durations associated with each solution preparation vessel. Clean in place duration 1422 and steam in place duration 1434 are the durations of the cleaning procedures necessary to prepare a solution preparation vessel for use in the next solution preparation cycle. Step 1432 matches preparation vessel identifiers 1402 with clean in place duration 1422 and steam in place duration 1434 to determine the clean in place duration 1422 and steam in place duration 1434 times associated with each of the solution preparation vessel used in the biopharmaceutical production process. FIG. 15, columns 1422 and 1434 illustrate exemplary values for clean in place duration 1422 and steam in place duration 1434, respectively.

Step 1436 calculates total solution preparation time 1428 for each preparation vessel by summing the time values calculated in steps 1420, 1408, 1414, 1418, 1426 and 1432. Total solution preparation time 1428 represents the amount of time required to prepare the maximum working volume 1406 of solution in a particular solution preparation vessel. It should be noted, however, that one of ordinary skill could expand the calculation of total solution preparation time 1428 to include additional steps, factors or parameters other than those described herein. Such expansion would allow the present invention to calculate the total solution preparation time 1428 for a solution preparation vessel more accurately, or to include additional factors in the calculation. In addition, the calculation of total solution preparation time 1428 for a solution preparation vessel could also be adjusted to accommodate solution preparation working volumes which are less than the maximum solution preparation working volumes for a given solution prep vessel. Column 1428 of FIG. 15 provides exemplary values for total solution preparation time 1428.

FIG. 15 shows an exemplary list of solution preparation parameters. Examples of such parameters are minimum working volume 1402, maximum working volume 1406, set up time 1410, water collection rate 1404, water collection time 1502, weigh and mix time 1416, square area of filter media 1412, volume per unit of filter area per hour 1424 and post-solution preparation and cleaning procedure duration 1422, 1434.

Minimum working volume 1402 and maximum working volume 1406 are the minimum and maximum volumes of solution a solution preparation vessel can prepare. Set up time 1410 is the amount of time necessary to prepare a solution preparation vessel for the solution preparation process. Water collection time 1404 is the time necessary to fill the solution preparation vessel with the maximum working volume 1406 of water. Weigh and mix time 1416 is the time necessary to weigh and mix the ingredients of a solution in a particular solution preparation vessel. Square area of filter medium 1412 is the area of the filter associated with a particular solution preparation vessel. Volume per unit of filter area per hour 1424 is the flux rate per unit of filter area associated with a particular solution preparation vessel. Post solution preparation and cleaning procedure duration 1422 and 1434 are the times associated with preparing the solution preparation vessel after the preparation of a batch of solution.

Figure 16:
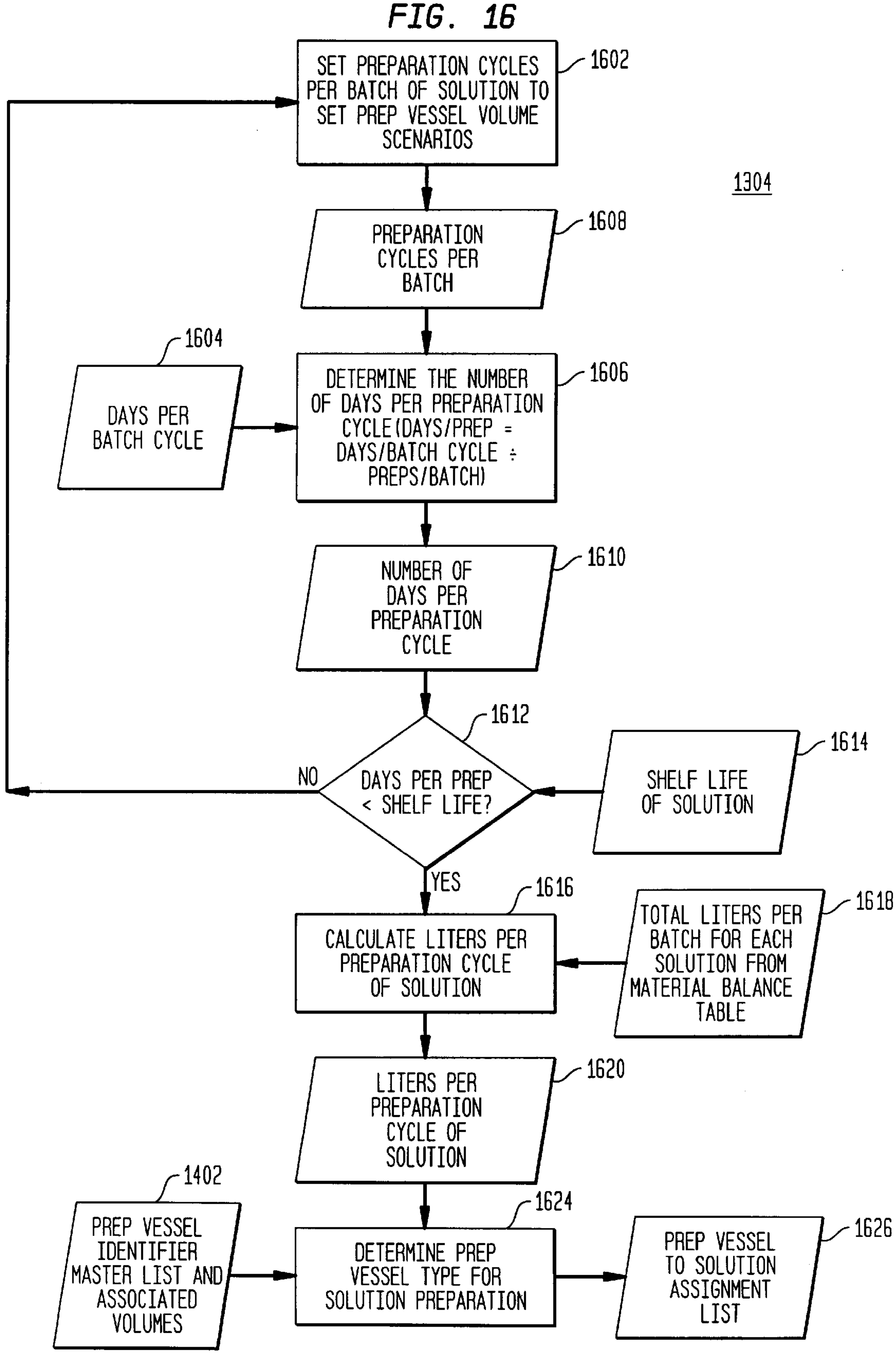
FIG. 16 is a block flow diagram illustrating the step of assigning the solutions required by the biopharmaceutical production process to particular solution preparation vessels.

FIG. 16 further illustrates step 1304, assigning the solutions required by the biopharmaceutical production process to particular solution preparation vessels. In order to schedule solution preparation cycles, each solution must be assigned to a solution preparation vessel. Step 1304 begins with step 1602. Step 1602 sets the preparation cycles per batch for a solution to be prepared. Preparation cycles per batch 1608 are the number of times a solution is prepared in a solution preparation vessel to support one product batch cycle. For example, if one-hundred and fifty liters of solution 101 is required to make a batch of product in a biopharmaceutical production process and the solution is to be prepared in a fifty liter solution preparation vessel, solution 101 may be prepared in three preparation cycles per batch of fifty liters each, yielding a 150 liter batch of solution 101. Alternatively, solution 101 may be prepared in four preparation cycles per batch of thirty-seven and one-half liters each in a solution preparation vessel of at least thirty-seven and one-half liters. In the preferred embodiment, preparation cycles per batch 1608 of solution is initially set by the designer. Preparation cycles per batch 1608 will affect values throughout the solution preparation scheduling module and the solution preparation procedure as a whole. The number of preparation cycles per batch 1608 for each solution will dictate the size of a solution preparation vessel and the time required to prepare a batch of solution.

Step 1606 determines the number of days per solution preparation cycle 1610 for each of the solutions involved in the biopharmaceutical production process. The number of days per solution preparation cycle 1610 is determined from preparation cycles per batch 1608 and days per batch cycle 1604. The batch cycle time is the amount of time required to produce one batch of product. Days per batch cycle 1604 is the number of days between successive batches of product. The number of days per preparation cycle 1610 is the number of days between the beginnings of each solution preparation. Dividing the number of days per batch cycle by the preparation cycles per batch 1608 yields the number of days per preparation cycle 1610. For example, if one-hundred and fifty (150) liters of solution per batch of product is to be prepared in a solution preparation vessel with a working volume of fifty liters, the preparation cycles per batch 1608 is three. If one batch of biopharmaceutical product is produced every 6 days, the days per batch cycle 1604 is six. Given that there are three preparation cycles per batch for a particular solution, and there are six days per batch cycle, the number of days per preparation cycle 1610 is determined to be two. That is, there are two days between the beginnings of each fifty liter preparation cycle of solution.

Decision step 1612 checks the shelf life of the solution against the number of days per preparation cycle 1610. In the preparation of solutions, it is possible that the number of days per preparation cycle 1610 may exceed the shelf life of the solution. In such a situation, it is possible to have “stale” solution available for use in the biopharmaceutical production process because it has been held to long. If decision step 1612 determines that number of days per preparation cycle 1610 is greater than the shelf life, step 1304 continues at step 1602 where the number of preparation cycles per batch 1608 is adjusted (preferably increased). Adjusting the preparation cycles per batch 1608 of the solution will allow the solution preparation process designer to decrease the number of days per preparation cycle 1610 as determined in step 1606. If decision step 1612 determines that the number of days per preparation cycle 1610 is less than the shelf life of the instant solution, step 1304 continues at step 1616.

Step 1616 calculates the liters per preparation cycle of solution 1620 for each solution. Liters per preparation cycle of solution 1620 is calculated by dividing the total liters per batch for each solution 1618 by the number of preparation cycles per batch 1608 as determined in step 1602. Total liters per batch for each solution 1618 is the quantity of each solution type needed to produce a batch of product in the biopharmaceutical production process and is stored in the material balance table.

Step 1624 determines the solution preparation vessel type for the preparation of each solution. Step 1624 assigns each solution to a solution preparation vessel in step 1624, generating preparation vessel to solution assignment list 1626. Step 1624 assigns each solution to a solution preparation vessel based on the number of liters per preparation cycle of solution 1620 and preparation vessel identifier and associated volume list 1402. Solution preparation vessels are chosen from preparation vessel identifier and associated volume list 1402 in order to place liters per preparation cycle of solution 1620 within the minimum working volume 1402 and the maximum working volume 1406 range of a solution preparation vessel. Preparation vessel to solution assignment list 1626 is a list of solutions to be prepared in the biopharmaceutical production process, and their associated solution preparation vessel.

FIG. 17 illustrates exemplary values of data for the present invention. Column 1618 illustrates exemplary values for the total liters per batch for each solution 1618. Column 1608 illustrates exemplary values for number of preparation cycles per batch 1608. In the instant example, all of the solutions as shown in column 1608 are prepared in one preparation cycle per batch. Column 1604 illustrates exemplary values for days per batch cycle 1604. Column 1610 illustrates exemplary values of number of days per preparation cycle 1610 as determined in step 1606. In the instant example, since the number of preparation cycles per batch 1608 of solution is equal to one for all of the solutions in the solution production process, the number of days per preparation cycle 1610 equals the number of days per batch cycle 1604. Column 1614 illustrates exemplary values of shelf life of solution 1614. Column 1706 illustrates exemplary values for the outcome of decision step 1612 where number of days per preparation cycle 1610 is compared to shelf life of solution 1614. Column 1618 of FIG. 17 illustrates exemplary values for total number of liters per batch for each solution 1618. Since the number of preparation cycles per batch 1608 for each of the solutions is one in the instant example, the number of liters per preparation cycle of solution 1620 is equal to total liters per batch for each solution 1618.

Columns 1708–1728 of FIGS. 17 and 18 illustrate an exemplary solution to solution preparation vessel assignment list 1626. The tank identifiers run along the top of column 1708–1728 and the solution identifiers run along the vertical axis on the far left hand side of the tables in FIGS. 17 and 18. In FIG. 18, exemplary solution preparation vessel identifiers are placed in the columns horizontally opposed from the solution identifiers indicating that the preparation vessel is assigned to that solution.

FIG. 18 illustrates exemplary preparation vessel to solution assignment list 1626. Columns 1626 illustrates preparation vessel to solution assignments. Column 1722 illustrates solution preparation vessel #108 is associated with solutions S-0107, S-0108, S-0112, S-0115, S-0117, and S-0120. Similarly, column 1724 illustrates solution preparation vessel #109 is associated with solutions S-0116, S-0118, and S-0119. Column 1726 illustrates solution preparation vessel #110 is associated with solutions S-0106 and S-0114. Column 1728 illustrates solution preparation vessel #111 is associated with solutions S-0101 and S-0113.

Figure 20:
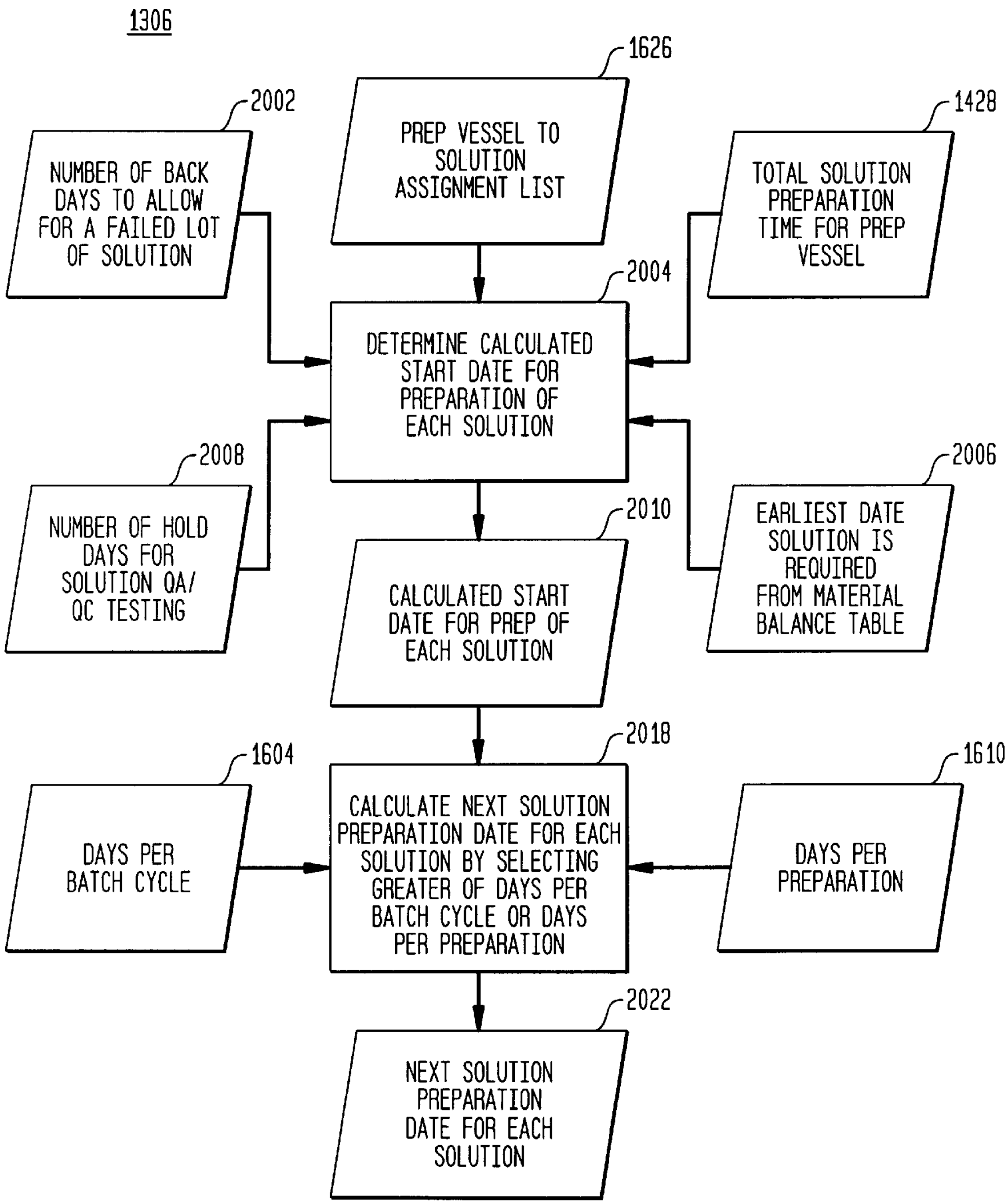
FIG. 20 is a block flow diagram illustrating the step of determining the calculated preparation start date and next solution preparation date for each solution.

FIG. 20 further illustrates step 1306, determining the calculated start date for preparation of each solution 2010 and the next preparation date for each solution 2022. The next preparation date 2022 is based on the calculated start date 2010 and the number of days per solution preparation cycle 1610. Step 1306 begins at step 2004, determining the calculated start date for the preparation of each solution ("calculated start date") 2010. Calculated start date 2010 is the date by which the preparation of a solution should begin in order to prepare the solution in time for use in the biopharmaceutical production process. The calculated start date 2010 is determined by calculating back from the earliest date a solution is needed 2006 in the biopharmaceutical production process and the "lead time" needed to prepare and test a batch of solution before use. In the preferred embodiment, the back calculated values are the total solution preparation time for a solution preparation vessel 1428, the number of back days to allow for a failed lot of solution 2002 and the number of hold days for solution quality assurance and quality control (QA/QC) testing 2008. If a batch of solution fails QA/QC testing, the solution will have to be prepared again, and this lead time is expressed as the number of back days to allow for a failed lot of solution 2002. The earliest date a solution is required 2006 comes directly from the process time line via the material balance table. The material balance is a list of solution formulation reagents and calculation sets, each of which is associated with a unit operation. The material balance table includes the volumes of all the process streams in the block flow diagram 704 and their constituent solution components according to the formulation of the solution. The material balance table also identifies the time that a solution is required in the manufacturing process according to the task scheduling data in the process time line 906.

After the calculated start date for solution preparation 2010 is determined, it is assigned to the associated solution and prep vessel solution assignment list 1626 resulting in a calculated start date 2010 for the preparation of each solution and its associated solution preparation vessel.

Step 2018 calculates the next solution preparation date for each solution after the calculated start date 2010 has been determined for each solution by selecting the greater of days for batch or days for preparation. Step 2018 calculates the next solution preparation date for each solution by. The next solution date is calculated in step 2018 by adding the number of days per preparation cycle 1610 to the calculated start date for preparation of each solution assigned to a preparation vessel 2010.

Figure 24:
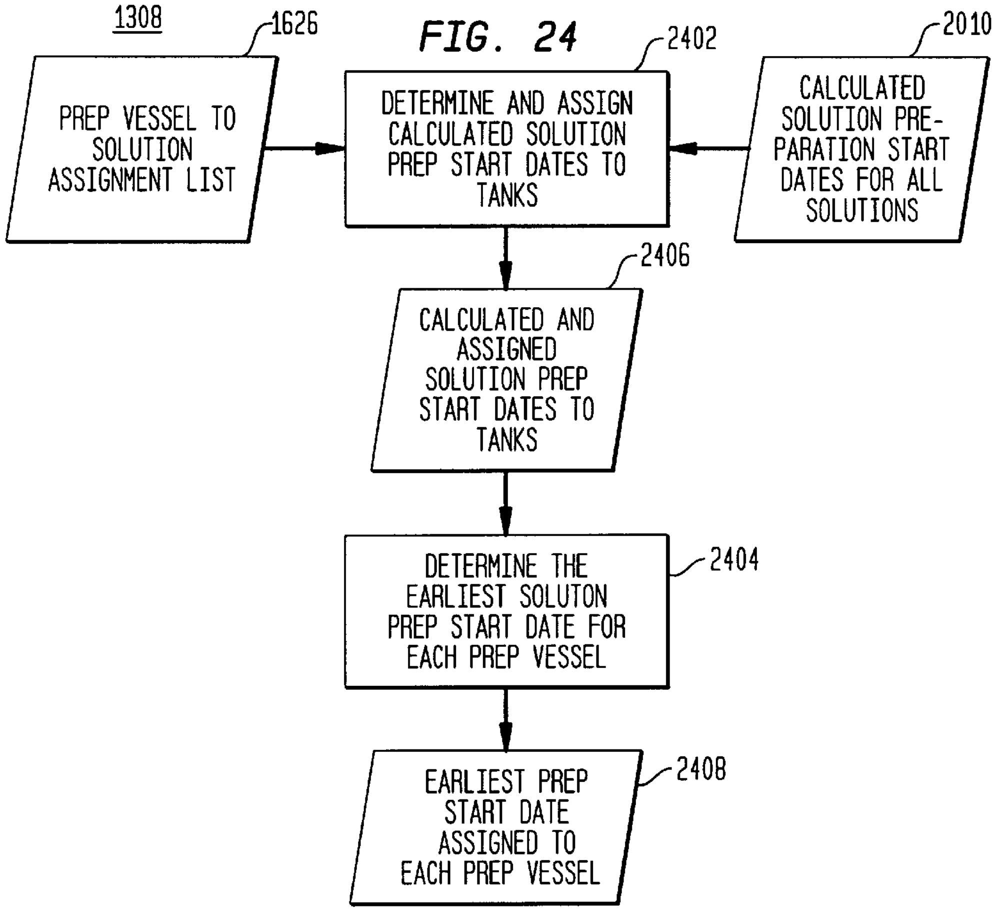
FIG. 24 is a block flow diagram illustrating the step of determining the earliest solution preparation start date for each solution preparation vessel.

FIG. 24 further illustrates step 1308, determining the earliest solution preparation start date for each solution preparation vessel in a process cycle. Step 1308 begins by determining and assigning the calculated solution preparation start dates 2010 to each solution preparation vessel in step 2402. Solution preparation vessel ("prep vessel") to solution assignment list 1626 and calculated solution preparation start date for all solutions 2010 are cross-referenced to generate calculated and assigned solution prep start dates to prep vessels 2404. Step 2406 generates the earliest solution preparation start date for each solution preparation vessel ("earliest start date") 2408. Calculated and assigned solution prep start dates to prep vessels 2404 is processed in step 2406 to determine the earliest solution preparation start date associated with each preparation vessel. Step 2406 results the earliest preparation start dates assigned to each preparation vessel 2408. This list provides the solution preparation vessels necessary for the biopharmaceutical production process, as well as the earliest date each solution preparation vessel is needed for preparation of solution in the process cycle.

Figure 25:
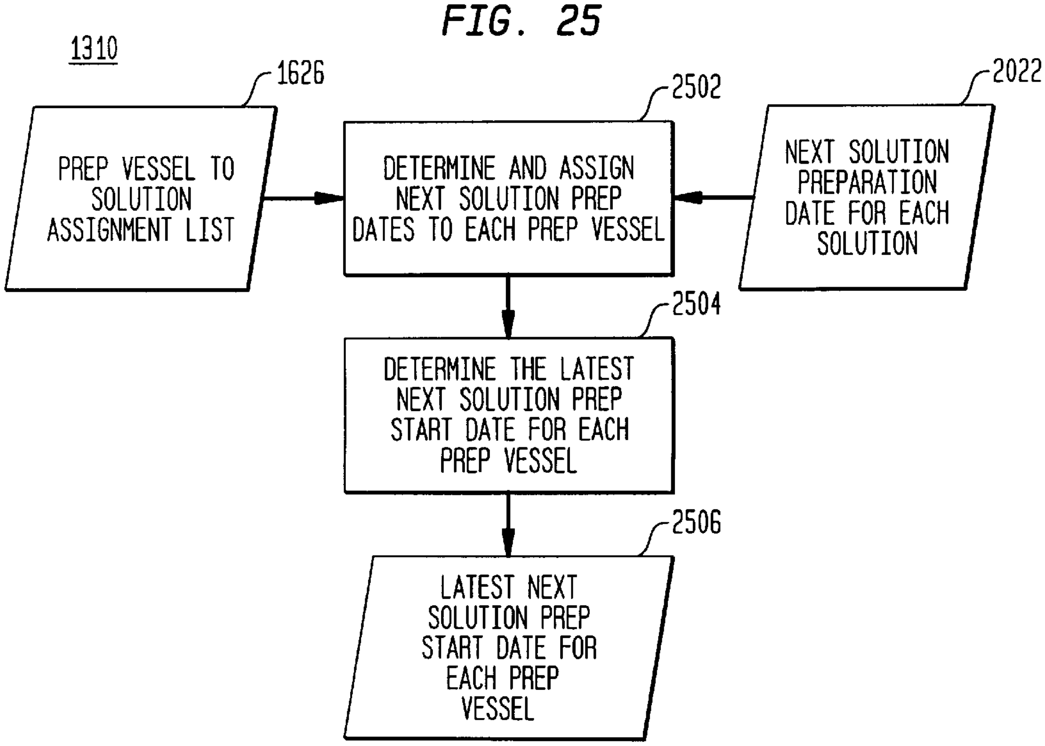
FIG. 25 is a block flow diagram illustrating the step of determining the latest solution preparation start date for each solution preparation vessel.

FIG. 25 further illustrates step 1310, determining the latest solution preparation start date for each solution preparation vessel. Step 1310 begins by determining and assigning the next solution preparation dates to each solution preparation vessel at step 2502. A next solution preparation date is the date that a solution preparation vessel will be needed for the preparation of solution next after the earliest start date 2408. The solution preparation vessel to solution assignment list 1626 and next solution preparation date for each solution 2022, as determined in step 2018, are matched to generate a list of next solution preparation dates to each preparation vessel at step 2502. Next, step 2504 determines the latest next solution preparation start date associated with each preparation vessel 2506. The latest next solution preparation start dates are those dates associated with preparation vessels which signify the last preparation of solution procedure to occur in a particular solution preparation vessel during a process cycle.

Figure 26:
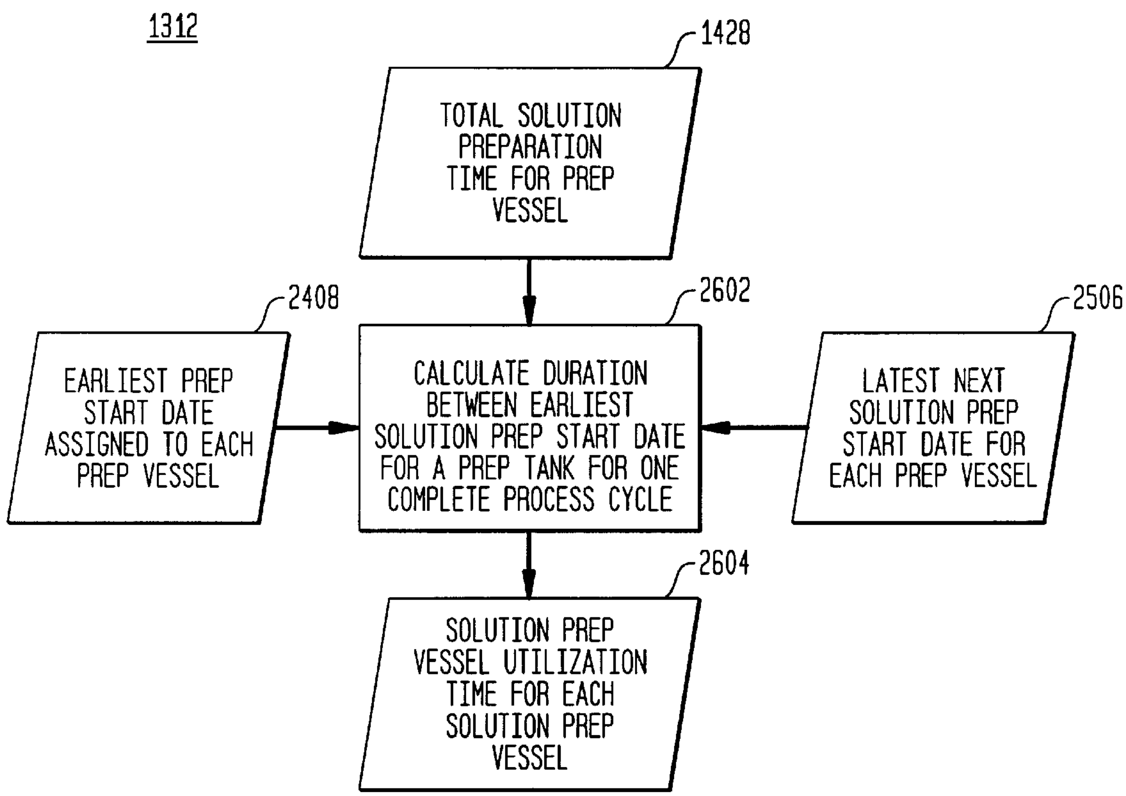
FIG. 26 is a block flow diagram illustrating the step of calculating solution preparation vessel utilization time.

FIG. 26 further illustrates step 1311, calculating solution preparation vessel utilization time for each solution preparation vessel 2604. Solution preparation vessel utilization time 2604 for each preparation vessel is that time during which the vessel is occupied with the preparation of solution(s) for a particular manufacturing cycle. Solution preparation vessel utilization time 2604 is the duration between the earliest preparation start date 2408 and the end of latest next solution preparation cycle. The end of latest next solution preparation cycle is calculated by adding the total solution preparation time for a solution preparation vessel 1428 to the latest next solution preparation start date for each solution preparation vessel 2506, which results in the date when the solution preparation vessel has completed preparing solution in a process cycle. Solution preparation vessel utilization time for each solution preparation vessel 2604 is determined by comparing the earliest solution preparation start date 2408 with the sum of the latest next solution preparation start date 2506 and the total solution preparation time for each solution preparation vessel 1428.

Figure 27:
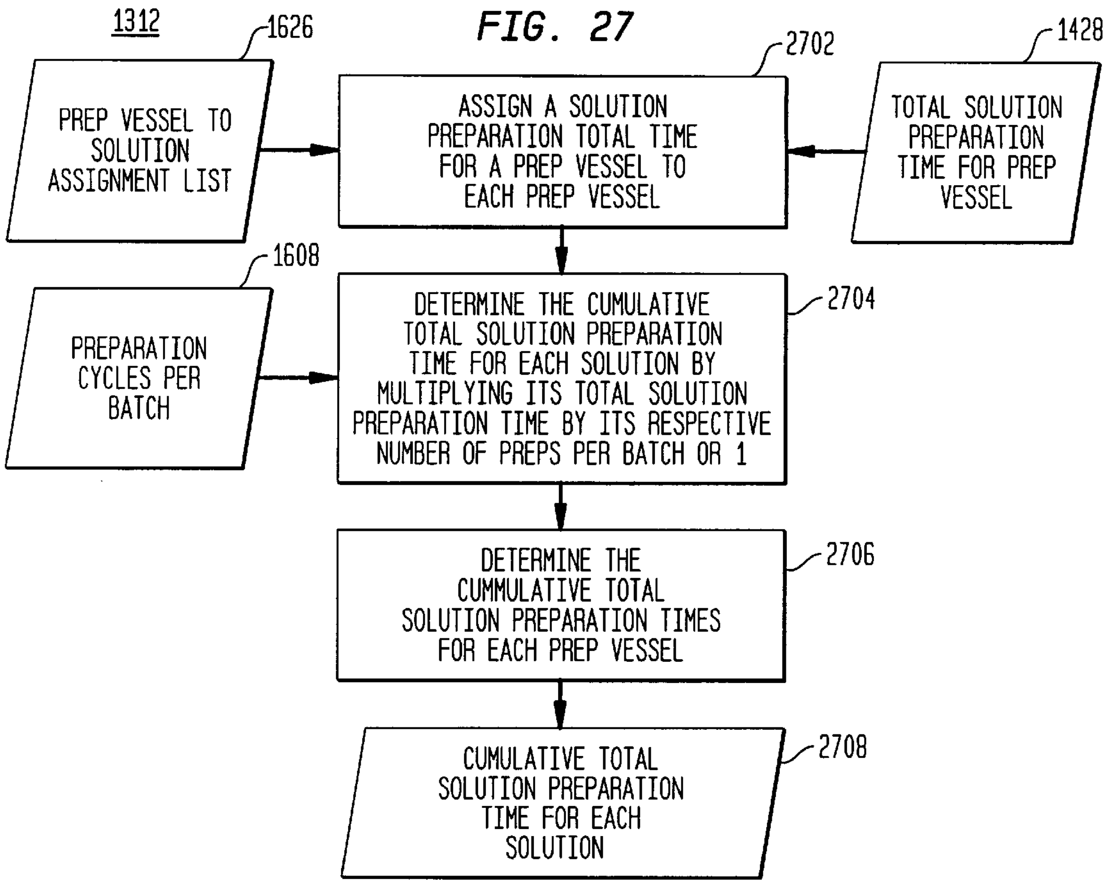
FIG. 27 is a block flow diagram illustrating the step of calculating the cumulative solution preparation time for each solution preparation vessel.

FIG. 27 further illustrates step 1312, calculating the cumulative solution preparation time for each solution preparation vessel 2708. Cumulative solution preparation time for each solution preparation vessel 2708 is the amount of time that each preparation vessel is actually occupied with the preparation of solution. Essentially, cumulative solution preparation time is the product of the total solution preparation time for a solution preparation vessel 1428 and the number of solution preparation cycles that the solution preparation vessel is used for in the manufacturing cycle. For example, if the total solution preparation time for a solution preparation vessel is six hours per cycle, and the solution preparation vessel is used in the preparation of six cycles of solution, the cumulative solution preparation time 2708 is thirty-six hours.

Step 1312 begins by assigning a solution preparation total time for each solution preparation vessel to each preparation vessel at step 2702. Total solution preparation time for each preparation vessel 1428 from step 1302 is matched to preparation vessel to solution assignment list 1626. The lists of preparation vessels, the solutions associated therewith and their total solution preparation times are input into step 2704. Step 2704 determines the cumulative solution preparation time for each solution by multiplying the total solution preparation time 1428 for the solution preparation vessel by a solution's respective number of preparation cycles per batch 1608. Step 2704 results in the amount of time each solution preparation vessel is occupied with the preparation each particular solution. Step 2706 determines the cumulative solution preparation time for each solution preparation vessel 2708 by summing the amount of time each solution preparation vessel is actually occupied with the preparation of solution. Steps 2704 and 2706 result in the list of cumulative solution preparation times for each preparation vessel 2708.

Figure 28:
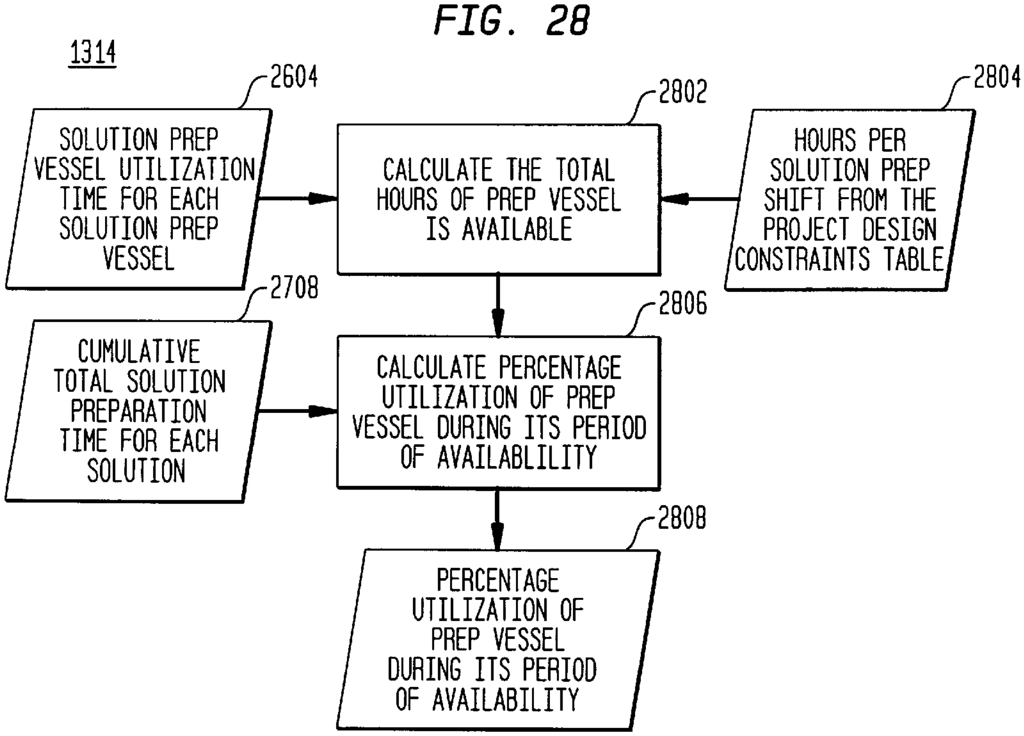
FIG. 28 is a block flow diagram illustrating the step of determining the percentage utilization of each solution preparation vessel.

FIG. 28 further illustrates step 1314, determining the percentage utilization of each solution preparation vessel. The percentage utilization of a solution preparation vessel is the ratio of the cumulative total solution preparation time for each solution preparation vessel 2708 to the total time that a solution preparation vessel is available for solution preparation 2802 expressed as a percentage. Determining the percentage utilization of each solution preparation vessel 2808 allows the process designer to tailor the preparation cycles per batch 1602 of each solution to maximize the utilization of the solution preparation equipment, thereby minimizing cost and maximizing efficiency. Step 1314 begins by calculating the total number of hours a solution preparation vessel is available at step 2802. The total number of hours a preparation vessel is available is the product of the solution preparation vessel utilization time 2604, as determined in step 2602, and the hours per solution preparation shift 2804. The hours per solution preparation shift 2804 is provided from in the original process design parameters for the biopharmaceutical production process. For example, if the process is designed as a two shift process, the plant would normally run sixteen hours a day, and the number of hours per solution prep shift 2804 would be sixteen.

Step 2802 multiplies the solution preparation vessel utilization time 2604 by the hours per solution preparation shift per day 2804. Step 2802 results in the number of raw hours that a solution preparation vessel is available to the biopharmaceutical production process. For example, if the solution preparation vessel utilization time 2604 is six days, and the biopharmaceutical production process is run one shift a day (eight hours), the number of hours the solution preparation vessel is available for use in the biopharmaceutical production process is forty-eight. Forty-eight is the maximum number of hours that the solution preparation vessel is available for use. If such a solution preparation vessel is actually occupied with the preparation of solution for twenty-four hours, the percentage utilization of the solution preparation vessel during its period of availability 2808 would be fifty percent.

Step 2806 calculates the percentage utilization of each solution preparation vessel. The percentage utilization 2808 is determined by comparing the total number hours a solution preparation vessel is available as calculated in step 2802 with the cumulative total solution preparation time for each solution preparation vessel 2708. By dividing cumulative total solution preparation time for each solution preparation vessel 2708 by the total number of hours a preparation vessel is available as calculated in step 2802, percentage utilization of each preparation vessel during its period of availability 2808 is calculated, as explained in the example above.

Figure 29:
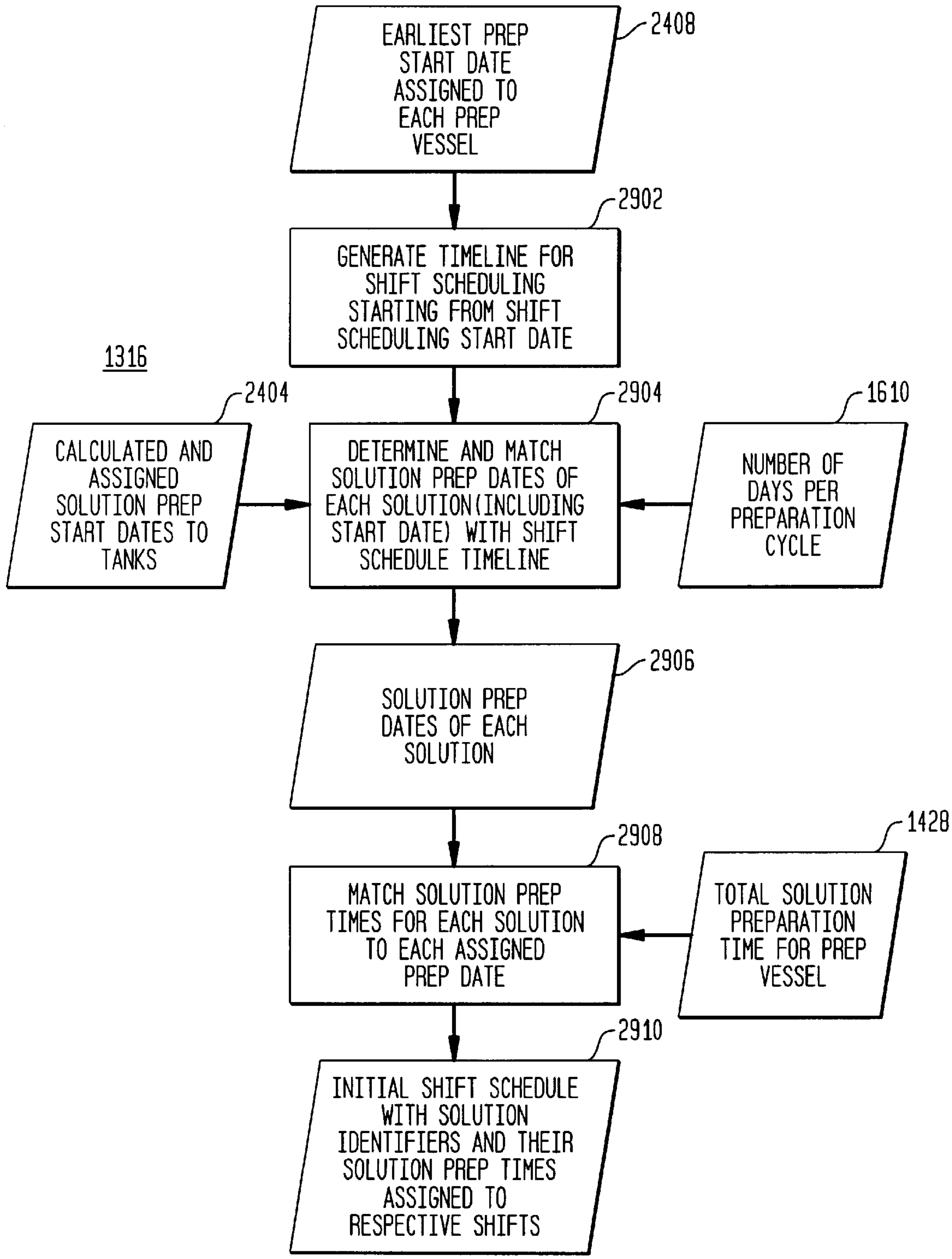
FIG. 29 is a block flow diagram illustrating the step of generating an initial solution prep shift schedule.

FIG. 29 further illustrates step 1316, generating the initial shift schedule 2910. The initial shift schedule 2910 is a table of dates scheduling the preparation of solutions for use in the biopharmaceutical production process. Initial shift schedules 2910 are generated for each of the solution preparation vessels. An initial shift schedule for a solution preparation vessel contains the solutions to be prepared and their associated preparation dates, as well as the days per prep cycle. FIG. 31 is an example of an initial shift schedule. Step 1316 begins with step 2902, generating a time-line starting from the earliest start prep date of all the solutions required by the biopharmaceutical production process at step 2902. In the preferred embodiment, the time-line is incremented one day at a time, out to a date predetermined by the system designer. In alternative embodiments, the time-line and shift schedule are incremented or delimited in whichever time intervals are most convenient.

Step 2904 determines and matches solution preparation dates for each solution 2404 with the dates in the shift schedule time-line from step 2902. Matched solution preparation dates to solution preparation vessels 2404 are entered into the shift schedule time-lines for each of the solution preparation vessels. Starting from the calculated start date 2404, step 2904 enters successive preparation start dates for each solution associated with a preparation vessel based on the number of days per preparation cycle 1610. For example, if a particular solution assigned to solution preparation vessel has two days per preparation cycle, the solution is scheduled for preparation in its solution preparation vessel every two days after its calculated start date 2010. Step 2904 results in a list of solutions and associated preparation dates for each solution preparation vessel 2906.

Step 2908 enters the total number of solution preparation hours for each solution into each initial shift schedule time-line. The result is the number of preparation hours each day associated with every solution preparation in the initial shift schedule. Step 2908 matches solution preparation times for each solution preparation vessel 1428 with the dates assigned in each of the shift schedule time-lines to generate the initial shift schedule 2910. The total number of hours each solution preparation vessel is occupied with the preparation of solution each day can then be determined by adding the number of solution preparation hours associated with each day on an initial shift schedule time-line 2910. In the preferred embodiment, the number of hours of solution preparation per day per solution preparation vessel is essentially the product of the number of solution preparation cycles and the total solution preparation time for the solution preparation vessel 1428. For example, if a solution preparation vessel has a total solution preparation time for the solution preparation vessel 1428 of five hours, and is scheduled for four solution preparation cycles, the solution preparation vessel is scheduled for twenty hours of solution preparation that day. Step 2910 results in the initial shift schedule with solution identifiers and their solution preparation times assigned to their respective shifts 2910.

FIG. 31 is an example of an initial shift schedule for solution preparation vessel 101. Exemplary solution identifiers are shown in column 3102. Column 3102 illustrates exemplary solution identifiers for the solutions used in the biopharmaceutical production process. Solution identifiers 3102 with date entries in corresponding An exemplary value for hours per solution prep shift is given in box 2804. Exemplary values for number of days per preparation cycle is given in column 1610. Exemplary values of solution prep dates of each solution is given in column 2906.

Figure 30:
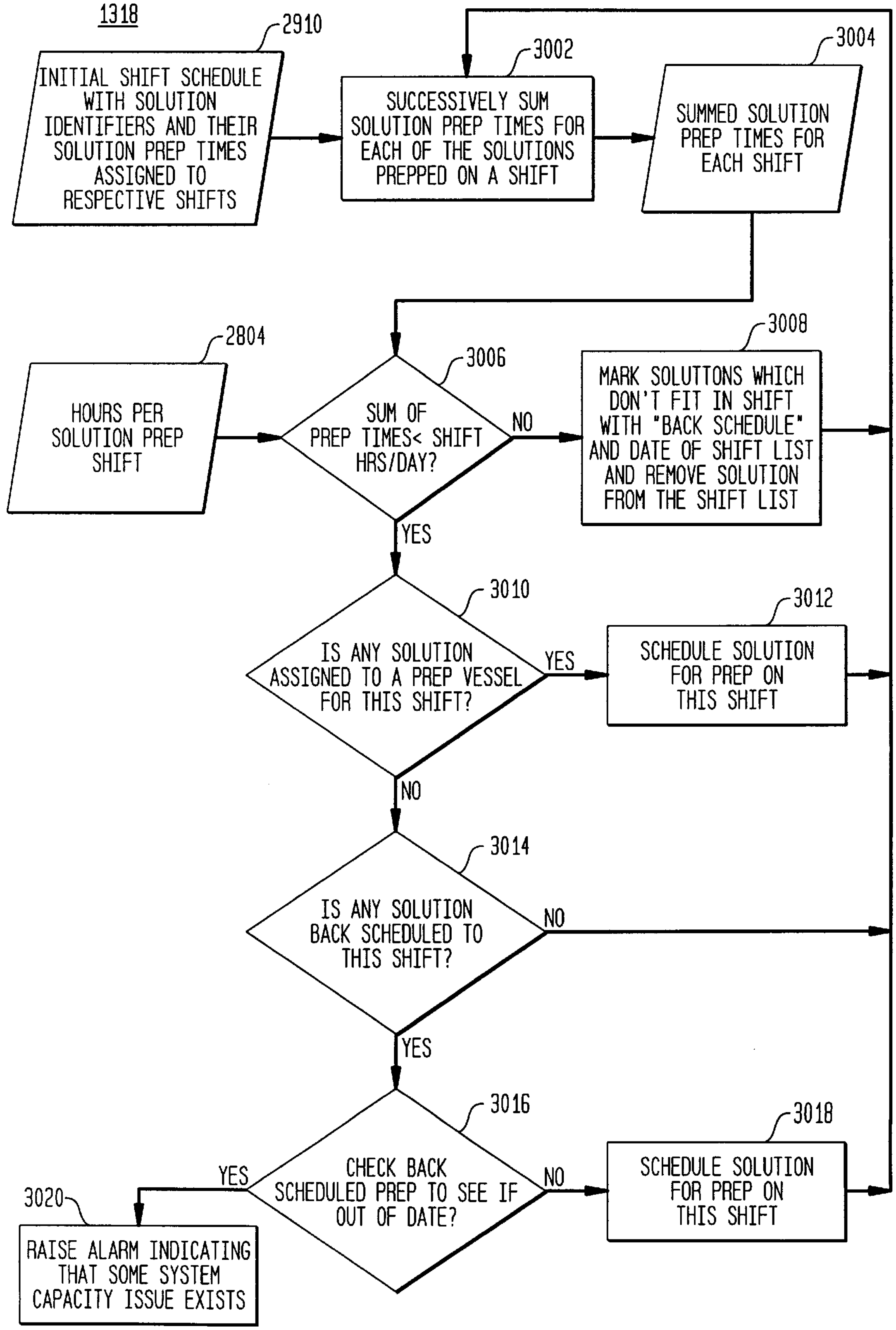
FIG. 30 is a block flow diagram illustrating the step of back scheduling solution preparation in the initial solution prep shift schedule.

FIG. 30 further illustrates step 1318, back scheduling solution preparation in the initial shift schedule. Solution preparation is initially scheduled in steps 1302–1316 without considering the possibility of scheduling conflict. Back scheduling solution preparation is done in order to avoid conflicts in the solution preparation process. Scheduling conflicts result from scheduling more solution preparation cycles for a solution preparation vessel than can be accommodated in the amount of time available. For example, a scheduling conflict will occur if a particular solution preparation vessel is scheduled for twenty hours of solution preparation on one sixteen hour day. The present invention back schedules those solution preparation cycles that do not fit into their scheduled shift or day. For example, if a solution preparation vessel is scheduled for three solution preparation cycles of three hours each, the solution preparation vessel is scheduled for nine hours of preparation activity. If the production facility runs on an eight hour day, not all of the solutions can be prepared as scheduled. The present invention back schedules one of the solution preparation cycles, leaving six hours of solution preparation to be completed in one day. The back scheduled solution preparation cycle is rescheduled to the first previous available shift so that the solution is prepared in time for use in the biopharmaceutical production process as scheduled in the process time line. After step 1318 is completed, the solution preparation time line is in proper form for use as a solution preparation and scheduling and management tool.

Step 1318 begins at step 3002, successively summing the solution preparation times for each of the days or shifts in the initial shift schedule 2910. the solution preparation times are summed in order to determine the total solution preparation time for each solution preparation vessel on each shift. For the purpose of summing the solution preparation times, a shift is the number of hours in one biopharmaceutical production process day (e.g., eight hours for a single shift plant, sixteen hours for a double shift plant, etc.). Step 2002 results in a list for each solution preparation vessel of summed solution preparation times for each shift 3004. Summed solution preparation times 3004 are compared with the available shift hours/day 2804 in step 3006. If the sum of the scheduled solution preparation times 3004 exceeds the number of shift hours available 2804, solutions are marked as "back scheduled" and are rescheduled for the first previously available shift. From the previous example, one of the three hour solution preparation cycles is to be rescheduled for the first previously available shift, leaving six hours of solution preparation in the eight hour shift. If the originally scheduled day for the nine hours of solution preparation was Wednesday, the three hour solution preparation would be back scheduled to Tuesday. After a solution that doesn't fit into the current day has been back scheduled, it is removed from the current day schedule.

If step 3006 determines that the number of shift hours 2804 available exceeds the sum of the scheduled solution preparation times 3004, step 3010 determines if any solution is scheduled for preparation on the current shift. If step 3010 determines that a solution is scheduled for preparation in the current shift, step 3012 leaves the solution scheduled for preparation in the shift schedule.

If step 3010 determines that no solutions are assigned to the solution preparation vessel for the shift that is being evaluated, step 1318 continues to step 3014. Step 3014 determines if any solutions have been back scheduled to the current shift for preparation for a later shift. If no solution preparation cycles have been back scheduled to the current shift, the process continues to step 3002 where the next shift is analyzed for back scheduling. If step 3014 determines that solution preparation cycles have been back scheduled, the process continues at step 3016. Step 3016 checks the original scheduling date on the back scheduled solution preparation cycle to determine if the back scheduled date is earlier than the original scheduling date minus the periodicity of the back scheduled solution. For example, if the solution has been successively back scheduled for four days (i.e., the preparation cycle of the solution had to be scheduled back four days in order to fit into a shift), and its periodicity was two days, the back scheduled prep would be potentially interfering the previously scheduled prep of the same solution thereby indicating a shift schedule capacity error.

If step 3016 determines that the solution is back scheduled beyond its periodicity, an alarm is raised indicating that a system capacity issue exists at step 3020. If step 3016 determines that the back scheduled solution preparation cycle not earlier than its orbitally scheduled date minus its periodicity, the solution preparation cycle is scheduled for the current shift at step 3018.

Figure 32:
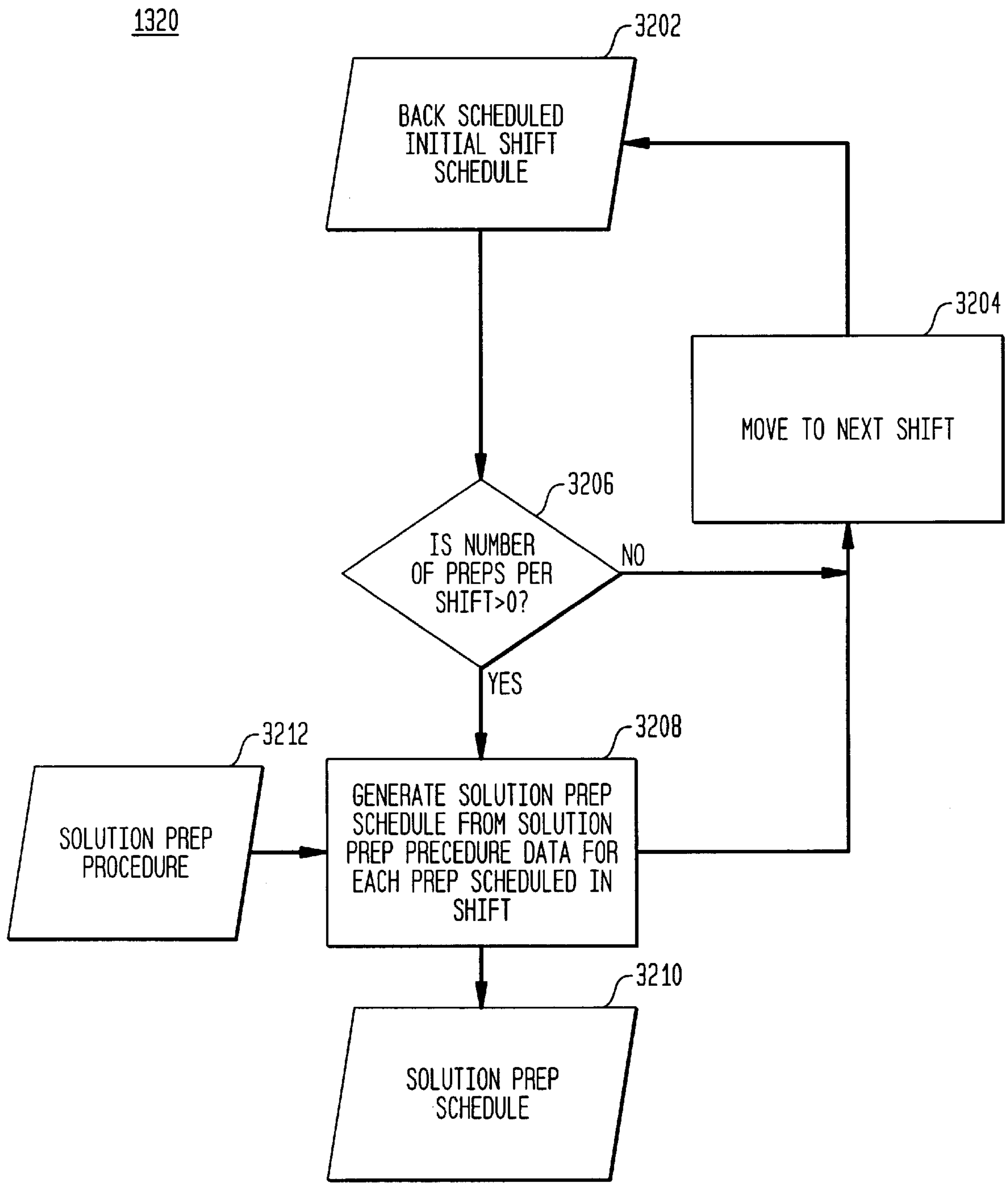
FIG. 32 is a block flow diagram illustrating the process for generating a solution preparation schedule.

FIG. 32 further illustrates step 1320, generating solution preparation schedule 3210. Solution preparation schedule 3210 schedules each task associated with solution preparation for the biopharmaceutical process based on the back-scheduled shift schedule 3202 and the solution preparation procedure 3212. Solution preparation schedules 3210 are generated for each solution preparation vessel that has an assigned solution. Back-scheduled initial shift schedule 3202, as generated in Step 1318, contains the solution preparation vessel to solution preparation assignment for each of the shifts in the initial shift schedule 2910. Step 1320 is performed for each of the shifts in the initial shift schedule 2910, thereby scheduling all of the solution preparation tasks for each solution preparation vessel on each shift.

Step 1320 begins at Step 3206, determining the number of solution preparation that are scheduled for the current shift in the back-scheduled initial shift schedule 3202. If no solutions are scheduled for preparation, step 1320 continues to step 3204 which moves to the next shift in the back-scheduled initial shift schedule 3202. If there are solution preparations scheduled for the current shift, step 1320 continues to step 3208. Step 3208 generates the solution preparation schedule 3210 from the solution preparation procedure data 3212 for each solution preparation scheduled in the shift. For example, if two solutions are scheduled to be prepared in solution preparation vessel 101, each task in each solution preparation procedure is scheduled out in solution preparation schedule 3210. An exemplary solution preparation procedure 3212 is illustrated in FIG. 14 (steps 1420, 1408, 1414, 1418, 1426, 1432, and 1436).

FIG. 15 illustrates exemplary solution preparation procedure data, as described above, used to generate solution preparation schedule 3210. Step 3208 schedules out each task for each solution preparation assigned to the current shift. After step 3208, and if there are additional shifts in the back-scheduled initial shift schedule 3202, step 1320 continues at step 3204 proceeding to the next shift in back-scheduled initial shift schedule 3202. Step 1320 repeats to schedule all of the solution preparations in the back-scheduled initial shift schedule. Step 1320 results in, therefore, solution preparation schedule 3210 which is a time line, by shift, for each solution preparation task for each solution preparation assigned to a solution preparation vessel.

3.0 Equipment Preparation Scheduling Module

The object of the equipment preparation module is to simulate, schedule and model equipment preparation and loading in the biopharmaceutical production process. Equipment used in the biopharmaceutical production becomes soiled and must be cleaned, wrapped and sterilized in order to be used again. The process of cleaning, wrapping and sterilizing is known as equipment preparation. A piece of equipment that has been used in the biopharmaceutical production process and requires preparation before it can be used again is called a soiled process component. Equipment preparation is performed in order to sustain the biopharmaceutical production process.

Current methods for the design equipment preparation procedures typically fall short of accurately defining the relatively complex procedures that are executed in an equipment prep area. As a result the equipment and work areas associated with equipment prep are usually inefficiently designed. Since the cleaning and sterilizing (prep) equipment associated with equipment prep activities are capital and utility intensive, an improved method for accurately modeling and optimizing these areas of a biopharmaceutical production facility is needed. The preferred embodiment provides a computer simulation method for the design and scheduling of equipment prep operations which is more accurate and efficient than conventional design methods.

Figure 33:
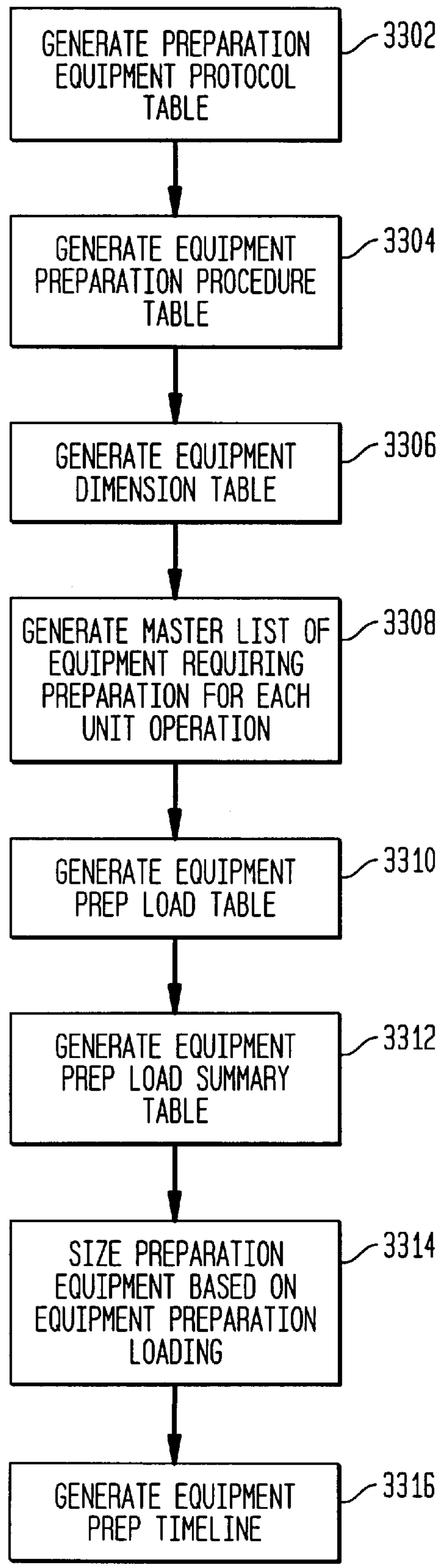
FIG. 33 is a block flow diagram illustrating an overview of the process for scheduling and simulating solution preparation in a biopharmaceutical production process.

FIG. 33 is a flowchart illustrating an overview of the process for scheduling and simulating equipment preparation in a biopharmaceutical production process. Step 3302 generates a preparation equipment protocol table. A preparation equipment protocol is a protocol for the operation of a piece of preparation equipment. Preparation equipment protocols usually include a plurality of equipment preparation tasks. A preparation task is a step in the equipment preparation process. For example, in a glassware dryer, a task may be loading the dryer, preheating the dryer, drying the glassware, unloading the dryer, etc. A preparation equipment protocol table is a set of standard preparation equipment protocols to clean soiled process components. Preparation equipment protocols are usually developed through experimentation and quality assurance testing. The preparation equipment protocols that prepare the soiled process components for reuse most effectively and to the required levels of cleanliness become the preparation equipment protocols.

Preparation equipment protocols are associated with specific pieces of preparation equipment. Examples of preparation equipment are bench sinks, wash stations, glassware washers, glassware dryers, carboy washers, carboy dryers, autoclaves, steam sterilizers, etc. Furthermore, there may be multiple preparation equipment protocols per piece of preparation equipment. For example, there may be four preparation protocols associated with each type of bench sink, each having different combinations of bench sink cleaning tasks and durations. Although the preferred embodiment describes a finite set of preparation equipment, soiled process components and preparation equipment protocols, one of ordinary skill could easily expand the process described herein to any preparation equipment or soiled process components.

Step 3304 generates an equipment preparation procedure table. An equipment preparation procedure is a standard procedure comprising a plurality of preparation equipment protocols by which a soiled process component is cleaned and sterilized for reuse in the biopharmaceutical production process. For example, an equipment preparation procedure for a carboy may include the preparation equipment protocols of bench sink rinsing, bench sink cleaning, carboy washing, carboy drying, wrapping and sterilization in an autoclave. Different types of soiled process components require different combinations of preparation equipment protocols in order to be readied for reuse in the biopharmaceutical production process, thereby defining different equipment preparation procedures. As with preparation equipment protocols, equipment preparation procedures are determined through experimentation, quality assurance and quality control. Each type of equipment used in the biopharmaceutical production process has an associated equipment preparation procedure.

An equipment preparation procedure table is a list of preparation equipment protocols and their associated information that define an equipment preparation procedure for each of the soiled process component types. In a preferred embodiment, there are equipment preparation categories for each piece of soiled process components. Instead of an equipment preparation procedure associated with each type of soiled process component, there is a an equipment preparation procedure associated with each equipment preparation category. Preparation equipment protocols associated with each of the different equipment preparation categories are placed together in a table format to provide the preparation procedures for each piece of soiled process components assigned to an equipment preparation category.

Step 3306 generates the equipment dimension table. Equipment dimensions are the length, height and depth of a piece of process equipment requiring cleaning and sterilization (e.g., beaker, flask, carboy, stainless steel fittings, etc.). The equipment dimension table defines the dimensions of all process equipment potentially requiring cleaning after use in the biopharmaceutical production process. The equipment dimension table is determined directly from the list of equipment used in the biopharmaceutical production process. The equipment dimension list provides a means for determining the volume of the equipment to be cleaned in the biopharmaceutical production process, thereby allowing the calculation of the capacity of the preparation equipment.

Step 3308 generates a master list of equipment that may require preparation. Each unit operation in the biopharmaceutical production process is associated with preparation equipment. Step 3308 generates a master list of equipment associated with the biopharmaceutical production process and solution preparation process. In the preferred embodiment, the preparation equipment associated with each unit operation for both the biopharmaceutical production process and solution preparation process is defined when the unit operations for these activities are defined. As described above, the process equipment associated with unit operations of a biopharmaceutical production process are incorporated into a production process time line. Likewise the activities associated with each step of solution preparation is identified in step 1302 and incorporated into total solution preparation time for the solution preparation vessels 1428.

Step 3310 generates the equipment preparation load table. The equipment preparation load table includes data describing when particular soiled process components from the equipment dimension table are available for preparation. For example, some information comes from the finish times for the tasks in process time line 906 that define when the soiled process components from the biopharmaceutical production process will be available for cleaning. Step 3310 generates the equipment preparation load table by comparing the process time line schedule with the equipment preparation master list.

Step 3312 generates the equipment preparation load summary table. The equipment preparation load summary table is the sum of all equipment preparation load tables from each of the biopharmaceutical production processes active in the biopharmaceutical facility. For example, a facility may be producing multiple biopharmaceutical products in multiple processes. In such a case, the preparation equipment handles equipment preparation for multiple biopharmaceutical production processes. Likewise, a facility may have multiple solution preparation suites. In such a case, the preparation equipment handles equipment preparation for multiple solution prep suites. Step 3312 generates the equipment preparation load summary table for the sum of all biopharmaceutical production processes by combining the equipment preparation load tables for all of the biopharmaceutical production processes.

Step 3314 estimates the preparation equipment capacity. The capacity of the preparation equipment is determined in order to provide sufficient capacity to handle the load of soiled process components in the biopharmaceutical facility. Preparation capacity is the flow rate of soiled process components that the preparation equipment can accommodate. Preparation capacity is estimated based on the flow rate of equipment from the preparation load summary table. The rate at which soiled process components are generated in the biopharmaceutical production facility is a good estimate of the capacity of the preparation equipment.

Step 3316 determines the equipment preparation time line. The equipment preparation time line includes scheduling each soiled process component through each piece of preparation equipment in each of the equipment preparation procedures. Functional specifications for the preparation equipment and the utility load requirements for the preparation equipment can be generated from the equipment preparation time line. Functional specifications describe a piece of equipment with particularity. For example, functional specifications for a pump include pump type, flow rate, maximum and minimum input and output pressures, input and output fitting sizes, electrical requirement, temperature range and type and frequency of required maintenance.

Figure 34:
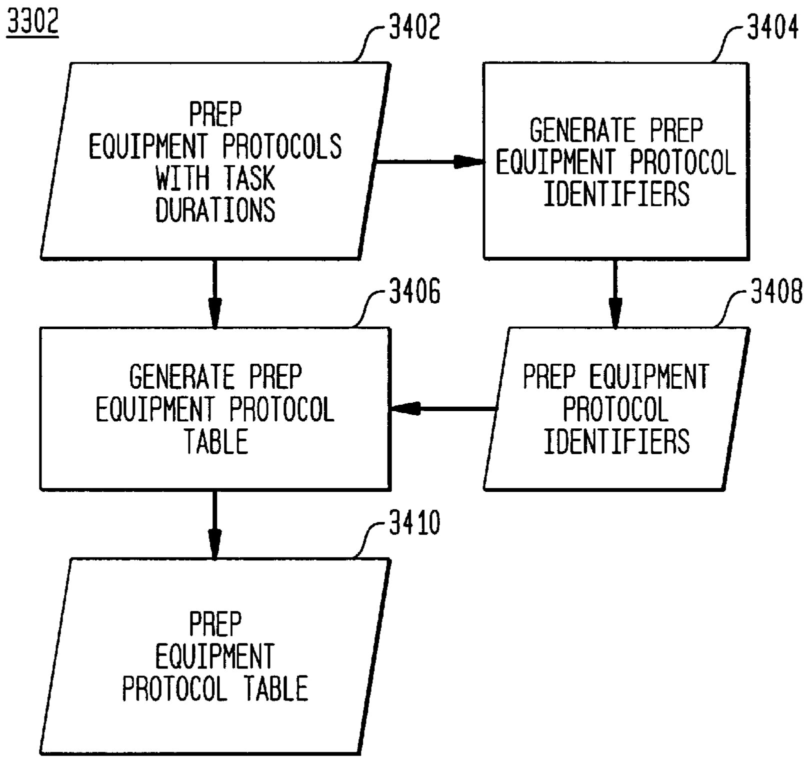
FIG. 34 is a block flow diagram illustrating the step of generating the preparation equipment protocol table.

FIG. 34 further illustrates step 3302, generating the preparation equipment protocol table. Step 3302 begins with step 3404, generating the preparation equipment protocol identifiers 3408. Preparation equipment protocol identifiers 3408 are keys or codes which identify each preparation equipment protocol. Preparation equipment protocol identifiers 3408 allow each preparation equipment protocol to be identified in the equipment preparation module and are used to generate the preparation equipment protocol table. Step 3404 assigns unique preparation equipment identifiers 3408 to each of the preparation equipment protocols 3402. Preparation equipment protocol table 3402 also includes the task and duration information associated with each preparation equipment protocol. Next, step 3406 generates preparation equipment protocol table 3410. Preparation equipment protocol table 3410 is generated by assigning preparation equipment protocol identifiers 3408 to each preparation equipment protocol in preparation equipment protocol table 3402.

FIGS. 36A–36H are exemplary preparation equipment protocol tables 3410. Column 3408 in FIGS. 36A–36H illustrate exemplary preparation equipment protocol identifiers 3408. Preparation equipment protocol table 3410 contains information describing each preparation protocol. Preparation equipment protocol identifiers BS-1 through BS-5 identify individual bench sink preparation protocols. For example, FIG. 36A illustrates protocol task durations for the bench sink preparation equipment. Protocol task duration is the amount of time associated with a task in a preparation equipment protocol. For example, protocol BS-1 in FIG. 36A has a loading task duration of 5 minutes. Bench sink protocol BS-1, therefore, includes the step of loading the bench sink, which requires 5 minutes. Protocol task durations of prewash rinse with non-potable hot water (NPHW), prewash rinse with non-potable cold water (NPCW), detergent wash with reagent, post wash rinse with NPHW and NPCW, final rinse and hold dry are illustrated in FIG. 36A. Columns 3602 and 3604 are examples of protocol parameters. Protocol parameters are data elements that describe particular facets of a preparation equipment protocol. In the example of FIG. 36A, protocol parameters detergent wash reagent and grams of reagent per cubic foot are used to describe the detergent in the bench sink wash process.

FIG. 36B illustrates an exemplary preparation equipment protocol table for a wash station. Column 3408 of FIG. 36B illustrates exemplary preparation equipment protocol identifiers 3408 for a wash station. FIG. 36C illustrates an exemplary preparation equipment protocol table for a glassware washer. Column 3408 in FIG. 36C illustrates exemplary preparation equipment protocol identifiers 3408 for a glassware washer. FIG. 36D illustrates an exemplary preparation equipment protocol table 3410 for a glassware dryer. Column 3408 in FIG. 36D illustrates exemplary preparation equipment protocol identifiers 3408 for a glassware dryer. FIG. 36D illustrates exemplary task durations for tasks associated with the glassware dryer protocols. Some examples of task durations are loading 3618, heat up 3620, drying 3624, cooling 3626 and unloading 3628, as shown by their respective columns. Column 3622 illustrates the drying temperature protocol parameter. FIG. 36E illustrates an exemplary preparation equipment protocol table 3410 for a carboy washer. FIG. 36F illustrates an exemplary preparation equipment protocol table 3410 for a carboy dryer.

FIG. 36G illustrates an exemplary preparation equipment protocol table for a steam sterilizer. Due to the multiple protocol parameters and task durations associated with steam sterilizer preparation equipment protocols, the preparation equipment protocol table of FIG. 36G is two-dimensional. Row 3608 illustrates exemplary preparation equipment protocol identifiers 3408 forth steam sterilizer. The steam sterilizer preparation equipment protocol table 3410 includes multiple protocol tasks 1–33 as illustrated in column 3606. Each of the tasks in the steam sterilizer protocol has associated protocol parameters and protocol durations as illustrated in columns 3608,3610,3612,3614 and 3616. Row 32 in column 3606 of FIG. 36G illustrates exemplary values for the total time in minutes required for each of the different steam sterilizer protocols (protocol identifiers SS-1, SS-2 and SS-3). FIG. 36H illustrates an exemplary preparation equipment protocol table 3410 for a dry heat stabilizer.

Figure 35:
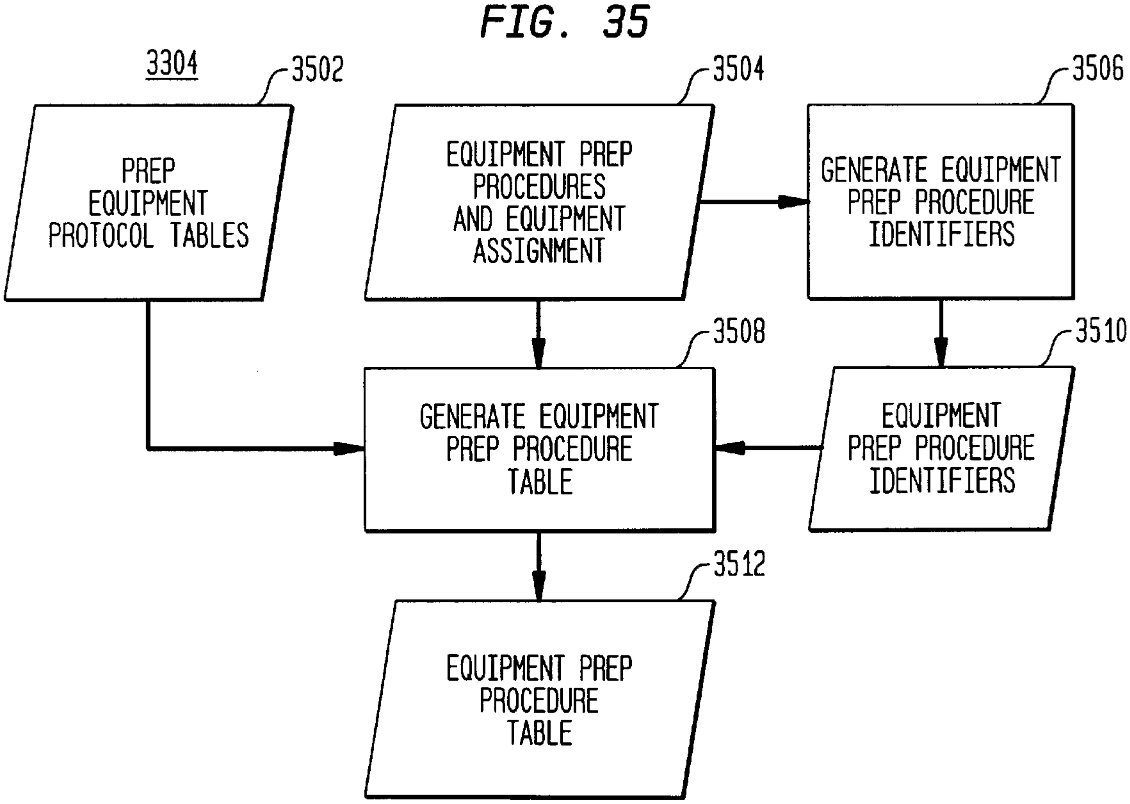
FIG. 35 is a block flow diagram illustrating the step of generating the equipment preparation procedure table.

FIG. 35 further illustrates step 3304 generating equipment preparation procedure table 3512. Equipment preparation procedure table 3512 includes data associated with each equipment preparation procedure, including the sequence of preparation equipment protocols and their individual durations as well as their cumulative duration over the entire procedure. Step 3304 begins at step 3506, generating equipment preparation procedure identifiers 3510. Equipment preparation procedure identifiers are tags or codes which identify equipment preparation procedures. FIGS. 37A and 37B illustrate an exemplary equipment preparation procedure table 3512. Row 3702 illustrates exemplary equipment preparation procedure identifiers 3510. EPC-1, EPC-2, EPC-3, EPC-4, EPC-5, EPC-6 and EPC-7 are examples of codes which identify equipment preparation procedures.

Step 3508 generates equipment preparation procedure table 3512. Step 3508 generates equipment preparation procedure table 3512 from preparation equipment protocol tables 3502, equipment preparation procedures 3504 and equipment preparation procedure identifiers 3510. Equipment preparation procedures 3504 provides the list of preparation equipment protocols that identify a particular equipment preparation procedure and equipment assignment. FIG. 37A, for example, shows equipment preparation procedure EPC-1 includes (as shown in column EPC-1) preparation equipment protocols BS-1, BS-3, GD-1, and SS-1 in FIG. 37B. Equipment preparation procedures 3504 also include the equipment assignments for each of the equipment preparation procedures. Equipment assignments define the soiled process components associated with, or prepared by, each equipment preparation procedure. For example, a particular equipment preparation procedure may only be used to clean carboys. Step 3508 compares the preparation equipment protocols in the equipment preparation procedures 3504 with the preparation equipment protocol tables 3502. The protocol durations and protocol parameters provide the information in equipment preparation procedures table 3512. Equipment preparation procedure identifiers 3510 are assigned to each individual equipment preparation procedure in equipment preparation procedure table 3512.

FIGS. 37A and 37B illustrate exemplary equipment preparation procedure tables 3512. Row 3702 illustrates exemplary equipment preparation procedure identifiers EPC-1, EPC-2, EPC-3, EPC-4, EPC-5, EPC-6, and EPC-7. Equipment preparation procedure identifiers 3510 identify equipment preparation procedures for different categories of equipment. Exemplary equipment preparation procedure identifier EPC-5 includes the preparation equipment protocols of wash station (WS-1), carboy washer (CW-1), carboy dryer (CD-1), and steam sterilization autoclave 1 (SS-2). Associated with each of the preparation equipment protocols are task durations. Column 3704 illustrates task durations for equipment preparation procedure EPC-5. The task durations for each of the preparation equipment protocols are totaled to yield the equipment preparation procedure duration for EPC-5. Cumulative totals for the equipment preparation procedure duration are given in column 3706, rows 8, 15, 24, 31, 38, 45, 52, 66, 75 and 82. The cumulative durations are the sum of all the previous preparation equipment protocol durations in the equipment preparation procedure.

Figure 38:
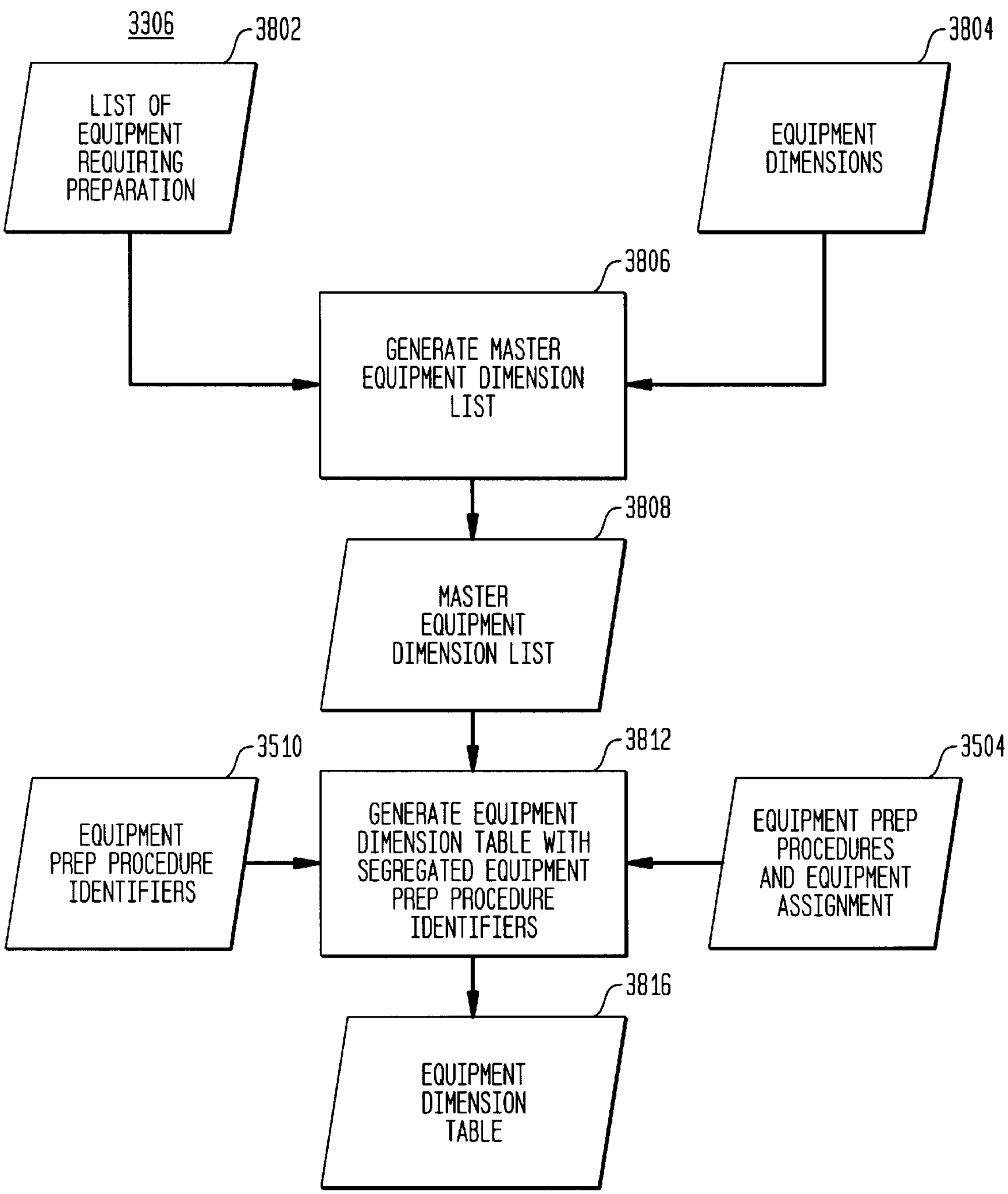
FIG. 38 is a block flow diagram illustrating the step of generating the equipment dimension table.

FIG. 38 further illustrates step 3306, generating equipment dimension table 3816. Step 3306 begins at step 3806, generating the master equipment dimension list 3808. Step 3806 uses the list of equipment requiring preparation 3802 and the equipment dimensions list 3804 to generate master equipment list 3806 which defines the dimensions of all process equipment that may cleaned by the equipment preparation procedure. List of equipment requiring preparation 3802 is a complete list of all the equipment used in the biopharmaceutical production process. List of equipment requiring preparation 3802 may be generated from the unit operations that define the process time line 906 or solution preparation schedule. Alternatively, list of equipment requiring preparation 3802 may be provided by the system designer as the equipment used in the biopharmaceutical production process by design. List 3802 identifies those pieces of equipment that will need to be prepared in order to complete the biopharmaceutical production process. Equipment dimensions list 3804 is a master list of equipment dimensions for all of the equipment available for use in the biopharmaceutical production process. Often, equipment dimensions list 3804 will be provided by the vender or manufacturer of the process equipment. List of equipment requiring preparation 3802 is compared to the equipment dimensions list 3804 in order to assign the equipment dimensions to the equipment used in the biopharmaceutical production process, resulting in master equipment dimension list 3808.

Next, step 3812 generates the equipment dimension table with segregated equipment preparation procedure identifiers. Step 3812 segregates the equipment dimension list into equipment preparation procedures as defined in the equipment preparation procedures and equipment assignment list 3504. The master equipment dimension list 3808 is segregated based on the equipment preparation procedure identifiers 3510 in order to generate equipment dimension table 3816 according to equipment preparation procedure identifiers. The resultant equipment dimension table 3816 includes a list of specific process equipment and their associated equipment preparation procedure identifiers. Each particular equipment preparation procedure (e.g., EPC-1, EPC-2, EPC-3, etc.) is assigned to particular equipment types. Equipment dimension table 3816 also includes the dimensions of equipment to be prepared.

FIG. 39 illustrates an exemplary equipment dimension table 3816. Row 3902 illustrates exemplary equipment preparation procedure identifiers 3510. Rows 3904 identify the dimensions of each particular type of equipment involved in the equipment preparation process. Rows 3904 illustrates exemplary values for the dimensions of soiled process components to be cleaned in the equipment preparation procedure. Row 1 of rows 3904 illustrates exemplary values for the right-to-left dimension (R/L) in inches. Row 2 of rows 3904 illustrates exemplary values for the front-to-back dimension (F/B) in inches. Row 3 of rows 3904 illustrates exemplary values for top-to-bottom dimensions (T/B) in inches. Row 5 of rows 3904 illustrates exemplary values for volume in cubic inches (CI). Row 6 of rows 3904 illustrates exemplary values for volume in cubic feet (CF). CI and CF- are computed directly from the rectilinear dimensional values in rows 1–3 of rows 3904.

Column 3906 illustrates exemplary dimensional values for siphon tube equipment in equipment preparation procedure EPC-1. Column 3908 illustrates exemplary dimensional values for instruments including pressure indicators (PI), optical density probe and pH probe. Column 3910 illustrates exemplary dimensional values for fittings including tees, elbows, crosses, reducers, hose barbs and clamps. Column 3912 illustrates exemplary dimensional values for small and medium plasticware. Column 3914 illustrates exemplary dimensional values for silicone and butyl rubber stoppers. Column 3916 illustrates exemplary dimensional values for small and large flexible tubing. Column 3918 illustrates exemplary dimensional values for small and medium glassware. Column 3920 illustrates exemplary dimensional values for one, twenty and forty-five liter polypropelene carboys. Column 3922 illustrates exemplary dimensional values for ten, twenty and forty-five liter borosilicate glass carboys.

Figure 40:
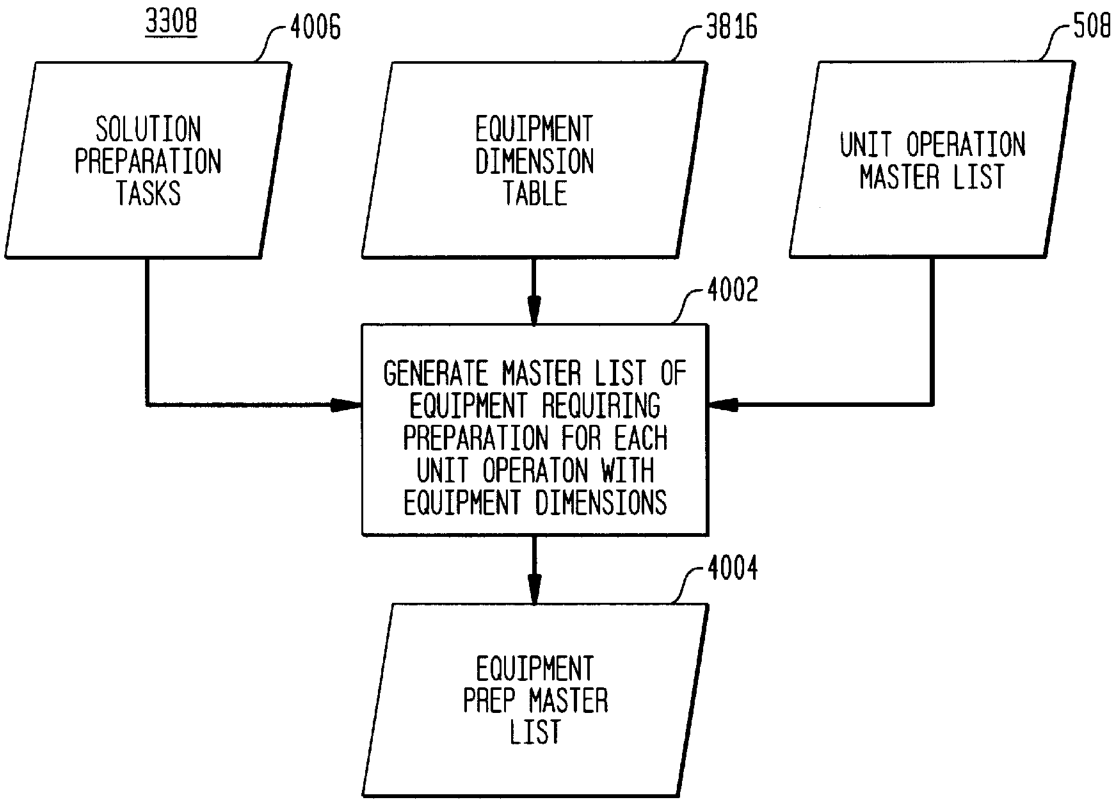
FIG. 40 is a block flow diagram illustrating the step of generating the master list of equipment requiring preparation.

FIG. 40 further illustrates step 3308, generating equipment preparation master list 4004. Equipment preparation master list 4004 includes the process equipment that may be soiled by unit operation tasks and the solution preparation procedure tasks in the biopharmaceutical production process. As described above, each task in unit operation master list 508 has associated process equipment. The process equipment associated with each unit operation task is added to the equipment preparation master list 4004 in step 4002. Step 4002 uses unit operation master list 508 to generate a master list of equipment that may require preparation after use in the biopharmaceutical production process. Each piece of equipment has an associated dimension as defined in equipment dimension table 3816. Step 4002 compares unit operation master list 508 with equipment dimension table 3816 to assign the equipment dimensions to the equipment in unit operation master list 508 when generating equipment preparation master list 4004. Step 4002 compares solution preparation task list 4006 with equipment dimension table 3816 to assign the equipment dimensions to the solution preparation task list 4006 when generating equipment preparation master list 4004. After step 4002, equipment preparation master list 4004 contains the list of process equipment used in the biopharmaceutical production process that may become soiled process components requiring cleaning by the equipment preparation procedures.

Figure 41:
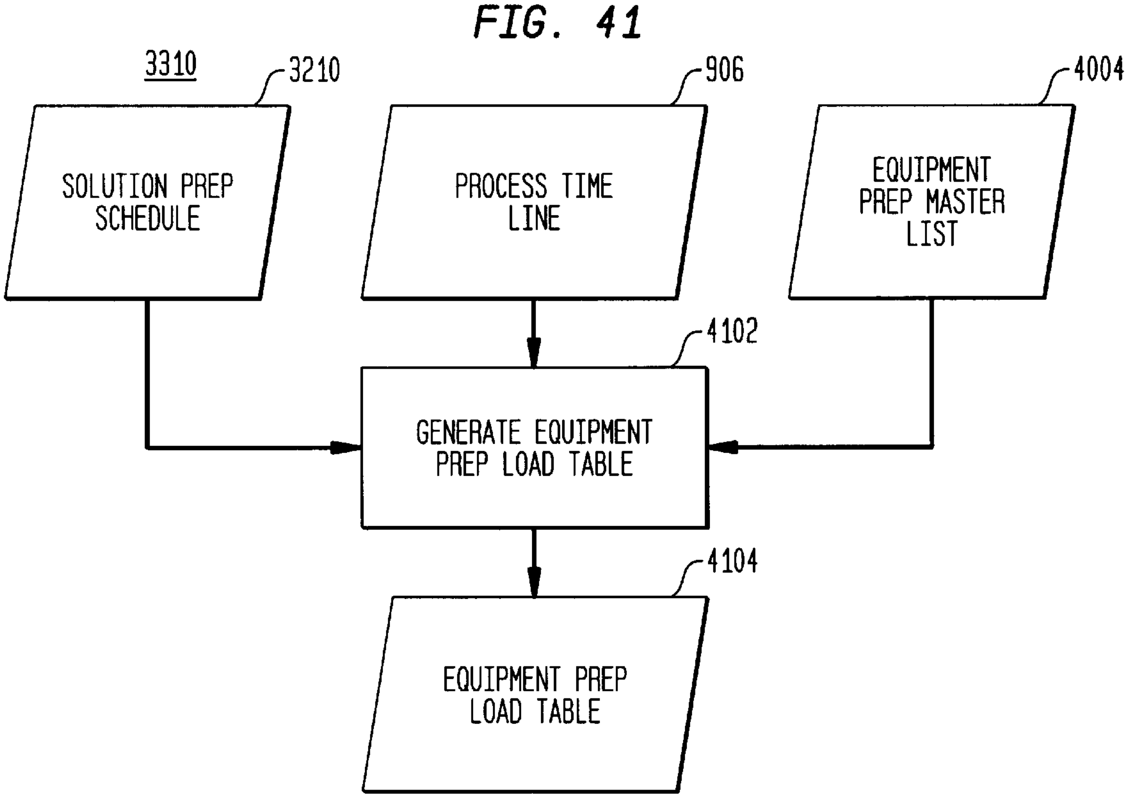
FIG. 41 is a block flow diagram illustrating the step of generating the equipment preparation load table.

FIG. 41 further illustrates step 3310, generating equipment preparation load table 4104. Equipment preparation load table 4104 includes data indicating when soiled process components from the equipment preparation master list 4004 will be available from the biopharmaceutical production process. Step 4102 generates equipment preparation load table 4104 by combining solution preparation schedule 3210 and process time line 906 with equipment preparation master list 4004. Cumulative flow of equipment out of the biopharmaceutical production process as represented by solution preparation schedule 3210 and process time line 906 is compared with equipment preparation master list 4004 in order to provide the equipment dimensional information in equipment preparation load table 4104. Equipment preparation load table 4104 includes soiled process components, the schedule for when the soiled process components are available for equipment preparation procedures, the dimensional information associated with each soiled process component and which task in the biopharmaceutical production process or solution preparation process generated the soiled process components. Equipment preparation load table 4104 represents the volumetric flow rate of equipment out of the biopharmaceutical production process that needs to be prepared for later use in order to sustain continuous biopharmaceutical production.

FIGS. 42A–42E illustrate an exemplary equipment preparation load table 4104. Column 4202 illustrates exemplary task titles. Task titles 4202 may originate from solution preparation procedure tasks or the titles of tasks in unit operations. Column 4204 illustrates exemplary task end times. The values in columns 4204 represent the date and time various soiled process components will be available for cleaning and preparation in equipment preparation procedures. Columns 4206–4216 of FIGS. 42A and 42B illustrate exemplary values for soiled process components available for preparation in equipment preparation procedures. In each of the columns, each of the soiled process components contains the number and cubic footage with which it is associated. FIGS. 42C–42D illustrate additional tasks in the biopharmaceutical production process. As before, columns 4218–4228 of FIGS. 42C–42D illustrate exemplary values for soiled process components available for preparation in equipment preparation procedures.

Figure 43:
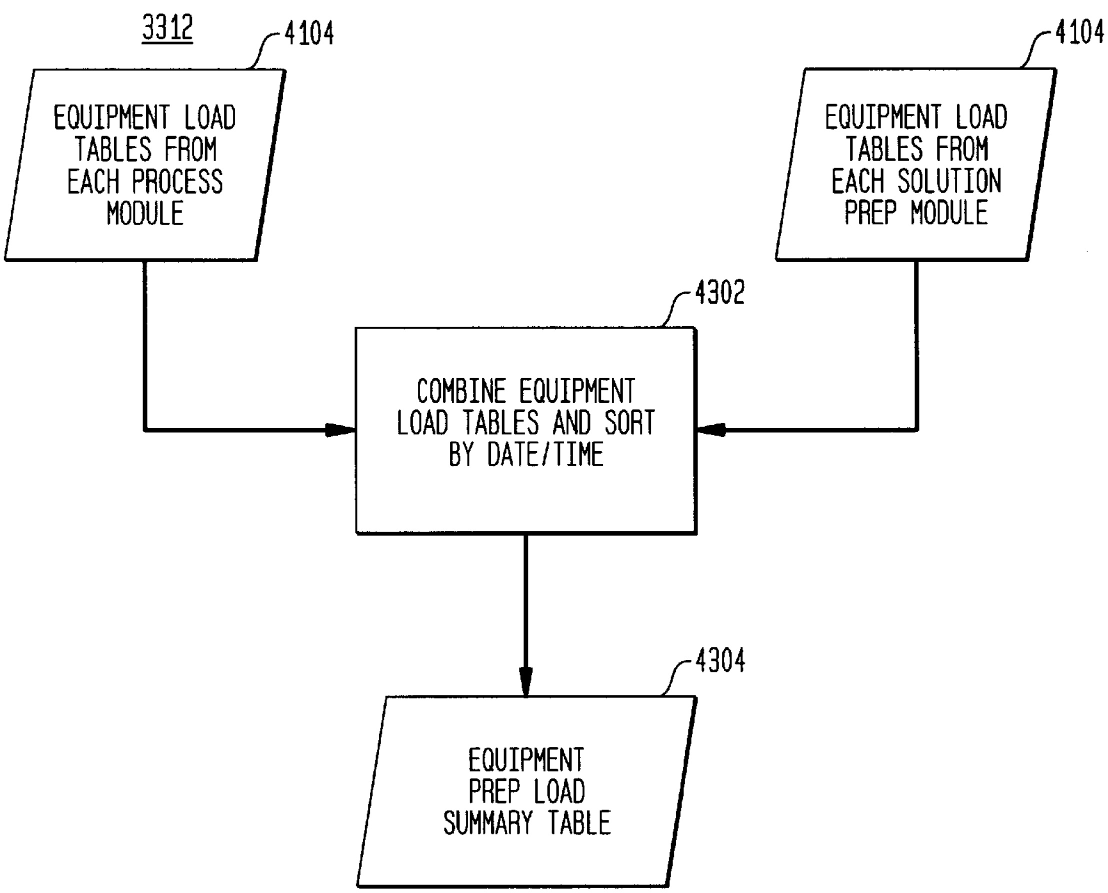
FIG. 43 is a block flow diagram illustrating the step of generating the equipment preparation load summary table.

FIG. 43 further illustrates step 3312, generating equipment preparation load summary table 4304. Equipment preparation load table 4104 defines when soiled process components from the equipment preparation master list 4004 will be available from all biopharmaceutical production processes active in the biopharmaceutical facility. Because single equipment preparation facilities may be shared across multiple biopharmaceutical production processes, the equipment load tables 4104 are combined to create equipment preparation load summary table 4304. Equipment preparation load summary table 4304 allows the scheduling and simulation of equipment preparation procedures for the entire biopharmaceutical production facility.

Figure 44:
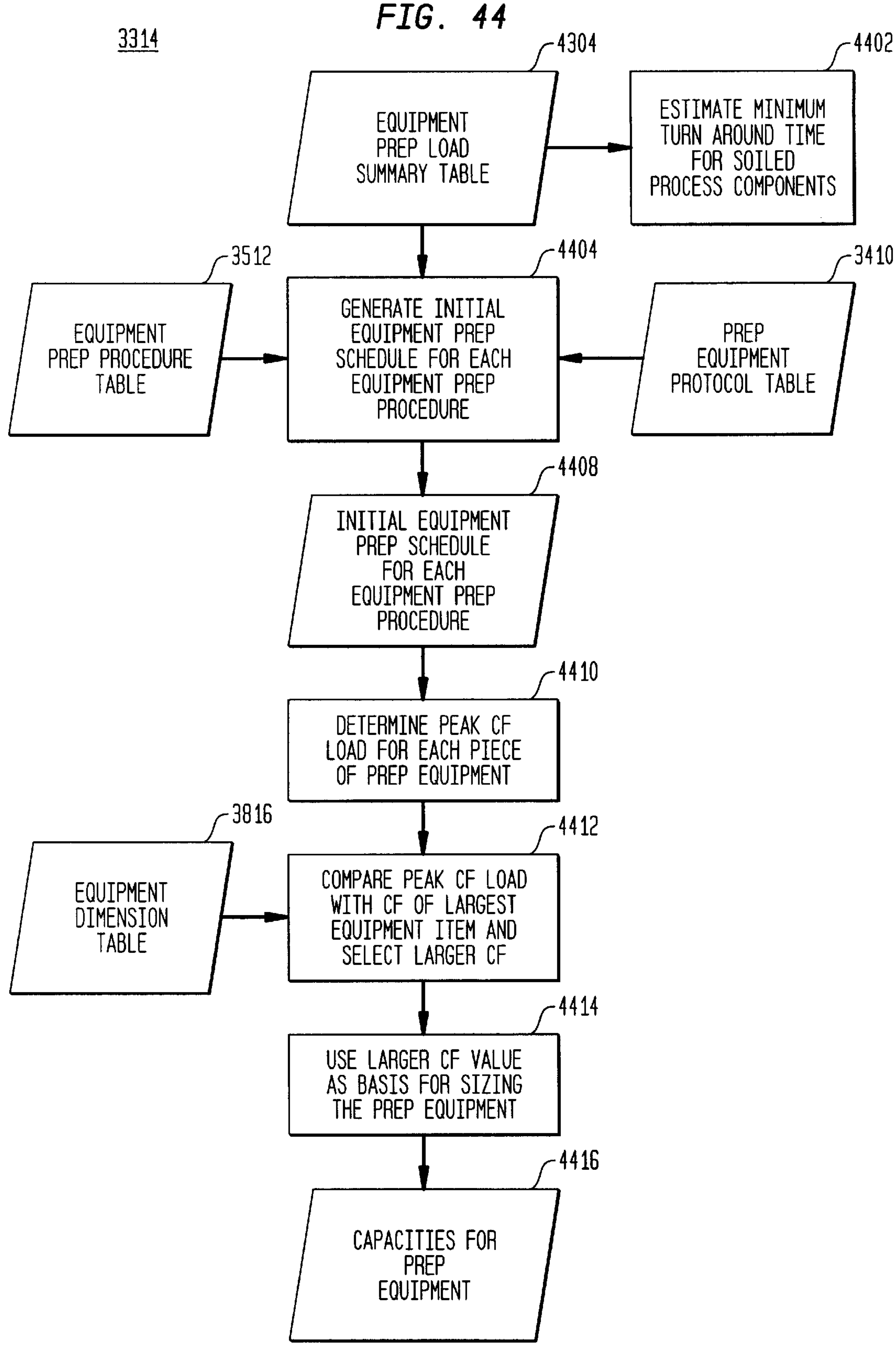
FIG. 44 is a block flow diagram illustrating the step of determining the capacities of the preparation equipment.

FIG. 44 further illustrates step 3314, determining the capacities of the preparation equipment 4416. Step 3314 begins with step 4404, generating an initial equipment preparation schedule 4408. An initial equipment preparation schedule 4408 is generated for each equipment preparation procedure (EPC-1, EPC-2, EPC-3, etc.). As stated above, each equipment preparation procedure is associated with specific soiled process components. The initial equipment preparation schedule 4408 begins prior to the earliest date that soiled process components are available, as provided by the equipment preparation load summary table 4304.

The initial equipment preparation schedule 4408 is an initial schedule for the arrival of soiled process components at each piece of preparation equipment. Since the duration of each task in each of the equipment preparation procedures is known, the time at which soiled process components arrive at various preparation equipment is calculated directly by adding the duration of each task from the preparation equipment protocol table 3410 to the equipment preparation load summary table 4304. The time at which each soiled process component arrives at a particular step in a preparation equipment protocol is the sum of previous equipment preparation procedure tasks and the time which the soiled process component became available, as indicated in the equipment preparation load summary table 4304. Scheduling the soiled process components that arrive at each piece of preparation equipment allows the peak loading on the preparation equipment to be determined. The peak loading of the preparation equipment can then be used to determine the size and capacity of the preparation equipment.

Step 4412 compares the peak cubic footage load, as determined in step 4410, with the cubic footage of the largest soiled process component from the equipment dimension table 3816. Step 4412 selects the larger of the peak cubic foot load and the cubic footage of the largest equipment item from the equipment dimension table.

Step 4414 uses the larger peak CF value as determined in step 4412 to generate the capacities for the preparation equipment 4416. Capacities for the preparation equipment 4416 will need to be high enough to handle the peak cubic footage of soiled process components that need to be prepared in the equipment preparation procedure. The capacities determined instep 4414 and stored in table 4416, therefore, are the maximum capacities for the preparation equipment. Once the necessary capacity for the preparation equipment has been determined, an equipment prep time line can be generated.

Figure 46:
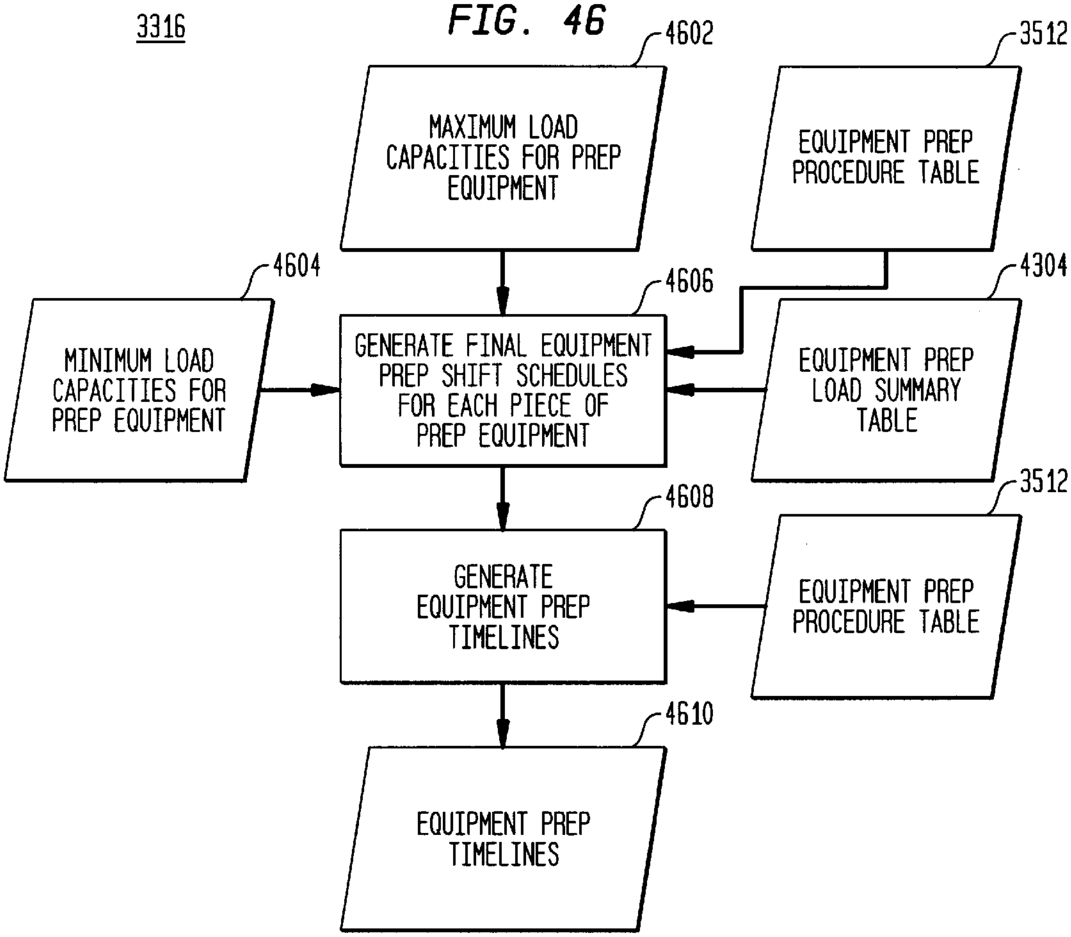
FIG. 46 is a block flow diagram illustrating the step of generating the equipment preparation time line.

FIG. 46 further illustrates step 3316, generating the equipment preparation time lines 4610. Equipment preparation time lines 4610 include scheduling information for each soiled process component through each piece of preparation equipment in equipment preparation procedures. Equipment preparation time line 4610 includes the schedule of operation for each piece of preparation equipment. Equipment preparation time lines 4610 also include scheduling information for each particular facet of preparation equipment operation including resource loads for labor, utilities, disposables, reusables, maintenance, calibration, etc. Together with the capacity data determined in step 4414, equipment preparation time line 4610 allows the determination of functional specifications for preparation equipment to which cost and other data can be matched.

Step 3316 begins with step 4606, generating the final equipment preparation shift schedules for each piece of preparation equipment. As stated above, after the preparation equipment capacities have been determined in step 3314, the maximum load capacities for the preparation equipment 4602 are known. Capacities for preparation equipment 4416 define the maximum load capacities for preparation equipment 4602. Minimum load capacity for preparation equipment 4604 is a value set by the biopharmaceutical production process designer in order to maximize efficiency or for the validation of equipment preparation procedure. For example, a biopharmaceutical production process designer may determine that sterilizer equipment should not be operated at less than fifty percent of its load capacity. The sterilizer equipment, therefore, would be operated only when sufficient volume of soiled process components have been accumulated. Step 4606 generates the final equipment preparation shift schedules for each piece of equipment based on the maximum load capacities for preparation equipment 4602, the minimum load capacities for preparation equipment 4604, and equipment preparation procedure table 3512. The final equipment preparation shift schedules include the load cycling through the preparation equipment dictated by the minimum load capacities 4604 and the maximum load capacities 4602. Maximum load capacities 4602 and minimum load capacities 4604 define when each particular protocol in the equipment preparation procedure table 3512 is executed. The final equipment preparation shift schedules contain accurate scheduling of the operation of each Step 4608 generates the equipment preparation time lines 4610. The equipment preparation time lines 4608 differ from the final equipment preparation shift schedules, as determined in step 4606, by providing detailed scheduling of the tasks associated the prep equipment protocols in equipment prep procedure table 3512. Equipment preparation time lines 4610 are generated by comparing equipment preparation procedure table 3512 with the final equipment preparation shift schedules for each piece of preparation equipment. Equipment preparation time lines 4610 contain the time data for specific tasks and operation of preparation equipment.

Figure 47:
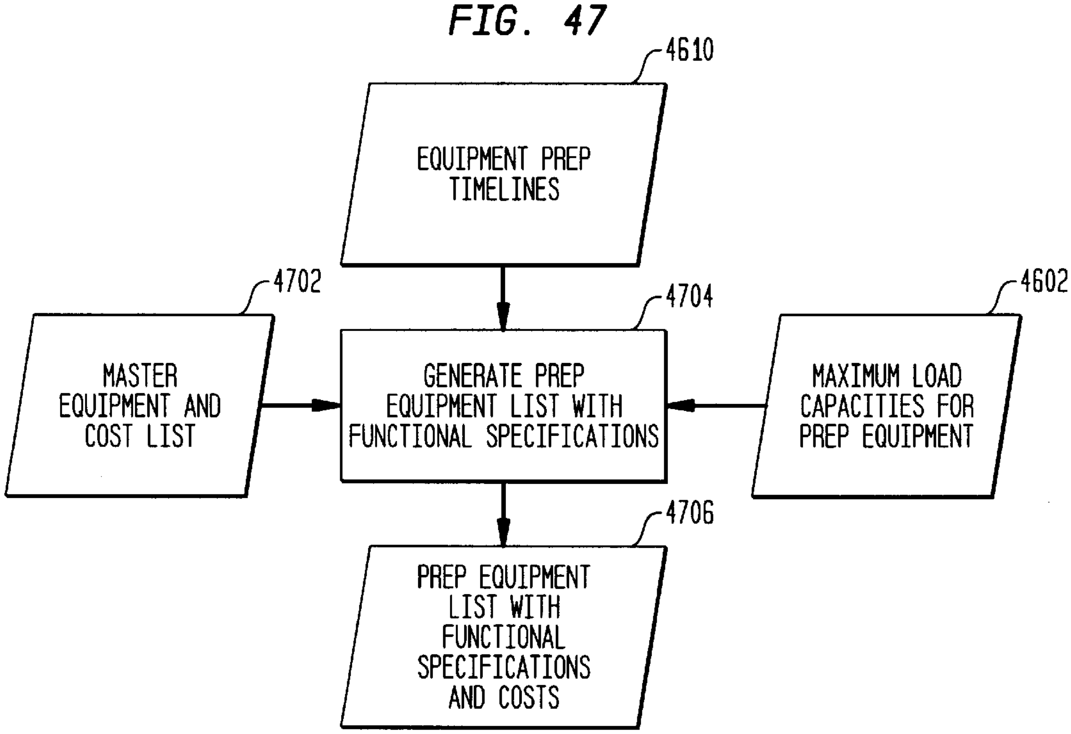
FIG. 47 is a block flow diagram illustrating the step of generating the preparation equipment list with functional specification and costs.

FIG. 47 illustrates the process of generating preparation equipment functional specifications 4706. Preparation equipment functional specifications list 4706 contains functional specifications and costs associated with each piece of preparation equipment used in the equipment preparation procedure. Maximum load capacities for preparation equipment 4602 is used with equipment preparation time lines 4610 to provide the necessary specifications for the preparation equipment in the preparation equipment procedure. Step 4704 compares the specifications of maximum load capacities 4602 and equipment preparation time lines 4610 to determine which preparation equipment units from master equipment and cost list 4702 are required for the equipment preparation procedures. Master equipment and cost list 4702 contains the functional specifications of all of the available preparation equipment and their associated costs. Preparation equipment is selected from master equipment and cost list 4702 based on functional specification matching with equipment preparation time lines 4610 and maximum load capacities for the preparation equipment 4602. The result of step 4704 is preparation equipment list with functional specifications and cost 4706, which is a subset of master equipment and cost list 4702. Preparation equipment list with functional specifications and costs 4706 provides a means to more accurately match required preparation equipment with detailed cost and other data such as loads for utilities maintenance, calibration, quality assurance and quality control testing, etc.

Figure 48:
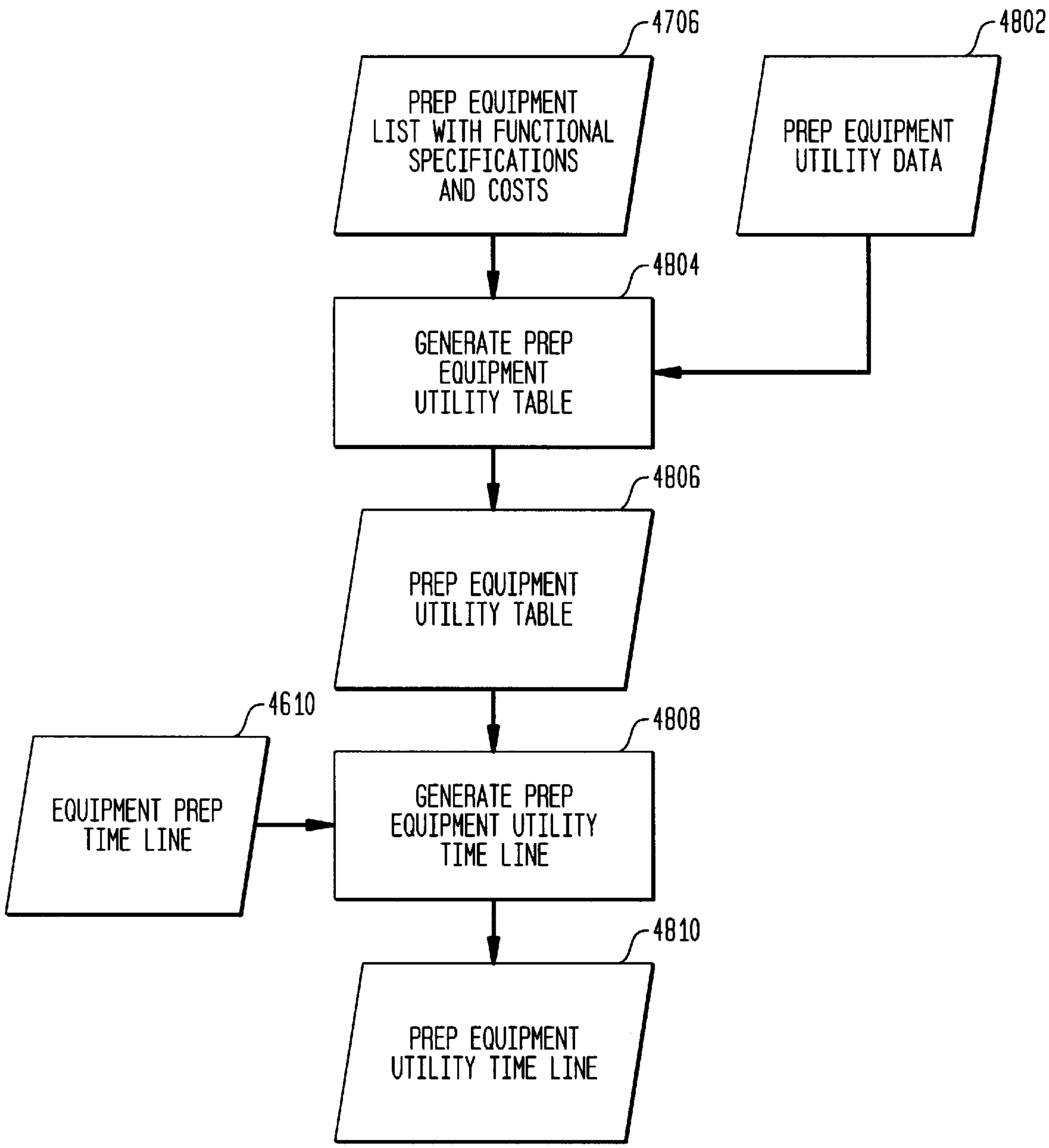
FIG. 48 is a block flow diagram illustrating the step of generating the preparation equipment utility time line.

FIG. 48 illustrates a process of generating preparation equipment utility time line 4810. The preparation equipment utility time line 4810 provides the utility requirements for the equipment preparation process. The preparation equipment utility time line 4810 includes the utility requirements for each piece of preparation equipment and the associated date and time for the requirements. The preparation equipment utility time line 4810 allows the calculation of utility costs associated with each piece of preparation equipment and allows a biopharmaceutical facilities designer to determine the necessary utility supply to the preparation equipment. The process of generating preparation equipment utility time line 4810 begins with step 4804, generating the preparation equipment utility table. The preparation equipment utility table includes a list of the preparation equipment functional specifications from preparation equipment list 4706 matched with the utility data for each piece of preparation equipment as given by preparation equipment utility data 4802. Preparation equipment utility data 4802 includes the requirements for each piece preparation equipment during each task in a preparation equipment protocol. Examples of utility data are electrical power requirements, potable and nonpotable hot and cold water requirements, waste water requirements, steam requirements, etc. Step 4804 generates preparation equipment utility table 4806 by matching the data from equipment preparation equipment list 4706 with preparation equipment utility data 4802 on a preparation equipment by preparation equipment basis.

Step 4808 generates preparation equipment utility time line 4810. Step 4808 matches the data in preparation equipment utility table 4806 with equipment preparation time line 4610 to generate preparation equipment utility time line 4810. Preparation equipment utility time line 4810 schedules out the utility requirements for each piece of preparation equipment on a for each task in the preparation equipment protocols. Each of the tasks in equipment preparation time line 4610 is matched to the data in preparation equipment utility table 4806. Based on equipment preparation time line 4610 and the utility requirements for each piece of preparation equipment as described in preparation equipment utility table 4806, the utility requirements for each of preparation equipment is scheduled out in preparation equipment utility time line 4810. The utility time line 4810 when combined with the utility time lines from other manufacturing operations such as biopharmaceutical production, solution preparation, etc. provides peak loading data for the accurate sizing of utilities. The detailed data of the equipment time lines allows for the identification and optimization of utility peak loads and cost through the analysis of well documented operations schedules.

4.0 Equipment Maintenance Scheduling Module

Equipment maintenance in a biopharmaceutical production facility is necessary to sustain the biopharmaceutical production process. The types and frequency of maintenance required is a function of the particular equipment used in the facility, as well as the frequency and nature of use. The equipment involved in the production process, solution preparation process, and equipment preparation all require regular maintenance during sustained operation. Often, maintenance frequency and cost are not considered in the design of a biopharmaceutical production facility. Maintenance costs, however, are a significant fraction of the cost of operating the biopharmaceutical facility and producing the biopharmaceutical product. Since maintenance is a significant cost of operating a biopharmaceutical production facility, a method and computer program product for scheduling and modeling the maintenance of process equipment, solution preparation equipment and preparation equipment would allow the biopharmaceutical facility designer to predict and minimize the cost of maintenance. Additionally, scheduling and modeling maintenance of a biopharmaceutical production process would allow for more complete modeling of a biopharmaceutical production facility.

Modeling and scheduling biopharmaceutical production facility maintenance is based on the functional specifications and usage of the biopharmaceutical production process equipment. Each piece of equipment has associated maintenance parameters. For example, a particular pump may require a new drive belt, seals and lubrication after a predetermined number of hours of operation. Filtration media in filters must be changed after a predetermined number of hours of use. Given equipment functional specifications, equipment maintenance requirements and production schedules for biopharmaceutical production process equipment, equipment maintenance can be modeled and scheduled.

Figure 49:
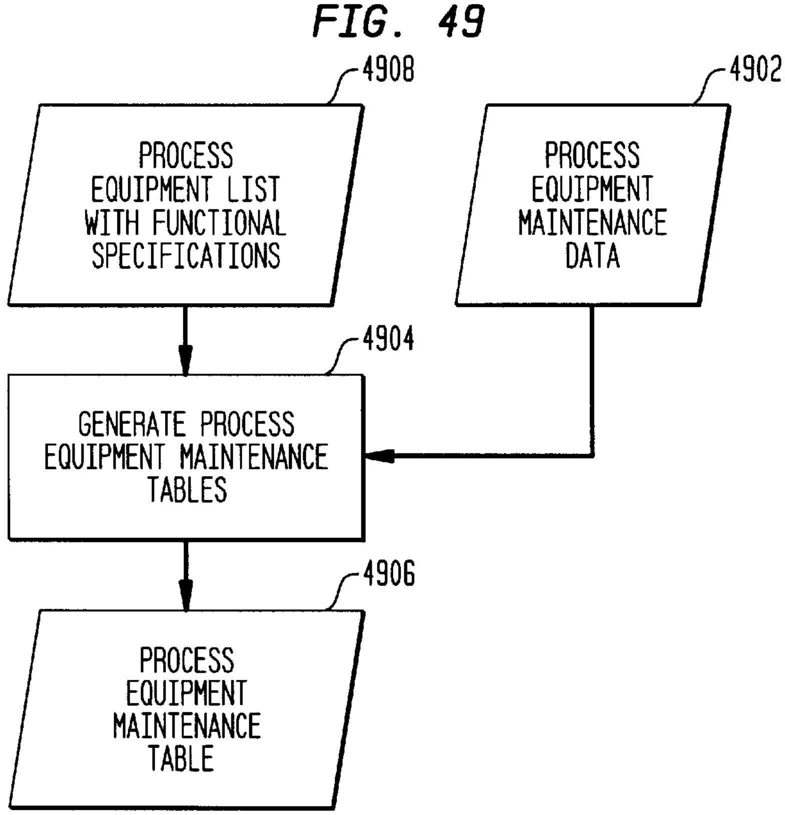
FIG. 49 is a block flow diagram illustrating the step of generating a process equipment maintenance table.

FIG. 49 illustrates the process of generating process equipment maintenance table 4906. Process equipment maintenance table 4906 includes maintenance procedures, maintenance duration (i.e., the amount of time required to perform the maintenance), reusables (i.e., those maintenance items that must be replaced periodically), disposables (i.e., those maintenance items that must be replaced after every use), the maintenance period (i.e., the amount of use before the equipment must be serviced), and the number of hours required to complete the maintenance tasks for the equipment.

Step 4904 generates process equipment maintenance tables 4906 from the process equipment list and functional specifications 4908 and process equipment maintenance data 4902. Process equipment list 4908 is generated from unit operation list 508. Unit operation list 508 includes the process equipment associated with each task in a unit operation. The process equipment list 4908, therefore, includes a list of process equipment from unit operation list 508. Process equipment list 4908 also includes functional specifications associated with each piece of process equipment in process equipment list 4908. Functional specifications describe a piece of equipment with particularity. For example, functional specifications for a pump include pump type, flow rate, maximum and minimum input and output pressures, input and output fitting sizes, electrical requirement, temperature range and type and frequency of required maintenance.

Functional specifications associated with each piece of process equipment are determined from the block flow diagram 704, process time line 906 and equipment data sheets. Equipment data sheets, usually vendor or manufacturer provided, are equipment specifications that provide the capacity and functional specifications for equipment available for use in the biopharmaceutical production processes. Each unit operation has associated process equipment. The functional specifications of the equipment, however, are rate- and time-dependent. Block flow diagram 704 defines the volume of solution and biopharmaceutical product handled by each unit operation. The process time line 906 defines the rate at which solutions and biopharmaceutical product are handled in each unit operation. The volume and rate information from the block flow diagram and process time line, therefore, define the operational parameters of the process equipment. The functional specifications of the process equipment are determined directly by matching the volume and rate parameters for the equipment with the volume and rate parameters in equipment data sheets. The functional specifications of the equipment from the equipment data sheet are then added to the process equipment list to form process equipment list with functional specifications 4908.

Step 4904 generates process equipment maintenance table 4906 from process equipment list with functional specifications 4908 and process equipment maintenance data 4902. Process equipment maintenance data 4902 includes functional specifications for each piece of process equipment and their associated maintenance information. Process equipment maintenance data 4902 includes replaceables, reusables, labor, cycle life and the cost of the associated maintenance item. Some examples of replaceables and reusables are: filters, gaskets, bearings, seals, belts, crank-shafts, lubricants and thermal media. Associated with each maintenance item is the number and identifier for the item, the quantity, the cycle life (i.e., the amount of time or use before replacement), and the cost per cycle. Also included in process equipment maintenance data 4902 is the amount of labor associated with each maintenance item and the number of dollars per cycle for the labor.

Step 4904 matches process equipment list with functional specifications 4908 with process equipment maintenance data 4902, to generate process equipment maintenance table 4906. Process equipment list with functional specifications 4908 is matched with process equipment maintenance data 4902 based on a comparison of functional specifications in the process equipment list 4908 and the process equipment maintenance data 4902. Step 4904 copies the process equipment maintenance data 4902 for each piece of process equipment in the process equipment list 4908, thereby creating process equipment maintenance table 4906.

FIGS. 64A–64AB illustrate an exemplary process equipment maintenance table 4906. Column 6402 illustrates exemplary unit operations and their associated process equipment, as determined from process equipment list 4908. FIGS. 64A–64E illustrate the process equipment maintenance data for unit operations 1–6, as illustrated in column 6402.

Column 6404 of FIG. 64A illustrates exemplary maintenance data values for the filter maintenance items. Included in column 6404 are item number, quantity, cycle life of the filter materials, unit cost of the filter materials, dollars per cycle of the filter material, the labor of hours required to service the filter media, and the dollars per cycle for the labor. Item number identifies the stock number or part number of the item used in the maintenance procedure. Cycle life of the materials identifies the useful life the maintenance item. Quantity identifies the quantity of the maintenance item used in the maintenance procedure. Unit cost is the per unit cost of the maintenance item. Dollars per cycle is the quotient of the cost of the maintenance items and the cycle life of the maintenance items.

Column 6406 illustrates exemplary maintenance data for gasket maintenance items. Column 6408 of FIGS. 64A and 64B illustrates exemplary maintenance data for bearing maintenance items. Column 6410 of FIG. 64B illustrates exemplary maintenance data for seal maintenance items. Column 6412 of FIGS. 64B and 64D illustrate exemplary maintenance data for belt maintenance items. Column 6416 of FIG. 64C illustrates exemplary maintenance data for crank shaft maintenance items. Column 6418 of FIGS. 64C and 64D illustrates exemplary maintenance data for lubricant maintenance items. Column 6420 of FIG. 64D illustrates exemplary maintenance data for thermal media maintenance items. FIGS. 64E–64AB illustrate the same maintenance items as described in column 6404–6420, as associated with unit operations 7–22.

Figure 50:
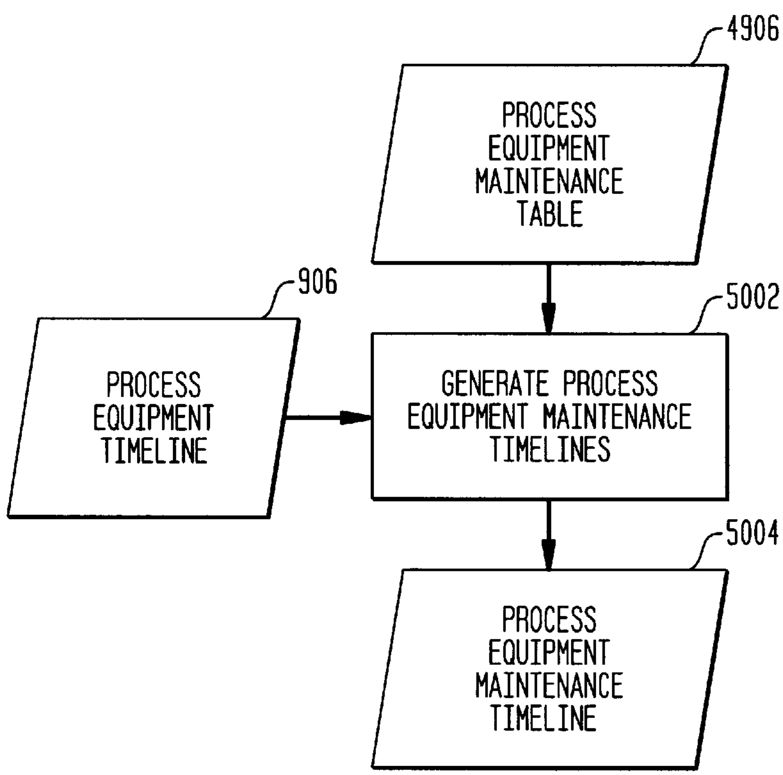
FIG. 50 is a block flow diagram illustrating the step of generating a process equipment maintenance time line.

FIG. 50 illustrates the process of generating the process equipment maintenance time line 5004. Process equipment maintenance time line 5004 is a schedule maintenance items or procedures for process equipment in the biopharmaceutical production process. Step 5002 generates process equipment maintenance time line 5004 by applying the equipment scheduling data from the process equipment time line 906 data to the process equipment maintenance table 4906. Step 5002 calculates the accumulated usage time for each piece of equipment and schedules maintenance on the equipment at the times specified by the process equipment maintenance table 4906. Process equipment maintenance time line 5004 includes process equipment maintenance data from process maintenance data 4906 and the specific time and date when each piece of process equipment should be serviced. Step 5002, therefore, determines the number of unit operations or process cycles required to attain the cycle life rating on the maintenance item in order to trigger the maintenance processes.

Figure 51:
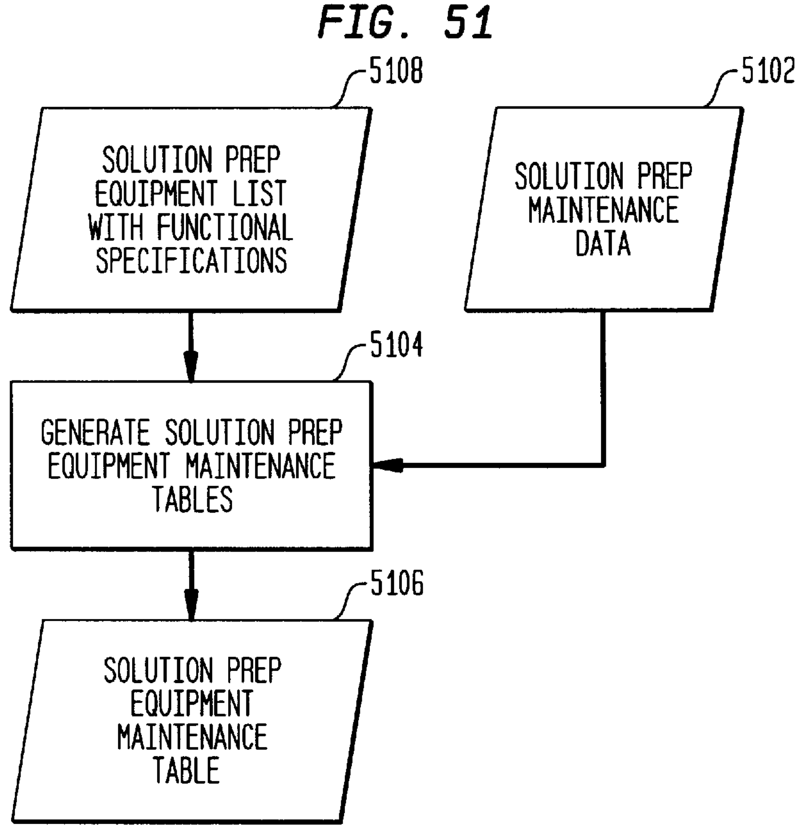
FIG. 51 is a block flow diagram illustrating the step of generating a solution preparation equipment maintenance table.

FIG. 51 illustrates the process of generating solution preparation equipment maintenance table 5106. Solution preparation equipment maintenance table 5106 includes maintenance procedures, maintenance duration (i.e., the amount of time required to perform the maintenance), reusables (i.e., those maintenance items that must be replaced periodically), disposables (i.e., those maintenance items that must be replaced after every use), the maintenance period (i.e., the amount of use before the equipment must be serviced), and the number of hours required to complete the maintenance tasks for the equipment.

Step 5104 generates solution preparation equipment maintenance table 5106 from the solution preparation equipment list and functional specifications 5108 and solution preparation equipment maintenance data 5102. Solution preparation equipment list 5108 is generated from preparation vessel identifier and associated volume list 1402. Preparation vessel identifier and associated volume list 1402 includes the solution preparation equipment associated with each solution preparation vessel. The solution preparation equipment list 5108, therefore, includes a list of solution preparation equipment from preparation vessel identifier and associated volume list 1402. Solution preparation equipment list 5108 also includes functional specifications associated with each piece of solution preparation equipment in solution preparation equipment list 4809. The functional specifications for each solution preparation vessel and its associated solution preparation equipment are included in preparation vessel identifier and associated volume list 1402 when it is defined.

Step 5104 generates solution preparation equipment maintenance table 5106 from solution preparation equipment list with functional specifications 5108 and solution preparation equipment maintenance data 5102. Solution preparation equipment maintenance data 5102 includes functional specifications for each piece of solution preparation equipment and their associated maintenance information. Solution preparation equipment maintenance data 5102 includes replaceables, reusables, labor, cycle life and the cost of the associated maintenance item. Some examples of replaceables and reusables are: filters, gaskets, bearings, seals, belts, crank-shafts, lubricants and thermal media. Associated with each maintenance item is the number and identifier for the item, the quantity, the cycle life (i.e., the amount of time or use before replacement), and the cost per cycle. Also included in solution preparation equipment maintenance data 5102 are the amount of labor associated with each maintenance item and the number of dollars per cycle for the labor.

Step 5104 matches solution preparation equipment list with functional specifications 5108 with solution preparation equipment maintenance data 5102, to generate solution preparation equipment maintenance table 5106. Solution preparation equipment list with functional specifications 5108 is matched with solution preparation equipment maintenance data 5102 based on a comparison of functional specifications in the solution preparation equipment list 5108 and the solution preparation equipment maintenance data 5102. Step 5104 copies the solution preparation equipment maintenance data 5102 for each piece of solution preparation equipment in the solution preparation equipment list 5108, thereby creating solution preparation equipment maintenance table 5106.

Figure 52:
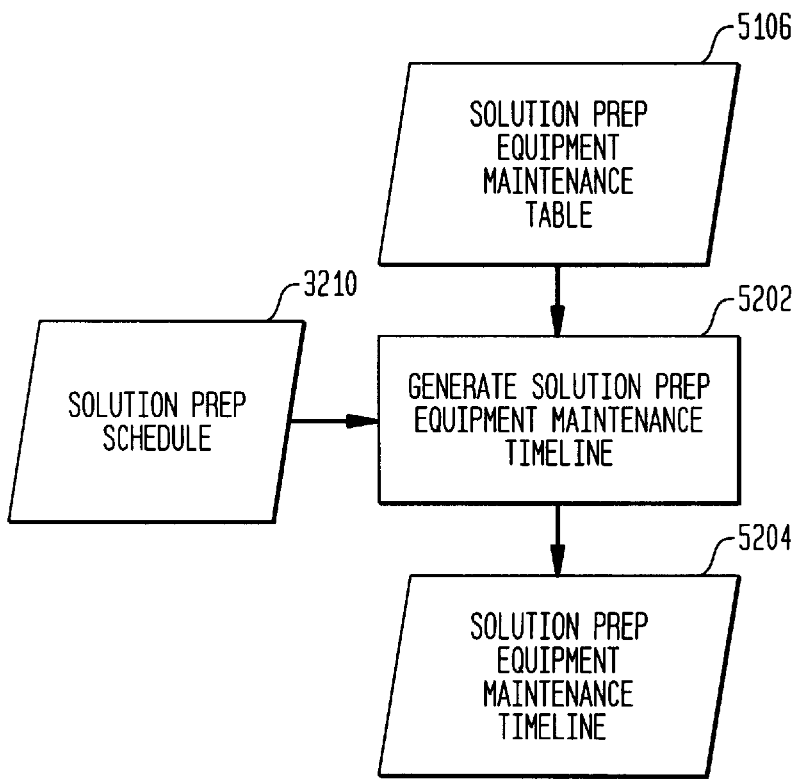
FIG. 52 is a block flow diagram illustrating the step of generating a solution preparation equipment maintenance time line.

FIG. 52 illustrates the process of generating the solution preparation equipment maintenance time line 5204. Solution preparation equipment maintenance time line 5204 is a schedule maintenance items or procedures for solution preparation equipment in the biopharmaceutical production process. Step 5202 generates process equipment maintenance time line 5204 by applying the equipment scheduling data from the solution preparation equipment time line 3210 data to the solution preparation equipment maintenance table 5106. Step 5202 calculates the accumulated usage time for each piece of equipment and schedules maintenance on the equipment at the times specified by the solution preparation equipment maintenance table 5106. Solution preparation equipment maintenance time line 5204 includes solution preparation equipment maintenance data from process maintenance data 5106 and the specific time and date when each piece of solution preparation equipment should be serviced. Step 5202, therefore, determines the number of unit operations or process cycles required to attain the cycle life rating on the maintenance item in order to trigger the maintenance processes.

Figure 53:
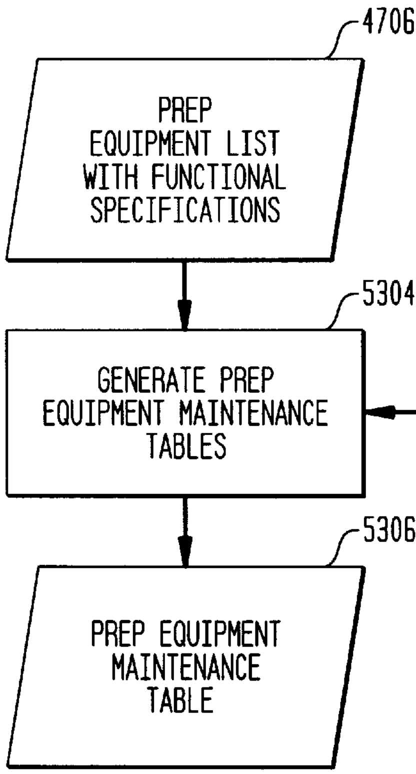
FIG. 53 is a block flow diagram illustrating the step of generating a preparation equipment maintenance table.

FIG. 53 illustrates the process of generating preparation equipment maintenance table 5306. Preparation equipment maintenance table 5306 includes maintenance procedures, maintenance duration (i.e., the amount of time required to perform the maintenance), reusables (i.e., those maintenance items that must be replaced periodically), disposables (i.e., those maintenance items that must be replaced after every use), the maintenance period (i.e., the amount of use before the equipment must be serviced), and the number of hours required to complete the maintenance tasks for the equipment.

Step 5304 generates preparation equipment maintenance table 5306 from preparation equipment list with functional specifications 4706 and preparation equipment maintenance data 5302. Preparation equipment list 4706 also includes functional specifications associated with each piece of preparation equipment as determined in step 3314. Preparation equipment maintenance data 5302 includes functional specifications for each piece of preparation equipment and their associated maintenance information. Preparation equipment maintenance data 5302 includes replaceables, reusables, labor, cycle life and the cost of the associated maintenance item.

Step 5304 matches preparation equipment list with functional specifications 4706 with preparation equipment maintenance data 5302, to generate preparation equipment maintenance table 5306. Preparation equipment list with functional specifications 4706 is matched with preparation equipment maintenance data 5302 based on a comparison of functional specifications in the preparation equipment list 4706 and the preparation equipment maintenance data 5302. Step 5304 copies the preparation equipment maintenance data 5302 for each piece of preparation equipment in the preparation equipment list 4706, thereby creating preparation equipment maintenance table 5306.

Figure 54:
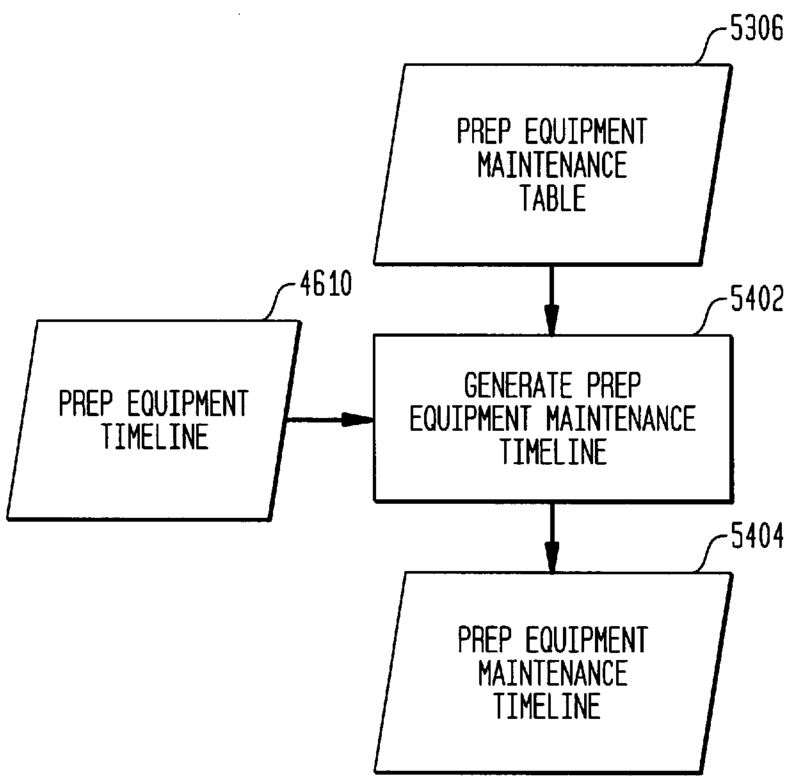
FIG. 54 is a block flow diagram illustrating the step of generating a preparation equipment maintenance time line.

FIG. 54 illustrates the process of generating the preparation equipment maintenance time line 5404. Preparation equipment maintenance time line 5404 is a schedule maintenance items or procedures for preparation equipment in the biopharmaceutical production process. Step 5402 generates process equipment maintenance time line 5404 by applying the equipment scheduling data from the preparation equipment time line 4610 data to the preparation equipment maintenance table 5306. Step 5402 calculates the accumulated usage time for each piece of equipment and schedules maintenance on the equipment at the times specified by the preparation equipment maintenance table 5306. Preparation equipment maintenance time line 5404 includes preparation equipment maintenance data from process maintenance data 5306 and the specific time and date when each piece of preparation equipment should be serviced. Step 5402, therefore, determines the number of unit operations or process cycles required to attain the cycle life rating on the maintenance item in order to trigger the maintenance processes.

5.0 Equipment Calibration Module

Equipment calibration in a biopharmaceutical production facility is necessary to sustain the biopharmaceutical production process. Equipment calibration is essential to the accurate measurement and control of all key manufacturing operations. Instruments such as pressure indicators, temperature indicators, flow meters, load cells etc. are at the core of most manufacturing systems. The reliability of these instruments and the processes they serve is dependent on punctual and consistent calibration programs. The types and frequency of calibration required is a function of the particular equipment used in the facility, as well as the frequency and nature of use. The equipment involved in the production process, solution preparation process and equipment preparation all require regular calibration during sustained operation. Often, calibration frequency and cost are not considered in the design of a biopharmaceutical production facility. Calibration costs and scheduling, however, are a significant fraction of the cost of operating the biopharmaceutical facility and producing the biopharmaceutical product. Since calibration is a significant cost of operating a biopharmaceutical production facility, a method and computer program product for scheduling and modeling the calibration of process equipment, solution preparation equipment and preparation equipment would allow the biopharmaceutical facility designer to predict and minimize the cost of equipment calibration. Additionally, scheduling and modeling equipment calibration of a biopharmaceutical production process would allow for more reliable calibration programs to insure the adequate and consistent performance of all manufacturing systems.

Modeling and scheduling biopharmaceutical production equipment calibration is based on the functional specifications and usage of the biopharmaceutical production process equipment. Each piece of equipment has associated calibration points. These calibration points typically include pressure indicators and transmitters, temperature indicators and transmitters, level sensors, flow meters, etc. All of these calibration points are required for the reliable operation of these process systems. Given equipment functional specifications, equipment calibration requirements and production schedules for biopharmaceutical production process equipment, equipment calibration can be modeled and scheduled.

Figure 55:
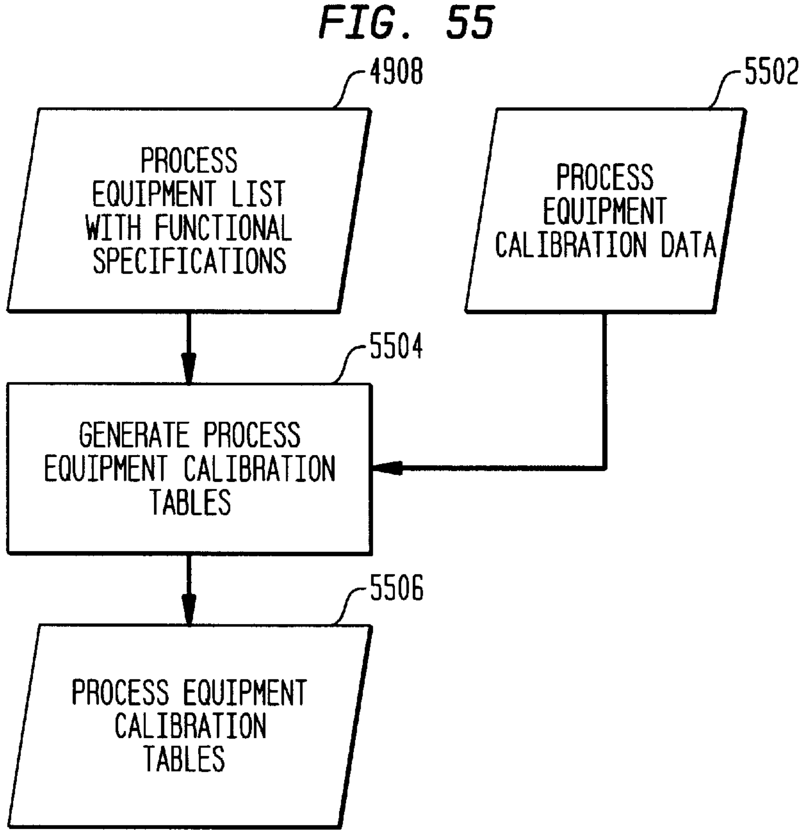
FIG. 55 is a block flow diagram illustrating the step of generating a process equipment calibration table.

FIG. 55 illustrates the process of generating process equipment calibration table 5506. Process equipment calibration table 5506 includes calibration procedures, calibration duration (i.e., the amount of time required to perform the calibration), the calibration period (i.e., the amount of use before the equipment must be serviced), and the number of hours required to complete the calibration tasks for the equipment.

Step 5504 generates process equipment calibration table 5506 from process equipment list with functional specifications 4908 and process equipment calibration data 5502. Process equipment calibration data 5502 includes functional specifications for each piece of process equipment and their associated calibration information. Process equipment calibration data 5502 includes replaceables, reusables, labor, cycle life and the cost of the associated calibration item. As mentioned above, some examples of replaceables and reusables are: filters, gaskets, bearings, seals, belts, crank-shafts, lubricants and thermal media. Associated with each calibration item is the number and identifier for the item, the quantity, the cycle life (i.e., the amount of time or use before replacement), and the cost per cycle. Also included in process equipment calibration data 5502 are the amount of labor associated with each calibration item and the number of dollars per cycle for the labor.

Step 5504 matches process equipment list with functional specifications 4908 with process equipment calibration data 5502, to generate process equipment calibration table 5506. Process equipment list with functional specifications 4908 is matched with process equipment calibration data 5502 based on a comparison of functional specifications in the process equipment list 4908 and the process equipment calibration data 5502. Step 5504 copies the process equipment calibration data 5502 for each piece of process equipment in the process equipment list 4908, thereby creating process equipment calibration table 5506.

Figure 56:
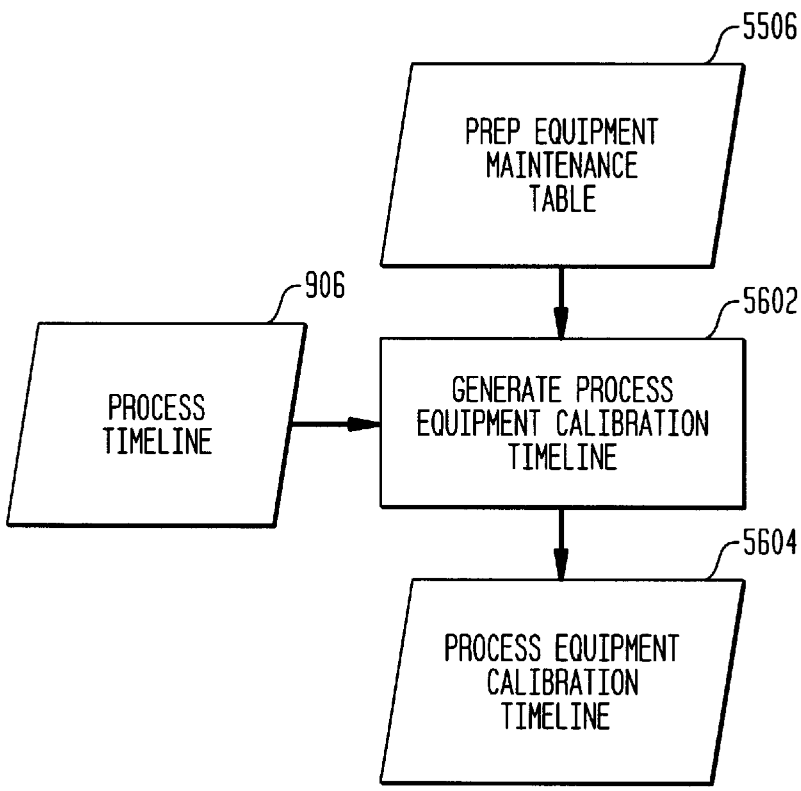
FIG. 56 is a block flow diagram illustrating the step of generating a process equipment calibration time line.

FIG. 56 illustrates the process of generating the process equipment calibration time line 5604. Process equipment calibration time line 5604 is a schedule calibration items or procedures for process equipment in the biopharmaceutical production process. Step 5602 generates process equipment calibration time line 5604 by applying the equipment scheduling data from the process equipment time line 906 data to the process equipment calibration table 5566. Step 5602 calculates the accumulated usage time for each piece of equipment and schedules calibration on the equipment at the times specified by the process equipment calibrationtable 5566. Process equipment calibration time line 5604 includes process equipment calibration data from process calibration data 5566 and the specific time and date when each piece of process equipment should be serviced. Step 5602, therefore, determines the number of unit operations or process cycles required to attain the cycle life rating on the calibration item in order to trigger the calibration processes.

Figure 57:
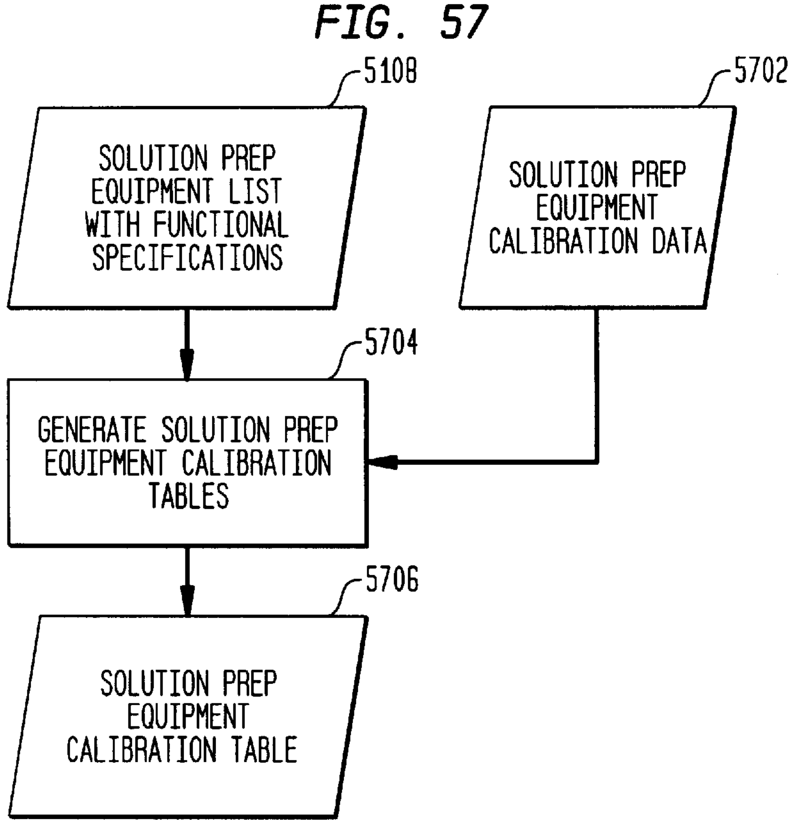
FIG. 57 is a block flow diagram illustrating the step of generating a solution preparation equipment calibration table.

FIG. 57 illustrates the process of generating solution preparation equipment calibration table 5706. Solution preparation equipment calibration table 5706 includes calibration procedures, calibration duration (i.e., the amount of time required to perform the calibration), reusables (i.e., those calibration items that must be replaced periodically), disposables (i.e., those calibration items that must be replaced after every use), the calibration period (i.e., the amount of use before the equipment must be serviced), and the number of hours required to complete the calibration tasks for the equipment.

Step 5704 generates solution preparation equipment calibration table 5706 from the solution preparation equipment list and functional specifications 5108 and solution preparation equipment calibration data 5702. Solution preparation equipment list 5108 is generated from preparation vessel identifier and associated volume list 1402. Preparation vessel identifier and associated volume list 1402 includes the solution preparation equipment associated with each solution preparation vessel. The solution preparation equipment list 5108, therefore, includes a list of solution preparation equipment from preparation vessel identifier and associated volume list 1402. Solution preparation equipment list 5108 also includes functional specifications associated with each piece of solution preparation equipment in solution preparation equipment list 4809. The functional specifications for each solution preparation vessel and its associated solution preparation equipment are included in preparation vessel identifier and associated volume list 1402 when it is defined.

Step 5704 generates solution preparation equipment calibration table 5706 from solution preparation equipment list with functional specifications 5108 and solution preparation equipment calibration data 5702. Solution preparation equipment calibration data 5702 includes functional specifications for each piece of solution preparation equipment and their associated calibration data.

Step 5704 matches solution preparation equipment list and functional specifications 5108 with solution preparation equipment calibration data 5702 to generate solution preparation equipment calibration table 5706. Solution preparation equipment list with functional specifications 5108 is matched with solution preparation equipment calibration data 5702 based on a comparison of functional specifications in the solution preparation equipment list 5108 and the solution preparation equipment calibration data 5702. Step 5704 copies the solution preparation equipment calibration data 5702 for each piece of solution preparation equipment in the solution preparation equipment list 5108, thereby creating solution preparation equipment calibration table 5706.

Figure 58:
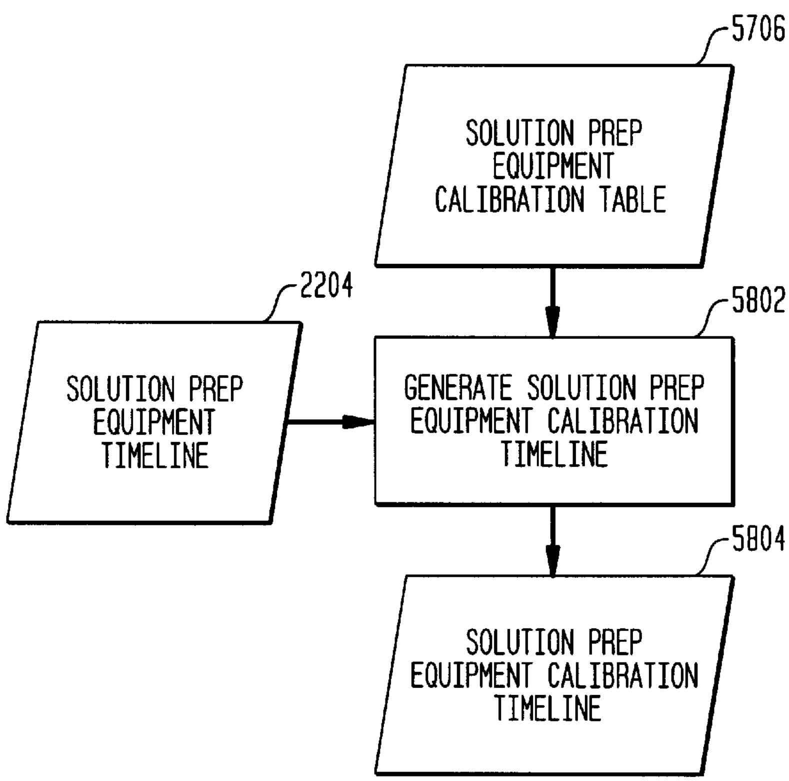
FIG. 58 is a block flow diagram illustrating the step of generating a solution preparation equipment calibration time line.

FIG. 58 illustrates the process of generating the solution preparation equipment calibration time line 5804. Solution preparation equipment calibration time line 5804 is a schedule of calibration items and procedures for solution preparation equipment in the biopharmaceutical production process. Step 5802 generates process equipment calibration time line 5804 by applying the equipment scheduling data from the solution preparation equipment time line 3210 data to the solution preparation equipment calibration table 5706. Step 5802 calculates the accumulated usage time for each piece of equipment and schedules re-calibration on the equipment at the times specified by the solution preparation equipment calibration table 5706. Solution preparation equipment calibration time line 5804 includew solution preparation equipment calibration data from process calibration data 5706 and the specific time and date when each piece of solution preparation equipment should be calibrated. Step 5802, therefore, determines the number of unit operations or process cycles required to attain the cycle life rating on the calibration of the equipment in order to trigger re-calibration of the equipment.

Figure 59:
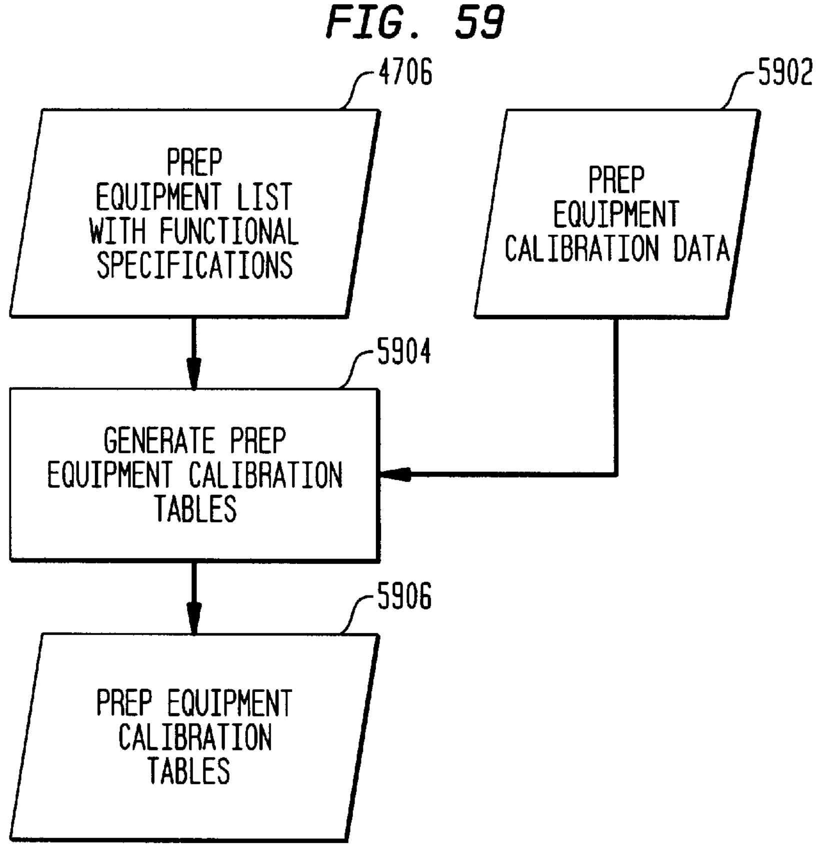
FIG. 59 is a block flow diagram illustrating the step of generating a preparation equipment calibration table.

FIG. 59 illustrates the process of generating preparation equipment calibration table 5906. Preparation equipment calibration table 5906 includew calibration procedures, calibration duration (i.e., the amount of time required to perform the calibration), the calibration period (i.e., the amount of use before the equipment must be serviced), and the number of hours required to complete the calibration tasks for the equipment.

Step 5904 generates preparation equipment calibration table 5906 from preparation equipment list with functional specifications 4706 and preparation equipment calibration data 5902. Preparation equipment list 4706 also includew functional specifications associated with each piece of preparation equipment as determined in step 3314. Preparation equipment calibration data 5902 includew functional specifications for each piece of preparation equipment and their associated calibration data. Preparation equipment calibration data 5902 includes labor, and cycle life of the associated with calibration.

Step 5904 matches preparation equipment list and functional specifications 4706 with preparation equipment calibration data 5902, to generate preparation equipment calibration table 5906. Preparation equipment list with functional specifications 4706 is matched with preparation equipment calibration data 5902 based on a comparison of functional specifications in the preparation equipment list 4706 and the preparation equipment calibration data 5902. Step 5904 copies the preparation equipment calibration data 5902 for each piece of preparation equipment in the preparation equipment list 4706, thereby creating preparation equipment calibration table 5906.

Figure 60:
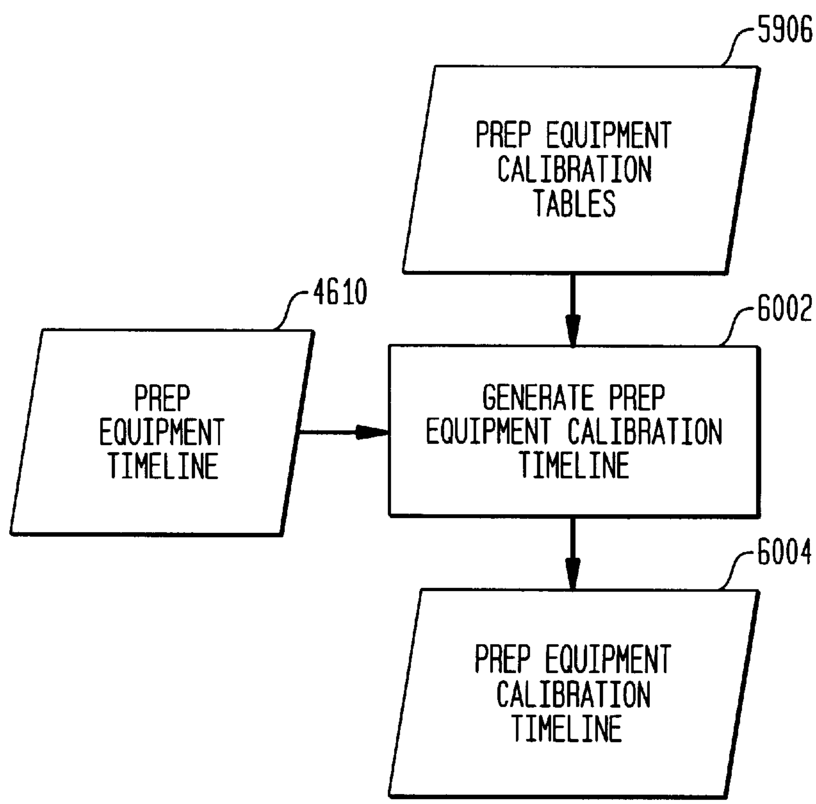
FIG. 60 is a block flow diagram illustrating the step of generating a preparation equipment calibration time line.

FIG. 60 illustrates the process of generating the preparation equipment calibration time line 6004. Preparation equipment calibration time line 6004 is a calibration schedule calibration for preparation equipment in the biopharmaceutical production process. Step 6002 generates process equipment calibration time line 6004 by applying the equipment scheduling data from the preparation equipment time line 4610 data to the preparation equipment calibration table 5906. Step 6002 calculates the accumulated usage time for each piece of equipment and schedules calibration on the equipment at the times specified by the preparation equipment calibration table 5906. Preparation equipment calibration time line 6004 includew preparation equipment calibration data from process calibration data 5906 and the specific time and date when each piece of preparation equipment should be calibrated. Step 6002, therefore, determines the number of unit operations or process cycles required to attain the cycle life rating on the calibration item in order to trigger the calibration processes.

6.0 Quality Control Module

Quality control in a biopharmaceutical production facility is necessary to ensure the safety and quality of the biopharmaceutical product. Quality control sampling and testing, at various points in the biopharmaceutical production process ensures contamination-free product during the process, solution preparation and equipment preparation. The type and frequency of quality control sampling and testing required in a biopharmaceutical production process is a function of the particular equipment used in the process, the frequency and nature of the equipment use and the particular step or task in which the equipment is engaged. Often, quality control testing, frequency and cost are not planned prior to the design of a biopharmaceutical production facility. Quality control, sampling and testing, however, play a significant role in scheduling the operation of a biopharmaceutical facility. Modeling and scheduling quality control sampling and testing in a biopharmaceutical production facility is based on the definitions of the basic steps in the biopharmaceutical production process. Quality control testing and sampling steps are specified for the production process, the solution preparation process and equipment preparation protocols.

Figure 61:
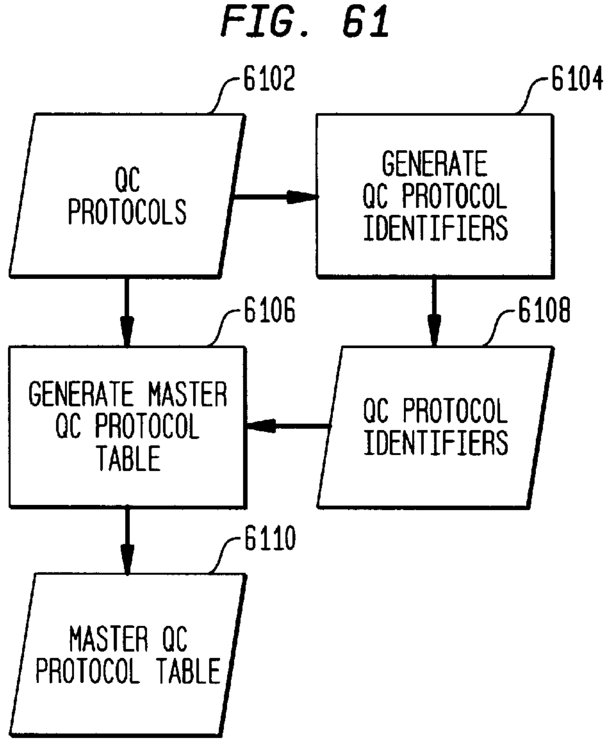
FIG. 61 is a block flow diagram illustrating the step of generating a master quality control protocol table.

FIG. 61 illustrates the process for generating a master quality control protocol table 6110. Quality control protocols are assays and testing procedures associated with quality control sampling and testing. Quality control protocols 6102 are defined by the biopharmaceutical facility designer, determined through testing and experimentation or specified by the vendor of the equipment in the biopharmaceutical facility. Quality control protocols 6102 include quality control protocol parameters. Quality control parameters are values that define the quality control assays. Examples of quality control parameters are the category and title of the assay, the setup time for the assay, the time required to draw each sample, the time required to clean up after taking the sample(s) and the disposal material necessary to dispose of the samples after testing.

Step 6104 generates quality control protocol identifiers 6108 for each of quality control protocols 6102. Quality control protocol identifiers 6108 are tags or codes that identify individual quality control protocols 6102. Step 6106 assigns quality control protocol identifiers 6108 to the quality control protocols 6102 resulting in master quality control protocol table 6110. Master quality control protocol table 6110 includes quality control protocols 6102 and a unique quality control identifier 6108 associated with each of quality control protocols 6102.

FIG. 21 illustrates an exemplary master quality control protocol table 6110. Column 2102 illustrates three exemplary categories of quality control protocols including environmental, analytical, and in vitro biological quality control protocols. Column 2104 illustrates exemplary quality control protocol identifiers 6108. Column 2106 illustrates exemplary values for quality control protocol parameters. More specifically, column 2106 illustrates quality control protocol parameters for the number of man-hours required to setup, draw each sample and cleanup the sampling operations associated with each quality control protocol. Setup and cleanup parameters define the amount of time necessary to setup prior to and cleanup after quality control protocol sampling. The per sample quality control protocol parameter defines the amount of time required to draw each sample. For example, 10 samples of temperature (quality control protocol identifier E-1) would require 0.5 man-hours to set up, 1.0 man-hours to sample (0.1 hours/sample×10 samples) and 0.5 man-hours to clean up.

Figure 62:
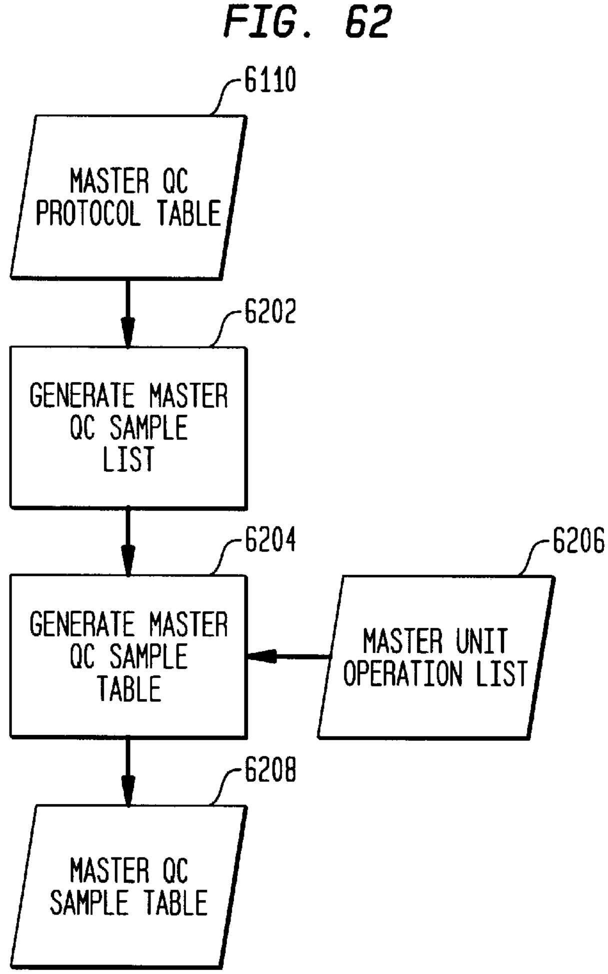
FIG. 62 is a block flow diagram illustrating the step of generating a master quality control sample table.

FIG. 62 illustrates the process of generating master quality control sample table 6208. Master quality control sample table 6208 includes all of the tasks and quality control sampling protocols associated with the production of a biopharmaceutical product. Each task or step in the process time line, the solution preparation schedule or the preparation equipment time line that has an associated quality control protocol 6102 is included in master unit operation list 6206. Each task or step in master unit operation list 6206 also includes a quality control protocol. The quality control protocol parameters of master quality control protocol table 6110 is used to generate master quality control sample list in step 6202. The master quality control sample list 6202 lists all the codes of the quality control protocols from the master QC protocol table 6110. Step 6204 uses the master quality control sample list to assign sampling assays to each step in master unit operation list 6206 according to which quality control protocol is assigned to each step in master unit operation list 6206. The result of step 6204 is a master QC sample table 6208 which includes all of the steps in the biopharmaceutical production process, solution preparation and equipment preparation as well as their associated quality control protocol and sample list.

Figure 63:
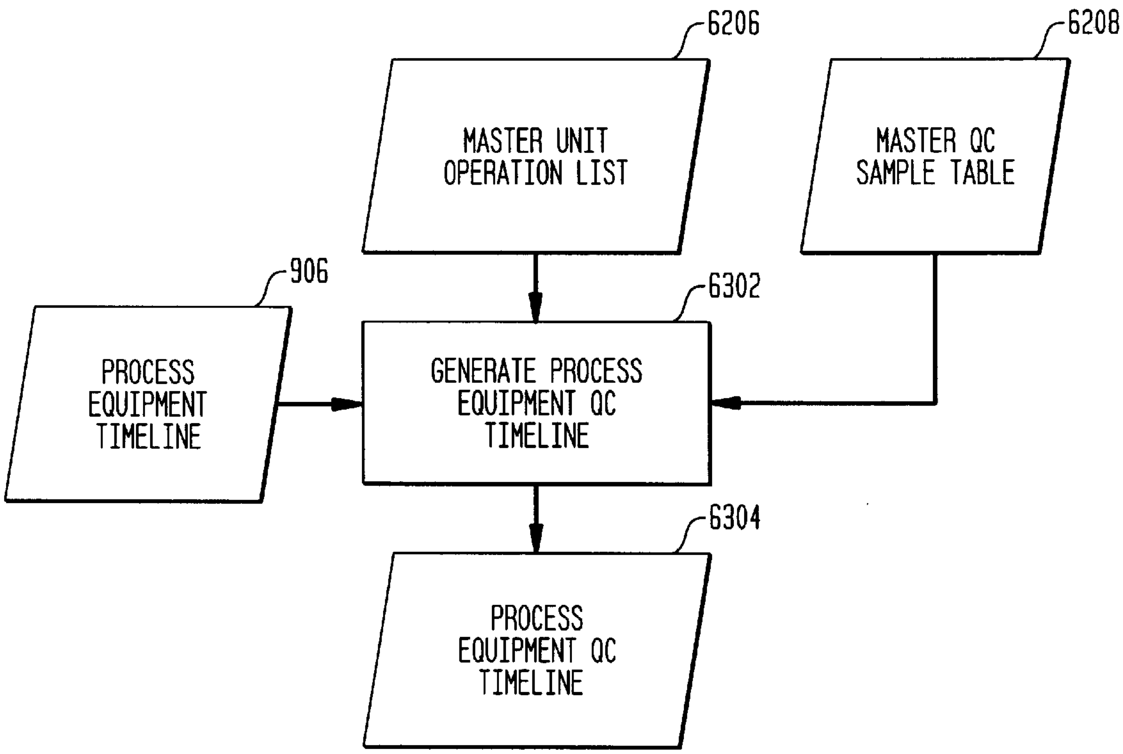
FIG. 63 is a block flow diagram illustrating the step of generating a process equipment quality control time line.

FIG. 63 illustrates the process for generating the process equipment quality control time line 6304. Quality control process equipment time line 6304 is a table of all the unit operations associated with process equipment time line 906 as well as the schedule of quality control assays and samples associated with each. Step 6302 generates the process equipment quality control time line 6304. Step 6302 matches the process steps of process equipment 906 with master unit operation list 6206 to determine which assays need to be assigned to the tasks in process equipment time line 906. Step 6302 assigns the quality control samples to be taken in each of the associated tasks from master quality control sample table 6208 to each of the tasks in process equipment time line 906, resulting in process equipment quality control time line 6304.

FIGS. 45A–45I illustrate an exemplary process equipment quality control time line 6304. FIG. 45A illustrates unit operations 1A–6A in column 4502. Scheduling for each of the tasks in unit operations 1A–6A is illustrated in columns 4504. Columns 4506 of FIGS. 45A–45B illustrate the quality control assays from master quality control protocol table 6110. Although columns 4506 are empty, if quality control samples where scheduled for unit operations 1A–6A in column 4502, columns 4506 would contain the number of samples to be taken at the scheduled time, as defined in master quality control sample table 6208. FIGS. 45C–45I illustrate the balance of the tasks and unit operations for the process equipment quality control time line 6304.

Figure 22:
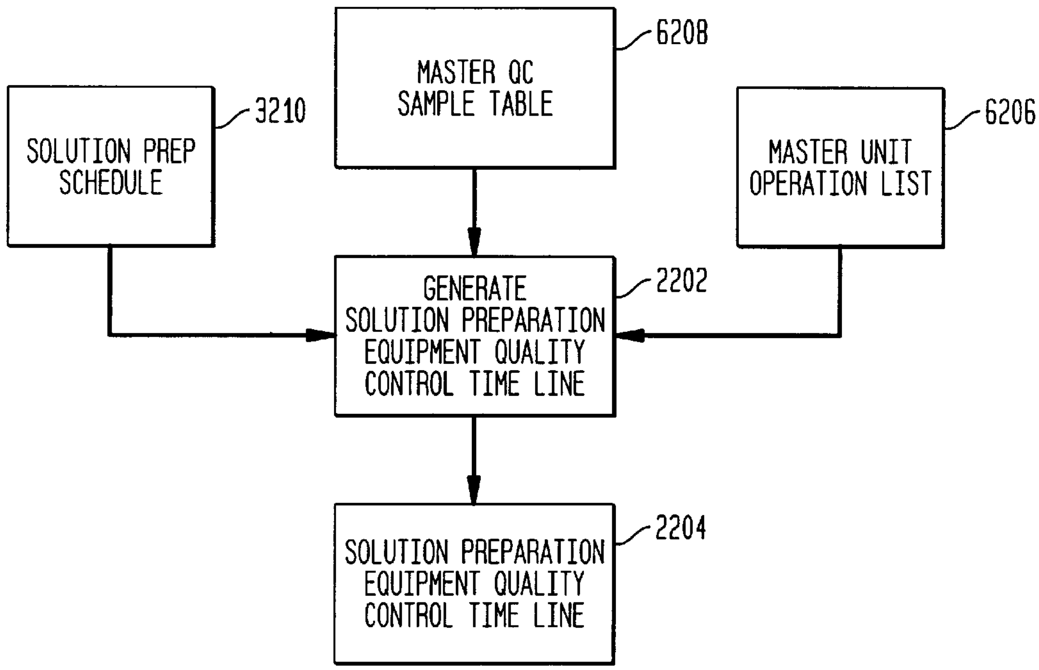
FIG. 22 is a block flow diagram illustrating the step of generating a solution preparation equipment quality control time line.

FIG. 22 illustrates the process for generating the solution preparation equipment quality control time line 2204. Quality control solution preparation equipment time line 2204 is a table of all the tasks associated with solution preparation schedule 3210, as well as the schedule of quality control assays and samples associated with each task. Step 2202 generates the solution preparation equipment quality control time line 2204. Step 2202 matches the solution preparation tasks of solution preparation schedule 3210 with master unit operation list 6206 to determine which assays need to be assigned to the tasks in solution preparation schedule 3210. Step 2202 assigns the quality control samples to be taken in each of the associated tasks with from master quality control sample table 6208 to each of the tasks in process equipment time line 906, resulting in process equipment quality control time line 2204.

Figure 23:
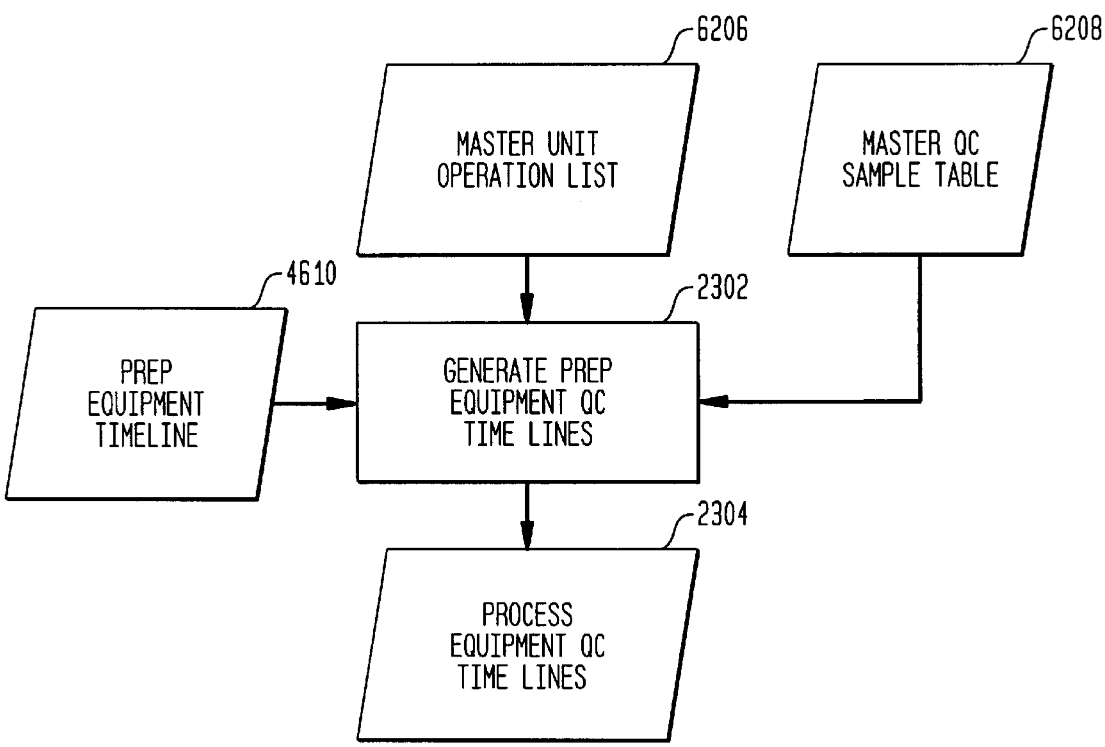
FIG. 23 is a block flow diagram illustrating the step of generating a preparation equipment quality control time line.

FIG. 23 illustrates the process for generating preparation equipment quality control time line 2304. Quality control preparation equipment time line 2304 is a table of all the tasks associated with preparation equipment time line 4610, as well as the schedule of quality control assays and samples associated with each task in the preparation equipment protocols. Step 2302 generates the preparation equipment quality control time line 2304. Step 2302 matches the equipment preparation tasks of preparation equipment time line 4610 with master unit operation list 6206 to determine which assays need to be assigned to the tasks in preparation equipment time line 4610. Step 2302 assigns the quality control samples to be taken in each of the associated tasks from master quality control sample table 6208 to each of the tasks in process equipment time line 906, resulting in process equipment quality control time line 2304.

7.0 Environment

Figure 19:
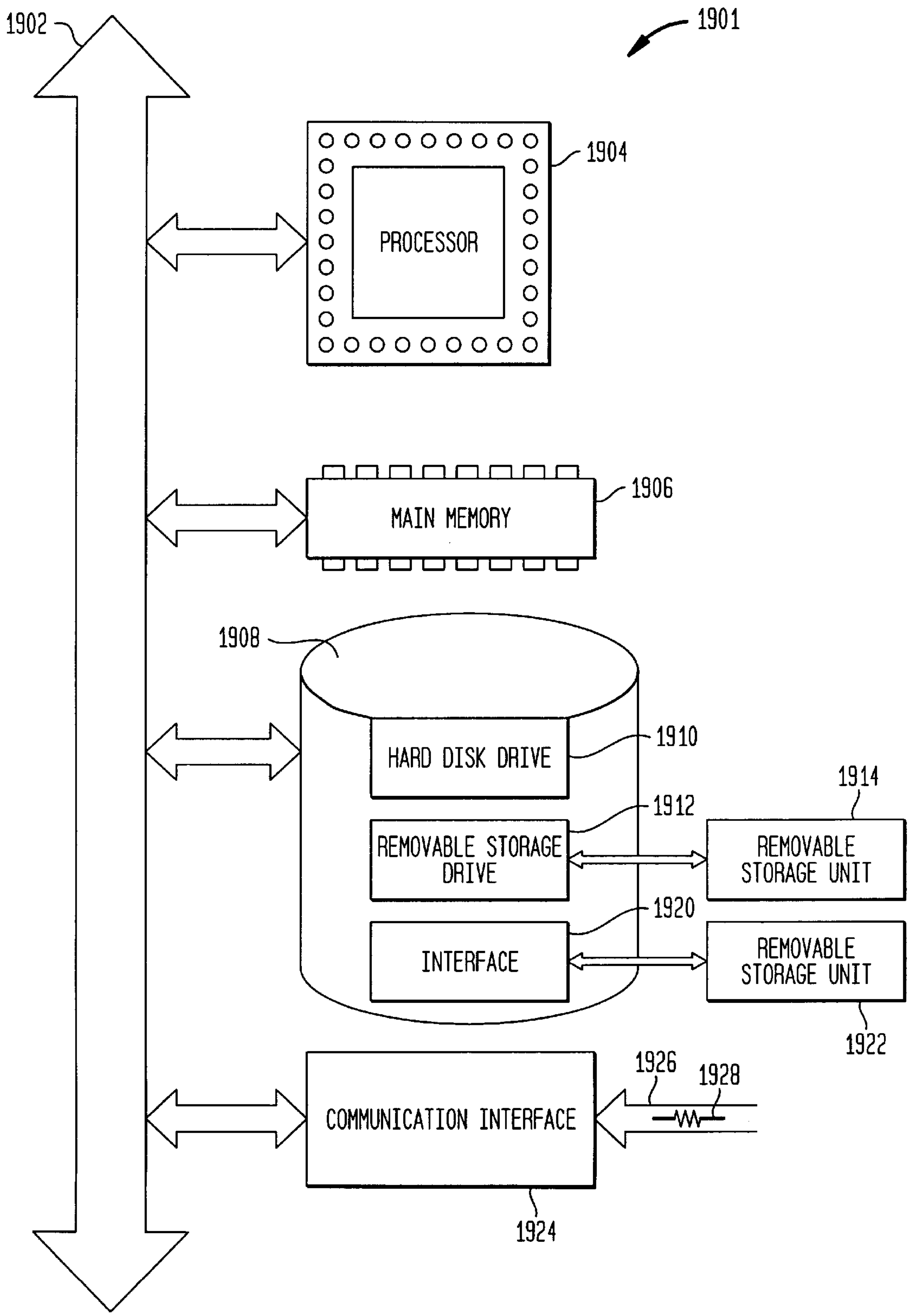
FIG. 19 illustrates an exemplary computer according to an embodiment of the present invention.

The present invention may be implemented using hardware, software or a combination thereof and may be implemented in a computer system or other processing system. In fact, in one embodiment, the invention is directed toward a computer system capable of carrying out the functionality described herein. An example computer system 1901 is shown in FIG. 19. The computer system 1901 includes one or more processors, such as processor 1904. The processor 1904 is connected to a communication bus 1902. Various software embodiments are described in terms of this example computer system. After reading this description, it will become apparent to a person skilled in the relevant art how to implement the invention using other computer systems and/or computer architectures.

Computer system 1902 also includes a main memory 1906, preferably random access memory (RAM), and can also include a secondary memory 1908. The secondary memory 1908 can include, for example, a hard disk drive 1910 and/or a removable storage drive 1912, representing a floppy disk drive, a magnetic tape drive, an optical disk drive, etc. The removable storage drive 1912 reads from and/or writes to a removable storage unit 1914 in a well known manner. Removable storage unit 1914, represents a floppy disk, magnetic tape, optical disk, etc. which is read by and written to by removable storage drive 1912. As will be appreciated, the removable storage unit 1914 includes a computer usable storage medium having stored therein computer software and/or data.

In alternative embodiments, secondary memory 1908 may include other similar means for allowing computer programs or other instructions to be loaded into computer system 1901. Such means can include, for example, a removable storage unit 1922 and an interface 1920. Examples of such can include a program cartridge and cartridge interface (such as that found in video game devices), a removable memory chip (such as an EPROM, or PROM) and associated socket, and other removable storage units 1922 and interfaces 1920 which allow software and data to be transferred from the removable storage unit 1922 to computer system 1901.

Computer system 1901 can also include a communications interface 1924. Communications interface 1924 allows software and data to be transferred between computer system 1901 and external devices. Examples of communications interface 1924 can include a modem, a network interface (such as an Ethernet card), a communications port, a PCMCIA slot and card, etc. Software and data transferred via communications interface 1924 are in the form of signals which can be electronic, electromagnetic, optical or other signals capable of being received by communications interface 1924. These signals 1926 are provided to communications interface via a channel 1928. This channel 1928 carries signals 1926 and can be implemented using wire or cable, fiber optics, a phone line, a cellular phone link, an RF link and other communications channels.

In this document, the terms "computer program medium" and "computer usable medium" are used to generally refer to media such as removable storage device 1912, a hard disk installed in hard disk drive 1910, and signals 1926. These computer program products are means for providing software to computer system 1901.

Computer programs (also called computer control logic) are stored in main memory and/or secondary memory 1908. Computer programs can also be received via communications interface 1924. Such computer programs, when executed, enable the computer system 1901 to perform the features of the present invention as discussed herein. In particular, the computer programs, when executed, enable the processor 1904 to perform the features of the present invention. Accordingly, such computer programs represent controllers of the computer system 1901.

In an embodiment where the invention is implemented using software, the software may be stored in a computer program product and loaded into computer system 1901 using removable storage drive 1912, hard drive 1910 or communications interface 1924. The control logic (software), when executed by the processor 1904, causes the processor 1904 to perform the functions of the invention as described herein.

In another embodiment, the invention is implemented primarily in hardware using, for example, hardware components such as application specific integrated circuits (ASDICS). Implementation of the hardware state machine so as to perform the functions described herein will be apparent to persons skilled in the relevant art(s).

In yet another embodiment, the invention is implemented using a combination of both hardware and software.

8.0 Conclusion

While the invention has been particularly shown and described with reference to preferred embodiments thereof, it will be understood by those skilled in the relevant art that various changes in form and details may be made therein without departing from the spirit and scope of the invention.

What is claimed is:

1. A computer-implemented method for simulating equipment maintenance in a biopharmaceutical production process, comprising the steps of:

(1) accessing an equipment list, said list comprising each piece of equipment necessary to perform required tasks in a unit operation of the biopharmaceutical production process and a set of functional specifications for each of said pieces of equipment;

(2) accessing an equipment data store, said data store comprising maintenance data for each of said pieces of equipment in said equipment list;

(3) generating, using said equipment list and said equipment data store, an equipment maintenance table, said maintenance table including maintenance procedures, period and duration for each of said pieces of equipment;

(4) accessing an equipment time line which includes the start and stop times for the required tasks in said unit operation of the biopharmaceutical production process; and (5) generating, using said equipment maintenance table and said equipment time line, an equipment maintenance time line which indicates the specific time and date when each of said pieces of equipment should be serviced;

wherein said equipment maintenance time line contains information that can be used to determine an optimal design for a biopharmaceutical batch process manufacturing facility where said unit operation will be performed.

2. The computer-implemented method of claim 1, wherein said equipment list, said equipment data store, and said equipment time line includes information for at least one of the following types of equipment used in said unit operation of the biopharmaceutical production process:

(i) process equipment;

(ii) preparation equipment; and (iii) solution preparation equipment.

3. The computer-implemented method of claim 1, wherein one of said pieces of equipment is a pump, and said functional specifications for said pump include at least one of the following specifications:

(i) pump type;

(ii) flow rate;

(iii) maximum and minimum input and output pressures;

(iv) input and output fitting sizes;

(v) electrical requirement;

(vi) temperature range;

(vii) type of required maintenance; and (viii) frequency of required maintenance.

4. The computer-implemented method of claim 1, wherein said maintenance data in said equipment data store includes at least one of the following types of data for each of said pieces of equipment:

(i) replaceables;

(ii) reusables;

(iii) labor cycle life; and (iv) maintenance cost.

5. A computer program product comprising a computer usable medium having computer readable program code means embodied in said medium for causing an application program to execute on a computer that simulates equipment maintenance in a biopharmaceutical production process, said computer readable program code means comprising:

first computer readable program code means for causing the computer to access an equipment list, said list comprising each piece of equipment necessary to perform required tasks in a unit operation of the biopharmaceutical production process and a set of functional specifications for each of said pieces of equipment;

second computer readable program code means for causing the computer to access an equipment data store, said data store comprising maintenance data for each of said pieces of equipment in said equipment list;

third computer readable program code means for causing the computer to generate, using said equipment list and said equipment data store, an equipment maintenance table, said maintenance table including maintenance procedures, period and duration for each of said pieces of equipment;

fourth computer readable program code means for causing the computer to access an equipment time line which includes the start and stop times for the required tasks in said unit operation of the biopharmaceutical production process; and fifth computer readable program code means for causing the computer to generate, using said equipment maintenance table and said equipment time line, an equipment maintenance time line which indicates the specific time and date when each of said pieces of equipment should be serviced;

wherein said equipment maintenance time line contains information that can be used to determine an optimal design for a biopharmaceutical batch process manufacturing facility where said unit operation will be performed.

6. A computer-implemented method for simulating equipment calibration in a biopharmaceutical production process, comprising the steps of:

(1) accessing an equipment list, said list comprising each piece of equipment necessary to perform required tasks in a unit operation of the biopharmaceutical production process and a set of functional specifications for each of said pieces of equipment;

(2) accessing an equipment data store, said data store comprising calibration data for each of said pieces of equipment in said equipment list;

(3) generating, using said equipment list and said equipment data store, an equipment calibration table, said calibration table including calibration procedures, period and duration for each of said pieces of equipment;

(4) accessing an equipment time line which includes the start and stop times for the required tasks in said unit operation of the biopharmaceutical production process; and (5) generating, using said equipment calibration table and said equipment time line, an equipment calibration time line which indicates the specific time and date when each of said pieces of equipment should be calibrated;

wherein said equipment calibration time line contains information that can be used to determine an optimal design for a biopharmaceutical batch process manufacturing facility where said unit operation will be performed.

7. The computer-implemented method of claim 6, wherein said equipment list, said equipment data store, and said equipment time line includes information for at least one of the following types of equipment in the biopharmaceutical production process:

(i) process equipment;

(ii) preparation equipment; and (iii) solution preparation equipment.

8. The computer-implemented method of claim 6, wherein said calibration data in said equipment data store includes at least one of the following types of data for each of said pieces of equipment:

(i) replaceables;

(ii) reusables;

(iii) labor cycle life; and (iv) calibration cost.

9. A computer program product comprising a computer usable medium having computer readable program code means embodied in said medium for causing an application program to execute on a computer that simulates equipment calibration in a biopharmaceutical production process, said computer readable program code means comprising:

first computer readable program code means for causing the computer to access an equipment list, said list comprising each piece of equipment necessary to perform required tasks in a unit operation of the biopharmaceutical production process and a set of functional specifications for each of said pieces of equipment;

second computer readable program code means for causing the computer to access an equipment data store, said data store comprising calibration data for each of said pieces of equipment in said equipment list;

third computer readable program code means for causing the computer to generate, using said equipment list and said equipment data store, an equipment calibration table, said calibration table including calibration procedures, period and duration for each of said pieces of equipment;

fourth computer readable program code means for causing the computer to access an equipment time line which includes the start and stop times for the required tasks in said unit operation of the biopharmaceutical production process; and fifth computer readable program code means for causing the computer to generate, using said equipment calibration table and said equipment time line, an equipment calibration time line which indicates the specific time and date when each of said pieces of equipment should be calibrated;

wherein said equipment calibration time line contains information that can be used to determine an optimal design for a biopharmaceutical batch process manufacturing facility where said unit operation will be performed.

* * * * *